US012539861B2

(12) United States Patent
Gesang et al.

(10) Patent No.: US 12,539,861 B2
(45) Date of Patent: Feb. 3, 2026

(54) SOFTWARE-DEFINED HYBRID POWERTRAIN AND VEHICLE

(71) Applicants: Wangjie Gesang, Shanghai (CN); Wei Cha, Shanghai (CN); LCB International Inc., Tortola (VG)

(72) Inventors: Wangjie Gesang, Shanghai (CN); Wei Cha, Shanghai (CN)

(73) Assignees: Wangjie Gesang, Shanghai (CN); Wei Cha, Shanghai (CN); LCB International Inc., Tortola (VG)

( * ) Notice: Subject to any disclaimer, the term of this patent is extended or adjusted under 35 U.S.C. 154(b) by 303 days.

(21) Appl. No.: 18/275,551

(22) PCT Filed: Jan. 21, 2022

(86) PCT No.: PCT/CN2022/073181
§ 371 (c)(1),
(2) Date: Dec. 29, 2023

(87) PCT Pub. No.: WO2022/166616
PCT Pub. Date: Aug. 11, 2022

(65) Prior Publication Data
US 2025/0269856 A1    Aug. 28, 2025

(30) Foreign Application Priority Data
Feb. 5, 2021 (CN) .......... 202110163841.4

(51) Int. Cl.
*B60W 30/188* (2012.01)
*B60K 1/02* (2006.01)
(Continued)

(52) U.S. Cl.
CPC .......... *B60W 30/1882* (2013.01); *B60K 1/02* (2013.01); *B60K 6/20* (2013.01); *B60W 10/02* (2013.01);
(Continued)

(58) Field of Classification Search
None
See application file for complete search history.

(56) References Cited

U.S. PATENT DOCUMENTS

| | | | |
|---|---|---|---|
| 5,345,154 A | 9/1994 | King | |
| 5,791,427 A * | 8/1998 | Yamaguchi | B60L 7/14 903/910 |
| 2009/0260903 A1 * | 10/2009 | Park | B60W 30/1882 180/65.21 |

FOREIGN PATENT DOCUMENTS

| | | |
|---|---|---|
| CN | 1857941 A | 11/2006 |
| CN | 103978880 A | 8/2014 |

(Continued)

OTHER PUBLICATIONS

International Search Report issued for International Application No. PCT/CN2022/073181, entitled "Software-Defined Hybrid Powertrain and Vehicle," mailed on Mar. 23, 2022.

(Continued)

*Primary Examiner* — Peter D Nolan
*Assistant Examiner* — Michael F Whalen
(74) *Attorney, Agent, or Firm* — Hamilton, Brook, Smith & Reynolds, P.C.

(57) ABSTRACT

A dual-motor mixed-hybrid powertrain system, by performing pulse modulation control, i.e., series-hybrid intelligent start-stop control or parallel-hybrid intelligent power switching control, on the instantaneous power time-varying functions of an engine and a battery pack, can convert the surface working condition of an analog electric control engine into a simpler line working condition of a digital pulse control (DPC) engine, either a pre-determined high-state line working condition in the high-efficiency combustion area or a pre-determined non-combustion low-state line working condition with zero fuel consumption and zero pollutant emissions multiplexed in time. The traditional (Continued)

fixed one-to-one bidirectional mapping between an engine working condition and a vehicle working condition is converted into a dynamically adjustable many-to-many bidirectional mapping to achieve the full coverage of any overall vehicle working condition, achieving decoupling between a DPC engine working condition and the overall vehicle working condition and decoupling between software and hardware of a hybrid powertrain.

15 Claims, 5 Drawing Sheets

(51) Int. Cl.
*B60K 6/20* (2007.10)
*B60W 10/02* (2006.01)
*B60W 10/06* (2006.01)
*B60W 10/08* (2006.01)
*B60W 10/26* (2006.01)
*B60W 20/13* (2016.01)
*B60W 20/40* (2016.01)
*B60W 20/16* (2016.01)

(52) U.S. Cl.
CPC ............ *B60W 10/06* (2013.01); *B60W 10/08* (2013.01); *B60W 10/26* (2013.01); *B60W 20/13* (2016.01); *B60W 20/40* (2013.01); *B60W 20/16* (2016.01); *B60W 2300/125* (2013.01); *B60W 2510/0208* (2013.01); *B60W 2710/0644* (2013.01); *B60W 2710/0666* (2013.01)

(56) References Cited

FOREIGN PATENT DOCUMENTS

| CN | 108973979 A | 12/2018 |
|---|---|---|
| CN | 109823188 A | 5/2019 |
| CN | 111746259 A | 10/2020 |
| EP | 4091893 A1 | 1/2021 |
| WO | 2022/166616 A1 | 8/2022 |

OTHER PUBLICATIONS

Extended European Search Report for European Application No. 22748895.4, dated Feb. 14, 2025, 11 pages.

* cited by examiner

SOFTWARE-DEFINED HYBRID POWERTRAIN AND VEHICLE

This application is the U.S. National Stage of International Application No. PCT/CN2022/073181, filed Jan. 21, 2022, which designates the U.S., published in Chinese, and claims priority under 35 U.S.C. § 119 or 365(c) to Chinese Application No. 202110163841.4, filed Feb. 5, 2021. The entire teachings of the above applications are incorporated herein by reference.

TECHNICAL FIELD

This application relates to a mixed hybrid powertrain and a vehicle.

BACKGROUND

Road freight is critical to all major economies in the world. The long-haul freight truck (average working day runs more than 600 kM, more than 80% of the driving mileage is along a controlled-access expressway; The total vehicle weight exceeds 15 tons) is the core of the road freight industry. It is also a major source of fuel consumption (CO2) and pollutant emissions (NOx) in transportation. It is one of the key areas of the national government's annual energy conservation and emission reduction supervision. Today, Europe and the United States mandatory emission regulations on large commercial vehicles (with gross vehicle weight rating over 10 tons) including on-road heavy trucks ("heavy truck" for short) have moved from Euro-VI standard (effective in Europe since 2014) and US EPA-2010 (effective in USA since 2010) with emphasis on exhaust pollutant emissions reduction to a series of new emission standards with emphasis on the reduction of CO2 and other greenhouse gas emissions from the vehicle exhaust. The carbon emission (CO2 g/kM) of the vehicle is basically proportional to its fuel consumption (L/100 kM), therefore reducing the fuel consumption (or improving the fuel economy MPG) is equivalent to reducing carbon emissions.

The second phase of the greenhouse gas (GHG-II) for the medium/heavy engine (diesel or natural gas) and commercial vehicle promulgated by the US Federal Government in 2016 explicitly defines the period from 2021 to 2027, all the US newly registered medium/heavy engines and commercial vehicles maintaining the same EPA-2010 exhaust-gas pollutant emissions limit values, must improve the vehicle fuel economy (FE, mile/gallon) year over year, reducing fuel consumption (FC, L/100 kM) or carbon emission (CO2, g/kM) to meet detailed mandatory standards. In 2019, the EU passed the first mandatory regulation on heavy truck carbon emission in its history (that is, the European CO2 standard); Under the premise of keeping the Euro-VI exhaust-gas pollutant emission limit unchanged, taking 2019 years diesel heavy truck carbon emission (fuel consumption) as the reference, requiring by 2025 years, European new heavy truck carbon emission (CO2, g/kM) is reduced by 15%; by 2030 years, carbon emission is reduced by 30%. China began to implement large commercial vehicle GB-5 mandatory emission regulations nationwide in 2017, and from July 2021, the country's national—GB-6 mandatory emission regulations have been implemented nationwide; The national GB-6 standard is basically the same as the European-VI standard and the US EPA-2010 standard at the exhaust-gas pollutant emissions limit values, and some individual limit values are even more stringent; At the same time, China also has regulations on heavy truck fuel consumption or carbon emission.

The regulations are the most important driving force for the development of powertrain technology in various countries in the world. The powertrain of China—GB-6 heavy trucks will be in the same technical platform for the first time in the history of the powertrain of the current North American and European trucks. According to the promulgation of the promulgation of China-1 to GB-6 regulations in the past 20 years, China will follow the historical experience of EU-1 to European-VI regulations, and it is expected that China will follow up the EU, and soon launch new regulations on focusing on carbon emission intensity and fuel consumption. Obviously, after 2021 years, the mandatory emission regulations and industry focus of the three major markets in the world (China, the United States, and the United States) will continue to reduce the fuel consumption and carbon emissions of heavy-truck trucks by reducing the emissions of the heavy-truck exhaust-gas emissions. The average fuel cost of a trunk line is nearly 60 million US dollars per year in Europe and the United States, and the annual fuel cost of China is up to four hundred thousand RMB per year. The annual total oil cost of more than 2 million heavy trucks in the US exceeds 100 billion US dollars, and the total oil cost of more than 5 million heavy trucks in China is more than 10 billion RMB per year. Through technological innovation, the fuel consumption and emission of heavy truck are reduced, the main engine plant, driver, fleet, shipper, government, society and other interests are not all the meaning of the party.

The United States has been in the forefront of heavy-truck emissions and fuel consumption regulations and technological research and development. SuperTruck I, 2011-2016, led by the US Energy Department (DOE) with a total government funding of $100 million, four technical teams from the four major U.S.-based major heavy-truck manufacturers, four of the four superheavy truck-like vehicles produced by the five-year development, At the end of 2016, the target of improving 50% for 2009 heavy truck cargo fuel economy (gallon/ton miles) and 50% of diesel engine thermal efficiency (BTE) was completed. From 2017 to 2022, the US Department of Energy subsidized five technical teams for a total of US$80 million. The SuperTruck II project (SuperTruck II) is implemented. It is expected that five super-heavy truck-like vehicles 2022 will achieve a 100% improvement in diesel engine thermal efficiency (BTE) 55% and heavy truck fuel economy (gallon/ton miles). Each of the technical teams led by the heavy-truck host plant, the total resource investment of the enterprise itself, is higher than the amount of subvention from the US government obtains SuperTruck I&II, the two-phase U.S. Super Truck Item (2011~2022), has invested more than $4 billion in the U.S. federal government; The technical route and development and test results of nine super heavy truck-like vehicles represent the top technical level of the world's heavy truck industry today.

The U.S. super-truck project includes all heavy-truck energy-saving and emission-reducing technical solutions that the North American heavy-truck industry believes that 2027 years may be produced and the ground is used for commercial use, the main challenge is how to improve the comprehensive performance-to-price ratio of various energy-saving and emission-reducing technical solution products, and accelerate the pace of mass production and commercial landing. At present, the long-term challenge in the heavy-truck industry in the United States is how to achieve the mandatory requirements of the GHG-II heavy-truck fuel consumption in 2027 years, under the premise of effectively controlling the price expansion of the new heavy truck. It is worth noting that all nine technical teams in the US Super Truck project do not have a deep diesel-electric hybrid heavy-truck technology route; Obviously, in today's U.S. heavy-truck industry, the full-hybrid HDT technical solution cannot be used for commercial production before 2027.

In the past ten years, in the world's major automotive market, especially the world's largest Chinese automotive market, the passenger vehicle and large passenger vehicle of pure electricity or diesel-electric hybrid power are heavily subsidized by the government, and there is large scale commercial success precedent, but in China/America/the European Union, the three world-wide ranges are the largest, technology is the most advanced trunk line freight truck market, industry experts at home and abroad generally considers 2030 years before, limited to power battery technology and performance limit of the industrialization of today, zero discharge pure electric heavy truck or ultra-low discharge deep mixed heavy truck (Full Hybrid Truck) under the condition of no government subsidy, under the trunk logistics scene, it is difficult to realize large-scale commercial, In other words, the electric power of the long-haul heavy trucks the technical peak of the current global new energy automobile industry unconquered. Details of the following European and American Open Industry Research Report: 1) Ricardo's 2017 study report entitled "Heavy Vehicle Technology Potential and Cost Analysis". Ricardo (2017), "Heavy Duty Vehicle Technology Potential and Cost Study", Final Report for ICCT, 2) International Clean Transportation Association (ICCT) Oscar Delgado et al. The White Paper issued in January 2018, "European Heavy-Duty Vehicles: Cost Effects of Effects-Efficiency Technologies for Long-Haul Tractor-Trailers in the 2025-2030Timeframe (3) International Clean Transport Association (ICCT) Felipe Rrodriguez, Ph. 2018 Jun. 28, "HDV Fuel Efficiency Technologies"; 4) The United States Energy Department submitted the report "Adoption of New Fuel Technologies from SuperTruck" in the Congress in June 2016. 5) North America Cargo Efficiency Association (NACFE) 2019 year is "pure electricity, mix, or replace fuel heavy truck" research report; "Viable Class 7/8Electric, Hybrid and Alternative Fuel Tractors", North American Council for Freight Efficiency, 2019.

The actual fuel consumption (up/hundred kM) of the oil-electric hybrid vehicle is associated with the height of the vehicle operating condition (Duty Cycle), the average vehicle speed of the vehicle under the urban working-condition (Urban) is low (less than 40 kmph), the active acceleration, deceleration or braking frequent; The average vehicle speed of the vehicle (more than 60 kmph) under the expressway (Highway) condition is actively accelerated, and the deceleration or braking is not frequent. The hybrid vehicle is mainly used for recycling energy by regenerative braking of the traction motor to achieve the beneficial effects of energy saving and emission reduction. For a long time, the fuel-saving potential for hybrid vehicles (light vehicles or heavy vehicles) in the global automotive industry and academia has the following "Consensus": under the city condition, the mixed vehicle is obviously fuel-saving than the traditional fuel oil vehicle; the comprehensive fuel consumption can be reduced by more than 30%; but under the expressway condition (the average speed is higher than 60 kmph; little active acceleration or brake deceleration), engine can stably work in the high efficiency zone, regenerative braking recycling energy of less chance, mixing vehicle than the traditional fuel oil vehicle fuel-saving effect is not obvious, comprehensive fuel consumption reducing amplitude is not more than 10%; especially in series hybrid vehicle, because the engine power generation and pure electric drive need to be converted by multiple energy, the fuel-saving effect under expressway working-condition is not such as parallel hybrid vehicle, even more fuel oil than the traditional fuel vehicle.

In the engine of the heavy-truck, the ratio of diesel engine is more than 95%, The heavy truck diesel engine can stably work under the high speed working-condition in the combustion high-efficiency zone, after dozens of years of improvement, the oil saving edge benefit is reduced, further reducing the traditional diesel engine fuel consumption and the technical challenge of discharging is increasing, the cost is increased and higher; In the past 25 years, the United States, Europe, and the average fuel consumption (up/100 kM) of the Chinese long-haul logistics heavy-truck industry have been reduced by less than 1.5%, For heavy-truck manufacturers in Europe and America or China, the market-recognized performance-to-price ratio significantly reduces the actual comprehensive fuel consumption (up/hundred kM) of the long-haul truck, and has a huge challenge in technology and business. Reference is made to the European Automotive Manufacturers Association (ACEA) on the European Union's position document on the European Union's new CO2 emission standard for New Year's (European Commission Propee) Standards for New York Heavy-Duty,"; ACEA considered the new carbon emission (CO2) mandatory standard to be approved by the European Union (EU); the fuel consumption in 2025 is reduced by 15%, the target that fuel consumption is reduced by 30% in 2030 is too aggressive; the new heavy truck powertrain development time is very long, there is no technical route of performance-to-price ratio and can timely mass production, to realize 2025 years EU fuel-saving regulations target; It is a further double percentage point to reduce the fuel consumption of modern heavy trucks in technology and business challenges.

Obviously, any oil saving technology, has double benefits of reducing vehicle exhaust-gas pollutant discharge and greenhouse gas (or carbon) discharge, in other words, the vehicle energy saving is good for reducing emission (pollutant and CO2), but reducing exhaust-gas pollutant discharge is not necessarily good for saving oil; In fact, most of the technical solutions that reduce the amount of exhaust gas emissions that are representative of NOx and that can be mass-produced are at the expense of increasing fuel consumption (i.e., CO2 emissions).

Under the premise of ensuring the power of the vehicle, optimizing the vehicle actual (RDE operation) energy saving and emission reduction is the two large ultimate target of the global automobile industry long-term unremitting pursuit; In the past two decades, the mainstream heavy-truck of Europe and the United States has invested a lot of manpower and material resources, actively explore and develop many heavy-truck fuel-saving and emission-reducing technologies, by the end of 2020, European and American mainstream heavy-truck host manufacturers and first-level suppliers have not publicly available the new technical route or solution of deep-diesel-electric hybrid heavy-truck powertrain capable satisfy the target value of European CO2 regulations 2030 annual carbon the target value of US GHG-II regulations 2027 annual carbon discharge the target value and can be industrialized in time. In the present invention, for the traditional internal combustion engine heavy truck or oil-electric hybrid heavy truck, the core index (Core Metrics) is fuel consumption (FC, liter/hundred kM)

or carbon emission (CO2, gram/kilometer), the core index of emission is NOx emission (g/kWh or g/hp-hr.). Most of the mass production or recent (three years) capable of mass production of diesel engine energy-saving and emission-reducing technical measure, between the CO2 and NOx discharge can only realize zero and balance (Zero-sum Trade-off), namely both can only one rise and one drop, cannot be one drop and one same or both drop; can realize positive and balance between CO2 and NOx discharge (Positive-sum Trade-off; that is, the two can reduce a level or the same drop) of the performance-to-price ratio and recently available technical solution is very rare, is the holy grail of the global heavy truck industry decades of unremitting pursuit. The world's famous automobile group has sold nearly 60 million clean diesel passenger vehicles in the United States; it has announced that it has found a performance-to-price ratio and production technical solution capable of optimizing the CO2 and NOx of the diesel engine of the road vehicle at the same time; However, in 2015, the automobile group publicly admitted to the US government (EPA and CARB) that the emission control software was cheating and fraud during the process of energy saving and emission reduction of vehicles; when the vehicle emission certification test, software command diesel engine adopts emission control strategy, ensuring the NOx emission stable standard, but the software does not calculate and does not depend on the actual fuel consumption (high CO2 discharge) cost; and when the vehicle real driving environment (RDE-Real Driving Environment) operation, software command diesel engine adopts energy-saving control strategy, ensuring the lowest CO2 discharge (namely minimum fuel consumption), but the actual NOx emission is more than 20 times higher than the regulation limit value; The automobile group was finally fined a total of over US$200 billion in the US-led government, and the company's reputation has a large decline; This globally shocking "Diesel Gate" event reflects how the technical solution of high performance-to-price ratio can be used for mass production so as to optimize the beneficial effect of diesel engine RDE fuel consumption and emission (i.e., CO2 and NOx emission at the same time), which is the technical problem of the global automobile industry urgently to be solved. It needs to emphasize, in the engine emission regulations authentication process, the same as the hardware discharge related hardware, calibration software version once determined, as carved on the stone plate, not modified by unauthorized, all calibration software must be re-certified after the modification of the project.

International Clean Transportation Association (ICCT) issued a white paper on the actual operational emission standards of European and American trucks in May 2020, "In-use NOx Evaluation and Compliance Evaluation for Modern Heavy-Duty Vehicles in Europe and United States, White Paper, ICCT, May 2020; According to the white paper, modern diesel heavy truck in Europe and the United States, under the actual driving environment (RDE), especially the low-speed low-load working-condition of idle condition with challenging the fuel consumption and discharge of the vehicle, using a portable discharge tester (PEMS), the actual NOx emission is overproof, and in the large-probability engine low-speed low-load or idle running city condition, modern American heavy truck (satisfy EPA-2010) is higher than the actual NOx emission value of the modern European heavy truck (satisfy), and both of them exceed the standard; For example, when the vehicle speed is lower than 25 mph (i.e., miles/hour, the city condition), the NOx actual discharge mean 1.1 g/bhp-hr. the American heavy truck (g/horsepower-hour) and EPA-2010 the NOx regulatory limit 0.2 g/bhp-hr.; NOx actual discharge mean of 0.5 g/bhp-hr. heavy-truck (g/horsepower-hour) and the NOx regulatory limit of Europe-0.34 g/bhp-hr.; is when the vehicle speed is higher than 50 mph (expressway condition), the actual discharge average value of NOx of the American heavy truck and the European heavy truck is stable to reach the standard, under the condition of full low-speed low-load city condition, American heavy truck actual NOx emission is generally higher than the bottom technology reason of the European heavy truck in the U.S. EPA-2010 emission regulations of RDE actual operation discharge test specification (i.e. not exceeding the specification, NTE Protocol) is compared with the RDE actual operation discharge test specification (i.e., moving average window specification, MAW Protocol) in European-VI emission regulations, The invention has obvious defect in ensuring the high correlation between the laboratory emission certification test result and the RDE actual operation discharge test result.

It is the global automobile industry consensus that the CO2 and NOx emission values (fuel consumption and pollutant emissions) of a diesel engine under low speed low load or idle conditions are significantly higher than that of an engine under high speed high load conditions; but the US NTE specification allows one to eliminate or discard all the emission data when the diesel engine torque load rate (i.e., actual torque/peak torque) is less than 30%, the power load rate (actual power/peak power) is less than 30%, or the exhaust-gas temperature is lower than 250 degree C. when judging whether the diesel heavy truck RDE emission data meet the emission standard; under the urban working-condition, most (more than 90%) of the RDE emission data with high fuel consumption and high emission can be discarded legally, resulting in urban condition diesel heavy truck NTE NOx emission meeting the emission standard nominally, but the RDE NOx emission limit value has high probability to exceed the emission standard "legally". The US Federal Government (EPA) and the California government (CARB) have realized the major defects of the NTE test specification in the current EPA-2010 regulation, they are actively preparing to modify the relevant emission regulations and test specifications, for example, increasing the low load and idle speed cycle and comprehensive score weight when the engine emission certification is increased, modifying the NTE test specification and so on, blocking the "legal loophole" of vehicle RDE operation NOx emission over the legal limits.

August of 2020, California Air Resources Committee (CARB) approved the diesel heavy-truck low NOx emission new series of regulations (Heavy-Duty Engine and Vehicle Omnibus Regulation), All new heavy diesel vehicles (including the buses and heavy trucks) required to be sold in California reduce the NOx emission limit of nitrogen oxide compounds from the current 0.2 g/bhp-hr. (g/horsepower hours) to 0.05 g/bhp-hr. drop of 75% in 2024; further reducing the NOx authentication emission limit value to 0.02 g/bhp-hr. high as 90% in 2027 years; California combination regulations also include newly added diesel engine low-load test cycles (LLC-Low Load Cycle) and actual operating RDE emissions new test specifications for alternative NTE test specifications. The federal government is currently moving the Cleaner Truck Initiative, which is expected to be completed in 2021, and is expected to be completed in 2030, The emission of NOx exhaust-gas of all new large commercial vehicles sold in the United States is 0.02 g/bhp-hr. The EU is also preparing for the EU-VII legislation. It is expected that the emissions of NOx emissions from all the new large commercial vehicles sold in the European Union (EU) will be reduced by about 90% from the European-VI value. China will also follow the EU, and implement the country's 7 emission regulations in 2030 years. In other words, the NOx emissions and CO2 emissions of all new heavy diesel vehicles sold in the United States, the European Union and China and the three major markets in China have to be significantly lower than the NOx and CO2 values of the models currently (2020 years); The energy saving and emission reduction of the heavy diesel vehicle is optimized, and there is no stop on the environment. North American truck and engine manufacturer association (EMA) of 342 pages issued in August 2020, "Comments on CARB Heavy-Duty Engine and Vehicle Omnibus Regulation, Truck and Engine Manufacturers Association, 13, 2020", Dear Cost for California New Heavy Diesel Vehicle Series Disposal Cost (Cost Prohibitive), is not feasible (infeasible), and cannot be performed (unenforceable). EMA's report describes how heavy diesel vehicles (Heavy-Duty Diesel, Heavy-Duty Diesel) have been significantly reduced at the same time in 2027-2030 market-acceptable costs, from one side of the heavy-truck industry. The fuel consumption (CO2) and exhaust-gas pollutant discharge (NOx) of the vehicle are not provided with feasible technical solution of performance-to-price ratio. The global heavy truck industry needs to break the zero and balance (Zero-sum Tradeoff) between the CO2 and NOx, realizing positive and balance (Positive-sum Tradeoff), The invention can optimize the technical solution of performance-to-price ratio and recent mass production of energy saving and emission reduction of heavy truck at the same time, and it is combined with the American GHG-II carbon emission regulations and California ultra-low NOx emission satisfy in 2027 years, or satisfy carbon emission regulations and future European-VII pollutant emission regulations of the European Union in 2030 years.

Because the heavy truck belongs to the production tool, the service life of Europe and America is more than 20 years, and the longest service life in China is 15 years. The new technology for saving energy and reducing emission of any heavy truck is put into the market, and the time for more than 10 years can be gradually becoming the mainstream of all the heavy trucks in the market; at the same time, the fuel consumption and discharge of the card are obviously higher than the new heavy truck; It is necessary to quickly and significantly reduce the total amount of CO2 and NOx emissions at the macroscopic market level of the heavy truck, that is, the need for rapid commercial promotion of new heavy trucks using the latest energy conservation and emission reduction technologies, and the need for efficient technology and commercial means to accelerate the upgrading of the old heavy truck (Used Truck). The current laws and regulations in the U.S. heavy-truck market allow the retrofit of the used diesel truck into the diesel-electric hybrid heavy truck, the merchant self-discipline does not need the government to re-authenticate, and then directly put the modified hybrid heavy Truck into the market operation. The current laws and regulations in the EU and China's heavy-truck market are not allowed to remodel used diesel heavy trucks into diesel-electric hybrid heavy trucks. Each new model (including the vehicle frame and powertrain) must be submitted to the government for authentication by a qualified host factory, and then it can be put into the market for commercial use.

In the present invention, vehicle RDE operation fuel consumption (RDE fuel consumption for short) refers to the fuel consumption of the vehicle when running in the actual driving environment, equal to the actual fuel consumption (L) of the vehicle divided by the accumulated mileage, the dimension is L/100 kM; Vehicle RDE operation discharge data (hereinafter referred to as "RDE emission") when the vehicle is running in the actual driving environment, using the pollutant discharged by the portable discharge tester (PEMS), comprising a nitrogen oxide NOx and a particulate matter PM, which is equal to the actual pollutant accumulated discharge weight (g) of the vehicle divided by the total output of the accumulated mileage engine to do work, the dimension unit is g/kWh or g/bhp-hr., and the discharge data of the working point of the non-high-efficiency zone of any engine is not allowed to be removed; Vehicle NTE emissions data (abbreviated as "NTE emissions") or MAW discharge data (hereinafter referred to as "MAW discharge"), pointing to the RDE discharge data set, according to the NTE technical specification in the US EPA-2010 rule of the MAW technical specification in the European-VI rule, allowing to eliminate the discharged data after the discharge data of the non-high-efficiency area working-condition point of the engine according to the specification, Engine authentication discharge data (abbreviated as "authentication discharge") according to the American EPA-2010 rule or Europe-VI rule, the engine in the laboratory bench according to the corresponding rule of the authentication discharge measuring specification of the emission data; The nominal discharge (Nominal Emission) of the heavy truck refers to engine authentication emissions data or the entire vehicle NTE emissions/MAW emissions. Obviously, for the pollutant emission limit, the authentication emission limit of the engine is less than the NTE emission limit value or MAW emission limit value of the vehicle less than the RDE emission limit value of the vehicle; the maximum difference of the RDE discharge test of the vehicle and the laboratory inner rack authentication discharge test of the engine is that the circulating working-condition of the former vehicle and the external environment are not fixed and difficult to repeat, and the new variable of the driver driving style is increased, it is necessary to ensure that the RDE operation emission limit value of the heavy truck is very challenging to the technology and business in a long time; However, the RDE emission of the entire car is the test gold for the discharge of government and social vehicles. The discharge should be the same as the discharge of RDE. The European and American heavy-truck industry has been unremitting efforts in nearly 20 years. So far, it still cannot effectively solve the technical problem that heavy-truck RDE is discharged for a long time to reach the standard. America NTE specification allows legal to eliminate all the engine torque or power load rate less than 30% of all the discharge data, and the European Union MAW specification to reserve most engine discharge data of low-speed low-load or idle speed working-condition of high challenging, this is a comparison of the diesel heavy truck of the European-VI version and the diesel heavy truck of the EPA-2010 version of the United States EPA-2010. RDE emissions are significantly lower than that of the underlying technology, different fuel consumption, the RDE discharge of modern heavy truck is not visible and cannot be touched, for the vehicle or driver, the emission standard can be reached, there is no original power to continuously reduce the vehicle RDE operation discharge; The Government Environmental Protection Department and the public are concerned about reducing the difference between the discharge of the nominal discharge and the discharge of RDE and continuing to reduce the discharge of RDE operation, the heavy truck is a production tool, for the vehicle team or driver, the vehicle energy saving is always with market original power, the lower the RDE operation fuel consumption is, the better is, reducing the efficiency of the vehicle owner; and the driver of fleet only recognizes the RDE operation fuel consumption, and is not the nominal fuel consumption of the main engine factory or the engine factory; However, in terms of vehicle emission reduction, it is driven by the mandatory emission regulations of the government, the fleet is required to discharge the standard card in the name of the heavy truck, the RDE operation is discharged and the lower the better, especially when the emission reduction is slightly increased to the cost with the fuel consumption.

It needs to be emphasized, the 2027 US Federal GHG-II regulation heavy truck CO2 emission limit value (fuel consumption limit) and California ultra-low NOx emission Omnibus regulation limit value represent the most advanced and aggressive heavy-truck emission regulations in the global heavy truck industry, the EU and China, will respectively promulgate and implement heavy-truck CO2 and NOx emission regulations similar to the United States (European-VII or GB-7) by 2030; finding out the high performance-to-price ratio and production-ready technical solution to satisfy the US diesel heavy truck CO2 and NOx emission regulations 2027 limit value is a crucial and very hard technical problem urgently to be solved by the global heavy truck industry.

The information of the background technology part is only intended to increase the understanding of the general technical background of the present invention, and should not be regarded as an admission to or in any form implying that the information has become a prior art known to those of ordinary skill in the art.

SUMMARY OF INVENTION

The invention Claims a software defined mixed hybrid powertrain (SDPt) and an automated-connected-electrified (ACE) heavy truck equipped with the said powertrain. It aims to solve the globally challenging problem that it is extremely difficult to find a high performance-to-price ratio and production ready heavy truck powertrain technology pathway of the new diesel trucks in the existing technology to meet the 2027 US Federal CO2 emission regulation (GHG-II) and California diesel heavy vehicle (including heavy truck, large bus, engineering vehicle) 2027 ultra-low NOx emission regulation (Low NOx Omnibus Regulation) simultaneously; It also provides the high performance-to-price ratio and production ready technical solution which can convert the existing million unit level used diesel or natural gas heavy trucks into retrofit ACE trucks in US, achieves RDE fuel consumption (L/100 KM) reduction of 20%+, and assures the RDE NOx emission (g/bhp-hr.) to meet the EPA-2010 long term stably. Under long-haul applications, the ACE heavy truck of the present invention compared with the traditional diesel heavy truck, under the premise of ensuring the vehicle power performance and attendance rate, RDE fuel consumption (L/100 KM) reduction can reach more than 25%, but also can improve the driving safety of the vehicle operation, and ensure the RDE emissions in the range of 700K KMs (i.e., 435K miles) effective life (Useful Life) to meet standard long-term stably; the current US market million-unit level modern used diesel heavy trucks to be converted into retrofit ACE heavy trucks, owners of the retrofit ACE truck can enjoy the benefits of RDE average fuel consumption reduction of 20%~30%, additionally, without any increase in hardware cost and leveraging software OTA, can effectively solve the industry technical hard-problem of RDE NOx emissions exceeding the EPA-2010 in-use compliance limit legally when the US modern diesel truck operates in low-speed and low-load working condition or idle working condition; the retrofit ACE heavy truck under any vehicle operation condition, all can ensure the RDE operating NOx emission to meet standard long term stably (for example: EPA-2010, NOx authentication emission limit: 0.2 g/bhp-hr.). Each main subsystem of the invention ACE heavy truck is industrialized, not depending on any product or technology which is not mature or not production ready; the ACE truck is production ready in 2024, satisfy EU CO2 regulations 2025 annual carbon target or US greenhouse gas emissions second phase regulation (GHG-II) 2027 annual carbon target, and 2027 California ultra-low NOx emission regulations ahead of schedule, detailed description later.

Unless explicitly specified, the software defined powertrain (SDPt) technical solution of the present disclosure refers to a set of various technical features of the present invention, the dual-motor hybrid powertrain system architecture is the hardware foundation, and then it is matched with pulse modulation control (PMC—Pulse Modulation Control) of the instantaneous power of the engine and the battery pack respectively; An ACE heavy truck is a mixed hybrid heavy truck equipped with SDPt; A conventional heavy truck (or vehicle) refers to a modern heavy truck (or vehicle) that only has an internal combustion engine (diesel engine, natural gas engine, etc.) but does not contain any hybrid devices; A modern heavy truck mainly refers to the heavy truck meeting the current emission regulations (EPA-2010, Euro-VI, and GB-8) of the three places of US/Europe/China; The hybrid vehicle refers to a Full-Hybrid vehicle, in which the peak power of the electric drive or regenerative braking exceeds 30% of the total maximum drive power of the vehicle. The so-called diesel heavy-truck near-zero emission (NZE) technology, also called ultra-low NOx emission technology, refers to the technical measure set that can reduce the diesel heavy truck NOx emission certification value by 90% of that of the current emission regulations (EPA-2010, Euro-VI, GB-6); For example, in California, the state regulations require heavy truck diesel engine of NOx emission value by 2027, from the current EPA-2010 emission limit 0.2 g/bhp-hr. to 0.02 g/bhp-hr.; The U.S. federal government is expected to finalize the heavy-truck emission regulation in the near future, to be effective by 2030, the mandatory comprehensive implementation of the NZE emission standards is similar to that of California; It is expected that the EU and China will able to implement the NZE emission standards similar to that of California after 2030. It needs to emphasize that the NZE natural gas engine and heavy truck have been produced and commercialized in small quantities in California and other places in the United States; However, how to invent the production-ready and high performance-to-price ratio diesel heavy truck energy-saving and emission-reduction technology to enable the new US diesel trucks to meet the California NZE regulation (the emission reduction of the NOx emission is 90%) and the US federal GHG-II regulation (CO2 emission limit value; equivalent to fuel consumption) simultaneously by 2027 is still an industry urgent hard problem to be solved and technical hurdle to overcome.

In the invention, the software and hardware decoupling of the software defined mixed-hybrid powertrain (SDPt) refers to not only the technical features of the SDPt, but also the technical functions thereof, at least comprising the following points:

1) ACE heavy-truck working-condition and the SDPt working-condition have bidirectional one-to-one unique mapping relationship, the two are equivalent to each other;
2) The instantaneous working-condition point of the SDPt (that is, the instantaneous rotating speed and torque of the powertrain assembly output shaft) and the instantaneous working-condition point of the engine have multiple-to-multiple bidirectional mapping relationship; in other words, one working point of the SDPt can correspond to a plurality of different working points of the engine, and a plurality of different working points of the SDPt can correspond to the same working point of the engine;
3) The dynamic control of the ACE heavy-truck instantaneous road-load power space-time function or the rolling time average road-load power time-space function and the dynamic control of the instantaneous power time-varying function or the rolling time average power time-varying function of the engine are basically independent from each other;
4) SDPt instantaneous or steady state power performance metrics (including second-level pulse peak power or hour-level maximum continuous power) and that of the engine, the motors, and the battery pack are substantially independent, namely hardware combination performance and function redundancy and over-provisioning;
5) Aiming at any operation condition of an ACE heavy truck, the three items of power performance of the SDPt, RDE fuel consumption of the engine, and RDE emission of the engine basically have no cross-coupling; these three items can be controlled independently in real time through software, and optimized simultaneously;

Obviously, software and hardware decoupling is the necessary technical feature and technology foundation of a software defined powertrain system; the engine of a traditional heavy truck under normal propulsion mode can only operate in the $1^{st}$ quadrant complex surface working-condition (engine universal characteristic map), the vehicle working-condition and the engine working-condition are bidirectionally and uniquely mapped, the engine software and hardware are strong coupled, making it technically impossible to realize a software defined powertrain; For a fuel-electric hybrid heavy truck in the prior art, the instantaneous power functions of the engine and the electric-motor & battery pack are all under analogue-electronic control (AEC) respectively; although it is possible to dynamically adjust the working-condition of the engine in a limited range, the engine working-condition in normal driving mode is still on a complex surface in the 1st quadrant, only the engine running in the combustion high-efficiency zone with increased ratio of time, however the time ratio of the engine running in the non-high-efficiency zone cannot be reduced to a negligible number (e.g., less than 5%); the cross-coupling effects among the sub-systems of the powertrain are not negligible, the software and hardware are not almost completely decoupled, so the fuel-electric hybrid system in the existing technology has great difficulty to become a software-defined powertrain. The invention performs pulse modulation control (such as serial series-hybrid iSS or parallel-hybrid iPS) to the instantaneous power function of the prior art engine and battery pack respectively, and can convert any volume-production commercialized analogue-electronic-control (AEC) engine into a digital-pulse-control (DPC) engine. The DPC engine always works on one of the two pre-determined operating-condition lines in time division multiplexing fashion (namely at least one high-state line working-condition in the 1st quadrant combustion high-efficiency zone of the engine universal characteristics map and a 4th quadrant zero-emission & zero-emission non-combustion high-efficiency zone low-state line working-condition); the simple line working-condition of a DPC engine can completely covers all working conditions of an ACE heavy truck (Duty Cycle); for the first time to achieve the software and hardware decoupling of a hybrid powertrain system and finally to realize a software defined powertrain.

The heavy truck is used as a production tool, its actual (RDE) working-condition may have thousands of variations (arbitrary); in order to optimize conventional ICE heavy truck fuel consumption, the powertrain hardware parameters must be customized to fit the main-stream duty cycle of the vehicle operation. However, from the perspective of optimizing the RDE fuel consumption, the powertrain hardware parameter technical requirements for expressway working-condition and for city working-condition are often contradictory and it is almost impossible to optimize for both. For example, engine down-sizing or down-speeding, transmission box overdrive and other technical features are mainstream mature energy-saving & emission-reduction technologies of any modern traditional heavy-truck under expressway working-conditions; However, the above technical features often have negative impacts on the vehicle power performance, system cycle-life, RDE fuel saving and others of a traditional heavy truck under urban working-conditions. The software defined hybrid powertrain technical solution of the invention can effectively eliminate all the constraints of the powertrain hardware configuration on the ACE heavy truck power performance, RDE fuel consumption or emission; only using one set of generic mixed hybrid powertrain hardware composed of mainstream volume-production engine, electric motor, and high-power battery pack, to completely cover any and all working-conditions of an ACE heavy truck; the hardware remains unchanged; using the vehicle power management strategy (PMS) software algorithm to dynamically define the characteristics of the SDPt and to realize thousand-truck thousand-face (customization); for each ACE heavy truck and dynamic working-condition of each freight event, according to the energy-saving and emission-reducing AI algorithm, optimizing the three technical metrics of vehicle power performance, RDE fuel consumption, and RDE pollutant emissions simultaneously.

The software defined mixed hybrid powertrain technology of an ACE heavy truck can be combined with other energy-saving technologies such as vehicle air drag reduction technology, low rolling resistance tire technology, vehicle light weight technology, and so on, to enhance the vehicle energy-saving and emission-reduction effects; It should be emphasized that, compared with a traditional diesel heavy truck, an ACE heavy truck adopts these energy-saving technologies with synergistic effects (one plus one is more than two). In other words, if the actual fuel consumption of a traditional heavy truck is reduced by 15% through the combination of vehicle air drag coefficient and rolling resistance coefficient reductions as well as vehicle light-weighting, the actual fuel consumption of an ACE heavy truck with the same technical combination is reduced by much more than 15%.

In order to solve the above technical problem and to achieve the above beneficial technical effects, the invention will use the following technical solutions.

The current fuel-electric hybrid passenger vehicle or large commercial vehicle of various system architectures (series-hybrid, parallel-hybrid, mixed-hybrid), under urban operating condition with average vehicle speed less than 40 kmph and frequent active acceleration and braking, can effectively move the working point of the engine by the electric motor and the power battery pack to keep the engine to run in its high-efficiency-zone of the universal characteristic curve most of the time; moreover the traction motor can also charge the battery pack through regenerative braking (Regenerative Braking), effectively recovering energy, compared with the traditional engine vehicle, the RDE fuel consumption (L/100 KM) of a hybrid vehicle is greatly reduced (the fuel saving rate can reach 30% to 60%), the energy-saving and emission-reduction effect is significant with high performance-to-price ratio, and it has been commercialized in all major automobile markets of the world. But for the long-haul truck, most of the running time and mileage (more than 85%) in the product life cycle is expressway operating condition, the vehicle has very few active acceleration or braking; The expressway network in the economically more developed regions of China tend to be congested, and the average speed of the long-haul truck is about 60 KM/hr.; The average speed of the US long-haul heavy truck is about 95 KM/hr. A traditional diesel heavy truck under expressway operating condition has very few active acceleration of braking, the engine can operate stably in its high-efficiency zone, its RDE fuel consumption is optimized, further reduction potential is rather limited, and it is very challenging to achieve RDE fuel-consumption and emission simultaneous minimization; and a fuel-electric hybrid vehicle at this time has few vehicle braking, the regenerative braking cannot recover much energy; at the same time, the fuel-electricity hybrid vehicle, especially the range extended series hybrid vehicle, has to shoulder additional loss caused by multiple energy conversions of chemical energy to mechanical energy to electric energy and last to mechanical energy. Therefore, experts and normal technical people from the global automotive and road freight industry have the following long-held "Consensus": long-haul hybrid heavy truck (abbreviated as "hybrid heavy truck"), compared with the traditional diesel truck, has very limited RDE fuel consumption reduction potential, the maximum fuel saving rate cannot exceed 12%; especially for the series-hybrid vehicle in expressway working-condition, its comprehensive fuel consumption can even increase; According to the technical level and industry development status of the current global three electrical systems (battery, motor, electric control), the purchasing cost of a hybrid heavy truck is obviously increased compared with the traditional diesel heavy truck. If the actual fuel saving rate cannot exceed 20%, the performance-to-price ratio of the mixed heavy truck is not high enough, with return on investment (use fuel saving to cover the comprehensive cost delta between a hybrid truck and a conventional truck) period longer than three years; the hybrid heavy truck lacks of sustainable market competitiveness without government subsidies.

As described above, the current global heavy-truck industry experts and ordinary technicians generally believe that it is very difficult to realize volume commercialization of long-haul hybrid heavy trucks in the three global major heavy truck markets of China, the United States, and Europe by 2030 without government subsidies; limited by the current automobile power lithium battery technology limitation and industrialization development constraints, the main-stream long-haul zero-emission pure electric heavy trucks need to configure lithium ion battery pack with effective capacity at least 1000 kWh, such battery pack is too large, too heavy, and too expensive, and it is rather difficult to realize fast charging (sub-hour level); Without high governmental subsidies, it is very challenging to realize volume commercialization by 2030; In addition, the zero emission hydrogen-electric hybrid heavy truck equipped with a hydrogen fuel cell low-carbon clean range extender can only start volume commercialization after 2030 because of the immature and high cost technology, supply chain, and hydrogen making/hydrogenation fueling infrastructure and other factors. In other words, different from the fast growth of the market share of the pure electric passenger vehicles, the new long-haul heavy trucks in the next twenty years, will still use the internal combustion engines, especially the diesel engines as the core and primary power source, the fuel-electricity hybrid powertrain as secondary power source; The zero-emission lithium battery heavy trucks or hydrogen fuel cell heavy trucks can gradually become the market mainstream new vehicles after 2030; It is likely to be after 2035 when the market penetration rate of long-haul zero emission heavy trucks in US, China and EU to be over 10%.

Another major challenge faced by the European and American road freight industry is the persistent long term high vacancy rate and turn-over rate of the heavy truck drivers. For the same heavy truck, payload and freight route, the comprehensive fuel consumption (L/100 KM) discrepancy rate of different drivers can reach 25%; Another pain point of the road freight industry is the high discrepancy of RDE fuel consumption among different drivers and it is resource intensive to manage and train the drivers daily. Many freight companies through training driver, fuel saving reward or penalty, loading the vehicle with sensors, driver's driving behavior big data analysis and fuel-saving counselling and other methods, to reduce the difference between the RDE fuel consumption of a driver and the best fuel consumption; However, the above methods only address the symptoms of the problem without curing the root-cause; For the majority of the trucking fleets, the high RDE fuel consumption discrepancy among different drivers has always been an industry pain point.

If the long-haul ACE trucks want to compete and win against traditional diesel heavy trucks to reach volume commercialization without government subsidies, they must increase the performance-to-price ratio significantly. The average price of a long-haul heavy truck in US or China (US $150K/truck of China 400K RMB/truck) is 5 to 8 times that of a normal passenger vehicle; however, the annual fuel cost of a heavy truck is 30 times that of a passenger vehicle. The retail prices of gasoline or diesel in the United States and China are significantly lower than those in Europe. The ratio of European passenger vehicles price and heavy truck price as well as the ratio of annual oil charges are similar to that of the United States and China. There are two ways to increase the performance-to-price ratio of a long-haul hybrid heavy truck effectively; one is to increase the comparative fuel saving rate against a conventional diesel truck, the other is to reduce the price difference between the sum of the vehicle primary purchasing cost and the accumulated vehicle maintenance cost of an ACE truck against a diesel truck, namely opening up the source and reducing the drain; Under the premise of ensuring the power performance, safety and attendance rate of an ACE heavy truck, the saved fuel cost can be directly converted into profit of the trucking fleet.

Experts in the global automotive industry (especially the heavy-truck industry experts) extrapolate from the facts that most hybrid passenger vehicles (the total weight is less than 3.5 tons; connected in series, parallel, or mixed hybrid system architecture) operating under expressway working conditions can only achieve very limited real-world fuel saving against conventional vehicles, speculate and conclude that the RDE fuel saving rate of any long-haul hybrid truck cannot exceed 10%; especially for series-hybrid heavy truck the RDE fuel consumption might even increase slightly. So far (by the end of 2019), there are no public reports or academic papers regarding the comparison of RDE fuel consumption of full hybrid heavy trucks, especially the dual motor range extended series-hybrid or mixed-hybrid heavy trucks, against conventional diesel trucks under long-haul freight 3R applications (real truck, real road, real payload), and there is no precedence of long-haul hybrid heavy truck volume commercialization. However, the above industry consensus is like the so-called "White Swan Consensus", it has its historical limitations, it can be proved false by scientific experiments; The industry experts might have ignored the secret source that the long-haul hybrid heavy trucks can greatly reduce the actual fuel consumption: under the high speed driving condition, the road longitudinal slope angle ("longitudinal slope") minor change (1.0 degree level) leads to hundred kW level changes of the longitudinal slope power time-variant function $P_g$ (t) and many opportunities to recover kWh level electric energy by the regenerative braking of the hundred kW level electric motor when the hybrid truck runs high speed down-hill.

The first principle of ACE heavy-truck's energy-saving and emission-reduction technology is the dynamic equation (1-1) of the vehicle longitudinal running, well known in the automobile industry:

$$P_v = \frac{v}{1000\eta}\left(Mgf_r\cos\alpha + \frac{1}{2}\rho_a C_D A_f V^2 + Mg\sin\alpha + M\delta\frac{dV}{dt}\right) \quad (1-1)$$

wherein $P_v$ is the vehicle power or the road-load power, all the power terms are in kW (kW).

Rolling resistance power $P_r$ refers to the required power to overcome the rolling friction resistance of the tires when the vehicle is running, it is a non-negative number, which can be represented by the following formula (1-2):

$$P_r = \frac{V}{1000\eta}(Mgf_r\cos\alpha) \quad (1-2)$$

Wind resistance power $P_d$ refers to the required power to overcome the air resistance (calm weather without big wind) when the vehicle is in motion, is a non-negative number, which can be represented by the following formula (1-3):

$$P_d = \frac{V}{1000\eta}\left(\frac{1}{2}\rho_a C_0 A_f V^2\right) \quad (1-3)$$

The (longitudinal) slope power $P_g$ refers to the required power to overcome gravity and increase the potential energy when the vehicle is running uphill and is a positive number; whereas when the vehicle is running downhill, the slope power is a negative number, representing the conversion of vehicle potential energy into kinetic energy to become the propulsion power; the longitudinal stope power $P_g$ can be represented by the following formula (1-4):

$$P_g = \frac{V}{1000\eta}(Mg\sin\alpha) \quad (1-4)$$

The acceleration power $P_a$ refers to the required power to reach the pre-determined acceleration when the vehicle is running on flat road. When the acceleration is a negative number, it represents deceleration through vehicle braking, namely it can either be friction brake, converting the vehicle kinetic energy into heat energy in energy consumption, or can be non-friction regenerative braking, converting part of the vehicle kinetic energy into electric energy, charging the battery pack to recover energy. The acceleration power $P_a$ can be represented by the following formula (1-5):

$$P_a = \frac{V}{1000\eta}\left(M\delta\frac{dV}{dt}\right) \quad (1-5)$$

In the above five formulas (1-1) to (1-5): V is the vehicle longitudinal linear velocity space-time function (meter/second); $\eta$ is the vehicle transmission system efficiency; M is the total mass of the vehicle (kg); g is gravitational acceleration of the earth, g=9.8 (M/S2); $f_r$ is the tire rolling friction coefficient; $\alpha$ is the road longitudinal slope space function, the positive value is for uphill, the negative value is for downhill, zero is for absolute level ground; $\rho$ a is air density (kg/cubic meter); the $C_D$ is the vehicle air-drag coefficient; $A_f$ is the vehicle front projection area (square meter); $\delta$ is rolling mass conversion coefficient; dV/dt is vehicle longitudinal acceleration (M/S2), positive value is acceleration, negative value is deceleration or braking. The longitudinal slope of each road section is only a space function (time invariant). Unless the road is under reconstruction, the longitudinal slope space function of the road does not change with time. Because the longitudinal speed of the vehicle is a time-space function, according to the equation (1-4), the longitudinal slope power is also a time-space function, and when the vehicle is running at a substantially constant speed, the power equation (1-1) only has one functional item of the slope power with hundred-KW-level amplitude fast change, the other three functional items ($P_r$, $P_g$, $P_a$) can be approximated as constants. According to the longitudinal speed space-time function of the vehicle and the vehicle-mounted satellite navigation (GNSS) timing and location, there is bidirectional unique mapping relationship between the vehicle operation time and its geographic location, the freight event vehicle time and space can have uniqueness mutual conversion; the power time-space function is equivalent to the power time-varying function. When optimizing ACE heavy truck energy saving and emission reduction, all set of the power time-space functions of ACE heavy truck are projected to the longitudinal space dimension of the specific road, and then detailed mathematical analysis is conducted in a meaningful engineering fashion; the projection to the time dimension for further analysis does not make much engineering sense. In the invention, g or G is equivalent, not only represents weight, but also represents gravitational acceleration, normal technical people can understand its meaning according to the context, without confusion or ambiguity.

Under the expressway driving condition, the vehicle has little active braking deceleration or acceleration. When the vehicle is running at a substantially constant speed, according to the dynamics equation (1-1), the acceleration power is approximately zero, the rolling resistance power is substantially constant in sections of the expressway with small longitudinal slope (i.e. the longitudinal slope in the range of positive and negative several degrees), the air drag power can also be approximately constant, only the longitudinal slope power is a time variable, its change amplitude is proportional to the sine value of the longitudinal slope angle of the expressway section, the vehicle speed and the vehicle total mass. The road longitudinal slope is generally referred to as "slope", the measuring unit has two kinds, one is the angle in degree between the road surface and the horizontal plane, the other one is the ratio of the road surface elevation to the horizontal projection distance of the road section expressed in %. The design and construction of expressways in various countries will limit the longitudinal slope in the range of −7.0% to +7.0%, mainly based on the consideration of the safe driving of the fully-loaded heavy truck on the expressway. Most of the long-haul heavy trucks in China are under 41 tons total gross weight, the highest legal speed limit is 90 kmph, the average vehicle speed is about 60 kmph due to major expressway congestion in China; the average speed of the heavy truck in the Road freight industry is about 60 kmph; And the total weight limit of the US long-haul heavy truck is 36 tons, and the maximum legal speed limit can be as high as 125 kmph, the average speed of heavy truck is about 95 kmph. Most US freight companies generally limit the maximum speed of the heavy trucks to 105 kmph to save fuel and assure driving safety.

For example, a loaded heavy truck of 40 tons of total mass at vehicle speed of 60 kmph, when it encounters an expressway slope of 2.0 degrees and runs constant speed uphill, the required slope power is as high as 228 kW; at the same time, the sum of the rolling resistance power and air drag power of the vehicle is only 71 kW; if the power surplus of the powertrain is not enough, then the heavy truck must downshift and reduce speed to continue uphill. Comparing a passenger vehicle of 2-ton total mass going uphill along road with slope of 2.0 degrees at constant speed, the longitudinal slope power of the vehicle is 11.4 kW (only 5.0% of the heavy truck longitudinal slope power), and the sum of rolling resistance power and air drag power is only 3.6 kW; to a passenger vehicle with a peak engine power of 100 kW, such a small slope is nothing of concern and is practically flat ground. In other words, for each high speed fully loaded heavy truck, each hard to detect small slope change of 1.0 degree corresponds to big change at hundred kW level of the road-load power of the truck (mainly from the slope power change). There must be a downhill slope whenever there is an uphill, when running downhill, the hundred kW level longitudinal slope power of the heavy truck is a negative value, the regenerative braking of the traction motor can be used to maintain the constant vehicle speed (equivalent to the negative acceleration power of the active brake), a portion of the mechanical energy of the vehicle is recovered and converted into electric energy to charge the battery pack. Although the ACE heavy truck has infrequent active braking at expressway working-condition, because of the many small change of 1.0 degree road grade along the expressway leading to the slope power change of the hundred KW level, an ACE heavy truck at constant cruising speed will have many "passive braking" opportunities for the regen braking to recover and accumulate kWh level electric energy; This is the secret of the significant fuel saving of a long-haul ACE truck over a conventional diesel heavy truck.

A vehicle at 60 kmph speed to realize the deceleration 2 $M/S^2$ (0.2 G, G is gravitational acceleration) of medium strength brake, for a passenger vehicle of total mass 2.0 tons, the required brake power is 67 kW; however, for a heavy truck with a total mass of 40 tons, the required braking power is as high as 1333 kW. The total mass of a city electric bus is about 20 tons, its average speed is 30 kmph, the braking power required by the urban bus to realize the speed 0.2 G is about 333 kW. Limited by the peak power of the current global industrialized vehicle-mounted traction motor and/or motor controller (power electronics), the peak power upper limit of the current fuel-electric hybrid vehicle regenerative braking is less than 500 kW; and the portion of the vehicle instantaneous braking power higher than 500 kW cannot be converted into electric energy by the motor regenerative braking to charge the battery pack to recover the energy, will be wasted only through the mechanical brake system of the vehicle, converting the vehicle kinetic energy into heat energy. In comparison, the current commercial DC fast charger has maximum power of 375 kW. Under the frequent acceleration/deceleration city or urban mixed driving condition, the fuel-electricity hybrid vehicle (light vehicle or large bus) can achieve RDE fuel saving rate of 30% to 60% against a conventional ICE vehicle through many opportunities of the hundred kW level active braking to recover energy via regen braking. In other words, the trunk line logistics ACE heavy truck is less active in the high speed working-condition, but there are many hundreds of kW level passive brakes (downhill) opportunities, it can utilize regenerative braking to recover energy; However, although there are few active braking opportunities for a long-haul ACE truck under expressway working condition, there are still many hundred KW level passive braking opportunities (downhill) to recover energy via regen braking; when a heavy truck under expressway working condition encounters an emergency braking, it mainly rely on the, mechanical brake system with over a megawatt of brake power to decelerate, most heavy-truck kinetic energy cannot be effectively recovered by regenerative braking.

Under the normal expressway condition with infrequent active acceleration or deceleration, the average speed of the vehicle is higher than 60 kmph, the traditional engine can stably work in its high-efficiency zone, the RDE fuel-saving effect of a fuel-electric hybrid vehicle against a traditional engine vehicle is minor (saving rate less than 10%), especially for a series-hybrid vehicle because of the additional energy loss of the multiple energy conversions, its comprehensive fuel consumption can even rise; The above global automotive industry "consensus" is applicable to all fuel-electric hybrid passenger vehicles (less than 3.5 tons) and single electric motor parallel-hybrid large commercial vehicles with engine peak power over 250 kW and electric motor peak power under 200 kW. However, the inventors believe that such industry "consensus" is not suitable for the ACE heavy trucks equipped with hundred-kW level dual-motor range extender series-hybrid or mixed-hybrid (series-and-parallel) system architecture in the long-haul freight applications. An ACE heavy truck in expressway working-condition, although with little active acceleration or braking, can accumulate and recover multiple kWh level energy over time via regenerative braking because of many hundred kW level downhill slope power generated by many small road grades of 1.0-degree variation along the expressway. In other words, for a heavy truck cruising at the constant speed on the expressway, every small road grade change of 1.0-degree level along the expressway will generate hundred kW level grade power (slope power) change, the impact of such change on the vehicle road-load power function is equivalent to that of a passenger vehicle or bus with frequent active acceleration of braking on urban roads.

The United States has nearly 130K miles of controlled access expressway. According to a study report of the United States National Regenerative Energy Laboratory (NREL) in 2016, 20% of the total mileage of the expressway has grade less than 0.2%, considered a flat road for an ACE truck; and in the nearby 75% of the total mileage has grade between 0.2% to 3.0%, considered non-flat road for an ACE heavy truck; only 5% of the total mileage has grade more than 3.0%; considered relatively large and downhill for a high-speed running ACE heavy truck.

The invention Claims a dual-motor mixed-hybrid ACE heavy truck, comprising a heavy-truck engine (diesel or natural gas) with a peak power greater than 250 kW and two large electric motors with peak power greater than 200 kW; wherein one motor (MG1) is mainly used as a generator, and the other motor (MG2) is mainly used as a traction motor. The traction motor is one of the deciding factors of the hybrid heavy-truck power, its peak power should be more than 250 kW; the larger the traction motor, the better the vehicle power performance, at the same time regenerative braking energy recovery effect is better. In order to solve the problem that the automotive grade large traction motor long-term cost is hard to come down, it also can consider using the main traction motor (MG2) plus an auxiliary traction motor (MG3) in a tri-motor hybrid system.

In the last ten years, some high-end internal combustion engine heavy trucks in Europe and the United States use a vehicle-mounted 3 D map containing road longitudinal slope information, along a hilly or mountainous expressway, to achieve fuel-saving through predictive cruise control (PCC). However, the traditional heavy-truck PCC fuel-saving has the following limitations: firstly, it is undesirable for a pure mechanical powertrain to change engine output power in large amount of automatic transmission box gear number frequently and suddenly (sub-second level); PCC in the prior art is mainly suitable for road grade greater than 2.0 degrees and slope length more than a few KMs; secondly, the traditional internal combustion engine heavy truck has no regenerative braking function and is unable to recover energy running downhill; The actual comprehensive fuel saving rate is less than 3.0%.

It needs to emphasize that there is no large-scale absolutely flat expressway in the world; Even in the vast area of the plane, the road sections of the 100-meter level granularity connected in series along the way of the expressway, the absolute value of the road grade is statistically distributed in the range of 0.2% to 3.0%. For a loaded heavy truck at basically constant speed on the expressway, its rolling resistance power $P_r$ and air drag power $P_d$ can be approximated as constants, and the largest factor influencing the vehicle road-load power $P_v$ time variable is the longitudinal slope power $P_g$, its value is proportional to the sine value of the slope angle; for every small change of road grade (grade change 1.0%), the change amplitude of the grade power is more than 100 kW, the ACE heavy truck has many opportunities to recover and accumulate kWh level energy through hundred KW level regen braking. If the vehicle-mounted 3 D electronic map with vehicle pre-installed expressway longitudinal meter level granularity, meter level locating precision (latitude and longitude), grade precision of 0.1 degrees, then adding vehicle road cooperative network or meter-level high precision satellite navigation (GNSS) and inertial navigation (IMU) cooperative real-time location (longitude and latitude) and posture measuring (longitudinal slope), according to the vehicle dynamics equation (1-1), the vehicle controller (VCU) is capable of precisely forecasting (sub-second level refreshing calculation; kW precision) vehicle road-load power time-variant function in the range of hundred kM level, especially longitudinal slope power $P_g$ (t) and the time-variant function of the road-load power $P_v$ (t) kW level granularity; VCU power prediction refresh frequency can reach more than 10.0 Hz, that is to say the vehicle running 2 to 3 meters. VCU can dynamically calculate and refresh the prediction of the power function in the electronic horizon; in normal expressway driving, vehicle speed is change but change is small ad slow; the relative error between the predicted power function and the actual power function is less than 5%, and the shorter the time or the closer the distance is, the smaller the prediction error is; ACE heavy truck driving under the city or suburban condition with frequent active acceleration and braking, vehicle speed change is wide in range and fast, according to the vehicle power equation (1-1) to real time predict hundreds kilometer level electronic horizon road-load power function, prediction relative error is deteriorated to more than 10%; In other words, the heavy truck in expressway driving normally, the hundred kilometer level electronic horizon road-load power function can be predicted, the prediction precision is in kW level, equal to 5% error rate of the average road-load power, the predicted refresh frequency is higher than 5 Hz.

Currently, various ADAS electronic navigation maps or commercial high precision maps (HD Map) supporting L3+autonomous driving in various countries around the world can be used as the 3 D map of the present invention, and provide priori information electronic horizon (Electronic Horizon) for the vehicle; The so-called "electronic horizon" refers to the various road information covered by the 3 D electronic map in the specified range in front of the vehicle, especially the 3D information such as the longitude and latitude of the expressway, and its longitudinal slope. A traditional diesel truck using PCC, limited by the difficulty of frequent and fast changes in engine working condition and transmission gear, and no regenerative braking function to recover energy, can only effectively use the electronic horizon information in the range of about 5 KM; The ACE heavy truck of the invention can effectively use the electronic horizon road information in the range from 10 KM to 1000 KM; Details are shown below.

For an ACE heavy truck running normally on the expressway (expressway) with little braking or acceleration and at substantially constant vehicle speed, the vehicle road-load power time varying changes mainly come from time varying changes of road grade. Non the less, the vehicle travel route and the road grade distribution function are deterministic and knowable; so the VCU of ACE truck can calculate the vehicle road-load power time-variant function distribution in the electronic horizon and predict the vehicle road-load power time-variant function in the future (hour level or hundred KM level) in kW level granularity real time (sub-second level) according to the vehicle dynamics equation (1-1), vehicle configuration parameters and dynamic operating data, electronic horizon a prior 3D road information, and real time road traffic condition; enabling the ACE truck to implement dynamic predicative energy management strategy on the mixed hybrid powertrain and achieve optimization of energy-saving and emission-reduction by leveraging the energy storage capability of the ten kWh level high-power battery pack and the power compensation capability of the hundred kW level electric motor and the fuel saving machine learning (ML) algorithm. The ACE heavy truck software defined mixed-hybrid powertrain of the present invention can transform the global difficult problem of long-haul ACE truck fuel consumption minimization into the equivalent narrow AI problem of computer playing Go. One can use the fuel-saving data set generated by multiple ACE heavy-truck operations, combining the machine learning algorithm and cloud end computation power, train the AI brain of the cloud-end fuel-saving robot, and establish deep neural network (DNN) model of fuel-saving algorithm; then the AI inference chip of the vehicle end, according to the depth neural network (DNN) model for reasoning operation, control the path, direction, and amplitude of the engine mechanical power flow or battery pack electric power flow of the ACE heavy truck, under the premise of ensuring the vehicle power and active safety, realize vehicle energy saving and emission reduction optimization; in terms of RDE fuel consumption minimization, AI can beat any human driver, and the actual fuel saving result is substantially decoupled from the skill level of the driver and the configuration parameters of the ACE heavy truck. In other words, the traditional internal combustion engine heavy truck of the existing technology, because there is no regenerative braking energy recovery function, adopting predictive cruise control (PCC), can achieve actual oil saving rate of less than 3%; and the dual-motor mixed-hybrid ACE heavy truck of the invention, due to the function of 500 kW regenerative braking of a parallel-hybrid powertrain and ten kWh level high-power battery pack, adding the vehicle cloud cooperative artificial intelligence (AI) with super computing power and self-learning capability, can realize the beneficial effect of 30% of the fuel saving rate against a conventional heavy truck; further details to follow.

The invention Claims an ACE heavy truck of configuration software defined hybrid powertrain, the vehicle controller VCU commanding the electric power divider ePSD, capable of accurately and continuously allocating the flow path, amplitude, or direction of the hundred kW level electric power in the ten milliseconds system response time among the three power sources of engine-generator set, battery pack, and the traction motor; Through pulse modulation control (PM), especially pulse-width-modulation control (PWM) or pulse amplitude modulation control (PAM) of the engine of battery pack instantaneous output power respectively, the engine can stably (99% time probability) work in the high-efficiency zone, the non-high-efficiency zone (especially low load) time ratio is compressed down to 1%; and according to the dynamic prediction of the vehicle road-load power function in the electronic horizon, the battery pack can work stably in one of the three modes or switch among the three modes of charge-sustaining mode (CS), charge-depleting mode (CD), and charge-increasing mode (CI), satisfy the vehicle dynamics equation (1-1). Under the condition of ensuring the vehicle power, freight timeliness, and vehicle active safety, ACE heavy truck compared with the traditional diesel heavy truck long-haul freight actual operation comprehensive fuel consumption reduction can reach 30%, actual NOx emission reduction can reach up to 75%.

The ACE heavy truck of the invention uses the dual-motor single-clutch mixed-hybrid system architecture, the details to follow. ACE heavy truck can be controlled by the vehicle controller (VCU) to command the clutch open or close, to operate in series-hybrid mode or parallel-hybrid mode respectively. Under urban working-condition, vehicle average speed is low (less than 45 kmph) and with frequent active acceleration and deceleration, it is preferable to use series-hybrid mode; the engine working-condition and vehicle road load condition are completely decoupled, the engine can stably work at the high-efficiency point, the traction motor also has many opportunities to recover energy by regenerative braking; Compared with the traditional vehicle, the fuel saving effect of the series-hybrid vehicle is significant (more than 30%); and under expressway working condition, the average vehicle speed is high (more than 50 kmph) and with less active acceleration and deceleration, the engine, even with direct mechanical coupling with the wheels, can work stably in its high-efficiency zone by the transmission box dynamic gear adjustment; at this time, it is preferable to use parallel-hybrid mode. The power split hybrid powertrain system represented by Toyota Prius has the functions of both series-hybrid and parallel-hybrid, which can optimize the power and fuel saving of the vehicle, it has been the international benchmark of passenger vehicle hybrid powertrain for the past two decades. But limited by the current metal material and production process, the core component planet gear of the power split hybrid system must bear the combined peak power of engine, generator, and traction motor each with peak power greater than 150 kW. There is no such heavy-duty automotive grade planet gear commercial product in the current world; new product design and mass production will need several years and the cost will be high and difficult to come down; so the mechanical power split hybrid system based on planetary gear is difficult to expand to the heavy vehicle with high performance-to-price ratio; Even the Toyota Motor Group has not yet used its distinctive power-split hybrid powertrain technology of single planetary gear on hybrid heavy truck.

The invention Claims a dual-motor mixed-hybrid powertrain architecture capable of time-division switching between series-hybrid mode and parallel-hybrid mode; The generator (MG1) is directly driven by the engine for converting the chemical energy of the vehicle-mounted fuel into electric energy (under series-hybrid mode) or directly driving the vehicle (under parallel-hybrid mode); an electric power divider (ePSD), which is provided to have three ports of the power electronic network, wherein the first port of the ePSD (i.e., port I) and the generator set (engine & generator) AC output end have bidirectional electric connection; the second port (namely port II) of the ePSD is electrically connected with at least one traction motor (MG2) in bidirectional manner, the third port (i.e., port III) of the ePSD is connected with at least one high-power battery pack bidirectionally DC; at the same time, it is further connected with a brake resistance one-way DC; an automatic transmission box, the output shaft of which is mechanically connected with the driving axle of the vehicle, A map unit, which is pre-stored with a 3 D map, comprising longitude, latitude and longitudinal slope three-dimensional information of the vehicle driving road, at least one main drive motor (MG2) for marking the hybrid P2 position, and the ePSD second port bidirectional AC electric connection, and the output shaft and the input shaft of the automatic transmission box are mechanically connected, the main drive motor (MG2) can be operated as follows: converting the electric energy into mechanical energy for driving the vehicle (electric drive model), or converting the mechanical energy of the vehicle into electric energy (regenerative braking model), and charging the battery pack through the inverter (namely the motor controller) in the ePSD second port, recycling the energy; wherein the engine flywheel end output shaft is mechanically connected with the mechanical shaft of the generator (MG1) of the mixing P1 position, the mechanical coupling mode can be a single shaft and the same rotating speed (coaxial connection), also can be parallel double-shaft and gear reduction coupling parallel shaft connection); the output shaft of the engine is further mechanically connected with the main drive motor (MG2) through a heavy clutch; the mechanical connection mode can be single shaft coaxial, it also can be parallel double-shaft and gear deceleration coupling at the same time, the main traction motor (MG2) is further mechanically connected with the input shaft of the automatic transmission box; the output shaft of the transmission box is mechanically connected with the driving axle of the vehicle; and the vehicle further comprises: a vehicle controller (VCU), through the data bus (such as CAN bus) of the vehicle, and based on the vehicle satellite navigation instrument (GNSS) and/or map unit (MU) in the 3 D map data, to the engine, a generator, clutch ePSD, a traction motor, an automatic transmission box, and at least one of the battery packs is dynamically controlled in an independent manner.

The invention Claims an ACE heavy truck hybrid power system architecture, comprising at least two hundred kW large torque low rotating speed motors and at least one heavy clutch (hybrid) powertrain system. The series-parallel system dynamically controls the engine in the vehicle powertrain system by means of cooperative work of the hundred kW-level level heavy clutch and the electric power divider (ePSD), a generator, a battery pack, a traction motor, different power flow closed loop (Power Flow Loop) of the power flow path, amplitude, and direction, switching the vehicle by opening/clutch to switch the series series-hybrid mode the vehicle or series-hybrid mode The hybrid architecture effectively fuses the original advantages of the series-hybrid and mixing two system architecture, overcoming the original disadvantages, and optimizing the power and oil saving of the vehicle, compared with the dual-motor increasing pure hybrid system or single motor pure hybrid system of comprehensive price ratio and RDE operation energy saving and emission reducing effect are higher. the generator (MG1) is provided at the mixing P1 position (after the engine flywheel, before, clutch main traction motor (MG2) in the mixing P2 position (after the clutch box, before the transmission box), selecting the auxiliary traction motor (GM3) can be provided after the hybrid P3 (after transmission box, in front of the propulsion shaft) or P4 (after propulsion shaft, by wheel end) position.

The above dual-motor mixed-hybrid architecture can realize full-digital software-defined powertrain with the ePSD as core; the hybrid powertrain is controlled by pulse modulation when the engine or battery pack instantaneous power is variable function respectively which not only realizes decoupling of engine working-condition and vehicle working-condition, but also realizes decoupling of powertrain hardware and software, ePSD three-port power electronic network hardware design, the function and performance should be reserved for the rest, increasing the plasticity of product later period, through each ACE heavy truck in the full operation life cycle software remote updating iteration (OTA), realizing the continuous upgrade and evolution of the product. relies on persistent software remote update (OTA), based on big data and cloud-vehicle end artificial intelligence, can be customized to continuously modify the actual performance of each ACE heavy-truck powertrain, that is to ensure each ACE heavy truck in the discharge rule of the requirement (Useful Life) is 70 million kilometers, long-term stable satisfy RDE operation emission rule limit, and realizes the heavy truck RDE operation fuel consumption minimization and intelligent maintenance and repair (iMR) optimization.

The ePSD can be provided as a three-port power electronic network (PEN-Power Electronic Network), which internally comprises at least three unique power electronic functional modules each with a rated power of at least one hundred kW level; A bidirectional AC-DC conversion module (inverter) is connected in the first port, a motor controller (MCU), which is internally connected with at least one bidirectional AC-DC converting module (inverter; and the motor controller (MCU), the third port is connected with at least one bidirectional buck-boost DC-DC conversion module (chopper) or a one-way DC voltage control switch module (VCS—Voltage Control Switch). The invention Claims a main peripheral input/output electric characteristics of focusing ACE heavy truck ePSD and core function and characteristic of three power electronic (PE) function module (namely inverter, chopper, voltage control switch); all kinds of circuit topology structure capable of realizing the three PE modules and mutually electromechanical connection belongs to the range of the invention. the physical packaging arrangement of the ePSD, namely the three PE function modules are intensively packaged and arranged in a metal box, the three PE function modules respectively in a plurality of metal box packaging arrangement with the generator (MG1), the main traction motor (MG2), and the battery pack.

The mixed-hybrid powertrain of the ACE heavy truck is controlled by switching the clutch, realizing respectively series-hybrid (clutch open) or parallel-hybrid (clutch close) two large unique system architectures or working modes. Each system architecture can be further divided into a plurality of different operating sub-modes. The vehicle controller (VCU) is electrically controlled (in non-pure mechanical way) command wire-control electromechanical clutch precise and smooth switching between series-hybrid or parallel-hybrid mode, described in details later. In order to optimize the fuel-saving and power performance of the vehicle at the same time, at high speed working-condition (smooth at high speed, average speed is more than 50 kmph, active acceleration or brake is not frequent) or lower long slope (the longitudinal slope absolute value is greater than 2.0 degrees, the slope length is more than 5 kM) under any condition (any vehicle speed, in order to safely need a slow-speed function, it can be preferable and model; In the city working-condition (average speed is less than 40 kilometers per hour, active acceleration or braking frequently), preferably series-hybrid mode.

Firstly under the series-hybrid mode, there is only electrical power flow loop and no mechanical power loop from the engine to the driving wheel, the DC ports of the three main function modules inside the ePSD are bidirectionally and electrically connected to the DC bus junction point X, the product of the DC voltage and the current time-varying functions at the junction point X is the electric power time-varying function of the corresponding energy conversion device, these power items are in real-time satisfy the following three equations:

$$P_V = \eta_{dt} P_{MG2} \quad (2\text{-}1)$$

$$P_{MG1} + P_{MG2} - P_{BAT} = 0 \quad (2\text{-}2)$$

$$P_{ICE} = -P_{MG1}/\eta_g \quad (2\text{-}3)$$

In the three equations above, all power items are hundred-kW-level time-varying continuous functions, and assuming the one-time round-trip energy conversion coefficient of the generator (MG1), battery pack, and the traction motor (GM2) can all be approximated to be 1.0. A normal technical person in the field can derive the corresponding equations when the actual conversion coefficient is a positive number less than 1.0 without creative invention. There is no substantial effect on the technical discussions in the present invention whether the conversion coefficient is indeed 1.0 or not. wherein:

$P_{MG1}>0$, is the electric propulsion power of the generator (MG1) (using engine non-combustion idle speed operation or engine non-combustion brake as load, converting the electric energy into mechanical energy); $P_{MG1}<0$, is the electric generating power (generated by the engine directly driven generator, the mechanical energy is converted into electric energy);

$P_{MG2}>0$, is the electric propulsion power of the main drive motor (MG2) (the electric energy is converted into mechanical energy); PMG2<0, is the regenerative braking power (converting mechanical energy into electric energy), charging the battery pack, recovering the mechanical energy of the vehicle;

$P_{BAT}>0$, is the total discharge power of all battery packs (converting the chemical energy into electric energy); $P_{BAT}<0$, is the total charging power of all the battery pack (converting the electric energy into the chemical energy);

$P_{ICE}>0$, is the effective output propulsion power (converting chemical energy into mechanical energy) of engine combustion working (namely active working-condition); the $P_{ICE}<0$, is the mechanical load effective power (the mutual conversion between each mechanical energy) of the non-combustion engine (fuel cut-off) being dragged or engine braking (both passive working-conditions);

The power parameters of the four energy conversion devices are preferably configured in principle as follows: $P_{ICE-p}>=P_{MG2-m}>=P_{MG1-m}$; $P_{BAT-m}>P_{MG2-m}$; wherein $P_{ICE-p}$ is the peak power of the engine (i.e., maximum continuous power); $P_{MG1-m}$, $P_{MG2-m}$, $P_{BAT-m}$ is the rated power of generator, traction motor, and the battery pack respectively (i.e. maximum continuous power). Different from the engine, the motor or battery can bear short time overload, the pulse peak power (10 seconds) of the motor can be higher than its rated power by more than 50%; the pulse peak power (10 seconds) of the high-power battery pack can be higher than its rated power by more than 100%. Under series-hybrid mode, the system peak power of the powertrain (i.e. the maximum continuous propulsion power of the vehicle) is completely determined by the $P_{MG2-m}$ of the main drive motor MG2. In order to improve the power performance of the vehicle, saving fuel, and enhancing safety, one can consider to add an auxiliary drive motor (MG3); MG3 may be configured at a hybrid P3 position (between the transmission-box output shaft and the first drive-axle or the second drive-axle input shaft). Of course, if the third motor is added, while improving the vehicle power and redundancy, the complexity and the total cost of the system will be increased.

Under series-hybrid mode, $P_{MG2}$ is the dependent variable, proportional to the road-load power $P_v$ of the vehicle; the road-load power is the independent variable, reflecting the driving intention of the driver and the dynamic traffic environment of the vehicle (ego vehicle); $\eta_{dt}$ is the drivetrain system efficiency (positive number less than 1.0), $P_{MG1}$ is another dependent variable and is proportional to the engine net output power $P_{ICE}$, an independent variable; and the working-condition of the engine is completely decoupled from that of the vehicle, the control strategy of the engine is independently determined; $\eta_g$ is generating set efficiency (positive number less than 1.0). Obviously under the series-hybrid mode, the working-condition of the engine is completely decoupled from the working-condition of the vehicle, it can independently and dynamically set the engine (ICE) and generator (MG1) to operate at the high-efficiency working points (specific speed and torque point) of the universal characteristics curve respectively; ensuring that the combustion thermal efficiency of the engine is the highest (namely with the minimum fuel consumption BSFC, g/kWh); at the same time, it can optimize the exhaust-gas emissions. The battery pack power function $P_{BAT}$ is equal to the sum of the two motor power functions $P_{MG1}$ and $P_{MG2}$, and is also a dependent variable. The three major power electronic functional modules inside the ePSD, an engine, a generator, a traction motor, an automatic transmission box, a battery pack, and other related subsystems, under the unified command of the vehicle controller (VCU), according to the power management strategy (PMS) of the vehicle, dynamically adjusting the self-variable $P_{ICE}$ and dependent variable $P_{BAT}$, performing peak clipping and valley filling to the road-load instantaneous power function (levelling), satisfying the vehicle dynamics equation (1-1), under the premise of ensuring the vehicle power performance and freight timeliness, to achieve the best fuel-saving effect.

Re-combining the equations (2-1), (2-2), and (2-3), one can obtain the following instantaneous power balance equation describing the three-way relationship among the road-load power, the engine power, and the battery pack power of the ACE heavy truck in series-hybrid operation mode ("series-hybrid power equation"):

$$P_V(t) = \eta_{dt}(\eta_g P_{ICE}(t) + P_{BAT}(t)) \quad (2-4)$$

The limiting boundary conditions of the series-hybrid power equation (2-4) are as follows:
a) when the battery pack is substantially full (i.e., high-efficiency zone; BLL<SoC<BUL)

$$P_{MG1-m} < \max(|P_V(t)|) < P_{MG2-m} \quad (2-4c1)$$

b) when the battery pack amount is substantially empty (i.e., SoC<LRL), $$\max(|P_V(t)|) < P_{MG1-m} < P_{MG2-m} \quad (2-4c2)$$

c) The rotational speed and torque of the engine are arbitrarily and continuously adjustable within the specified range; (2-4c3)
wherein max ($|P_v(t)|$) is the maximum value of the absolute value $|P_v(t)|$ of the ACE heavy truck road-load power time function in series-hybrid mode.

The equivalent alternative formula of the series-hybrid power equation (2-4) is as follows:

$$P_{BAT}(t) = (P_V(t)/\eta_{dt}) - \eta_g P_{ICE}(t) \quad (2-4A)$$

The preferred range of the rated voltage $V_{bus0}$ of the internal DC bus in the ePSD is from 600V to 800V. The external of the third port of the ePSD can be electrically connected with at least one high-power battery pack, the rated voltage $V_{bat}$ of each battery pack is less than or equal to $V_{bus0}$; at the same time, the outside of the third port can be electrically connected with a hundred kW level brake resistor $R_{bk}$ with a heat-sink or a cooling radiator as effective electrical load when the battery pack is basically full (SoC reaches URL) as the ACE heavy truck runs on a long downhill slope, the traction motor still needs to continue regenerative braking to provide non-friction retarder function for the vehicle. The equation (2-2) assumes that the voltage control switch module (VCS) in the ePSD is open and the brake resistor does not act; if the VCS module is closed, the brake resistor is used as the electric load and is connected in parallel with the battery pack; at this time, the left side of the equation (2-2) should add the brake resistance power item $P_{BR}$, which is positive number; at the same time, the series-hybrid power balance equation (2-4) also needs to be adjusted correspondingly; the industry common technician can easily do so; it needs to emphasize, whether the series-hybrid power equation (2-4) comprises a $P_{BR}$ item or not has no material impact on the technical discussions of the present invention.

The port III of the ePSD can be electrically connected with at least two different rated voltage battery packs composed of different electrochemical component battery cells with complementary advantages through built-in choppers respectively, which not only can improve the total performance of the battery pack and increase the redundancy of the battery pack system, but also can reduce the comprehensive cost of the battery pack, It brings multiple benefits to optimize the performance-to-price ratio of the ACE heavy truck. The battery pack of ACE heavy truck is the peak power source (Peak Power Source) with ultra-long cyclelife, wide environment temperature range, continuous high-rate partial state of discharge (HRPSoC) operations; under the series-hybrid mode, its main function is to provide hundred kW-level instantaneous electric power for levelling (clipping peaks and filling valleys), and combined with the instantaneous electric power provided by the generating set, cooperatively supplying electric power to the traction motor; the traction motor is driven by pure electricity to satisfy the vehicle dynamics equation (1-1) in real time. The capacity of the high-power battery pack is generally within 90 kWh, and detailed later. For a heavy truck diesel engine with a hundred-liter large fuel tank, its explosive power is normal but its endurance is strong, it can continuously run for more than one thousand KM; the high-power battery pack is more like a powerful engine with a five-liter small fuel tank, its explosive power is high but its endurance is insufficient, can only run in pure electric drive for ten KM continuously; the engine is combined with the battery pack, the two sides can complement each other, the total explosive power and endurance of the hybrid powertrain are exceptional. From the perspectives of vehicle power balance and energy management, the electric motor doesn't create energy by itself, also does not store energy; it can be viewed as a high-efficiency energy converter without memory and hysteresis effects, to convert the electric energy and mechanical energy in real time and bidirectionally.

The capacity of the high-power battery pack of the ACE heavy truck is normally dozens of kWh; Please note, because the rated voltage of each battery pack may not be exactly the same, the invention discusses the battery pack capacity in the unit of kWh, and not the battery industry customary unit of ampere hour (Ah). In series-hybrid mode, if an ACE heavy truck encounters the special road condition of high mountain or long slope of more than ten kM (longitudinal slope greater than 2.0 degrees), it is very likely that the battery pack charge is substantially exhausted before the vehicle reaches the top (i.e., SoC=LRL). At this time, the power performance (Gradeability) of the hybrid vehicle running uphill will be completely dependent on the maximum continuous power $P_{MG1\text{-}m}$ of the generator set. For a series-hybrid heavy truck in the extreme road condition of climbing large mountains, to assure the same power performance of a traditional engine heavy truck, the generator (MG1), the traction motor (MG2), and the corresponding motor controller each with rated power equal to the engine peak power must be selected. At present, the peak power of the global mainstream heavy truck engines (the maximum continuous power of the engine) all exceed 275 kW, while the peak power of the top-of-the-line 16 L engine is even more than 450 kW. Although the large motor and inverter with rated power (the maximum continuous power of the motor) exceeds 250 kW are industrialized, because the voltage platform and power upper limit requirements of these products are higher and annual production volume is lower than that of the new energy passenger vehicles with two orders of magnitude larger annual production volume, the price of these large electric motor and inverter are very high and difficult to fall long term. For example, the cost of a 300 kW rated power automotive grade large electric motor (with motor controller) is much higher than the combined cost of two 150 kW rated power medium-sized motors (with motor controller); and the number of the qualified supplier for the former product is ten times smaller than the latter, it is more difficult to reduce the product cost long term and guarantee the quality and the supply; therefore the comprehensive cost of the high power motor high configuration range-extended series-hybrid system will be high and difficult to fall long term, the vehicle performance-to-price ratio is not high. When an ACE heavy truck encounters a high mountain or large slope, from the perspective of vehicle gradeability and driving safety, parallel-hybrid mode should be the first and preferred choice while series-hybrid mode is the second and alternative choice.

Secondly, under parallel-hybrid mode, the clutch is closed and locked, the engine and the driving wheel are direct coupled, both the mechanical power flow loop and the electric power flow loop are closed; engine, generator (MG1), and the traction motor (MG2) can work independently or cooperate to combine power, to satisfy the vehicle dynamics equation (1-1) in real time. The DC ports of the three large function modules inside the ePSD are all bidirectionally and electrically connected to the DC bus junction point X, the product of the DC voltage at the junction point X and the electric current of each circuit branch is the electric power time-variant function corresponding to the energy conversion device, the power functions satisfy the following two power balance equations:

$$P_V = \eta_{dt}(P_{ICE} + P_{MG1} + P_{MG2}) \qquad (3\text{-}1)$$

$$P_{MG1} + P_{MG2} - P_{BAT} = 0 \qquad (3\text{-}2)$$

The equation (3-2) assuming that the voltage control switch (VCS) module in the ePSD is open and the brake resistance is not active; but if the module were to be closed and the brake resistor acts as an additional electric load in parallel with the battery pack, then the equation (3-2) left side should also add the brake resistance power item $P_{BR}$, a positive number. Unless the ACE truck runs down a long slope, it is necessary to connect the brake resistor to realize frictionless retarder function when the battery pack is substantially full (SoC=URL), in most of its operation time, the ACE heavy doesn't need the retarder function, the brake resistor and the ePSD bus point X are cut off from each other.

Re-combining the equations (3-1) and (3-2), obtaining the following instantaneous power balance equation describing the relationship among the road-load power, engine power, and the battery pack power of an ACE heavy truck in parallel-hybrid mode, (hereinafter referred to as "parallel-hybrid power equation" or "parallel-hybrid equation"):

$$P_V(t) = \eta_{dt}(P_{ICE}(t) + P_{BAT}(t)) \qquad (3-3)$$

The limiting boundary conditions of the parallel-hybrid power equation (3-3) are as follows:
a) the battery pack is basically full (i.e., high-efficiency zone; BLL<SoC<BUL).

$$P_{ICE-p} < \max(|P_V(t)|) < P_{ICE-p} + P_{MG2-m} + P_{MG1-m} \qquad (3-3c1)$$

b) the battery pack is basically empty (i.e., SoC<LRL), $$P_{MG2-m} < \max(|P_V(t)|) < P_{ICE-p} \qquad (3-3c2)$$

c) the rotating speed of the engine is proportional to the rotation speed of the wheels; while the engine torque can be randomly adjusted; (3-3c3)

The equivalent alternative formula of the parallel-hybrid power equation (3-3) is:

$$P_{BAT}(t) = P_V(t)/\eta_{dt} - P_{ICE}(t) \qquad (3-3A)$$

Comparing the series-hybrid power equation (2-4) and the parallel-hybrid power equation (3-3) as well as the two sets of corresponding limiting boundary conditions, it is obvious, as long as the battery pack is kept working in its high-efficiency zone (i.e., BLL<SoC<BUL), the maximum achievable road-load power in parallel-hybrid mode can be much larger than that in series-hybrid mode, the vehicle gradeability of a parallel-hybrid ACE heavy truck is much better than that of a series-hybrid one; at the same time, under parallel-hybrid mode, the engine can directly drive the vehicle wheels and avoid additional loss caused by multiple energy conversions between mechanical energy and electric energy; meanwhile the generator MG1 and the traction motor MG2 are combined into an equivalent larger motor with peak power more than 500 kW, it can effectively recover more vehicle energy through regenerative braking; under the expressway working-condition, a parallel-hybrid ACE heavy truck most likely has lower fuel-consumption than a series-hybrid one does. Of course, one also can fully utilize the electronic horizon 3D road prior data, combining the configuration parameters and dynamic working-condition data of the ACE heavy truck, predictively, intelligently, and dynamically switch between parallel-hybrid mode and series-hybrid mode (iMS technology), fully leverage the distinctive characteristics and advantages of these two modes, further achieve the RDE fuel consumption minimization of the whole freight event. Like playing Go, one doesn't contend with the local loss of each stone, but to look at the overall game situation, and try to win the end game with overall victory; and more details to follow.

When an ACE heavy truck is normally running on an expressway, the vehicle road-load power function $P_V(t)$ is a slow-changing analogue function in the second-level granularity in time; when the vehicle is normally running on the non-congested expressway, the absolute value of vehicle acceleration is basically less than 0.05 G (G is earth's gravitational acceleration), it can dynamically predict the distribution of the road-load power time-varying function in the hundred-kilometer-level electronic-horizon according to the vehicle dynamic equation (1-1) with the refreshing frequency over 2 Hz and in kW-level granularity. In other words, when the ACE truck is normally running on the expressway, the vehicular road-load power function in the next ten minutes or hour period can be dynamically and accurately predicted. Hybrid vehicle control in the existing technology (prior art), by using different power management strategies (PMS) and embodiments of the simultaneous analogue control of the instantaneous power of the hybrid vehicle engine and the instantaneous power the motor or battery pack, to satisfy series-hybrid power equation (2-4) or the parallel-hybrid power equation (3-3) in real time and to realize the beneficial effects of simultaneous optimization of the vehicle RDE energy-saving and pollutant-mission-reduction. The core difference between a hybrid vehicle engine control and a traditional vehicle engine control is the bidirectional mapping of multi-point to multi-point between the engine working-condition and the vehicle working-condition of the former (hybrid vehicle) and single-point to single-point bidirectional mapping of the latter (traditional vehicle). Obviously, the degree of freedom or dimensionality of the energy-saving and emission-reduction optimization control of a hybrid vehicle engine is obviously higher than that of aa traditional internal combustion engine vehicle; However, in the prior art, the instantaneous power of the engine, electric motor, and the battery pack of a hybrid vehicle are all controlled in an analogue fashion, which means that every subsystem in the hybrid vehicle powertrain system can influence each other and are cross-coupled; especially the working-condition of the engine cannot be completely decoupled from the vehicle working-condition (equivalent to the powertrain working-condition), the powertrain hardware and software are still cross-coupled, making it impossible to decouple the powertrain hardware from its software in the engineering sense; and the powertrain system software and hardware decoupling is the precondition and the foundation stone for a software defined powertrain system. In other words, for the fuel-electric hybrid vehicle technology prior art, especially the hybrid vehicle containing parallel-hybrid operations, it is extremely difficult to realize powertrain software and hardware decoupling in the engineering sense, therefore cannot realize a software-defined powertrain.

An ACE heavy truck has two independent power sources, the engine mechanical power source and battery pack electric power source; from the perspectives of vehicle energy or power management strategy, the generator (MG1) and the traction motor (MG2) can be regarded as efficient passive energy-conversion devices with mechanical energy and electric energy bidirectional conversion efficiency rate at about 90%. The core of the present invention is as follows: according to the vehicle dynamics equation (1-1) and a series-hybrid power equation (2-4) or parallel-hybrid power equation (3-3), use pulse modulation (PM) control on the instantaneous mechanical power time-variant function of the engine of an ACE heavy truck and the instantaneous power time-variant function of the battery pack respectively, especially the novel and unique bipolar rectangular or non-rectangular pulse-width-modulation (PWM) or pulse amplitude modulation (PAM) digital control, to simplify the complex surface working-condition of the engine in active operating mode (AOM; combustion) into one or more pre-determined working-condition points or lines in the high-efficiency zone of the engine with 99% probability in time, and almost completely avoiding any engine active working-condition in its non-high-efficiency zone; In addition, newly added engine passive operating mode (POM; that is, the non-combustion and dragged operation of the engine with zero fuel-consumption and zero pollutant-emission) under pre-specified point working-condition or line working-condition; the engine can be dynamically and bidirectionally switched between the AOM and POM or can operate stably in either mode; under the condition of ensuring the vehicle power performance and driving safety, to achieve simultaneous minimization of vehicle RDE fuel-consumption and pollutant-emissions. Further details to follow. According to the industry well-known engine universal characteristics curve (Engine Fuel Map), the AOM of the engine operates as a surface working-condition in its 1st quadrant (i.e., the non-negative rotational speed or torque), comprising a high-efficiency zone (such as the inner area with less than 105% of the minimum break-specific fuel-consumption curve BSFC) and a non-high-efficiency zone (rest of the area of the engine fuel map); and the POM of the engine is operated as surface working-condition in the 4th quadrant (i.e., non-negative rotating speed and negative torque), obviously all the 4th quadrant working-condition points of the engine, are "dual-zero condition" of zero fuel-consumption and zero pollutant-emissions, equivalent to extreme high-efficiency working-condition.

In essence, vehicle power equation (1-1), series-hybrid power equation (2-4), and parallel-hybrid power equation (3-3) describe the instantaneous power balance among various power items including vehicle road-load mechanical power function $P_V(t)$, engine mechanical power function $P_{ICE}(t)$, and the battery pack power function $P_{BAT}(t)$ of the ACE heavy truck equipped with a mixed-hybrid powertrain of the invention under any working-condition and system architecture (series or parallel); regardless in series-hybrid mode of in parallel-hybrid mode, the vehicle road-load instantaneous power must be equal to the linear superposition of the vehicle engine instantaneous power and battery pack instantaneous power. However, the instantaneous power and working condition of the engine and the battery pack must satisfy all the limiting boundary conditions of the series-hybrid power equation (2-4) or parallel-hybrid power equation (3-3). In the present invention, unless with specific indication, a power function is considered as an instantaneous power function. Next is the definition of a new function called "rolling average function" (MAW—Moving Average Window), it is the time average of the rolling time integration of the original function in the window period $T_w$, as shown in the following equation:

$$\overline{P}(t) = \frac{1}{T_w} \int_t^{t+T_w} P(t)dt \quad \text{(MAW)}$$

wherein $\overline{P}(t)$ is the rolling time average power space-time function, abbreviated as "average power"; P(t) is the instantaneous power space-time function, abbreviated as "instantaneous power"; t is time variable; $T_w$ is a window period (minute-level constant).

Obviously for the series-hybrid power equation (2-4) or parallel-hybrid power equation (3-3), the two equations still hold if every instantaneous power function on both sides of the equation goes through rolling time average mathematical computation according to MAW; at this time, the original "instantaneous power" items are then converted one-to-one bidirectionally to the "average power" items. The physical meaning of the average power function is: by fully leveraging the electrical energy buffer special feature of an ACE heavy truck under engine POM to be capable of relying on the 10 kWh-level vehicle high-power battery pack to supply 100 kW level electric power to the motors MG1 and/or MG2 to enable a fully loaded ACE truck to travel tens of miles at high speed on a relatively flat express way in pure electric mode, it is possible to completely decouple the technical requirement of instantaneous power balancing (in sub-second time; the so called "fast control loop") among the vehicle road-load power function, engine power function, and battery power function in order to satisfy the vehicle dynamics equation (1-1) and series-hybrid power equation (2-4A) or parallel-hybrid power equation (3-3A) in real time and by dynamically adjusting the difference value between the vehicle average power and the technical requirement of battery average SoC function control (in minute-level time; the so called "slow control loop") by dynamically adjusting the difference between the average vehicle road-load power function and the average engine power function (equivalently the average battery power function to be near zero, much larger than zero, or much less than zero) to actively control the work mode of the battery pack (stable operation in one of the three modes or dynamic switching among the three modes; charge sustaining mode CS, charge depleting mode CD, charge increasing mode CI) to realize dynamic control of the average SoC time varying function of the battery pack. The invention Claims an "instantaneous power control problem" on engine and battery pack of an ACE heavy truck (related to vehicle power performance, local fuel consumption and emissions; but not related to battery pack average SoC control or global vehicle fuel consumption and emissions) and an "average power control problem" (related to battery pack average SoC control or operation mode control, vehicle local and global fuel consumption and emissions; but not related to vehicle power performance); and these two technical problems are completely decoupled and independent of each other, therefore the instantaneous power (fast control loop) and the average power (slow control loop) can be adjusted and optimized independently. The pulse modulation control of the instantaneous power function of the engine and the battery pack respectively can determine the three important dynamic metrics of the instantaneous (sub-second level) vehicle operating power, the engine real-time fuel consumption, and pollutant emissions; and these three metrics can be optimized independently and simultaneously. On the other hand, the average power control can assure that both the engine and the battery pack can operate in their respective high-efficiency zones stably long term regardless of the actual working-condition of the ACE truck, almost completely eliminating the non-high-efficiency zone working-condition points of the engine or battery pack; and can realize the real-time control of the battery pack average SoC time-varying function through stable operation in one of the three operating modes of CS, CD, CI or dynamic switching among the three modes, in the macroscopic quasi-steady state sense (minute level), optimizing the vehicle energy saving and emission reduction simultaneously; making the vehicle energy-saving and emission-reducing instantaneous optimization and steady-state optimization an orthogonal combination, achieving the beneficial effects of simultaneous optimization of the whole freight event ACE heavy truck RDE fuel consumption and pollutant emissions. Obviously, according to the series-hybrid power equation (2-2) and the parallel-hybrid power equation (3-2), the battery pack instantaneous power function and the dual-motor MG1 and MG2 combined instantaneous power function are mathematically completely equivalent; but the power function of the motor is different from the power function of the battery pack in the physical sense; The former has electro-mechanical duality, on the one hand, represents mechanical power, determined by the product of the rotating speed of the motor shaft and its torque, on the other hand, it represents the electric power at the same time, determined by complex multiplication of the AD voltage and current of the motors; and the latter only represents the electric power determined by the product of the DO voltage and current of the battery pack. In the series-hybrid power equation (2-4) and the parallel-hybrid power equation (3-3), the motor power function is not shown explicitly in mathematical sense, only implicitly shown in the boundary conditions of the equations; However, from the physical sense, the dual motors MG1 and MG2 are just the physical bridges to connect the three items of ACE heavy-truck road-load mechanical power function, engine mechanical power function, and battery pack electric power function with low loss and high efficiency.

Under the ACE heavy truck parallel-hybrid mode, the engine and the vehicle drive axle are bidirectionally and mechanically connected, so the rotating speed of the engine is controlled by the vehicle working-condition (especially the gear of transmission box and the vehicle speed); the road-load power $P_V$ is an independent variable, it can be independently controlled, it embodies the control intentions of the vehicle driver (such as longitudinal speed of acceleration) and the dynamic traffic conditions encountered by the vehicle (Ego vehicle), its value is proportional to the product of the rotating speed of the vehicle driving wheel and the total vehicle driving torque; when the vehicle is running normally (namely, the driving wheel is not slipping), the rotating speed of the engine is proportional to the rotating speed of the driving wheel, and is a dependent variable and cannot be set independently, and the torque of the engine in the effective peak torque range at the rotating speed is an independent variable and can be set independently and dynamically according to the vehicle energy management control strategy; In other words, under parallel-hybrid mode, the instantaneous power function of the engine is still an independent variable and can be independently controlled; However, the rotating speed of the engine is controlled by the speed of the vehicle and the gear of the transmission box, cannot be independently controlled, only the torque is independently adjustable. From the perspective of vehicle RDE energy saving and emission reduction simultaneous optimization, under the city operating condition (vehicle average speed less than 40 kmph, active acceleration and braking frequently), it is preferably to choose the series-hybrid mode while under the expressway operating condition (namely normal expressway condition, vehicle average speed is more than 50 kmph, active acceleration or braking is not frequent), it is preferably to choose parallel-hybrid mode.

At present, more than 95% of the heavy-truck engine is a diesel engine. The high-efficiency zone of the heavy-truck diesel engine (namely the working area in the fuel consumption curve of 105% of the BSFC value of the engine) is generally in the range of 1100 to 1600 r/min (rpm), the torque is 50% to 90% of the maximum torque (that is, the torque load rate is 50% to 90%), the power load rate is more than 40%; outside the high-efficiency area, the brake specific fuel consumption value of the engine (BSFC: g/kWh) will increase significantly (more than 6% increase); especially in the diesel engine low load working-condition area (torque load rate or power load rate less than 30%), in addition to the substantial increase in the engine BSFC (more than 10%), its exhaust-gas temperature is generally lower than 250 degree C. resulting in after-treatment system catalyst conversion efficiency reduction and significant increase of the vehicle RDE pollutant emissions (NOx and PM). A major trend in the US and Europe heavy trucking industry in the last decade is to reduce the vehicle fuel consumption via engine speed reduction (Down Speed) or displacement reduction (Down Size); However, these two fuel-saving measures run counter to the requirement of vehicle gradeability optimization under any vehicle working conditions with negative impacts on the reliability and durability of the vehicle driveline system. ACE heavy truck under parallel-hybrid mode, both the generator and traction motor can power the vehicle in collaboration with the engine, therefore the power performance of a parallel-hybrid mode ACE heavy truck is significantly better than all traditional diesel engine heavy trucks or range extended series-hybrid heavy trucks (peak power less than 450 kW), can realize the total peak propulsion power (i.e. maximum load power) or regenerative braking power exceeds 500 kW, with best-in-industry gradeability and emergency braking or retarder capability.

When a long-haul mixed hybrid ACE heavy truck encounters the extreme road condition of more than ten kilometers long slope or large mountain, the vehicle controller (VCU) can, according to the vehicle-mounted 3 D map and vehicle geo-location, switch to parallel-hybrid mode by closing the clutch before the vehicle reaches the foot of the mountain, allowing the engine to drive the vehicle directly and avoiding the multiple energy conversions from the engine to the driving wheel to increase the driving efficiency. If the battery pack is depleted (SoC<LRL) before the vehicle reaches the top of the mountain, both the generator and the drive motor can operate in idle mode without load, the power performance of the vehicle is now completely determined by the peak power of the engine (usually greater than 300 kW). Under the mixed hybrid architecture of the present invention, peak power parameter configuration condition: $P_{ICE-p} > P_{MG2-m} > P_{MG1-m}$, can be selected $P_{ICE-p} > 300$ kW, $P_{MG2-m} < 250$ kW, $P_{MG1-m} < 200$ kW. If the rated power of the motor is less than 200 kW, it can obviously reduce the cost of the motor and the inverter. Except for the extreme road condition of the climbing large mountains, in plane or hilly area, an ACE heavy truck in parallel-hybrid mode can make the battery pack to operate in CS mode long term; through intelligent power switching control (iPS) of the engine instantaneous output power function, combined with the electronic horizon 3D road information, the battery pack charge condition (SoC) is kept in the best working area (such as 30% to 70%), the engine and dual motor (MG1, MG2) can drive the vehicle together, and the minute-level maximum total propulsion power of the parallel-hybrid powertrain can reach more than 500 kW; the parallel-hybrid heavy truck has significant advantages over a conventional truck or a range-extended series hybrid heavy truck of high configuration in terms of vehicle gradeability, driving safety, and fuel-saving.

The cumulative effective work of the ACE heavy truck to complete the whole freight event is directly or indirectly derived from the integration of the engine instantaneous power function over time; that is, the cumulative effective mechanical energy (also known as the effective propulsion work). The key of ACE heavy-truck fuel-saving strategy is to furthest keep the engine running stably for a long time in the high-efficiency area of its universal characteristics curve, reducing the chance of engine running outside the high-efficiency area, especially for a long time in the low load working-condition or idle operating point. Engine start-stop technology (SS) and engine cylinder deactivation technology (CDA) is the current energy saving and emission reduction technology well known to the current global automobile industry, and is already widely applied to passenger vehicles; However, the drawbacks and limitations of these two existing technologies are also the common knowledge of the industry.

A long-haul heavy truck operates for most of the time (85%+) under expressway working condition, with infrequent encounters of traffic light, low frequency vehicle starting and stopping, and infrequent active acceleration or brake; when the heavy truck engine is switched between start and stop, the resulting vehicle NVH problem is more severe than that of a conventional passenger vehicle; when the engine is stopped, multiple mechanical auxiliary sub-systems (such as cooling fan, water pump, oil pump, air pump, steering booster pump, air conditioner compressor and so on) on the heavy truck cannot directly obtain mechanical energy from the engine to maintain their normal operations, causing many negative effects; the frequent start and stop of an engine will shorten the cycle life of the engine, starting motor, sub-system such as clutch, storage battery and so on; the actual fuel-saving effect of the long-haul heavy truck engine starting and stopping technology is minor less than 2%); Therefore, the engine start-stop technology (SS) of the passenger vehicle (total vehicle weight is less than 3.5 tons) is not suitable for the long-haul heavy trucks, and the engine SS technology has not yet been commercialized for long-haul heavy trucks. At the same time for a long-haul heavy truck in normal operations, its engine can operate in the high-efficiency zone steadily and rarely operates in low-speed and low-load working condition, although the road congestion or waiting for loading and unloading trailer still will result in idle or low rotating speed, low load operations, but the time is small. If the long-haul heavy truck engine were to adopt the cylinder deactivation technology (CDA), it is necessary to add a set of complicated variable valve actuation device (VVA), by dynamically cutting off fuel to part but not all cylinders of the engine (such as turning 6 cylinder into 4 cylinder, 3 cylinder, or 2 cylinder) and constantly closing all of the intake or exhaust valves of the passive cylinders (deactivated cylinders) during the complete cycle of the four-stroke engine (two crank-shaft turns or 720 degrees), increasing the actual combustion working load rate on the rest of the active cylinders (activated cylinder), which is good for energy saving and emission reduction; It needs to emphasize that the primary purpose of the diesel engine CDA is to increase the engine exhaust temperature under the vehicle low load condition, enabling the after-treatment system (ATS) catalyst to operate in its high efficiency zone (250 to 500 degree C.), reducing the vehicle pollutant emissions; while the secondary purpose is to save fuel by adjusting the actual working-condition points of the active cylinder. The engine cylinder deactivation technology (CDA) obviously increases the structure complexity and cost of the engine, reduces its reliability and service life, results in deterioration of the vibration noise characteristics the vehicle (NVH), for a long-haul freight heavy truck, the comprehensive energy-saving and emission-reducing effect is rather limited, the performance-to-price ratio is not high. The global long-haul trucking market, currently (early 2021), has no yet commercialized heavy-truck the engine start-stop technology (SS) or cylinder-stop technology (CDA) in volume production. However, it a diesel heavy truck were to satisfy the ultra-low emission of combined regulations in California 2027 (i.e., 90% significantly lower than that of EPA-2010 regulations) and the US Federal GHG-II legislation, and it is necessary to commercialize the heavy-truck diesel engine CDA technology.

The mechanical-propulsion power loop and the electrical-propulsion power loop of an ACE heavy-truck mixed-hybrid powertrain can either work independently, or can cooperate with each other to satisfy the vehicle dynamics equation (1-1) and the series-hybrid power equation (2-4), or parallel power equation (3-3) in real time. An ACE heavy truck, even if the engine operates in passive mode (either a complete shutdown or a non-combustible dragged low state), can maintain the full-load & high speed operation of the vehicle for over five minutes with only the battery pack to power the traction motor independently; from the perspective of vehicle power or energy management strategy, the driving process of an ACE heavy truck is essentially a high inertia time-varying electromechanical system with minute level response time, according to the principle of equivalent moment, one can adopt pulse modulation (PM) digital control strategy on the engine instantaneous output power function, such as pulse-width-modulation control (PWM) or pulse amplitude modulation control (PAM), which can ensure that the engine runs stably in its combustion high-efficiency zone or non-combustible passive zone with zero fuel consumption zero emission, the instantaneous power function of the high-power battery pack can compensate the changes of the engine instantaneous power pulse sequence function dynamically (peak clipping and valley filling), the linear combination of the two (engine power and battery power) can reproduce the analogue slow changing road-load power function and satisfy the vehicle dynamics equation (1-1) and the series-hybrid power equation (2-4) or the series-hybrid power equation (3-3) in real time, and pave the road to make full use of various digital signal processing technology, digital control technology, big data (BD) technology, machine learning (ML) technology to optimize ACE heavy truck energy-saving and emission-reducing simultaneously. The speed of change of the instantaneous power of a battery pack or an electric motor is more than one order of magnitude higher than that of the vehicle road-load instantaneous power or the engine instantaneous power, the instantaneous power function of the battery pack, according to the series-hybrid power equation (2-4A) or the parallel-hybrid power equation (3-3A), can quickly and accurately (ten millisecond time delay or kW level granularity) follow the difference value between the road-load instantaneous power function and the engine instantaneous power function in real time to satisfy the vehicle dynamics equation (1-1); and an ACE heavy truck is significantly better than any traditional diesel heavy truck in vehicle power performance, brake performance, noise and vibration (NVH) characteristics, RDE fuel consumption of emissions. The invention Claims a control strategy of an ACE heavy truck engine output power function and upgrade such a control strategy from the existing technology (prior art) of analog amplitude modulation (AM) electronic control to digital electronic control technology based on pulse-width-modulation (PWM) or pulse amplitude modulation (PAM) and lay a high performance-to-price ratio technical foundation, device, and method to fully utilize various emerging technologies such as artificial intelligence, big data, and cloud calculation (ABC) to optimize the long-haul truck energy-saving and emission-reducing. The following detailed description of the present disclosure of the core invention, two kinds of novel engine digital pulse control technologies that can not only overcome the disadvantages but also keep the original advantages of the existing technology of engine start-stop technology (SS) or cylinder deactivation technology (CDA) to optimize the ACE heavy truck energy-saving and emission-reducing simultaneously: The invention Claims an intelligent Start-Stop technology (iSS) and an intelligent Power Switch technology (iPS).

Firstly, the ACE heavy-truck hybrid "Intelligent Start-Stop" (iSS) control technology is described. ACE heavy truck when running under the series-hybrid mode, the engine and the vehicle driving wheel are completely mechanically decoupled (i.e., without direct mechanical connection), the working-condition point of the engine (i.e., speed & torque) can be set freely, and is independent of the working-condition point of the vehicle. According to the specific configuration parameters of the engine, the maximum power working-condition point in the optimal working-condition zone defined by the equal-height line of the minimum brake-specific fuel consumption of the engine universal characteristics is generally near the highest rotating speed (i.e., base speed) corresponding to the engine peak torque, the torque load rate is between 80% to 90% (actual torque and peak torque ratio), the engine output power value (defined as "best output power") of the best working-condition point generally is between 60% and 80% of its peak power value; the engine brake specific fuel consumption (BSFC; g/kWh) of this working-condition point) is minimum (namely thermal efficiency BTE is highest); at the same time, the temperature of the engine exhaust gas at the exhaust port is higher than 250 degree C., which is good for high-efficient operation of vehicle exhaust gas after-treatment system (ATS). The invention furthest reduces the pollutant discharge and prolongs the effective service life of the after-treatment system in the actual operation environment (RDE). The best output power of the engine should be less than the rated power of the generator (MG1); The peak power of the engine is obviously greater than the optimum output power, and should be greater than the rated power of the generator (MG1), and only the specific fuel consumption (BSFC) of the engine peak power operating point is generally greater than its minimum value. In addition, the engine can also operate stably at a passive operating point with zero fuel consumption and zero emission: "Non-Combustion Idle Point" (NCIP), the rotation speed of this point can be set between 400 and 700 rpm, all kinds of subordinate subsystems of the ACE heavy truck that must directly obtain mechanical energy from the engine are able to work normally; at this time, the engine cuts of the fuel injection (Fuel Cutoff) of all cylinders, and enters into the passive operation mode (POM); the torque becomes a negative number and its average absolute value is substantially less than 300 NM; the generator (MG1) drives the engine to rotate under the driving mode (MG1); the engine power of this working-condition point is defined as "non-combustion idle power", is a negative number with its absolute value substantially less than 10% of the engine peak power; the engine under the passive operation mode is equivalent to a multi-output transmission-box (i.e., mechanical power splitter), the generator under the driving mode the output mechanical power of ten kW-level reverse to the vehicle each need from the engine obtain the continuous mechanical energy supply of the auxiliary subsystem, enabling the auxiliary sub-systems to operate normally. Obviously in the non-combustible idle speed working point, the engine has zero fuel consumption zero discharge, but the generator will consume electric power; the optimal output power of the engine under the iSS model also called "high-state rated power"; the non-combustible idle speed power is also called "low-state rated power".

For a basic engine without variable valve actuation (VVA) function, in the non-combustible idle point one complete four-stroke engine period (720-degree crankshaft angle; "engine cycle" for short), the intake and exhaust strokes will generate air pumping loss (Pumping Loss), while the compression and work strokes basically will not suffer pumping loss because of the benefits the compression air spring in the cylinder. The intrinsic mechanical loss (including friction loss and pumping loss) of the engine is positively associated with its rotational speed. The engine working at the non-combustible idle point is treated as the mechanical load with the non-combustion idle time average power less than 20 kW, the generator with a hundred kW level rated power can easily drag the engine to rotate, and the power consumption is limited in the minute level time interval, generally at one hundred Wh level. For an advanced engine with variable valve actuation (VVA) function, all the air in-take/exhaust valves of all cylinders can be closed steadily during POM of the engine in order to further reduce the pumping loss and to decrease the non-combustion idle average power and electrical consumption. When the engine operates in the POM, if all the air in-take/exhaust valves of all the cylinders of the engine are kept close steadily at the same time, it is defined as the "binary cylinder deactivation" function (bCDA); the associated VVA technical solution is called binary cylinder deactivation technology. The engine bCDA technology of the current invention and the prior art engine CDA technology have material differences in the essential technical features, control methodology, beneficial technical effects and so on with detailed descriptions later. The bCDA technology can significantly reduce the engine pumping loss, which is good for saving fuel, additionally it has another important benefit of avoiding large amount of clean low-temperature exhaust-gas generated when the engine operates in POM to blow and cool the various catalysts in the after-treatment system, reducing the temperature to light-off temperature (Light-off temperature) (i.e., +200 degree C.), the internal temperature of each catalyst subsystem in the after-treatment system of the pulse-controlled engine can be kept above the light-off temperature steadily, It can assure the vehicle RDE emission to satisfy the CARB ultra-low NOx regulation of 2027 consistently and steadily (90% below that of EPA-2010). Of course, an ACE heavy truck with only iSS technology but not bCDA technology can also satisfy the current diesel heavy-truck NOx emission regulations limit (EPA-2010, Euro-VI, GB-6), however to satisfy the 2027 years California diesel heavy duty truck NOx ultra-low emission limit of 0.02 g/bhp-hr., it must adopt bCDA technology and need to add after-treatment system active intelligent exhaust thermal management technology (iETM), detail descriptions later.

The so called intelligent start-stop technology (iSS) refers to a vehicle controller (VCU), according to the system configuration parameters of an ACE heavy truck under the series-hybrid model, dynamic driving data, electronic horizon road 3D information, and the machine learning (AI) algorithm focusing on optimizing energy-saving and emission-reducing simultaneously, commands the engine to operate stably in either "best working-condition point" or "non-combustion idle point" or to switch smoothly between the two points and performs bipolar asymmetric pulse-width modulation control (PWM) to the engine instantaneous output power time-varying function; then through the electric power divider (ePSD), then performs synchronized pulse modulation control (PWM or PAM) on the battery pack instantaneous power time-variant function to satisfy the vehicle dynamics equation (1-1) and the series-hybrid power equation (2-4A) and the corresponding boundary conditions; under the premise of ensuring the vehicle power performance and driving safety, optimizing the vehicle energy saving and emission reduction simultaneously. The period of the PWM pulse sequence is sub-minute level, the duty ratio k, is defined as the ratio between the pulse period in high-state (also called Active State; AS) optimal working-condition point running time and pulse period (%), is continuously adjustable between 0 and 1; The low-state (also called Passive State; PS) non-combustible idle point operation time ratio is equal $1-k_s$; The average power of the engine (see equation MAW) can be adjusted continuously between the "non-combustion idle power" and the "optimum output power" by dynamically adjusting the duty cycle $k_s$. Preferably, the engine operating-condition dynamic switching control embodiment is as follows: switching from the low-state (non-combustion idle point) to the high-state (the best working-condition point); firstly dragging the non-combustion engine by the generator (MG1), lifting the rotating speed from the idle point to the best working-condition point; then starting the engine fuel injection and combustion to do work; the engine torque is gradually increased (within second level transition time) along the fixed speed vertical line of the universal characteristics curve to the best operating point and then the engine operates stably; when reversely switching from high-state to low-state, the engine at the best working-condition point quickly reduces the fuel injection amount until a complete fuel cut-off (sub-second level), relying on the inertia of the engine flywheel, quickly entering the non-combustible state (passive working-condition, negative work); the engine torque is quickly reduced to a negative number (sub-second transition time) at the fixed rotating speed of the best working-condition point, and then the non-combustion engine is dragged by the generator to decelerate to the non-combustion idle point to run stably. Obviously under the series-hybrid iSS control mode, the instantaneous power function of the engine is converted into an asymmetric bipolar PWM pulse sequence function from the analogue time-varying function of the existing technology; The control mode of the engine instantaneous power function is converted from the complex full-domain surface working-condition analogue control into the novel and unique predetermined dual-point working-condition or dual-line working-condition digital control. Series-hybrid ACE heavy truck is purely electrically driven, ten kWh-level high-power battery pack can independently support the traction motor (MG2) full load operation (i.e., rated power minute level or peak power second level) in a short time (minute level); and the response speed of the battery packet instantaneous charging discharging power is one order of magnitude higher than that of the engine instantaneous power, the instantaneous power value is continuously adjustable between the negative peak power of the battery pack to the positive peak power, completely capable of tracking the difference value between the road-load instantaneous power function and the engine instantaneous power function (ten millisecond time delay and kW granularity) quickly and accurately according to the series-hybrid power equation (2-4A) (cutting the peak and filling the valley); not only can ensure that the vehicle instantaneous power (i.e., powertrain total propulsion power) is not affected by the dynamic switching between two working-condition points (high-state or low-state) of the engine, to satisfy the vehicle dynamics equation (1-1) in real time; but also can ensure the NVH characteristics of the ACE truck is better than that of the traditional internal combustion engine heavy truck when the hybrid powertrain is running; from the perspective of optimizing the vehicle NVH performance, the transition time of the engine high-state to low-state working point switching should not be too short, preferably be in the second level. For an ACE heavy truck, the non-combustible low-state engine is a mechanical load of the generator in POM and the generator is the mechanical load of the engine in high-state, when the engine works at the best working-condition point, the output power of the generator (MG1) is called the "optimal generator power", which is a positive number with the value between 85% to 100% of the rated power of the generator; when the engine is working at the non-combustible idle point, the power consumption of the generator (MG1) is called "no-combustion electric power consumption", it is a negative number with average absolute value less than 15% of the rated power of the hundred KW-level generator. In other words, under the series-hybrid iSS control mode, by dynamically adjusting the PWM sequence duty ratio $k_s$, the average electric power function of the generator set (engine and generator) can be continuously adjusted between the non-fuel consumption electric power and the optimal generator power.

In essence, the intelligent start-stop technology (iSS) can greatly simplify the actual working condition of an ACE heavy-truck engine in the series-hybrid mode from the complex surface working condition into a single optimal working-condition point (fixed rotating speed and torque with minimum fuel consumption), through asymmetric bipolar rectangular pulse-width-modulation (PWM) control of the constant output mechanical power of the engine at the optimal working point, to dynamically and continuously adjust the engine minute-level average output mechanical power and the corresponding gen-set average electric power, according to the three different cases of the difference between the minute-level average road-load power and the average electric to be basically zero, substantially greater than zero, substantially less than zero, making the battery pack to work stably in one of the three modes of charge sustaining (CS), charge depleting (CD), and charge increasing (CI) or to switch smoothly among them; through dynamically and accurately predicting (sub-second time delay and KW level granularity) the vehicle electronic horizon range (hour level or hundred kM) road-load average power time-variant function and adjusting the engine average power function, ensuring the battery pack to work stably in its high efficiency zone (BLL<SoC<BUL) for a long time, avoiding the bad condition caused by the battery pack basically empty (SoC<LRL), resulting in ACE heavy truck prolusion power degradation, or due to the battery pack basically full (SoC>URL), resulting in failure to recover the regenerative braking electric energy; the generator set (engine+generator) and battery pack cooperatively supply power, ensuring the traction motor can real time satisfy vehicle road-load power requirement, under the premise of ensuring the ACE heavy-truck propulsion power, realizing RDE fuel consumption and pollutant emission minimization simultaneously.

The simplest and most effective PWM control strategy is as follows: the non-combustible idle point and the best working-condition point of the engine are fixed after being selected. By dynamically adjusting the duty ratio $k_a$ of the engine instantaneous power bipolar equal amplitude pulse sequence (PWM) to realize the continuous adjustment of the minute-level gen-set average electric power between the non-consumption electric load power and the optimal electric generation power. The intelligent start-stop (iSS) function also can be expanded to other technical solutions such as dynamic switching between the adjustable non-combustible idle point of the engine and multiple high-efficiency working-condition points (namely different optimal working-condition power values). However, these adjustable multi-working-condition point iSS technical solution is more complex and the comprehensive performance-to-price ratio is not better than the iSS technical solution of the fixed double-operating point. Because the adjustment speed and precision (granularity) of the rotating speed and torque of a traction motor is one order of magnitude higher than that of the transmission box, if the vehicle needs to shift under the series-hybrid iSS mode, the traction motor (MG2) can easily finish the instantaneous torque interruption and fast rotation speed synchronization, the transmission box can be shifted smoothly. The whole gear-box shifting operation is independent of the working-condition of the engine.

The modern heavy truck diesel engine generally has a turbocharger; the intelligent start-stop technology (iSS) is suitable for not only the basic engine the low-cost fixed section turbocharger (FGT) and without the function of the variable valve drive (VVA); but also, for an advanced engine with variable valve drive (VVA) function and/or variable section turbocharger (VGT). A Basic engine and an advanced engine have basically the same minimum fuel consumption (BSFC) value or the best output power value, although there is significant difference in the high high-efficiency zone (size or shape), dynamic characteristics (such as Turbo Lag and so on), and price; using ACE heavy-truck series-hybrid intelligent start-stop technology (iSS), an ACE truck with a basic engine vs one with an advanced engine, under any operation condition and application scene, can reach the same power and energy saving and emission reduction effects; In other words, an ACE heavy truck comparing with an traditional diesel heavy truck, can greatly reduce the technical advancement and comprehensive performance requirements of its engine, the engine is no longer the bottleneck of ACE heavy power, RDE fuel consumption or emissions. An ACE heavy truck can easily adapt to any modern heavy-truck production engine. Any future China GB-6 new ACE heavy truck, even configured with a low cost of indigenous basic engine and under the premise of ensuring the extremely challenging heavy truck 700,000 kM actual operation environment (RDE) emission long-term meeting standard stably, still can optimize vehicle power and fuel economy simultaneously. The best output power of most engines is between 55% and 85% of its peak power; when in full load (load rate is more than 90%) or light load (load rate less than 30%), the engine brake specific fuel consumption (BSFC; g/kW) is obviously higher than its minimum value. In the universal characteristics curve of the engine, the equal height line of the brake specific fuel consumption (g/kW) is a plurality of irregular annular curve which are not intersected with each other; the area included in the inner part of the contour line with the minimum value of the fuel consumption in the full domain is called the optimal working-condition area, the so called "Sweet Spot" of the engine; wherein each point is a best working-condition point (specific rotating speed and torque), with the same brake specific fuel consumption value; the area included in the equal-height line with the ratio of 105% to the minimum value can be referred to as the high-efficiency working-condition area (high-efficiency zone for short); Obviously, the area of the high-efficiency zone is significantly greater than that of the sweet spot and completely contains the sweet spot. The rotating speed corresponding to the sweet-spot of most heavy truck engine is in the range of 95% to 125% of the base speed (the rotating speed of the peak torque point), and the corresponding torque is between 65% and 90% of the peak torque. Modern heavy truck engine (diesel or natural gas) base model's high efficiency zone is small, and advanced model's high high-efficiency zone is large; The minimum brake specific fuel consumption value of the two diesel engines at the sweet-spot can both reach 186 g/kW. In order to continuously reduce vehicle fuel consumption (L/100 kM), over the last ten years, the R&D mega trends in European or North American heavy truck engines are to reduce the engine displacement (Down-Size) or speed (Down-Speed). The engine speed (i.e., the rotational speed of the peak torque point) decreases from 1200 rpm to less than 1100 rpm, and even approaching 1000 rpm; The main-stream engine displacement is also gradually increased to 12 L. Under any specific application, an ACE heavy truck under the series-hybrid iSS control mode can completely decouple the working-condition of the vehicle and that of the engine, under the condition of ensuring the vehicle power performance, the engine is more than 98% of the time working in its high-efficiency zone or zero fuel consumption zero discharge of the non-combustible idle speed zone, basically completely eliminating engine full load, low load, or a combustion idle operation working-condition points (time probability less than 2%), achieving the beneficial effects of optimizing energy-saving and emission reduction.

The parallel-hybrid intelligent power switching (iPS) control technology is described below. ACE heavy truck is operated under the parallel-hybrid mode, because the engine is directly and mechanically connected with the driving wheels (namely mechanical coupling), its rotating speed is completely determined by the gear of the transmission box and the vehicle speed and changes along with time; it is a dependent variable (cannot be independently controlled); however the engine torque is still an independent variable and can be independently and dynamically adjusted; At this time, the engine cannot adopt intelligent start-stop (iSS) control technology and must use intelligent power switching (iPS) control technology. For an ACE heavy truck under normal expressway running (average driving speed over 50 kmph, no emergency braking), parallel-hybrid mode is preferred; on the road sections without long slopes, the vehicle road-load average power is substantially larger than 35% of the engine peak power, most of the time is in medium or high load working condition, the instantaneous vehicle speed changes slowly with the time in a narrow speed-band; the vehicle speed change ratio generally fluctuates in the range of positive to negative 15% of the average speed; therefore the absolute value of the change ratio of the vehicle engine rotating speed is also less than 15%; The absolute value of the active acceleration of the vehicle is substantially less than 5.0% of the gravity acceleration G (i.e., 0.5 meter/second square); at this time, the instantaneous engine output torque is still independent and adjustable within a wide range. The automatic shifting control strategy of the ACE heavy-truck transmission-box can always set the engine to run stably within a narrow range around the engine base speed (i.e., the engine speed with maximum torque) under vehicle high speed operating condition (high efficiency zone); for example, between 1100 r/m and 1600 r/m. Under parallel-hybrid mode, the rotating speed of the generator (GM1) or the traction motor (GM2) is also proportional to the engine speed, and the instantaneous torque of the two motors is still independent adjustable in a large range respectively. One can perform bipolar non-rectangular pulse-width-modulation control (PWM) or bipolar non-equal amplitude (i.e. non-rectangular) pulse amplitude modulation control (PAM) on the instantaneous mechanical power function of the engine and the instantaneous electric power function (charging or discharging) of the high-power battery pack respectively, to satisfy the vehicle dynamics equation (1-1) and the parallel-hybrid power balance equation (3-3A) in real time, and also can adjust dynamically and continuously the average power function of the engine by controlling the duty ratio of the engine instantaneous power PWM pulse sequence; making the difference (or delta) between the vehicle road-load average power and the engine average power (equation 3-3A) basically equal to zero (absolute value less than 30 kW), significantly greater than zero or less than zero, keeping the battery pack to operate stably in charge sustaining (CS) mode, charge depletion (CD) mode, or charge increasing (CI) mode or to switch smoothly among the three modes; ensuring the battery pack most time (90%+) running in the high efficiency zone (BLL<SoC<BUL), completely stopping the battery pack running outside the upper and lower red line (SoC<LRL or SoC>URL).

When an ACE heavy truck operates in parallel-hybrid mode, one can apply pulse modulation control (PM; comprising: PWM or PAM) on the instantaneous output power of the engine to realize the intelligent power switching (iPS) control function; the specific technical features are as follows: the vehicle controller (VCU) performs bipolar non-rectangular pulse-width-modulation control (PWM) to the engine instantaneous output power function through the vehicle data bus (CAN bus), the period T of the pulse sequence is sub-minute level, bipolar non-rectangular (i.e., non-equal amplitude). PWM pulse sequence can be divided into high-state condition or low-state condition within one period, the low-state condition can be set as the line working-condition (power is negative number, small range fluctuation) when the engine is not driven by combustion, the torque range of the low-state working-condition line is determined by the set of all sub-systems on the vehicle that must continuously obtain mechanical energy from the rotating engine to work normally; it is a negative number and its absolute value is at the hundred NM level; the rotating speed range is determined by the vehicle speed time-varying function of the ACE heavy truck and the transmission box gear, it is a positive number (1000~1800 RPM); the high-state working-condition line can be set as, within the engine speed fluctuation range in the pulse period, a set of connected working condition points in the fuel consumption high efficiency zone (namely within 105% of the minimum BSFC) (torque or power is positive number, with small fluctuation); the duty ratio $k_p$ is defined as the ratio of the operation time of the high-state working-condition and the period T of the PWM pulse sequence, and is adjustable between 0 and 1; and in the same period low-state working-condition time ratio is equal $1-k_p$; Because the rotating speed of the engine is determined by the vehicle speed with small range fluctuation in the PWM pulse period (sub-minute level), both engine instantaneous power function high-state pulse part and low-state pulse part are non-equal (i.e., non-rectangular) pulses. Under the series-hybrid intelligent start-stop (iSS) control mode, the instantaneous output power time-varying function of the engine can be converted into a bipolar equal amplitude (i.e. rectangular) PWM pulse sequence, directly setting the non-combustion electric power and the optimal electric power as constants; both are independent of the vehicle dynamic conditions; but under the parallel-hybrid intelligent power switching (iPS) control mode, the instantaneous output power time function of the engine can only be converted into bipolar non-rectangular PWM pulse sequence, the specific shape of the high-state pulse part or low-state pulse part is highly associated with the vehicle dynamic working-conditions, top part amplitude curve of the PWM pulse is slowly changing in a small range with time. Under the parallel-hybrid iPS mode, the full high-state pulse (i.e., duty ratio is 1.0) in one period T time integral area equal to (i.e., equal impulse) that of the equal amplitude power value is defined as "high-state equivalent power", it is a positive number greater than the engine peak power 70%; the equal amplitude power value of the whole low-state pulse sequence (i.e. duty ratio is 0) is the same as the time integral area (i.e., equal impulse) is defined as "low-state equivalent power", is a negative number with its absolute value less than 10% engine peak power; in iPS mode, the average power function of the engine is adjustable between the negative low-state equivalent power and the positive high-state equivalent power, it is a slow-changing analogue time-varying function. The PWM control scheme, by dynamically controlling the engine fuel injection quantity (fuel cut-off or fuel injection), enables the engine to switch smoothly between the combustion high-efficiency zone of the high-state working-condition line and the low-state working-condition line with zero fuel consumption and zero emission along the vertical direction (fixed speed, variable torque), dynamically adjusting the engine average power function (see equation MAW), and dynamically adjusting among the three different modes of the difference between the vehicle average power and the engine average power is basically zero (such as absolute value less than 15 kW), continuously much larger than zero (over 15 kW), continuously much less than zero (less than negative 15 kW), ensuring the battery pack of the ACE heavy truck to work stably in CS mode, CD mode, or CI mode or to switch smoothly among the three modes; to the fullest extend avoiding the bad situation of either the battery pack power to be basically empty (SoC<URL), the battery pack unable to continue to supply power to the traction motor, resulting in ACE truck power reduction, or the battery pack to be basically full (SoC>LRL), the battery pack unable to continue to recycle the vehicle energy through regenerative braking; then the engine, generator (MG1), and traction motor (MG2) drive the vehicle in real time collaboratively to satisfy the vehicle dynamics equation (1-1) and the parallel-hybrid power equation (3-3).

Under ACE heavy truck parallel-hybrid mode, the engine, generator (MG1), and the traction motor (MG2) all have direct mechanical connections with the driving wheels of the vehicle, the rotating speeds of the three are completely controlled by the independent variable of the vehicle speed time-variant function at fixed transmission box gear; these time-variant speed function are second level slow varying (the change rate per second is less than 5%) dependent variables; the instantaneous torque functions of the three are 0.1 second level fast changing (the change rate per second can be greater than 20%) independent variables; the instantaneous torques of the three can be directly combined; the total peak driving torque at the input shaft of the transmission box can be more than 4000 NM, significantly higher than the maximum torque (about 2800 NM) of the top-level configuration long-haul freight heavy truck 16 L diesel engine. Therefore, the parallel-hybrid ACE heavy truck can work at the highest gear (direct-drive gear or over-speed gear) of the transmission stably for a long time under the high-speed working-condition, and rarely has to down-shift because of insufficient peak torque during vehicle acceleration or constant speed uphill. To protect the mechanical cycle-life of the transmission-box and the drivetrain system, it is necessary to dynamically limit the maximum torque at the input shaft of the transmission-box under parallel-hybrid mode. If the ACE heavy truck under parallel-hybrid operation mode is to shift gear, especially downward shifting (i.e. high gear shifting low gear), because the torque or speed adjustment of the dual-motors (MG1 and MG2) is ten times faster than that of the engine; when gear shifting, firstly cutting off the engine fuel, letting the engine to operate along the non-combustible low-state working line, then the double motors (MG1 and MG2) work cooperatively to propel the vehicle, not only dragging the non-combustion engine but also driving the vehicle; it does not need to open the clutch, it can finish the torque interruption and rotating speed synchronization between the engine flywheel and the input shaft of transmission box in the second-level time, then the engine can restart fuel injection and combustion, entering into the high-state working line operation; the whole gear shifting action is automatically finished in the second level time. When an ACE heavy truck under the parallel-hybrid iPS control shifts gear, there is no obvious vehicle drive torque interruption, eliminating the noticeable vehicle propulsion interruption of a traditional internal combustion engine heavy-truck gear shift (especially when shifting downwards), significantly improving the vibration and noise characteristics (NVH) of the vehicle. In other words, under and parallel-hybrid iPS mode if an ACE heavy truck needs to shift, then the whole gear shift operation must be completed in the low-state pulse part (second level) of the engine instantaneous power PWM pulse sequence function; different from the traditional internal combustion engine heavy truck gear shift operation (especially the downward shift operation is different), at this time, the gear shift does not need to open the clutch, by double motors (MG1 and MG2) co-driving the vehicle and dragging the engine under low-state condition, realizing transmission box input shaft instantaneous driving torque interruption and rotating speed synchronization, finishing the gear shifting operation; not only reducing the ware-and-tear of the clutch, prolonging its service life, but also improving the power performance and NVH performance of the vehicle during gear shifting; the technical features of the above "Clutch-less Gear Shifting" (CGS) under parallel-hybrid iPS control are intrinsically different from the prior art of a traditional internal combustion engine vehicle or parallel-hybrid vehicle with significant advantages, the subsequent detailed description. ACE heavy truck under normal expressway operation, its average speed is higher than 50 kmph with little active acceleration or braking, parallel-hybrid mode is preferred.

The mechanical power of the engine under parallel-hybrid mode is mainly used for direct vehicle propulsion, while the generator and the traction motor can work under the same mode to be equivalent to a combined motor with larger peak torque and power, it not only can obtain electric energy from the battery pack to drive the vehicle, but also can charge the battery pack at high C rate by regenerative braking to recover vehicle energy. When a traditional ICE heavy truck runs normally on the expressway, the actual gear shifting frequency of the transmission box mainly depends on the driving style of the driver, the actual road longitudinal slope function, vehicle configuration parameter, vehicle driving condition, and multiple factors such as vehicle propulsion peak power or torque; the larger the engine displacement, the higher the torque or power surplus is, the lower the gear shifting frequency; ACE heavy truck under parallel-hybrid mode, the torque of power of the engine, generator, and traction motor can be combined, the vehicle total propulsion torque (greater than 3500 NM) of power (greater than 450 kW) is obviously greater than that of the 16 L diesel engine on a high-end heavy truck in the market, so the shift frequency of an ACE heavy truck in parallel-hybrid mode is obviously lower than that of all traditional ICE trucks; it not only improves the vehicle power or NVH performance, but also extends the service life of the automatic gear shifting mechanism of the transmission box; In some special conditions, the generator and the traction motor can also work in opposite modes, one is in power generating mode and the other one is driving mode. Of course, the intelligent power switching (iPS) function may also be implemented by technical features other than the pulse-width-modulation control (PWM); for example, performing non-rectangular pulse amplitude modulation (PAM) control on the engine instantaneous output power; the common technician can be inspired by the invention and leverage the mature modern digital communication technology or digital signal processing technology to come up with many alternative pulse modulation control (PCM) of the instantaneous engine power as equivalent technical features or solutions. However, these equivalent technical solutions or technical features have no obvious advantages in the system performance, cost, reliability and so on than the said PWM technical solution above.

The current invention of ACE heavy-truck series-hybrid iSS or parallel-hybrid iPS technology can convert any modern analog electric control (AEC) heavy truck production engine into a novel digital pulse control (DPC) engine under the premise of keeping the engine hardware and calibration software unchanged, (short for "pulse control engine"); the operation working-conditions of the pulse control engine can be divided into two types; the first type is active operation mode (AOM), at this time the engine combustion produces positive power (torque and rotating speed are positive value; corresponding to the first quadrant of the engine universal characteristics curve), all operating conditions of the engine is simplified from the traditional complex surface working-condition into combustion high-efficiency zone in several pre-determined high-state (AOM) working-condition point or working-condition line, engine high efficiency operation time ratio is higher than 99%, almost completely avoiding any other working point in the non-high-efficiency zone, especially the very challenging low speed and low load or idle speed working-condition for simultaneous optimization of energy saving and emission reduction, the non-efficient working-condition time ratio is less than 1%; the second type is a passive operation mode (POM), at this time, the engine is dragged as the negative power (the torque is negative and the rotating speed is positive; corresponding 4th quadrant), all engine operation conditions are simplified into several pre-determined zero-fuel-consumption zero-emission low-state (Low State) working-condition point or working-condition line; Obviously, for pulse control engine energy-saving and emission-reducing, any low-state working point is an absolute high-efficiency working point of the engine; but at this time, to the engine consumes the electric energy stored by the battery pack. Different from the traditional engine electric control technology of prior art, the pulse control engine converts the engine instantaneous power time-variant function from an analogue function into a bipolar pulse sequence function (PWM or PAM) through the series-hybrid iSS or parallel-hybrid iPS technical features, and the working condition of the pulse control engine is greatly simplified from the prior art complex surface condition into at least two pre-determined working condition lines and are completely decoupled with the working-condition of the ACE heavy truck; the actual operation condition of the engine can be completely independently controlled; in other words, no matter what the whole cycle working-condition of ACE heavy truck is (vehicle's Duty Cycle), the actual operation condition of the pulse control engine is stable operation in either the active mode (high efficiency zone combustion working) of the passive mode (non-combustible dragged, zero emission & zero fuel consumption) or smooth switching between the two; The pulse control engine realizes the full decoupling of engine working-condition from the vehicle working-condition and full decoupling of the hybrid powertrain software from its hardware, which lays a solid technical foundation for software-defined powertrain. One can view a pulse control engine as a binary state machine with a specific high-state and a low-state, which is good for engine hardware generalization (Generic), abstraction (Abstract), software and hardware decoupling (SW&HW Decoupling), so as to greatly simplify the algorithm of the ACE heavy truck RDE energy-saving and emission-reducing online real-time global optimization, improving the convergence and robustness of the algorithm.

The ACE heavy truck can, according to the hundred kM level electronic horizon road 3D information (including longitude/latitude/slope), vehicle configuration parameters and dynamic operation data, and the selected intelligent cruise control (iCC) sub-mode, depending on the vehicle dynamics equation (1-1), forecast in real-time accurately (second-level time delay and kW-granularity) the vehicle on the non-congested expressway in the future hour-level electronic horizon road-load instantaneous power function or road-load average power function respectively; the vehicle controller (VCU) performs parallel-hybrid iPS to the engine, and continuously adjusts the average power function value by dynamically controlling the engine instantaneous power function PWM sequence duty ratio $k_p$; enable the high-power battery pack to work stably in one of the three modes of CS mode (average engine power is basically equal to the average road-load power), CD mode (engine average power is significantly less than the average road-load power), or CI mode (the average power of the engine is obviously greater than the average road-load power) or to switch smoothly among the three modes; charging-discharging the battery pack just in time (JIT), ensuring the battery pack to work mostly in its high efficiency zone (BLL<SoC<BUL), battery pack efficient operation time ratio is 90%, completely avoiding the battery pack entering the near empty (SoC<LRL) or near full (SoC>URL) limit red line working-condition, engine, generator (MG1), and traction motor (MG2) are cooperatively driven, satisfy vehicle dynamics equation (1-1) and the hybrid power equation (3-3), so as to realize the beneficial effects of ACE truck actual fuel consumption and pollutant discharge simultaneously minimization.

The ACE heavy truck under parallel-hybrid mode, the total torque of the engine, generator, and traction motor at the input shaft of the transmission box can be linearly combined, the total peak torque can easily surpass 4000 NM; and the peak torque of the 16 L heavy-truck engine of a top-of-the-line long-haul heavy truck is less than 2800 NM, the maximum input torque of the mass-production heavy-truck gear-box in the world is mostly less than 3000 NM; and the maximum torque at the input shaft of the current heavy-truck gear-box is mainly limited by the original mechanical designs and cycle-life of the gear-box, drive shaft, or driving axle; if one were to re-design and produce a new heavy truck transmission box with peak input torque greater than 3500 NM, short term research and production unit cost will be very high. In other words, even with a basic low-cost heavy-truck engine (for example, displacement 9~12 L; peak power more than 260 kW; peak torque less than 2500 NM) and hundred kW level main-stream high performance-to-price ratio generator (MG1) and traction motor (MG2), the ACE heavy truck equipped with a mixed-hybrid powertrain of the current invention can provide explosive combined propulsion power over 450 kW (mechanical & electrical combined) and combined torque at input shaft of the transmission box over 3500 NM in the minute-level short time, the propulsion performance of the ACE truck is obviously higher than the top-of-the-line 16 L engine conventional heavy truck in the global marketplace. At present, the maximum input torque of most volume production transmission box for the long-haul freight is basically less than 3000 NM; in order to adapt to the ACE heavy truck, the existing heavy truck transmission-box or other transmission subsystem needs to be reinforced in mechanical strength and the service life in the future; the peak torque of the input end of the transmission box should be increased to more than 3000 NM, and the gear number can be reduced from the 10 to 16 gear to the 5 to 8.

In the prior art hybrid vehicle power management strategy (PMS) generally comprises the following seven vehicle operating sub-modes (also called control sub-mode); Unless otherwise specified, a certain mode is suitable for both series-hybrid or parallel-hybrid; The switching between each control sub-model is not frequent, the average switching interval is generally in the minute or ten-minute level.

1) Pure electric drive mode: At this time, the engine does not burn fuel to work, the battery pack works at the charge consumption (CD) mode to supply power to the traction motor, satisfy the vehicle road-load power requirement. At this time, the average power of the engine is zero, obviously lower than the average road-load power.

2) Engine only drive mode: At this time, the vehicle is either directly and completely driven by the engine in combustion (in parallel-hybrid) or indirectly and completely driven by the traction generator (in series-hybrid), and the battery pack does not work (i.e., no discharge but with regenerative braking charge), belonging to the charge sustaining (CS) mode. At this time, the average power of the engine is basically equal to the average road-load power.

3) Hybrid drive mode: an engine, a generator, a traction motor, and the battery pack work cooperatively to drive the vehicle. At this time, the average engine power is basically the same as the average road-load power; and the battery pack through high-rate charging-discharging to clip the peak and fill the valley of the road-load instantaneous power and to satisfy the ground vehicle dynamics equation; The battery pack operates in charge sustaining (CS) mode.

4) Engine drive and charge mode: The engine provides all the instantaneous road-load power and uses surplus power to drive the generator and to charge the battery pack; the battery pack works in the charge sustaining (CS) or the charge increase (CI) mode. At this time, the average engine power is obviously higher than the average road-load power.

5) Regenerative braking mode: At this time, the road-load power is negative (downhill or brake), the engine does not burn fuel and does not provide positive work, the traction motor generates electric power by regenerative braking, charging the battery pack to recover the mechanical energy of the vehicle and to decelerate the vehicle. At this time, the battery pack works in the charge sustaining (CS) or charge increasing (CI) mode. The average engine power of the is not positive, but is significantly higher than the average road-load power.

6) Parking and charging mode: At this time, the vehicle is parked and stationary, and the road-load power is zero. The engine power is completely used for charging the battery pack through the generator; the traction motor does not work. At this time, the battery pack works at the charge increasing (CI) mode. The average engine power is obviously higher than the average road-load power.

7) Hybrid charging mode: The instantaneous road-load power is negative (downhill or braking), the engine works through the generator to charge the battery pack, at the same time, the traction motor also charges the battery pack by regenerative braking. At this time, the battery pack works in the charge increase (CI) mode. The average engine power is obviously higher than the average road-load power.

Obviously, the power management strategy (PMS) of ACE heavy truck in the present invention and its operational sub-modes have intrinsic difference with the prior art hybrid vehicle PMS and the operation sub-modes; The ACE heavy truck, via series-hybrid iSS or parallel-hybrid iPS control, mix together organically the above six sub-modes of a prior art hybrid truck except the parking and charging sub-mode (technical features for the analogue control of the hundred KW level mechanical power flow or electric power flow) in the various sub-minute level periods of the PWM pulse sequence of the instantaneous engine power function; via performing pulse modulation (PM) control on the engine instantaneous power function of the ACE heavy truck, especially in series-hybrid iSS control or parallel-hybrid iPS control, converts the complex multi-dimensional nonlinear analogue control problem of the mechanical power flow or the electric power flow of a hybrid vehicle in operation into the equivalent simple reduced-dimensional quasi-linear pulse modulation (PM) digital control problem, it is very suitable for using a new digital information technology scheme to the globally hard problem of energy saving and emission reduction of an ICE heavy truck, making an ACE heavy truck much better than any prior art IEC heavy truck in the three key metrics of the vehicle power, RDE pollutant discharge, and RDE fuel consumption (L/100 kM); comprehensive fuel saving rate (i.e. fuel consumption or CO2 reducing ratio) can reach 30%, RDE pollutant emission (such as NOx) is reduced more than 75% (against a modern diesel heavy truck), and the vehicle power performance is better than any top-of-the-line 16 L diesel heavy truck.

The essential technical features of the prior art set of technical solutions including the ICE vehicle engine start-stop technology (SS), engine cylinder deactivation technology (CDA), the seven control sub-modes of the fuel-electric hybrid vehicle, include whether the engine rotates in operation (SS), part of the engine cylinders but not all the cylinders (for example, two or three deactivated cylinders out of six) whether to burn fuel to work (CDA), and the switching between different hybrid vehicle control sub-mode is highly correlated with the vehicle road-load instantaneous power function; The present invention of the technical solution of an ACE heavy-truck mixed-hybrid powertrain pulse modulation (PM) control technical solution of the invention includes series-hybrid intelligent starting and stopping technology (iSS), parallel-hybrid intelligent power switching technology (iPS), and intelligent mode switching technology (iMS) and so on, the essential technical features include engine always rotates; all but not part of the cylinders of the engine either work in high state working condition point or line (AOM) in the combustion high-efficiency zone, or in low-state working condition point or line (POM) of zero emission & zero fuel consumption, the high-state working-condition and the low-state working-condition can be bi-directionally, dynamically and smoothly switched; obvious the classification method (AOM or POM) of the pulse control mixed hybrid powertrain, the specific control method of the mechanical power flow and electric power flow of the hybrid powertrain under different sub-mode, and the engine or battery instantaneous power pulse sequence function generated are intrinsically different from that of the current technology set (prior art); the dynamic switching between the high-state working-condition (AOM) and the low-state working-condition (POM) of a pulse control engine or the dynamic switching (CS, CI, CD, one out of three) among three different operation modes of the battery pack, is basically independent of the vehicle road-load instantaneous power function distribution (i.e., the vehicle instantaneous working condition), and is highly correlated with the average road-load power function distribution in the electronic horizon. The series-hybrid iSS or parallel-hybrid iPS control technology of the invention not only keeps the main advantages of the prior art engine SS technology and CDA technology (such as fuel saving, exhaust-gas temperature control and so on), but also effectively overcomes the main disadvantages of the two (such as the interruption of the air conditioning function; the vehicle vibration noise NVH characteristics degradation; increasing system complexity and cost, reducing the reliability and service life of the engine, and so on), to realize ACE heavy truck energy-saving and emission-reducing simultaneous optimization (Optimization) with higher performance-to-price ratio under the premise of not adding any hardware. It needs to be emphasized, in theory, either the series-hybrid iSS control or the parallel-hybrid iPS control can be used by the ACE heavy truck in the full range of vehicle working condition from stationary to the highest legal vehicle speed; However, when ACE heavy truck average speed is less than 30 mph with frequent active acceleration or braking (congested expressway or city driving), the series-hybrid iSS control has obvious advantages over the parallel-hybrid iPS control in terms of vehicle power performance and energy saving & emission reduction, and should be the preferred choice; and when ACE heavy truck is normally running at expressway (average vehicle speed is higher than 40 mph, in-frequent active acceleration or braking), the preferred choice should be parallel-hybrid iPS.

Some of the modern European or American advanced ICE heavy truck adopts the neutral-gear coasting control technology (commercial names such as e-Coast or SmartCoast and so on) to further reduce fuel consumption; if the absolute value of the average vehicle road-load power on a certain road section is less than the preset threshold value (for example, the absolute value is less than 20 kW; long and shallow descending slope), the heavy truck controller (VCU) can, according to the mile-level electronic horizon 3 D road information, command the automatic transmission box (AMT) to shift to neutral or to open the wire-controlled clutch; at this time the engine is mechanically decoupled from the output shaft of the transmission box or the driving wheels of the vehicle, the engine first reduces the torque and then reduces its rotating speed, switching to the idle speed operating condition point, which further reduces the mechanical power consumption of the engine, the vehicle can still coast for quite a distance (mile level or minute level) and slow don gradually by means of its huge inertia, leading to further fuel saving; when the road-load average power absolute value exceeds a specific threshold value (such as absolute value greater than 20 kW), VCU can command the engine to increase its rotating speed to synchronize the engine with the speed of the transmission box input shaft first, then to close the wire-controlled clutch and re-engage the transmission box into gear, bring the engine back into normal driving mode or engine braking mode within second level time. The heavy truck engine at idle working condition point is low rotating speed and low load with higher BSFC, still has fuel consumption and pollutant emissions; however at this time, because the engine load is low (power load rate is less than 15%), the fuel consumption amount is not high, but the real world pollutant emissions will increase; heavy truck descending a slow slope in neutral coasting (including open clutch coasting), although it can save fuel, the vehicle loses engine braking function and obviously increases the burden of the mechanical brake system; at the same time, the vehicle loses some of its ability of quick acceleration, the vehicle driving safety is degraded; When the driver of a truck with a manual transmission encounters a descending slope, most trucking fleets forbid the driver to coast down in neutral gear to save fuel because of driving safety considerations. Limited by the relatively slow response of the engine and transmission mechanical systems, the neutral coasting control technology mode switching interval is in the minute level, it is very difficult to switch back and forth with high frequency in the second level interval. Only a portion of the road (for example 30% road section) of a long-haul truck is suitable for the neutral coasting mode, the real world fuel saving effect is not significant (less than 1%), and requires the dynamic balance of the contradiction requirements of the fuel saving and the braking safety; at the same time, the neutral coasting mode greatly increases the gear shifting cumulative times or the cumulative times of the clutch operation with negative impacts on the service life of the gear shifting mechanism of the transmission box and the clutch, and it may also negatively affect the noise, vibration and harshness performance (NVH) of the vehicle.

ACE heavy truck under the series-hybrid iSS or parallel-hybrid iPS control mode, in each PWM pulse sequence period of the engine's instantaneous power function, the engine low-state working-condition with zero-fuel-consumption and zero-discharge is in included statistically (distributed in time); the following "intelligent Mode Switching" control technology (iMS) can also be adopted to further save fuel; The specific implementation technical features are as follows: the ACE heavy truck according to the vehicle configuration parameters, vehicle dynamic working-condition data, and electronic horizon a priori 3D road data, computes and predicts in real time (sub-second time delay), to kW level granularity in the future hour level or hundred kM front road section, the distributions of the instantaneous road-load power function or the average road-load power function; along the mile level road section with the absolute value of the average road-load power function of less than the pre-determined threshold value (such as 50 kW), the vehicle is preferably switched to operate in the series-hybrid iSS control mode, and along the other road sections with the absolute value of the average road-load power greater than the pre-determined threshold value (such as 50 kW), the vehicle is preferably switched to operate in the parallel-hybrid iPS control mode. Obviously, the engine rotating speed and its equivalent energy consumption in the low-state working-condition of the PWM period under the series-hybrid iSS mode are much lower than that under the parallel-hybrid iPS mode, the energy consumption per unit distance of the former (namely power consumption or fuel consumption) is lower and is more beneficial for saving fuel; It needs to be emphasized, regardless the vehicle operating in series-hybrid iSS mode or parallel-hybrid iPS mode, the transmission box is always in gear and can completely eliminate vehicle neutral coasting, the iMS can effectively balance the prior art contradictory requirements of energy-saving and emission-reduction against that of braking effectiveness. The peak torque of the traction motor (MG2) is very similar to that of the engine, but the adjusting speed of the electric motor working condition (i.e., its torque or speed) is one order of magnitude faster than that of the engine; no matter in series-hybrid iSS mode or parallel-hybrid iPS mode, the traction motor (MG2) can provide kW-level driving positive power or regenerative braking negative power to the vehicle through the transmission box in the ten-millisecond level response time, it not only optimizes the engine fuel consumption and emission reduction, but also completely avoids the neutral gear coasting and assures effective braking; at the same time, it can reduce the AMT gear shifting times, improve the vehicle NVH performance; As described above, the real world fuel-saving effect of the said iMS technology is obviously better than the prior art neutral gear coasting, the implementation technical features of the two (iMS vs prior art) are intrinsically different, at the same time, the iMS completely overcomes the various short comings of the prior art such as the degradation of cycle life of the transmission gear shifter and clutch because of the significant increase of the gear shifting frequency, the vehicle NVH performance, the braking performance, and the increase of the brake pad wear-and-tear, and so on.

The clutch of a traditional ICE truck is similar to that of the tires and the brake pads, and are all consumable products (Consumables); the core function of the clutch is the time-domain torque transfer switching control between the engine and the transmission box input shaft; during the second level transient state between the bi-directional switching of the two stable states of full open and full close of the clutch, the clutch achieves the rotation speed synchronization and torque transmission between the engine flywheel and the transmission box input shaft is clutch by its internal friction plates; the normal service life of the clutch is significantly lower than the service life of the engine or the transmission box, and it is highly correlated with the driving style of the heavy truck driver, the clutch and the brake systems are always the key items of the daily maintenance work of a traditional heavy truck; The replacement or maintenance on clutch not only costs money, but also affects the attendance rate of the vehicle. It has always been one of the pain points in the daily maintenance of many trucking fleets. When gear shifting of a traditional ICE heavy truck, especially down-shifting (from high gear down to low gear); the clutch must first be open, realizing torque interruption, wait until the gear-box finishes shifting operation and the engine lifts its speed under low load rate to reengage the clutch (close), achieving speed synchronization between the engine flywheel and the input shaft of the transmission via the friction of plates inside the clutch to eliminate the speed delta between the engine fly-wheel and the input shaft of the transmission within the second level transition period; only when the clutch is completely closed, can the engine efficiently transfer the propulsion torque and resume high load rate operation, driving the vehicle forward; the gear shifting operation of a heavy truck transmission-box is normally done within several seconds; Because it is rather difficult to quickly and accurately adjust the engine rotating speed, each open and close of the clutch will inevitably causes the friction plates to skid at various levels. Obviously, the frequent shifting of the transmission box, and the rotating speed delta or the extra-large torque difference between the clutch driving end and the driven end in the second-level transition period (namely before the clutch is completely closed) all have negative effects on the clutch cycle life and the NVH performance of the vehicle; The aggressive driving style of the driver can cause the heavy truck unit mileage shifting frequency to increase significantly and shorten the clutch cycle life mileage by more than 50%. The modern AC motor through vector control can achieve precise dynamic control of the motor rotating speed and torque with the response speed and precision of the rotating speed control of the motor approximately one order of magnitude higher than that of the engine; The hundred kW level traction motor in the hybrid P2 position, via vector control, can easily finish the instantaneous torque interruption and speed synchronization (sub-second level) necessary for gear-box shift operation, and it does not need any assistance of the clutch. The ACE heavy truck of the invention can command the dual-motor hybrid powertrain to achieve the function of vehicle clutch-less gear shift (CGS); that is, the ACE heavy truck under the series-hybrid mode or the parallel-hybrid mode, gear shifting of the transmission-box does not require the synchronous switch actions of the clutch; throughout the whole gear shifting operation process (second level), the clutch is either completely closed (parallel-hybrid) or completely open (series-hybrid); Specific technical features are as follows; when the ACE heavy-truck operates steadily in series-hybrid iSS mode, the clutch is open, the engine and the transmission box are completely decoupled, the electric power divider (ePSD), through vector control technology, commands the traction motor (MG2) to realize the instantaneous driving torque interruption and speed change synchronization between the motor and the transmission box easily, allows the transmission box to complete the gear shifting operation smoothly; when the ACE heavy-truck operates steadily in parallel-hybrid iPS mode, the clutch is always closed (no clutch open or close actions during gear shifting), the rotation speed of the engine, dual-motors (MG1 and MG2), and transmission box are synchronous or proportional; if the transmission box needs to shift, then the duty ratio of the engine instantaneous power function PWM pulse sequence can be adjusted dynamically, firstly switching the working-condition of the engine into and then maintaining the PWM low-state working-condition (second level), dragging the engine to rotate by the generator under the traction mode, the engine is equivalent to a small mechanical load with less than 50 kW power consumption, the hundred kW-level generator (MG1) and the traction motor (MG2) are coaxially connected with the same rotating speed (coaxial) or the speed ratio is fixed (parallel shaft), the torque can be linearly combined, the dual-motor total peak torque can be higher than 3000 NM, the total propulsion power can reach 500 kW; the electric power divider (ePSD), through vector control technology, commands the two motors (MG1 and MG2) to drag the non-combustion engine to rotate easily, can also realize the transmission input end of the instantaneous drive torque interruption and speed synchronization, the transmission-box can complete the CGS operation (second level), and then the engine can be switched back to the PWM high-state to run. Obviously, the duty ratio dynamic control of the pulse control engine in a PWM period, the requirement to satisfy transmission box CGS has higher priority level than that to satisfy the battery pack working mode (CS/CD/CI).

The iMS control technology refers to the controlled bidirectional dynamic switching between the series-hybrid iSS mode and the parallel-hybrid iPS mode of an ACE heavy-truck; at this time, the clutch must complete one switching action (switching from open to close or from close to open); when switching from the series-hybrid to parallel-hybrid (i.e., clutch from open to close), by dynamically adjusting the engine PWM pulse sequence duty ratio, ensuring the engine to operate in the low-state working condition (second level), the generator (MG1) drives the engine in the passive mode (POM) to realize the synchronization of the rotating speed of the engine, the rotating speed of the traction motor mechanical shaft, and the rotating speed of the transmission box input shaft, then close the clutch, afterwards the engine can resume the high-state working-condition; Because the rotating speed and torque of the generator and the traction motor can be dynamically and accurately controlled, it can ensure that the generator (MG1) and the traction motor (MG2) can realize fast synchronization under all kinds of vehicle working-conditions (Synchronization), the synchronous relative error of the rotating speed of the two clutch ends can be strictly controlled to within 0.5%; while during the traditional heavy-truck gear shifting, the speed synchronous relative error of the two clutch ends is more than 3%; Therefore, under the iMS control mode the wear-and-tear of an ACE heavy truck clutch is greatly reduced by nearly one order of magnitude than that of a traditional ICE heavy truck clutch. It is clear that the ACE truck clutch needs to operate stably in either one of the two stable states of continuously open or continuously close, while most of the conventional clutch has a single steady state of continuously close, and the other aspects of the requirements on these two clutch types are substantially the same. In other words, the ACE heavy truck only needs to open or close the clutch when switching between the series-hybrid mode and the parallel-hybrid mode; and during the second-level transition state of bidirectional switching between the two modes, the traction motor is always mechanically connected with the gear-box input shaft, continuously provides the instantaneous propulsion power or regenerative braking power of the hundred-kW level to the ACE heavy truck; comparing with the existing technology prior art (such as neutral-gear coasting technology), ACE truck has obvious advantages over prior art truck in terms of vehicle power performance, fuel-saving effect, braking effectiveness and so on; When the ACE truck is in steady state operation, if the transmission-box needs to shift (under the series-hybrid iSS or parallel-hybrid iPS), it is preferable to use CGS control without any clutch operations. A long-haul ICE heavy truck has average daily mileage of 500 miles and needs to finish several hundred transmission box gear shifting operations; the power performance (gradeability) of an ACE heavy truck (the vehicle total peak power or peak torque) is much better than that of all the long haul ICE heavy trucks, the transmission gear shifting operation times of the truck over the daily 500 miles can be reduced by more than 70%; additionally the daily average times of the iMS is well below one hundred, and the CGS function can basically eliminate the operations of the clutch triggered by gear shifting. In summary, the ACE heavy truck, through CGS technology and iMS technology and comparing with a modern diesel heavy truck (existing technology prior art), can reduce the accumulated clutch operation times by more than 75%, increase the effective service life (namely changing mileage) of the clutch by more than 300%, lower the vehicle maintenance cost significantly, improve the truck's attendance rate; under the premise of not increasing any hardware, solve one key pain-point in the daily maintenance of the heavy truck driver and the vehicle fleet with high performance-to-cost ratio; It needs to be emphasized, for an ACE heavy truck of the present invention during the transition period of clutch open-close operation, the VCU controls all vehicle operations and ensures that the pulse control engine always operates in passive mode (POM), completely avoids the obvious negative impacts on the clutch cycle life caused by aggressive driving style of some drivers, and realizes the decoupling of the clutch service life from the actual working-conditions of the ACE heavy truck and the driving style of the driver.

When a traditional ICE heavy truck is running on the road, the engine instantaneous power is substantially the same as the vehicle road-load instantaneous power in a dynamic equalization, both are analogue time-varying functions; to carry out computer simulation analysis on the problem of vehicle energy saving and emission reduction optimization, it is necessary to use the engine cylinder single combustion stroke as the basic unit to set up model and to conduct analysis. The engine operation in the full domain of the universal characteristics curve is a very complex multi-variable nonlinear system problem, the total time of each cylinder combustion working stroke of the engine is less than 100 milliseconds, as of today the human still cannot set up a complete dynamic microscopic (molecule level) mathematical model or digital model with hundred millisecond level single cylinder combustion stroke as the base unit of analysis, to achieve real time (0.1 second level) high fidelity computer simulation on the engine dynamic characteristics, brake specific fuel consumption, and emissions; also cannot collect engine operation big data in a full engine cycle (intake/compression/combustion/exhaust) in real time to describe fully the problem of simultaneous optimization of the energy-saving and emission-reducing in the full domain of its universal characteristics curve; The conventional analogue electronic control engine's fuel injection electronic control technology essentially uses the single four-stroke engine cycle (two crankshaft turns, rotation of 720 degrees) as the minimum basic unit, and performs analogue signal processing or analogue electronic control on the analogue time varying function of the engine instantaneous power; at this time, the engine and each sub-system of the powertrain are cross-coupled, the hardware and software of each sub-system are also closely coupled, and the corresponding relation of the engine working-condition and the vehicle working-condition has bidirectional one-to-one mapping, engine design and calibration (Design & Calibration) have to cover all the working conditions and can only leverage one fixed universal characteristics curve with complex surface working-condition to adapt to different vehicle types or a specific vehicle with different operating conditions (Duty Cycle); The hardware and calibration software of the engine (i.e., firmware) are completely fixed after the mandatory emission compliance certification; throughout the period of mass production and vehicle service life, it does not allow any unauthorized change; The traditional engine can only use one fixed system to suit the various duty cycles and a thousand trucks with the same face (hardware & firmware); it cannot adjust the engine universal characteristics based on specific vehicle type and vehicle application (vehicle duty cycle) in agile mass customization fashion to achieve simultaneous optimization of fuel consumption and emission reduction and a thousand vehicle with a thousand face.

The ACE heavy truck of the invention can be controlled by series-hybrid iSS or parallel-hybrid iPS, converting the instantaneous power function of the DPC engine and the battery pack from the prior art second-level slow-changing analogue-function with strong hardware and software coupling and complex variation (the working-condition surface of the universal characteristics curve) into the much simpler pulse sequence digital function (several fixed operating-condition points or lines; at most one round-trip switching between the high-state and the low-state in each PWM pulse period; covering any vehicle type or vehicle working-condition of duty-cycle), such as bipolar rectangular (series-hybrid) or bipolar non-rectangular (parallel-hybrid) pulse-width-modulation (PWM) pulse time sequence and non-rectangular pulse amplitude modulation (PAM) pulse time sequence, transform and simplify the three highly non-linear and cross-coupled complex analogue signal processing or control problems of 1) the vehicle power optimization problem (primarily based on instantaneous power control), 2) the vehicle energy management (i.e., RDE fuel consumption) optimization problem (primarily based on average power control), 3) the problem of vehicle real driving environment (RDE) pollutant emission long-term stable compliance (based on both instantaneous power control and average power control) into three linearized and decoupled digital signal processing and control problems, and then automatically and effectively solves the problem of the online real-time global optimization of the ACE heavy-truck energy saving and emission reduction by means of the computer program and the AI algorithm; It actually realizes a software defined and fully digitalized electric hybrid powertrain. In the present invention, an ACE heavy truck can transform any modern analog electric control (AEC) engine (meeting EPA-2010, European-VI, GB-6) into a digital pulse control (DPC) engine through a series-hybrid iSS control or a parallel-hybrid iPS control technical solution (DPC engine for short).

Pulse modulation control technology can have two different meanings; in the first meaning, the pulse sequence function is used as digital carrier, a specific parameter of this digital carrier (e.g., pulse width PW, pulse amplitude PA, the pulse position PP) is changed along with the analog modulation signal with much lower frequency against the pulse sequence repeating frequency, namely the low-frequency analog signal is used for modulating and controlling the digital carrier signal; in the second meaning, the pulse sequence function itself is the digital modulation signal to modulate and control an analog time-varying function (e.g., high frequency oscillation carrier), namely using the digital pulse signal to modulate the control analog signal. Using the power electronic IGBT or silicon carbide (SiC) module to dynamically control the instantaneous analogue power function of the motor or battery (namely the Analogue Modulation Signal) and to generate a corresponding digital pulse sequence power function (i.e., Digital Modulated Signal), most of which is based on the pulse-width-modulation (PWM) or pulse amplitude modulation (PAM) control technology under the first meaning, according to the "Equivalent Impulse Principle" of a system with inertia, the output response function of the system with inertia using analogue modulation signal or digital modulated signal of equal momentum as input excitation is substantially the same, the two cases are equivalent in the engineering sense; however the pulse control engine technology (series-hybrid iSS or parallel-hybrid iPS) of an ACE heavy truck in the present invention is based on the pulse modulation control technology under the second meaning, using the PWM or PAM pulse modulation signal to perform synchronous digital pulse modulation control to the instantaneous simulation power functions of the engine and the battery pack respectively, generating two bipolar pulse-width-modulation (PWM) or pulse amplitude modulation (PAM) pulse sequence digital functions with synchronous and complementary transition, the three functions of engine instantaneous power, battery pack instantaneous power, and road-load instantaneous power satisfy the vehicle power equation (1-1) and series-hybrid power equation (2-4) or parallel-hybrid power equation (3-3) in real time; the so-called engine pulse power function and battery pack pulse power function to be synchronous and complementary refers to when the engine instantaneous power function jumps from the high-state to the low-state with second level hundred KW level delta (switching from AOM to POM), the instantaneous power function of the battery pack is synchronized with the same amplitude change from the low-state to the high-state (the discharge power is increased or the charging power is reduced), and vice versa; according to the series-hybrid power equation (2-4) or parallel hybrid power equation (3-3), the linear combination of the instantaneous power PWM pulse sequence function of the DPC engine and the synchronized instantaneous power PAM or PWM pulse sequence function of the battery pack is equal to the instantaneous road-load power analogue function of the ACE heavy truck. Obviously, the instantaneous slow-varying analogue power function of the engine or the battery pack and the instantaneous digital pulse power function (PAM of PWM) of the engine or the battery pack have intrinsically different mathematical or physical meanings; the analogue power time-varying function and the pulse power time-varying function represent two completely different kinds of operating-condition point distribution of the engine or the battery pack.

Common technical personnel in the automotive industry knows, if under the condition of keeping optimal power performance in any hybrid vehicle working-condition point, the engine actual working-condition distribution can be greatly simplified from the complex surface working-condition into several fixed working-condition points or working-condition lines in the high-efficiency zone, as much as possible to avoid engine low-speed low-load operation, idle operation, or each working-condition point of the engine to be switched quickly and greatly among the challenging low-efficiency operation condition, then it can significantly simplify the engine dynamic control and optimize the vehicle energy-saving and emission-reducing simultaneously; But so far, the global automobile industry has not found and publicize a set of feasible technical solution to achieve the above mentioned ideas; The invention Claims a feasible technical solution with high performance-to-cost ratio for realizing the said idea (especially to simplify the parallel-hybrid mode complex surface working-condition of the engine into pre-determined high-efficiency working-condition point or line). Using pulse modulation control (PMCs) on the instantaneous power time-varying function of an ACE heavy-truck engine (series-hybrid iSS or parallel-hybrid iPS), to greatly simplify the working-condition of the engine from the complex surface working-condition to at least one high-state working-condition point or line in the 1st quadrant (positive rotating speed, positive torque, AOM) high efficiency zone of the universal characteristics curve, and adding the new universal characteristics curve 4th quadrant (positive speed, negative torque; POM) at least one low-state working-condition point or line with zero fuel consumption and zero emissions; then adding the corresponding relation between ACE heavy truck engine working-condition and the vehicle working-condition can be converted into bidirectional N to M mapping (M and N are positive integer greater than 1); namely each vehicle working-condition point corresponds to N different engine working-condition points, and each engine working-condition point corresponds to M different vehicle working-condition points; performing synchronous and complementary pulse modulation control (PWM or PAM) to the instantaneous power functions of the engine and the battery pack respectively, realizing almost complete decoupling of the engine working-condition from the vehicle working-condition, and decoupling of the control software of the hybrid powertrain layer from the physical layer hardware; through hardware standardization and redundant design, using stability (no change in bottom layer hardware and calibration software) to deal with various changes (vehicle operation); adding control software dynamic customization and over-the-air iteration (OTA), realizing software defined mixed hybrid powertrain, achieving the beneficial effects of the batch customization (Agile Mass Customization) at high performance-to-price ratio, can optimize the RDE power performance, fuel consumption, pollutant emissions and other multi-dimensional important metrics of ACE heavy truck simultaneously. The so-called "thousand-vehicle & thousand-face" has two meanings, firstly any different vehicle model has a high performance-to-price ratio agile customizable powertrain control technical solution; secondly, each vehicle model each working day of different duty cycle also has a high performance-to-price ratio agile customizable powertrain control technical solution; the double dynamic customization of the powertrain control strategy aiming at any vehicle duty cycle working-condition of any ACE heavy truck type or specified vehicle can be realized by software definition and over-the-air iteration (OTA); regardless of the vehicle configuration parameters, making each and every ACE heavy truck an all-around champion heavy truck, aiming at any different vehicle duty cycle working-condition, can optimize the three important vehicle metrics of RDE power, fuel consumption, emissions simultaneously, breaking the difficult dilemma that the prior art heavy truck configuration parameters are very difficult to optimize for both the high speed working-condition and the city driving working-condition simultaneously; It can continuously improve the existing function and performance of the vehicle powertrain during the life cycle of ACE heavy truck, and can also continuously add new functions.

It is necessary to emphasize that any modern heavy-truck AEC engine (with displacement 9 L~16 L; whether the basic type or advanced type diesel engine or natural gas engine) used in the three core heavy-truck markets of Europe. United States, or China, can be converted into a DPC engine through the series-hybrid iSS or parallel-hybrid iPS technical measures of the invention; the actual working-condition distribution of the DPC engine is greatly simplified from the complex surface working-condition of the whole domain to at least one pre-determined working-condition point or line in the 1st quadrant high-efficiency zone, effectively shields the characteristics difference of the heavy truck engine with different displacement or technical grade in the universal characteristics curve full domain to impact the instantaneous or steady-state power (torque or power characteristics), brake specific fuel consumption (BSFC), pollutant emissions negatively; so that the engine is no longer the system bottleneck of ACE heavy truck power and actual energy-saving and emission-reducing effect, with obvious improvement on the performance-to-price ratio of the ACE heavy truck equipped with a mixed hybrid powertrain. The ACE heavy truck depends on the two sets of independent and redundant electromechanical power systems with complementary advantages of 1) rated power hundred kW-level dual-motors plus high-power battery pack with ten kWh-level capacity, and 2) the hundred kW-level heavy engine, under the premise of improving the vehicle power and active safety, at the same time, realizing the simultaneous optimization of the vehicle fuel consumption and pollutant emissions, and the RDE energy-saving and emission-reducing effects are basically decoupled from the full working-condition domain dynamic performance limit value (universal characteristics curve) of the engine of the ACE heavy truck or the driving level of the driver; Therefore, the ACE heavy truck also can effectively solve the long-term industry pain point of high RDE fuel consumption spread caused by different traditional heavy truck powertrain configuration parameters and different drivers; ensure that each ACE heavy truck under the control of the machine learning (ML) software algorithm can realize the simultaneous optimization of energy saving and emission reduction of long-haul heavy truck with high consistency, and are always better than what a human driver can accomplish.

Obviously, the change speed of the instantaneous power function of the hundred-kW battery pack (or motor) is one order of magnitude faster than that of the instantaneous power function of the hundreds of kW-level internal combustion engine or vehicle road-load; controlled by the electric power divider (ePSD), the battery pack can follow the dynamic changes of the difference between the road-load instantaneous power function and the engine instantaneous power function in real time accurately (ten millisecond time delay, kW level precision), in real time satisfy the series-hybrid power equation (2-4A) or parallel-hybrid power equation (3-3A); corresponding to the bipolar non-rectangular pulse-width-modulation (PWM) of pulse amplitude modulation (PAM) time sequence function of the engine instantaneous power to generate in synchronization the battery packet instantaneous charge and discharge power bipolar rectangular or non-rectangular PWM or PAM pulse sequence function; the equivalent amplitude value of the battery pack pulse sequence is continuously adjustable between the charging peak power value (negative value) and the discharging peak power value (positive value) of the battery pack; the period of the battery pack PWM is the same as that of the engine PWM; and the period of the battery pack PAM can be set as one tenth of the PWM period of the engine; realizing the digital conversion and control of the vehicle road-load instantaneous power analogue time-varying function; in other words, the real-time control problem of the ACE heavy-truck road-load instantaneous power analogue time-varying function can be converted into the following equivalent technical problem, performing pulse-width-modulation (PWM) control to the engine instantaneous mechanical power function and synchronously performing pulse modulation (PAM or PWM) control to the battery pack instantaneous electric power function; then according to the series-hybrid power equation (2-4) or parallel-hybrid power equation (3-3) to combine the two to generate a digital road-load instantaneous power pulse sequence function (referred to as "digital road-load power") with equivalent impulse of the original road-load instantaneous power analogue time-varying function ("original road-load power"), ensuring the ACE heavy truck to satisfy vehicle dynamics equation (1-1) in real time, although there is a fine difference between the original road-load power function and the digital road-load power function, the impulse of the two is the same (i.e., the work amount is equal to the time integral of the power function); the heavy truck driving operation can be viewed as a high inertia dynamic electromechanical system, according to the "equivalent impulse principle", both the digital road-load power and the original road-load power can satisfy the vehicle dynamics equation (1-1) in real time and generate basically the same vehicle driving effects; Obviously, the digital road-load power function is a composite pulse sequence function comprising an engine mechanical power PWM pulse sequence and a battery pack power pulse sequence (PAM or PWM). The long haul ACE heavy truck whole transportation event energy management (steady state, time integration of power function) or power management (instantaneous, lime differential of energy function) technology problem once through the series-hybrid iSS technology, parallel-hybrid iPS technology, intelligent mode switching (iMS) technology, clutch-less gear shifting technology (CGS), intelligent cruise control technology (iCC) and other combined technical features of the present invention to accomplish digitization as well as software and hardware decoupling, the vehicle energy-saving and emission-reducing optimization problem is then converted into an artificial intelligence (Narrow) AI) problem equivalent to the problem of "computer playing Go" (such as AlphaGo), very suitable for using machine learning (ML) algorithm, especially a deep learning algorithm of (Deep Learning), to automatically solve the problem; AlphaGo has already beaten all best human players, the ACE heavy truck, leveraging AI fuel-saving algorithm in the special vertical application field of the long-haul heavy truck energy-saving and emission-reducing simultaneous optimization, also can out-perform the human driver, and becomes the best assistant or secondary driver of the truck driver.

The International Clean Transportation Association (iCCT) issued a white paper in May 2020, reporting in detail the US and European Modern Heavy Truck Actual Driving Environment (RDE) pollutant NOx emissions data analysis; "In-use NOx Emissions and Compliance Evaluation for Modern Heavy-duty Vehicles in Europe and US", F Posada, ICCT, May 2020. Although the United States EPA-2010 emission regulation the nitrogen oxide compound (NOx) limit is lower than that of the Europe-VI emission regulation, due to the inherent design defect of the US EPA-2010 vehicle actual driving environment (RDE) pollutant testing method (NTE), US EPA-2010 diesel heavy truck and European-VI diesel truck using mobile emission measuring system (PEMS) under the actual driving environment (RDE) test, under the most challenging low-speed low-load working-condition (engine torque or power load rate is less than 30%), the actual NOx emission of the US diesel heavy truck is nearly 100% higher than that of the diesel heavy truck of Europe-VI, and is nearly 300% higher than the statutory limit of EPA-2010. California Air Resources Committee (CARB), the latest heavy diesel vehicle low NOx discharge state assembly (Heavy-Duty Low NOx Omnibus Regulations) promulgated in August 2020, in addition to the mandatory requirement of 2027, the NOx emission value of the new heavy diesel vehicle sold in California must be reduced by 90% compared with the EPA-2010 limit, also added new low-load test (Low Load Cycle) and idle test specification (Idling) and limit. In other words, for the United States, Europe, China's modern diesel truck, although the new diesel heavy truck is satisfy various national emission regulations (US EPA-2010, Europe-VI, GB-6) on the surface, but the low-speed low-load (torque or power load rate is less than 30%) and the idle speed of the urban circulation working-condition (Urban Duty Cycle) RDE actual NOx emission value is substantially higher than the rule limit by more than 100%, the local air quality and human health negative influence of the urban or suburban area with high population density is significant, belonging to the "legal" over the limit emissions; how to ensure the actual NOx emission can meet the emission standard stably long term in various actual driving environment of heavy diesel vehicle (RDE) is the difficult technical problem of current global diesel heavy truck industry urgently to be solved. The current global heavy-truck pollutants discharge government certification (e.g., US EPA-2010; Euro VI; GB-6), mainly according to engine laboratory bench discharge test data, must meet the emission standard, otherwise the product cannot be sold in the market legally; but after the engine emission certification meets the emission standard, continuing to reduce the RDE pollutant discharge of the vehicle does not earn extra credits and has no obvious economic benefits for the vehicle manufacturer of the vehicle owners, no one is willing to pay for these extras; however reducing the vehicle RDE fuel consumption (i.e., reducing $CO_2$ emission) is much more beneficial, the more the better without limit, and with important explicit economic benefits, with willing buyers to pay. The diesel heavy truck of the prior art, powertrain hardware strong coupling engine working-condition and the vehicle working-condition bidirectional one-to-one mapping, the minimum fuel consumption and pollutant discharge value of modern diesel heavy truck is determined by design and manufacturing process, when leaving factory, it is cured, cannot be sold after adjusting or improving (after mandatory after recall); Unless the Government modifies existing regulations, especially diesel heavy duty RDE pollutant emissions (NOx and PM) test specifications (e.g., the NTE specification of the United States or the MAW specification of Europe), forcing the main engine plant and engine plant consumption time to redesign and produce new diesel engine and heavy truck, Otherwise, all modern diesel heavy trucks in the United States/Europe/Europe/China (low-load, low-load, idle speed) RDE pollutant discharge (NOx/PM) seriously exceed this technical problem and the social problem of environmental pollution cannot be effectively solved.

Diesel engine emissions reduction represented by NOx and fuel consumption and greenhouse gas emissions (GHG) reduction represented by $CO_2$ often have contradictory requirements. Most of the technology for reducing emissions of vehicle exhaust gases is disadvantageous for reducing fuel consumption at the same time; for example, increasing exhaust gas recirculation (EGR) ratio, lifting diesel engine idle speed, adding an after-treatment system (ATS) small fuel heater (Mini-burner) and other technical features are helpful for diesel heavy truck to reduce NOx emission at low-speed and low-load operation, but these measures will also increase fuel consumption (i.e., increase $CO_2$ emission); vice versa, for example, the EGR ratio is reduced to zero, exhaust-gas waste heat recovery (WHR) and other technical features, although they are good for vehicle fuel consumption and $CO_2$ emission optimization (minimization), under the actual driving environment (RDE), especially under the low-speed low-load urban or suburban working-conditions, they have negative impacts on the pollutant emissions (NOx and PM and so on) minimization; In the prior art, the technical solution ready for immediate production that can optimize the RDE fuel consumption ($CO_2$) and pollutant emissions (NOx) of any diesel heavy truck simultaneously is very rare, which is considered the holy grail pursued by the technical personnel of the entire industry. Technical measures such as heavy truck diesel engine cylinder deactivation (CDA) technology, electrically heated catalyst (EHC) technology, heated urea injection (Heated Dosing) technology, electric hybrid powertrain technology may reduce the actual $CO_2$ and NOx emissions of any diesel heavy truck simultaneously under various highly challenging working conditions including low-speed and low-load or idle working-conditions. However, the above technical features are not yet in volume production and commercial deployment on the global diesel heavy truck markets.

The ACE heavy truck configured with the software defined mixed hybrid powertrain of the invention can effectively adopt various novel technical features, dynamically optimize the vehicle RDE emissions according to different vehicle real-time working-conditions, achieve simultaneous minimization of vehicle RDE $CO_2$ and NOx emissions. The effective technical measures to reduce diesel heavy truck RDE pollutant emissions can be divided into two types, the first type is to reduce the engine out pollutants amount (Engine-out Emission), such as exhaust gas recirculation (EGR) technology; the second type is through several passive (Passive) or active (Active) temperature management (Thermal Management) technical features, to keep the vehicle after-treatment system (ATS) to work stably for a long time above the off-light temperature (200 deg C.+), improving the conversion efficiency of each catalyst (90%+), furthest reducing the vehicle exhaust-gas pollutant emission limits.

Firstly, the series-hybrid iSS technology and the parallel-hybrid iPS technology of the invention ensure that, under any working-condition (Duty Cycle) of any ACE heavy truck, the engine (diesel engine or natural gas engine) always operates on selected working-condition points or lines in the active mode (AOM) combustion high-efficiency zone, almost completely avoid the engine active idle or low-load working conditions; adding a few selected novel passive, mode (POM) working condition points or lines with zero fuel consumption and zero pollutant emissions; the dynamic control of the engine average power can be realized by adjusting the duty ratio (Duty Cycle) of the engine instantaneous power pulse width-modulation (PWM) function in real time, at this time, the working-condition of the engine is completely decoupled from the working-condition of the vehicle, when the DPC engine is operating in high-state working-condition with low fuel consumption (BSFC) and high thermal efficiency (BTE), at the same time, the engine exhaust pipe outlet waste gas (engine-out exhaust) temperature is obviously higher than the light-off temperature (more than 250 degree C.), while when the engine is operating in low-state (POM), there are zero fuel consumption and zero pollutant emissions but with ten kW level electric power consumption, the DPC engine can realize simultaneous minimization of the vehicle RDE $CO_2$ and NOx emissions. Regardless of the actual working-condition of an ACE truck, the pulse periods in iSS and iPS technology are all in the minute level; when the engine is switched from the low-state working-condition (POM; with zero fuel consumption & zero pollutant emissions) to the high-state working-condition (AOM, with fuel consumption & pollutant emissions), it is equivalent to the engine frequent hot start, the after-treatment system will not become cold; and once the engine enters the high-state working-condition, the engine-out exhaust flow is strong and its temperature, is obviously higher than the light-off temperature; even if the after-treatment system only adopts passive mechanical thermal insulation technical measure and does not use active temperature control measures, it is still possible to ensure that various catalysts in the after-treatment system can work efficiently (e.g., SCR catalytic conversion efficiency is greater than 90%), ensuring that ACE heavy-truck RDE emissions can meet the emission standards (EPA-2010, Europe-VI, GB-6, etc.) stably for a long time.

However, if it is necessary to satisfy the 2027 CARB ultra-low emission requirements (ULE-Ultra Low Emission or ULE-Ultra Low Emission) with 90% NOx reduction over the EPA-2010 limit (NZE-Near Zero Emission) and the US Federal GHG-II 2027 CO2 emission limit simultaneously, then in addition to the series-hybrid iSS and parallel-hybrid iPS technical features, it also must implement engine binary cylinder deactivation technology (bCDA) and/or after-treatment system active temperature control technology such as urea injection electric heating technology (Heated Dosing) and/or catalyst electric heating technology (EHC) and so on while basically keeping the modern engine main body design or mainstream integrated after-treatment system (ATS: DOC/PDF/SCR/ASC) design, detailed description later.

The ACE heavy truck in the invention can be configured with multiple electric motors, at least the standard configuration with two hundred-kW level rated power low rotating speed & high torque automotive grade electric motors with both rotating speed and torque independently adjustable; wherein the motor (MG1) at the hybrid P1 position is mainly operated to generate electricity (generator for short); the other one motor (MG2) at the hybrid P2 position is mainly used for propulsion (the "main traction motor" or the "traction motor" in short); the generator can also run under the driving mode (dragging the non-combustion engine), the traction motor can also operate under the electric generation mode (regenerative braking); it can also configure an optional secondary traction motor (MG3) of hundred-kW level rated power at the hybrid P3 position, its rotating speed is proportional to that of the main traction motor, its torque is randomly adjustable. The system architecture of the ACE heavy truck in the invention is a dual-motor hybrid architecture, wherein the generator at the hybrid P1 position is mechanically coupled with the flywheel of the engine (constant speed coaxial or constant speed ratio parallel shaft) to form a generator set (Gen Set); the traction motor at the hybrid P2 position is mechanically connected with the input shaft of the transmission box in a bidirectional manner (coaxial or fixed speed ratio parallel shaft), and it is also connected with the flywheel of the engine and the mechanical shaft of the generator through a wire controlled heavy truck clutch in a bidirectional mechanical way. It is obvious that the range-extended series-hybrid heavy truck can be considered as a special case of the mixed ACE heavy truck with the clutch always open or without the clutch, while the parallel-hybrid vehicle can be regarded as another special case of the mixed ACE heavy truck with clutch constantly closed; at this time the generator and the traction motor with mechanical linkage and fixed rotating speed ratio can be viewed as an equivalent larger motor with rated power the sum of the two. According to the series-hybrid power equation (2-4) or parallel-hybrid power equation (3-3) and the corresponding boundary conditions, it can be derived from the theory, under the precondition of the vehicle full domain working-condition to ensure the vehicle power performance and active safety and seeking simultaneous optimization of the energy saving and emission reduction of the ACE heavy truck, the performance-to-price ratio of the mixed hybrid ACE heavy truck of the present disclosure is significantly higher than that of that of the series-hybrid heavy truck or parallel-hybrid heavy truck with similar configurations.

The ACE truck also includes: a satellite navigator (GNSS), which can be a double-antenna carrier phase real-time dynamic difference (RTK) receiver, it can measure and calculate the longitude and latitude of the longitudinal road, the altitude, the longitudinal slope, and the linear velocity and other parameters during the vehicle driving process in real time; or can also be a high-precision single-antenna satellite navigator, it can have better than ten-meter-level absolute positioning precision, calculate the longitude and latitude of the vehicle driving process road, and linear speed (relative precision is better than 3%) in real time; then matching with the inertial navigation unit (IMU) containing dynamic (second level) inclination angle sensor, which can measure the road longitudinal slope in real time, the measuring absolute precision can be 0.15%. The vehicle controller VCU of the ACE heavy truck can be configured to: based on satellite navigator (GNSS) in real time measuring the longitude, latitude, longitudinal slope of the vehicle in the driving process, vehicle speed, and vehicle acceleration, and combined with the prior 3 D road information (longitude, latitude, longitudinal slope and so on) in the vehicle electronic horizon, to perform intelligent cruise control (iCC) to the generating set (engine+generator) of ACE heavy truck, clutch, traction motor, automatic transmission-box, ePSD, and battery pack (collectively referred to as hybrid powertrain); The iCC technique comprises a Predicative Control (Predictive Control) and an adaptive cruise control (ACC) technologies, which are described in detail later.

The high-power battery pack is one of the most expensive sub-systems in the ACE heavy truck, and often is one of the weakest links of the performance and the service life of all the important sub-systems of the vehicle. If the ACE truck wants to realize large-scale commercial application soon, it must solve the problems of the cost, performance and service life of the high-power battery pack at the same time. The technical requirements on the ACE heavy truck battery cells and the battery pack are obviously different from that for the hybrid passenger vehicles, firstly, the battery pack total weight or volume requirements are less stringent, there is basically no limit; However, the battery pack requirements on tolerance of high and low temperature and vibration, especially the requirement of extra-long cycle-life under the high-rate part charging-discharging (HRPSoC) working-condition. ACE heavy truck needs to adopt the high-power battery pack with ultra-long cycle-life, low temperature resistant, safe and reliable, high performance-to-price ratio; the battery cells in their high-efficiency zone under high-rate partial SoC (such as SoC 30% to 70%) charging-discharging working-conditions need to bear the continuous charging-discharging rate of up to 5 C to 10 C and the peak charging-discharging (10 seconds or 15 seconds pulse) the rate of up to 10 C to 25 C, the battery cells will work for a very long time in the most challenging high rate partial SoC charging-discharging (HRPSoC) working-conditions, while the charging rate is often higher than the discharging rate, further challenging the weak point of the current lithium ion battery cells comfortable with higher charging C rate and lower discharging C rate; the battery pack should work normally when the vehicle external working environment temperature range is from −30 degree C., to +55 degree C.; The equivalent deep charging-discharging (DoD 100%) cycle-life should be more than 12000 times. When the vehicle is parked outdoor for 24 hours in a cold winter day of −30 degree C., after the engine cold start, within three minutes of parked idling to heat up the vehicle, or within vehicle starting running for ten minutes, the battery packet should be basically working; the battery pack charging-discharging performance is allowed to be temporarily reduced, when the inner temperature of the battery cells rises to 10 degree C., it needs to recover the full charging-discharging capability; However, it does not allow permanent damage to the battery cells due to low-temperature high-rate charging or reduction of the cycle-life, even the important potential safety hazard of the battery cell thermal runaway.

The mainstream lithium-ion power cells such as lithium iron phosphate (LFP) and ternary lithium (NCM or NCA, etc.) are generally afraid of cold. When the battery cell temperature is lower than zero degree C., the high rate discharge (more than 2 C) capability is significantly reduced temporarily, when the battery cell temperature rises to more than 10 degree C., the battery cell discharge performance recovers to normal; the low-temperature high-rate discharge of the battery pack will not damage the battery cells permanently; however the battery cell low temperature (especially less than 0 degree C.) high rate charging, it is easy to cause the battery cell carbon negative electrode to be plated with lithium (Plating), seriously and permanently reducing the service life of the battery cells; The damage mechanism of the battery cell is mainly the metal lithium dendrite generated negative electrode plating lithium may pierce the separator membrane, causing the potential safety hazard of the electric short circuit inside the cells and triggering the thermal runaway. The battery management system (BMS) will monitor the temperature of the battery cells in real time, strictly prohibit the high-rate charging at the low temperature of the battery cells. Unless effective battery pack preheating and cooling thermal control technical features are adopted, mainstream automobile power cells such as LFP, NCM, or NCA are difficult to solely shoulder the role of ACE heavy truck battery pack. Different from the mainstream automotive grade power cells, lithium titanate battery cell (LTO; positive electrode ternary lithium/negative electrode lithium titanate) negative electrode never appear lithium plating phenomenon, it is the only battery cell capable of completely satisfying all technical requirements of mass production ACE heavy truck power cell. Comparing the mainstream lithium-ion battery cells discussed above, the LTO battery cells have many obvious advantages such as extra-long service life and high safety, low temperature resistance, excellent high-rate partial SoC (HRPSoC) charging-discharging performance, also have two significant disadvantages such as battery cell lower specific energy (less than 80 wh/KG) and higher cost ($/kWh about four times of LFP/NMC battery cell). Because the ACE heavy truck high-power battery pack with only dozens of kWh of the total capacity has no hard packaging limit in terms of volume and weight and so on, LTO pack with lower specific energy and large volume is not a problem, but the disadvantages of higher cost will hinder the large-scale commercial applications of the ACE heavy trucks, it is essential to reduce the total cost of the high-power battery pack system by all means; The invention optimizes the comprehensive performance and cost of ACE heavy-truck battery pack by connecting at least two ten-watt time-level high-power battery packs composed of different electrochemical battery cells in parallel; Details in later sections.

The battery pack of the ACE heavy truck can operate in three different modes: 1) under the charge-sustaining mode (CS), both the instantaneous SoC function and the minute-level time average SoC function of the battery pack are always kept in the high-efficiency zone (from the best upper limit BUL to the best lower limit BLL) to fluctuate up or down continuously; 2) under the charge depleting mode (CD), the instantaneous SoC function of the battery pack always fluctuates continuously between the URL and the LRL, while the average SoC function (the minute level rolling time average) is continuously reduced with the time between the URL and the LRL; 3) under the charge increasing mode (CI), the instantaneous SoC function of the battery pack always fluctuates continuously between the URL and the LRL, while the average SoC function continuously rises between the URL and the LRL over time. The best working area (also called high efficiency zone) of the battery pack is the SoC fluctuation range between the best lower limit (BLL) and the best upper limit (BUL); in the high-efficiency zone, the battery pack high rate partial SOC charging-discharging (HRPSoC) performance is the best, and the full life cycle actual equivalent cycle-life (namely the total throughput and battery packet effective capacity ratio) is the longest, and when the battery pack SoC is between the lower red line (LRL) and the best lower limit (BLL) or between the best upper limit (BUL) and the upper red line (URL), its high rate partial SoC charging-discharging performance is not the best, but will not cause permanent damage to the battery cells and will not reduce the equivalent cycle-life. Obviously, the URL>BUL>BLL>LRL of the SoC function of the battery pack, the values of these four SoC limits of each battery pack are specified by the battery cell and/or pack manufacturer, the battery pack operation outside the red lines should be avoided completely (i.e., the SoC<LRL or SoC>URL).

In the intelligent cruise control (iCC) technical solution of ACE heavy truck of the invention, the charge and discharge power control strategy of the battery pack is closely related to the control strategy of the ACE heavy-truck engine mechanical power control strategy and the vehicle total propulsion power control strategy (i.e., the sum of the closed-loop drive effective mechanical power and the effective electric power). The essence of the ACE heavy-truck power management strategy (PMS) of the invention is to split and convert the complex multi-dimensional nonlinear analogue control problem of the "optimized vehicle energy-saving and emission-reduction" into two relatively simpler reduced dimension quasi linear digital control (Digital Control) problems; one is the digital control problem of sub-second level "instantaneous power management", while the other one is the digital control problem of minute-level "average power management", firstly in instantaneous power (sub-second level) control aspect, via series-hybrid iSS control or parallel-hybrid iPS control, the instantaneous electric power analogue function of the battery pack and the instantaneous mechanical power analogue function of the engine respectively are converted into two synchronous and complementary PAM or PWM pulse sequence (battery pack) and bipolar PWM pulse sequence (engine) and satisfy the vehicle dynamics equation (1-1), series series-hybrid power equation (2-4), or parallel hybrid power equation (3-3) in real time; at this time the instantaneous SoC time-varying function of the battery pack fluctuates continuously between the lower red line (LRL) and the upper red line (URL); secondly, to control the steady state average power (minute rolling average), dynamically adjusting the duty ratio of the PAM pulse sequence or the PWM pulse sequence respectively, and performing the minute level rolling time average operation (equation MAW) to the PAM pulse sequence of the PWM pulse sequence respectively and to continuously and dynamically adjust the average power function value of the battery pack or the average power function value of the engine; it can also combine the vehicle satellite positioning (GNSS) and road-3D electronic map and according to the vehicle dynamics equation (1-1) to predict and compute the distribution of the instantaneous road-load power function and the average road-load power function (equation MAW) in the electronic horizon (one hour level or hundred kM level) with kW granularity in real time (second-level time delay); then by dynamically adjusting the delta value between the road-load average power function and the engine average power function, making the battery pack to work stably in one of the three modes of CS (delta value is close to zero), CD (delta value is significantly larger than zero), or CI (delta value is significantly smaller than zero) or switch smoothly among the three, to the furthest extend making the high-power battery pack to work stably in its high efficiency zone for a long time, searching for battery pack regeneration charge turnover rate maximization and engine charge turnover rate minimization, achieving simultaneous optimization of the power performance, driving safety, energy-saving & emission reduction of the ACE trucks with multiple benefits.

The charge stored in the battery pack of the ACE heavy truck is divided into two types: one is high-cost charge derived, from engine direct power generation, namely "engine charge", the other one is the quasi-zero cost charge recovered from the regenerative braking of the electric motors, namely "regeneration charge" (regen charge); It is obvious that the regen charge is indirectly derived from the engine and it belongs to the effective utilization of the waste. Unless otherwise indicated, the physical unit used for various charge of electric quantity of the invention is kWh. The power management strategy (PMS) of an ACE heavy truck during the entire freight event focuses on achieving simultaneous optimization of the vehicle RDE fuel consumption and pollutant emissions (i.e. simultaneous minimization of $CO_2$ and $NO_x$ emissions) under the premise of ensuring the vehicle power performance and the active safety; Firstly, the accumulated charge throughput of the battery pack should be maximized; complete the charging-discharging cycle (Round Trip) use the electric energy for vehicle propulsion; Secondly, the proportion of the regen charge in the total charge must be maximized, at the same time, the proportion of the engine charge in the total charge should be minimized; Obviously the total charge is equal to the sum of the regen charge and the engine charge, and the physical unit of the three is kWh. The ratio of the total charge throughput and the effective capacity of the battery pack is defined as "total charge turnover rate", the ratio of the accumulated regen charge and the effective capacity of the battery pack is defined as the "regen charge turnover rate"; the ratio of the accumulated engine charge and the effective capacity of the battery pack is defined as the "engine charge turnover rate"; if one were to neglect the battery pack charging-discharging round-trip loss, one could obtain the following formula, "total charge turnover rate=regen charge turnover rate+ engine charge turnover rate". The expression of ACE heavy truck "energy saving and emission reduction optimization" in the invention can either be the technical problem to be solved or technical target, can also be the technical effects or benefits (namely fuel consumption and pollutant emissions simultaneous minimization) achieved via solving the said problem, the reader can determine the right meaning from the context; and the ACE heavy-truck intelligent cruise control (iCC, namely L1 level autonomous driving function) refers to the technical solution of the software-defined hybrid powertrain to realize vehicle RDE fuel consumption and pollutant emissions optimization (i.e., $CO_2$ and $NO_x$ simultaneous minimization), is a set of specific technical features of the invention; iCC is essentially an ACE heavy truck agile mass customization (i.e., thousand vehicle & thousand face) vehicle dynamic power control strategy, the core of the vehicle fuel consumption minimization is under the precondition of lifting the battery pack total charge turnover rate in each freight event, maximize the regen charge turnover rate and minimize the engine charge turnover rate simultaneously. The market force will forever pursuit the ACE truck energy saving targets, there will always be even lower fuel consumption or cost; the pursuit of the emission reduction destination is clear, ensuring long-term stable compliance of the heavy-truck pollutant emission regulations (new vehicle emission certification, effective service life, in-use compliance verification (NTE or MAW), after meeting the emission standard, there is no market original drive to spend resources to further reducing emissions.

The VCU can be configured to: based on the accurate timing function of the GNSS receiver, real-time calibrating the internal clock of each subsystem microprocessor including the internal clock of the VCU, the system time sequence with single direction and uniqueness is used to automatically mark the dynamic operational data of each sub-system associated with the vehicle operation and the vehicle running transverse or longitudinal controls, the sampling frequency is higher than 5 Hz (i.e., at least five times per second) of the measurement and storage; in the first dimension, synchronize and form a data group from the configuration parameters and dynamic operational data of at least two sub-systems among the GNSS receiver, map unit, engine, generator, electric power divider (ePSD), clutch traction motor, an automatic transmission box, and the battery pack; and according to the system time sequence, calibrating the plurality of data groups on the second dimension, aligned, or arranged to form structured big data (oil data) about ACE heavy truck operation, for describing the dynamic operation condition, especially focusing vehicle energy saving and emission reduction and driving automatic safety; Optionally, to protect the privacy and commercial secret of the driver and fleet, the fuel-saving data set to be desensitized and encrypted, then by mobile internet or wired internet in a safe way, in real-time (sub-second time delay) or timely (hour-level time delay) cloud computing platform for storage, for subsequent big data analysis processing.

The VCU can also be provided to: based on the 3 D map prior road longitudinal slope distribution function in the electronic horizon range, vehicle GNSS positioning, universal characteristics curve digital model of the engine, the digital model of the generator universal characteristics, the digital model of the battery pack charging-discharging characteristics the digital model of the transmission box characteristics and driving at least one of the digital characteristics of the motor, the engine, the generator, the battery pack, the ePSD, the transmission-box, and the corresponding at least one of the traction motor for real time control.

The VCU can also be provided to: in the vehicle driving process, commanding a plurality of vehicle sensors and a microprocessor set, real-time collecting and locally storing the structured big data (oil data) of ACE heavy truck operation; and the vehicle-mounted storage of fuel-saving data set, via wireless mobile internet, real-time (sub-second time delay) or timely (hour-level time delay) to the remote cloud computing platform for sending and storing, for subsequent analysis processing in the cloud, on the cloud platform, integrated deep learning algorithm, cloud platform hash rate and a plurality of fuel-saving data set of ACE heavy truck cluster, to train the cloud AI brain (namely AI training chip) of ACE heavy truck, establishing deep neural network (DNN) model of fuel-saving algorithm, and downloading or wireless remote push (OTA) to the appointed ACE heavy truck aiming at the specific freight event of the Merck fuel-saving algorithm, then performing local real-time reasoning operation by the vehicle end AI brain (namely AI inference chip), optimizing vehicle fuel consumption and emission, according to the specific ACE heavy truck and specific freight path, combining the running big data of all ACE heavy trucks in the same path history, the cloud AI brain quickly calculates the default oil power control scheme of the vehicle running on the path, the lower transmission is pushed to the vehicle, then the vehicle end AI brain according to the specific vehicle condition and road condition, performing local inference operation, modifying the power control strategy in real time to achieve the vehicle fuel consumption (L/100 kM) and pollutant emissions simultaneous optimization (i.e., minimization).

The after-treatment system (ATS) s of China GB-6 heavy diesel engine or modern European and American heavy diesel engine (EPA-2010, European-VI) use substantially the same technical pathway, including the diesel oxidation catalyst (DOC), diesel particulate filter (DPF), the selective catalytic reducing device (SCR) for eliminating nitrogen oxide compound (NOx), and urea leakage catalyst (ASC) with these four large sub-system sequentially connected in series from front to back, namely the integrated after-treatment system (IATS); Unless otherwise specified, the after-treatment system (ATS) in the present invention refers to the integrated after-treatment system (IATS). The high-efficiency temperature range of the emission-reducing conversion of each catalyst of ATS is generally between 250 degree C., and 550 degree C.; for the diesel engine under high load condition (torque or power load rate greater than 40%), its exhaust-gas temperature is generally between 250° C. to 500° C., the ATS system operates in the high efficiency region, which is good for emission reduction; while for engine cold start, idle speed or low load operation, the exhaust-gas temperature is obviously lower than 250 degree C., the surface temperature of each catalyst in the after treatment system cannot quickly reach the high efficiency zone threshold value, namely the light-off temperature (about 250 degree C.), the catalyst conversion efficiency is not high (such as less than 50%), pollutant (particulate matter, NOx and so on) emissions are high. Most of the accumulated pollution emissions of the vehicle comes from engine cold start, low load or idle speed operations, and the instantaneous states with sudden changes of rotating speed and torque; How to make sure that in the effective working period of the 700K kM, the ATS system can meet the vehicle RDE pollutant emission regulations limits stably in long term is a hard technical problem to be effectively solved for all modern diesel heavy trucks including China—GB-6 new heavy trucks.

Constrained by the vehicle-mounted self-diagnosis module (OBD-II) to monitor the vehicle exhaust-gas discharge condition in real time, modern diesel heavy truck must park and complete DPF system active regeneration (Active Regeneration) to remove the carbon particles deposited inside the DPF after certain period of time (hundreds of miles or thousands of miles); the active regeneration frequency (times/100 kM) mainly depends on the configuration parameters of the vehicle and the main-stream operation conditions (Duty Cycle); DPF active regeneration not only waste time (about 30 minutes of parking idle speed diesel engine), but also burns the fuel without any useful work; DPF active regeneration has always been one of the key pain points of European and American heavy truck drivers and freight companies, and will also become one of the key pain points of Chinese drivers and fleets using new GB-6 heavy trucks.

The mixed hybrid ACE heavy truck of the invention is capable of operating the full life cycle, by implementing series-hybrid iSS and parallel-hybrid iPS control, the engine is stably set to operate in its combustion high-efficiency zone of the best working point, it can reduce by more than 75% the active regeneration frequency against a single electric motor parallel-hybrid heavy truck or a traditional diesel heavy truck; at the same time of optimizing the vehicle fuel consumption, ensuring that the catalyst surface temperature in the processing system after discharging is stably fallen in the high-efficiency conversion temperature range (higher than 250 degree C.) for a long time, which can reduce the fuel consumption, but also can reduce the pollutant discharge in the actual operation of the heavy truck, Long-term stability, satisfy the actual driving environment (RDE) discharge control mandatory requirement (CO2 and NOx is optimized at the same time) in the actual driving environment (RDE) in the current emission regulations of the three places in the United States and Europe, the stable standard is reached.

As described above, under the long-haul freight applications, the invention publicize an ACE heavy truck configured with a mixed hybrid powertrain (pulse control engine, dual motors, single clutch) can reduce comprehensive fuel consumption (L/100 kM) by 30% compared with a traditional engine heavy truck, and with much better vehicle power performance, active safety, RDE pollutant emission compliance consistency. At the same time, compared with dual-motor range extended series-hybrid heavy truck or single-motor parallel-hybrid heavy truck, dual-motor mixed hybrid heavy truck has bigger advantages in fuel-saving, vehicle power, active safety, and cost competitiveness.

The ACE heavy truck of the invention can according to a prior electronic horizon road 3D data (longitude, latitude, longitudinal slope, others), vehicle configuration parameters and dynamic operation data (total weight, rolling resistance coefficient, drag coefficient, vehicle speed, vehicle acceleration, real-time positioning and so on), and the vehicle dynamics equation (1-1), dynamically predicting the road-load power space-time function in the electronic horizon (hour level or hundreds of miles level) with refreshing frequency higher than 2.0 Hz and kW level granularity, then according to the machine learning (ML) algorithm focused on energy-saving and emission-reducing automatically generate and execute the vehicle power control strategy at the vehicle end in real-time (sub-second level), commanding the mixed ACE heavy truck to dynamically implement the series-hybrid iSS or parallel-hybrid iPS, iMS control, CGS control, iCC control, and others in a combination of technical features, then adding the cloud-and-vehicle collaboration, and through software over-the-air upgrading (OTA) to realize continuous improvement of the energy-saving and emission-reducing optimization machine learning algorithm (ML), under the precondition of ensuring the vehicle power and active safety, the engine and the battery pack can work stably for a long time in the respective high-efficiency area, satisfy ground vehicle dynamics equation (1-1), series-hybrid power equation (2-4) or parallel-hybrid power equation (3-3), realizing the simultaneous optimization of the ACE truck actual energy-saving and emission reduction, especially the RDE fuel consumption is minimized; The above set of multiple technical features is defined as the "intelligent cruise control" (iCC) technical solution of function of the ACE truck. Comparing with a traditional ICE heavy truck without any hybrid function, in the same path, with the same load, under the condition of the same freight delivery time, an ACE heavy truck, through iCC technical solution, can realize actual fuel consumption average reduction rate of 25%, fuel consumption spread (i.e., variance) is one order of magnitude smaller than that of a human driver, and substantially decoupled from the level of the ACE heavy truck driver and engine performance. Obviously, the iCC technical solution can realize the ACE heavy truck longitudinal L1 level autonomous driving function defined by SAE; In the present disclosure, iCC not only represents the specific technical solution, but also can represent the L1 level autonomous driving function realized by the technical solution; iCC technology comprises the existing technology focusing fuel-saving prediction cruise control (PCC—Predicative Cruise Control) and focusing active safety and driving convenience of adaptive cruise control (ACC—adaptive Cruise Control) two types of functions, at the same time, the iCC makes important technical improvements on the specific technical features and final technical effects of PCC and ACC function, and further described in the embodiment part.

The ACE heavy truck of the present disclosure, all key subsystems or components are based on the industrialized products and technologies; under long-haul freight applications and comparing with prior art diesel engine heavy trucks, the ACE truck can achieve the beneficial effect of comprehensive fuel saving rate of 30% under the premise of ensuring the vehicle power performance, active safety, RDE emission meeting the emission standard stably long term, and vehicle attendance rate. The ACE truck, even without government subsidies, will enable the feet owner or the truck owner to recover the TCO delta within 2 years or 400,000 kM (total cost of ownership difference between that of an ACE truck and that of a conventional diesel heavy truck) by saving vehicle fuel expense, reducing maintenance and repair expenses, increasing the labor productivity of the heavy truck drivers. The brand new production ACE heavy truck (Le, the OEM ACE heavy truck) can reach the carbon emission target value of the 2025 CO2 regulation recently promulgated by the European Union and the US GHG-II 2027 carbon emission target value ahead of schedule; It also can be used, under the condition that the modern diesel engine and its after-treatment system don't undergo significant design changes, to satisfy the 2027 diesel heavy truck ultra-low NOx emission Omnibus regulation issued in August 2020 in California.

In the United States, the average service life of heavy truck (especially chassis or vehicle frame) is more than 20 years or over 1.5 million miles, every heavy truck frame in its full cycle-life period may be provided with two or three sets of powertrains (engine+transmission-box; out-of-frame overhaul after about 600K miles), the second or third set of powertrain tends to be a remanufactured powertrain certified by the OEM. The average annual sales volume of new heavy trucks in North America is about 250K, while the number of retrofitted heavy trucks per year (i.e. a used truck with a remanufactured powertrain) exceeds 250K. Benefitting from the more flexible (easy to enter but hard to exit) heavy truck regulatory regime in US and Canada, it is legal and allowable for a retrofit truck, including the retrofit ACE truck converted form a conventional used ICE heavy truck, to enter into commercial deployment in US and Canada without government review or re-certification. The software-defined mixed hybrid powertrain technology of the invention not only can be adapted to the brand new OEM ACE heavy trucks, but also can be used to upgrade the approximately two million used diesel heavy trucks in US and to achieve annual volume deployment over ten thousand retrofit ACE trucks within three years, enabling all these high volume retrofit ACE trucks, like the OEM ACE trucks, to meet the GHG-II 2027 carbon target ahead of schedule, significantly reducing the RDE fuel consumption (L/100 kM) of large number of used traditional diesel trucks in US and ensuring these retrofit ACE heavy trucks RDE emissions to meet the emission standard stably for long-term with profound economic meaning and social significance for the US long-haul freight industry. At the same time, it lays a solid foundation for the promotion of the global OEM ACE heavy-truck volume production. China and Europe have adopted a mandatory licensing system for the production and sales of all road vehicles, and the hybrid conversion of any used-heavy-truck is not allowed under the current regulatory regime in China or Europe; However, the speedy volume commercialization of the retrofit ACE trucks of the present invention in USA will greatly promote the process of commercial deployment of the OEM ACE trucks in the US, China, or Europe.

The average useful life of a heavy trucks in the United States is over 20 years. According to a media announcement by the Clean Diesel Forum in 2020, by the end of 2018, of all the deployed diesel trucks throughout USA, only 43% of the diesel heavy trucks satisfy the US current emission regulation EPA-2010 (i.e., 43% market penetration rate), and the rest of the diesel heavy trucks do not satisfy EPA-2010 and these older diesel trucks have higher pollutant emissions. In other words, the United States will wait until 2030 when most of the diesel heavy trucks (more than 90% market penetration rate) will satisfy the current emission standard EPA-2010 in the heavy-truck market, the market penetration of a new technology is very slow, and it will take a few decades. Obviously in general, the fuel consumption and emission of about 2 million used heavy trucks in the United States are significantly higher than that of the new OEM heavy trucks. The US laws and regulations allow the hybrid conversion of used heavy trucks; these retrofit hybrid heavy trucks can be deployed commercially for freight operations without the time consuming and expensive governmental recertification. The software defined hybrid powertrain of the invention can retrofit large amount of used diesel heavy trucks into retrofit ACE heavy trucks, which can quickly and significantly reduce the fuel consumptions and emissions of the million-unit level used heavy trucks in US with high performance-to-cost ratio, high technical and commercial feasibilities, and huge economic and social values, and the commercialization process can start immediately.

The content of the invention focuses on long-haul heavy trucks, but the technical problem to be solved of the invention, specific technical solutions and measures, and beneficial technical effects are also applicable to medium or large commercial mixed hybrid vehicles (truck or bus); at the same time, series-hybrid intelligent stop-start control technology (iSS), parallel-hybrid intelligent power switching control technology (iPS), intelligent mode switching technology (iMS), clutch-less gear shift technology (CGS), Intelligent cruise control technology (iCC) and other single technology or combination technologies are also applicable to dual-motor mixed-hybrid light vehicle (total weight is less than four tons).

Several embodiments of the present invention focus on the long-haul hybrid heavy trucks, mainly because the global automotive industry generally considers that the challenges of the mass-production-ready engineering technology (PRET—Production Ready Engineering Technology) of the electrified long-haul heavy trucks to be extremely high, mainly limited by the current status of the modern lithium ion power battery technology and DC fast charging technology, it cannot directly expand the hybrid or pure electric technology of the passenger vehicle to the main-stream heavy truck field, the main-stream hybrid heavy truck or zero emission pure electric heavy truck is very unlikely to reach volume commercialization in global scale before 2030. The present disclosure has a creative contribution to the prior art: fully leveraging the heavy truck diesel engine and integrated after treatment system in mass production by 2020, under the premise of not changing the hardware of the engine and the after-treatment system, the invention Claims an engineering technology solution with high performance-to-price ratio and ready for volume production, which can satisfy the 2027 mandatory US GHG-II heavy truck CO2 emission limits and the California ultra-low NOx Omnibus regulations (NOx 90% lower than EPA-2010) by 2025. The software defined powertrain and the key subsystem hardware of the ACE heavy truck of the present invention all have been in volume production and commercial use, the key invention points are centralized on the powertrain system architecture, electro-mechanical connection modes and methods, engine and battery pack instantaneous or average power function pulse modulation control methods, the collecting and storing methods of the fuel-saving data set; the technology discussion focused on long-haul heavy trucks; common technical people in the automotive industry, starting from the present disclosure and without much creative thinking, can extend the applications of the software defined mixed hybrid powertrain technical solution of the present invention (especially for series-hybrid iSS and parallel-hybrid iPS control technology, intelligent cruise control iCC technology and so on) to on-road or off-road hybrid light vehicles (total vehicle weight less than 4.5 T) or medium large commercial vehicle (total vehicle weight is more than 5 tons).

The first aspect of the present invention Claims a hybrid heavy truck, the hybrid heavy truck comprises: a traction motor (drive motor), which is mechanically connected with the driving shaft of the hybrid heavy truck; a generator set and at least one power battery pack, each of which can independently provide power to the drive motor, wherein the generator set comprises a bidirectional mechanical connected engine and a generator; and a vehicle controller, which is provided to: controlling the engine, so that it only can work in a specified combustion state or another specified non-combustion state, and can be switched between the two states, so as to adjust the power provided by the engine by the first modulation mode wherein in the combustion state, the engine has a rotating speed in a specified first positive value range, and a torque in a specified positive value range; and in the non-combustion state, the engine has a rotating speed in a specified second positive value range, and a torque in a specified negative value range, and the absolute value of the torque in the negative value range is lower than the torque value in the positive value range, and the vehicle controller is further provided to: to adjust the power provided by the power battery pack by the second modulation mode, the second modulation mode is determined based on the needed path-load power and the first modulation mode.

According to some embodiments of the present invention, the hybrid heavy truck further comprises: controllable clutch, set between the generating set and the traction motor, and can be operated as follows: when said clutch is closed, making the generating set and the traction motor have a direct mechanical connection; and when the clutch is open, making the generating set and the traction motor lose direct mechanical connection.

According to some embodiments of the present invention, the first modulation mode to adjust the power provided by the engine comprises: in each control period, determining the duty ratio between the time of the engine working in the combustion state and the control period.

According to some embodiments of the present invention, the first modulation mode to adjust the power provided by the engine further comprises: in each control period, according to the state of charge of the battery required at a certain time point in the future, further adjusting the determined duty ratio, to obtain the updated duty ratio.

According to some embodiments of the present invention, the first modulation mode to adjust the power provided by the engine further comprises: in each control period, controlling the power amplitude of the engine working in the combustion state and/or the power amplitude of working in the non-combustion state.

According to some embodiments of the present invention, the control of power amplitude of the engine working in the combustion state comprises: when said clutch is closed, the power amplitude provided by the engine is selected from: the first positive value range of the rotating speed and the positive value range of the torque commonly defined in the area, the power amplitude corresponding to the working point on the predefined working condition line, and when the clutch is open, the first positive value range of the rotating speed is set as a fixed value, and the amplitude of the power provided by the engine is selected from: the power amplitude corresponding to the working point on one straight line section in the region defined by the fixed value of the rotating speed and the positive value range of the torque.

According to some embodiments of the present invention, the hybrid heavy truck further comprises: electric power divider, comprising a first port, a second port and a third port, wherein the first port is connected with the generator set bidirectionally AC, the second port is bidirectionally AC connected with the input end of the traction motor; and the third port and the at least one power battery pack are connected bidirectionally DC, and the electric power divider is controlled by the vehicle controller to adjust the flow path, amplitude, and direction of the electric power among the generator set, the battery pack, and the traction motor.

According to some embodiments of the present invention, the vehicle controller is further provided to: determining an average value of the road-load power in a plurality of control periods and an average value of the power supplied by the internal combustion engine; and based on the difference between the average road-load power and the average engine power, determining the working mode of the battery pack in the plurality of control periods, so that the battery pack can enter into one of the following three modes; when the difference between the average road-load power and the average engine power is close to 0, entering the charge sustaining mode (CS), wherein the SoC is maintained between a predefined first upper limit and a first lower limit;

when the difference between the average road-load power and the average engine power is substantially greater than 0, entering the charge depletion mode (CD), the average SoC is monotonically decreasing between a predefined second upper limit and a second lower limit, and when the difference between the road average road-load power and the average engine power is substantially less than 0, entering the charge increasing mode (CI), wherein the average value of the SoC is monotonically increasing between a predefined second upper limit and a second lower limit; wherein the second upper limit is higher than the first upper limit, the second lower limit is lower than the first lower limit.

According to some embodiments of the present invention, the hybrid heavy truck further comprises: a power control unit, a catalytic electric heater and an after-treatment system, wherein the after treatment system is arranged downstream of the catalytic electric heater along the exhaust emission flow direction, wherein the power control unit controls the catalytic electric heater to heat up the after-treatment system in the non-combustion state of the internal combustion engine or from the non-combustion state to the combustion state.

According to some embodiments of the present invention, the vehicle controller is further provided to: when the internal combustion engine is in the non-combustion state, the air in-take valve and the exhaust valve of all cylinders of the internal combustion engine are in the stable closed state, so as to reduce the negative impact of the exhaust air on the temperature of the downstream catalytic system.

A second aspect of the present invention Claims a hybrid heavy truck, the hybrid heavy truck comprises: a traction motor (drive motor), which is mechanically connected with the driving shaft of the hybrid heavy truck; an engine and at least one power battery pack, each of which can independently provide power to the drive motor; and a vehicle controller, which is provided to: controlling the engine, so that it only can work in a specified combustion state or another specified non-combustion state, and can be switched between the two states, so as to adjust the power provided by the engine by the first modulation mode wherein in the combustion state, the engine has a rotating speed in a specified first positive value range, and a torque in a specified positive value range; and in the non-combustion state, the engine has a rotating speed in a specified second positive value range, and a torque in a specified negative value range, and the absolute value of the torque in the negative value range is lower than the torque value in the positive value range, and the vehicle controller is further provided to: to adjust the power provided by the power battery pack by the second modulation mode, the second modulation mode is determined according to the required road-load power and the first modulation mode.

The third aspect of the present invention Claims a method for refitting traditional fuel heavy truck, comprising: providing an existing traditional fuel heavy truck, wherein the existing traditional fuel heavy truck comprises an engine; providing a traction motor, mechanically connecting it with the driving shaft of the traditional fuel heavy truck; providing a generator, the bidirectional mechanical connection with the engine; providing at least one power battery pack, wherein the generator and the power battery pack are arranged to respectively capable of independently providing power to the drive motor, and providing a vehicle controller, which is provided to: controlling the engine, so that it only can work in a specified combustion state or another specified non-combustion state, and can be switched between the two states, so as to adjust the power provided by the engine by the first modulation mode wherein in the combustion state, the engine has a rotating speed in a specified first positive value range, and a torque in a specified positive value range; and in the non-combustion state, the engine has a rotating speed in a specified second positive value range, and a torque in a specified negative value range, and the absolute value of the torque in the negative value range is lower than the torque value in the positive value range, and the vehicle controller is further provided to: to adjust the power provided by the power battery pack by the second modulation mode, the second modulation mode is determined according to the required road-load power and the first modulation mode.

The fourth aspect of the present invention Claims a device for controlling a vehicle, comprising: a processing unit; and a memory, coupling to the processing unit and comprises a computer program code, when the computer program code is executed by the processing unit, the device executes the following actions: controlling the engine of the vehicle, so that it only can work in a specified combustion state or another specified non-combustible state, and can be switched between the two states, so as to adjust the power provided by the engine by the first modulation mode wherein in the combustion state, the engine has a rotating speed in a specified first positive value range, and a torque in a specified positive value range; and in the non-combustion state, the engine has a rotating speed in a specified second positive value range, and a torque in a specified negative value range, and the absolute value of the torque in the negative value range is lower than the torque value in the positive value range, and the device is further provided to: to adjust the power provided by the power battery pack of the vehicle by the second modulation mode, the second modulation mode is determined based on the required road-load power and the first modulation mode.

The fifth aspect of the present invention Claims a method for controlling a vehicle, comprising: controlling the engine of the vehicle, so that it only can work in a specified combustion state or another specified non-combustible state, and can be switched between the two states, so as to adjust the power provided by the engine by the first modulation mode wherein in the combustion state, the engine has a rotating speed in a specified first positive value range, and a torque in a specified positive value range; and in the non-combustion state, the engine has a rotating speed in a specified second positive value range, and a torque in a specified negative value range, and the absolute value of the torque in the negative value range is lower than the torque value in the positive value range, and the second modulation mode adjusting the power provided by the power battery pack of the vehicle, the second modulation mode is determined based on the required road-load power and the first modulation mode.

The sixth aspect of the present invention Claims a computer program product, which is stored on a non-volatile computer readable medium and comprises machine executable instructions, the executable instructions, when executed, cause the machine to perform the steps of the method according to the fifth aspect of the present invention.

DESCRIPTION OF FIGURES

In these figures, the same or similar reference symbols or labels are used to represent the same or similar elements (Element) or devices (Apparatus).

DETAILED EMBODIMENTS

The present disclosure will now be discussed with reference to several example embodiments. It should be understood that these embodiments are only used in order to make those skilled in the art can better understand and therefore realize the present disclosure, and not to limit the scope of the present disclosure.

As used herein, the term "comprising" and variants thereof are to be interpreted as "including, but not limited to, open terms". The term "based on" is to be interpreted as "at least partially based on". The terms "one embodiment" and "one embodiment" are to be interpreted as "at least one embodiment". The term "another embodiment" is to be interpreted as "at least one other embodiment". The term "first", "second", etc. may refer to different or identical objects. Hereinafter, other explicit and implicit definitions may be included. In this context, "one-way" or "bidirectional" connection refers to whether the power or mechanical power flow or energy flow from the power source to the load direction is reversible, the role of the two can be reversed. When one-way connection, the roles of the power source and the load are fixed, the power flow from the source to the load is single direction, permanent, and irreversible; when bidirectional connection, the role of the power source and the load can be dynamically reversed, the power flow is reversible, capable of time-division bidirectional flow. Unless otherwise specified, all electromechanical parts, modules or devices of the present invention are all automotive grade. The vehicle engine comprises an automotive grade internal combustion engine or a turbine; At present, nearly 95% of the world's heavy trucks use diesel engines, and the rest of them use natural gas engines. Torque and torque are synonyms. In the present invention, "vehicle" can refer to a machine with at least 4 Wheels and total vehicle weight (GVW, vehicle weight plus the maximum legal load) of at least 1.5 ton on-road or off-road vehicle, heavy truck can have at least 6 wheels and total vehicle weight of at least 10 ton on-road or off-road vehicle (i.e., large commercial vehicle).

The technical solution of the present disclosure will be described with reference to the accompanying drawings in conjunction with several example embodiments, and the technical function and effect of the technical solution.

Figure 1:
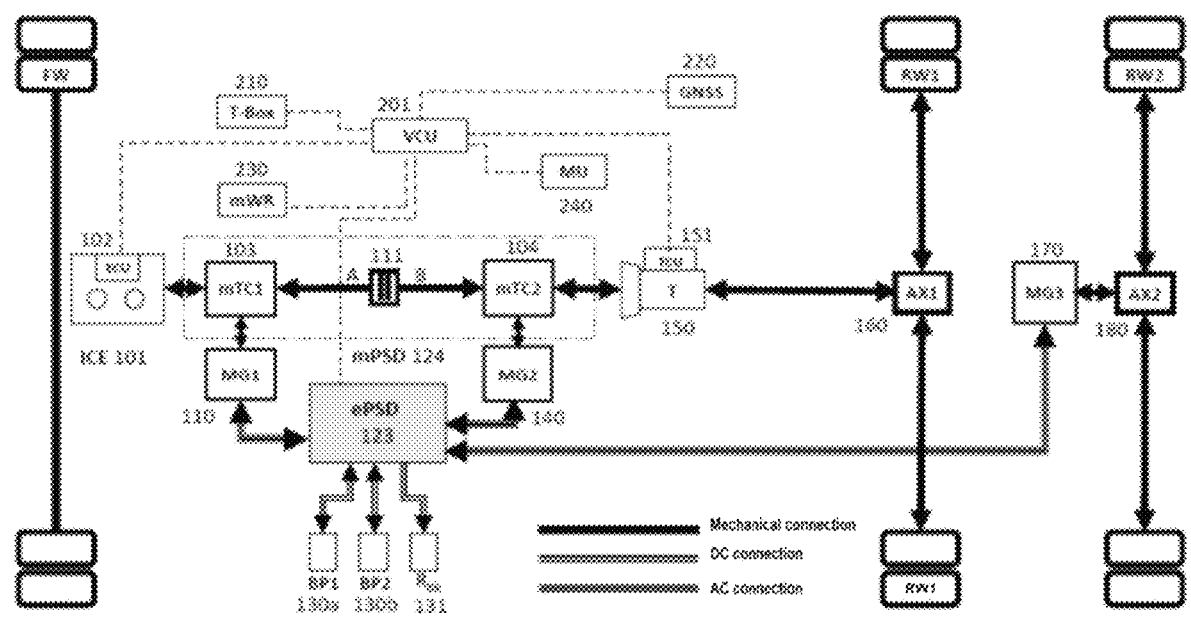
FIG. 1 shows an ACE heavy system block diagram equipped with a software defined mixed hybrid powertrain according to one embodiment of the present disclosure

FIG. 1 shows a mixed hybrid powertrain system block diagram of an ACE heavy truck 010 according to one embodiment of the present invention. The system can be provided as a dual-motor, namely hybrid P1 position of the generator (MG1) 110 and hybrid P2 position of the traction motor (MG2) 140, an active drive-axle 160 and a passive drive-axle 180 of the 6×2 powertrain system, or a 6×4 powertrain system of two active axles 160 and 180; can also be provided as a three-motor, namely hybrid P1 position of the generator (MG1) 110, P2 position of the traction motor (MG2) 140. The auxiliary drive motor (MG3) 170, the two active axles 160 (the main drive-axle) and the 6×4 powertrain system of 180 (secondary drive-axle) are located at the P3 position. In some embodiments, the heavy truck can be a long-haul freight hybrid heavy truck of total vehicle weight over 15 tons.

As shown in FIG. 1, generally, the ACE heavy-truck hybrid powertrain may include: engine 101, engine control unit (ECU) 102, mechanical torque coupler (mTC1) 103, generator (MG1) 110, electric power divider (ePSD) 123, clutch 111, mechanical torque coupler (mTC2) 104. At least one main battery pack 130a, a brake resistor 131, an automatic transmission-box (T) 150, a transmission-box control unit (TCU) 151, at least one traction motor (MG2) 140, and a vehicle controller (VCU) 201, a primary axle 160, a secondary axle 180, and the like, wherein the main battery pack 130a and the traction motor 140 are the essential parts (labeled), and the secondary battery pack 130b and the secondary traction motor 170 are the optional parts (selected); The mechanical or power/electronic connection relationship between the individual sub-systems or devices with unique labels is explicitly shown in the figure.

Specifically, the flywheel end of the engine 101 through mechanical torque coupler 103 is mechanically and bi-directionally connected with the mechanical shaft of the provided P1 positioned generator (MG1) 110 and the A end of the clutch 111, and controlled by the engine control unit (ECU) 102; the flywheel of the engine 101, the mechanical shaft of the generator 110, A end of the wire-controlled clutch 111 (also called "driven end") the three are mechanically & bidirectionally connected by three-port mechanical torque coupler 103. A mechanical torque coupler (mTC1) 103 can adopt the simplest concentric shaft (Coaxial) structure to implement (coaxial connection), can also adopt more complex and flexible parallel shaft and gear (coupling, speed reducer, flywheel and the end of the clutch rotating speed, generator rotating speed is higher) structure to implement (parallel shaft connection). In the preferable example of coaxial connection, the mechanical connection mode is simplest and the most efficient, but at this time, the hundred kW generator 110 needs to have large torque (peak torque greater than 1000 NMs) and low rotating speed (the highest rotating speed is less than 3000 r/min) with high cost of a large motor; another preferred example is parallel shaft connection, the flywheel output end of the engine 101 is coaxial connected with one end of the clutch 111 (bidirectional mechanical connection with the same speed). The mechanical shaft of the generator 110 passes through the mTC1 103 of the large speed reducer containing the fixed gear ratio (4 to 8) is bidirectionally mechanically coupled with the flywheel output end of the engine 101 and the driven end (i.e., end A) of the clutch. In this case, the generator 110 can be a mid-torque (peak torque less than 500 NM) and high-speed motor (maximum speed less than 12000 RPM) with better performance to cost ratio. However, the mTC1 103 with the speed reducer structure will increase the complexity and cost of the parallel shaft coupling mode and carry reliability risks. In FIG. 1, the mechanical torque coupler (mTC1) 103, clutch 111, mechanical torque coupler (mTC2) 104 (three devices) are arranged in-line, bidirectionally and mechanically connected in series, the combination of the three forms a mechanical power splitter (mPSD) 124; the mPSD 124 is substantially a hundred-kW heavy wire-control three-port combined mechanical device, and can cooperate with the hundred kW-level power splitter (ePSD) 123. The invention (mPSD+ePSD) can dynamically adjust the closed loop path of the hundred kW-level mechanical power flow of engine (101) or battery pack (130a or 130b) electrical power flow of the hundred kW-level, amplitude, flow direction, satisfy ground vehicle dynamics equation (1-1) and series-hybrid power equation (2-4) or parallel-hybrid power equation (3-3).

Figure 2:
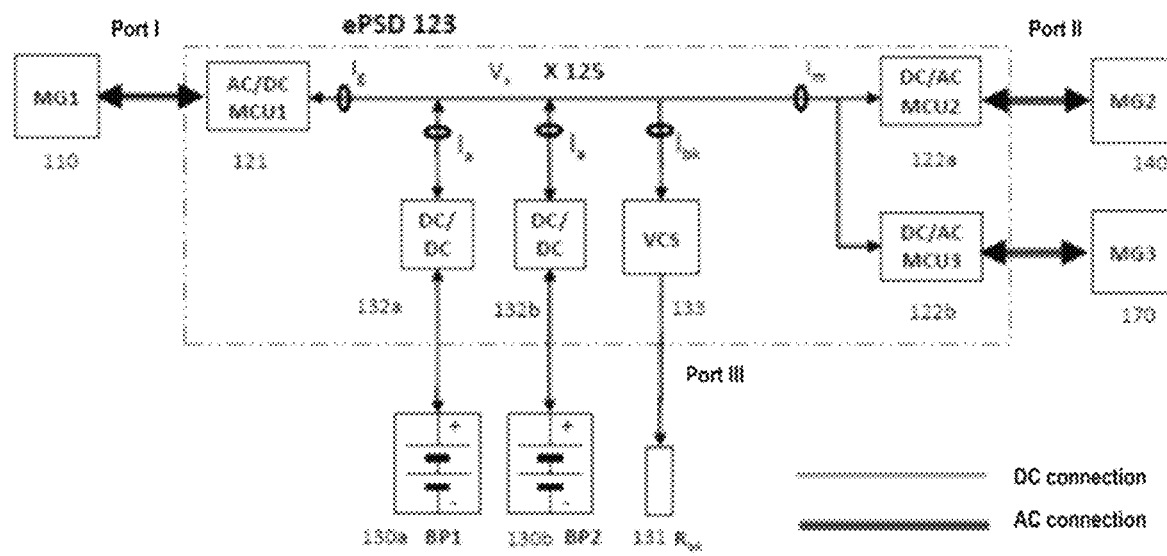
FIG. 2 is a system block diagram of an electric power splitting device (ePSD) of an ACE truck according to one embodiment of the present disclosure.

Referring to FIG. 2, the electric power divider (ePSD) 123 is a three-port power electronic network (Power Electronics Network-PEN), and the port I (also called "first port") is shown in FIG. 2, the three-phase ACAC end of the motor controller (MCU1) 121 with the hundred-kW inverter (Inverter) as the core module is bidirectionally electrically connected with the three-phase ACAC end of the external generator 110; The external battery pack 130a or 130b and the low voltage end of the hundred kW-level DC choppers (DC Chopper; also called DC-DC converter, called "chopper") 132a or 132b inside the port III of the ePSD 123 (also referred to as the "third port") are bidirectionally and DC electrically connected at the DC; The external hundred-kW brake resistor 131 is electrically connected with one end (namely the external end) of the hundred-kW voltage control switch (VCS) 133 inside the port III in unidirectional DC. The three-phase AC end of the external hundred-kW traction motors 140 and 170 and the port II of the ePSD (also referred to as the "second port"), the AC end respectively the motor controller (MCU2) 122a or (MCU3) 122b is electrically and bidirectionally connected with the AC end of the motor controller (MCU2) 122a or (MCU3) 122b with the hundred-kW-level inverter as the core module; the DC ends of the three motor controllers 121, 122a, 122b are all electrically connected to the DC bus junction point X (125) in the ePSD, the other end of the hundred-kW-level voltage-controlled switch (VCS) 133 (i.e., the inner end) is also electrically connected with the junction point X; The high voltage ends of the chopper 132a or 132b are also bidirectional and DC electrically connected with the junction point X.

Referring back to FIG. 1, the output shaft of the automatic transmission-box 150 is mechanically coupled to the main drive-axle 160 of the vehicle and is controlled by the transmission-box controller (TCU) 151, the mechanical shaft of the traction motor (MG2) 140 at the hybrid P2 position is bidirectionally connected with the clutch end (also called the driving end) and the input shaft of the transmission box (150) by mechanical torque coupler (mTC2) 104, The B end of the clutch 111 and the input shaft of the transmission box 150 can be preferably mechanically coupled coaxially with the same rotating speed, and also can be bidirectionally coupled by a parallel shaft gear or a chain. The mTC2 104 uses the parallel shaft coupling structure, the mechanical shaft of the traction motor (MG2) 140 can pass through the hundred kW heavy-duty single-speed speed reducer of fixed gear ratio (preferable speed ratio range: 3 to 9) is mechanically coupled to the input shaft of the transmission-box 150 and the B-end of the clutch; the mechanical shaft of the auxiliary traction motor (MG3) 170 provided at the hybrid P3 position is through the hundred kW heavy single speed reducer (preferably the speed ratio range: 3 to 9) and the input shaft of the secondary axel 180 bidirectionally & mechanically connected, FIG. 1 of the present invention does not show the speed reducer, it can be understood that the secondary traction motor (MG3) 170 comprises a suitable single speed reducer. The essential traction motor (MG2) 140 or the optional secondary traction motor (MG3) 170 can be operated as follows: The electrical energy is converted into mechanical energy for driving the ACE heavy truck (electrical drive), or the mechanical energy of the ACE heavy truck is converted into electrical energy (regenerative braking); and then through the ePSD, the motor controller 122a or 122b and chopper 132a of 132b inside ePSD 123 charge the battery pack 130a or 130b, and effectively recover the vehicle energy. To reduce the system cost and complexity, the secondary traction motor (MG3) 170 and the corresponding motor controller (MCU3) 122b can be eliminated.

As one of the key components of the present disclosure, the vehicle controller (VCU) 201 of ACE heavy truck 201 can be shown by the vehicle data bus (shown in dashed line in FIG. 1, without label; for example, CAN bus or wireless communication virtual data line and so on) and based on the vehicle satellite navigation instrument (GNSS; navigator for short) 220 real-time measured vehicle location and attitude three-dimensional data (longitude, latitude, longitudinal slope), the electronic horizon three-dimensional data stored in map unit (MU) 240, vehicle configuration parameter and dynamic operating data (such as vehicle speed, vehicle acceleration and so on), vehicle longitudinal control signal (reflecting driving intention of human driver or AI driver) and so on information, using the vehicle dynamics equation (1-1), using the refresh frequency higher than 0.2 Hz and kW level granularity to predict the vehicle road-load power space-time function in the electronic horizon, and according to the fuel consumption machine learning (ML) algorithm to optimized vehicle fuel consumption and pollutant emission, the engine 101, generator 110, ePSD 123, 111 clutch drive motor 140&170, automatic transmission box 150, and one or more of the battery packets 130a&b will be dynamically controlled individually or simultaneously.

In some embodiments, VCU 201 can be automotive grade high performance embedded single core or multi-core microprocessor. Similar to early personal computer to increase its image processing performance with an image co-processor, VCU 201 also can include extra AI inference chip (AIU, also called AI processor; is not marked in FIG. 1), improving the ACE heavy truck 010 vehicle end executing energy-saving and emission-reducing machine learning algorithm of the artificial intelligence operation capability; At the same time, the AIU can also be upgraded to the hardware computing platform supporting the SAE L4 level autonomous driving software stack. It can be understood that, non-limiting, VCU 201 or AIU may also be heterogeneous microelectronic hardware logic component, comprising: the invention claims a universal microprocessor (CPU), a field programmable gate array (FPGA), a graphics processor (GPU), an application specific integrated circuit (ASIC), a digital processor (DSP), a system on-chip (SoC), a complex programmable logic device (CPLD), and the like.

Preferably, the engine 101 of the ACE heavy truck is a six-cylinder diesel engine or a natural gas engine with a displacement of 9 to 13 L, a peak power range of 250 to 350 kW, and a heavy-truck market mainstream six-cylinder diesel engine or a natural gas engine; also can select a heavy-truck engine with larger displacement (13-16 L), the peak power range is 350-520 kW, with more power margin, with better gradability climbing alpine (continuous uphill over ten kM, longitudinal slope greater than 2.0 degrees), but the actual fuel saving effect is not much better than the preferred engine, and the engine volume, weight, and cost are obviously increased, the performance-to-price ratio to cost ratio is good; it also can select smaller displacement (less than 9 L) engine, the peak power is generally less than 260 kW, although the fuel-saving effect is good, volume, weight, the cost is low, but the power of the engine is insufficient to support high speed road climbing mountain, if the battery pack 130a&b is substantially depleted (SoC<LRL), cannot continue to supply power to the drive motor, driving the whole engine, then ACE heavy truck 010 climbing power will be obviously insufficient, it is necessary to change the low gear speed to continue uphill, at the same time, the small marathon vehicle, realizing ultra-long actual service life of the engine (1 million kM), the performance-to-price ratio is good. It can be understood, optionally, engine 101 also can be a vehicle gas turbine to satisfy the power requirement. The gasoline engine is inferior to diesel engine in combustion heat efficiency, low rotating speed & large torque, and service life (B10 service life mileage number) and so on, and is not suitable for the mainstream heavy truck applications.

It is noted that, as shown in FIG. 1, in various embodiments of the present disclosure, when the clutch 111, is disconnected, ACE heavy-truck powertrain system is in series-hybrid mode; at this time, the engine 101 and the vehicle driving axle 160 or 180 don't have any mechanical connection, the engine operating condition is completely decoupled with the vehicle driving condition. The engine 101 enables long-term stable operation of several operating conditions (designated rotational speed/torque) within its universal characteristic curve efficient zones (including the best fuel efficiency range and/or the optimum emission range). When the clutch 111 is closed and locked, ACE truck powertrain is switched to parallel-hybrid mode, the engine 101 through the transmission box 150 is connected mechanically with the main drive-axle 160 or the auxiliary drive-axle 180 of the vehicle, the rotating speed of the engine 101 is determined by the speed of the vehicle and the gear ratio of the transmission box 150, the output torque of the engine 101 can be independently and dynamically adjusted, and not limited by the driving condition of the vehicle. The output power of the engine 101 is proportional to the product of its rotational speed and torque, and is still independently adjustable, except that the engine is not at a fixed-point operating condition but in a line operating condition of the highly efficient zone of the engine universal characteristics. The vehicle under high-speed condition, through gear shift control strategy of the transmission box 150, always can make the engine stably work in the high efficiency zone; For the ACE heavy truck, the high efficiency zone of the engine universal characteristics curve is basically 1000 r/min to 1800 r/min in the rotating speed, the torque load rate is more than 50% (namely the actual torque/peak torque ratio). The sum of the rated power of the generator 110 (MG1) and the traction motor 140 (MG2) should be greater than the peak power of the engine 101, the total drive power of the double motors (110 & 140) can be adjusted dynamically under parallel-hybrid mode and the parallel-hybrid power equation (3-3) with the boundary conditions, to achieve the vehicle road-load instantaneous power peak clipping and valley filling and to satisfy the vehicle dynamics equation (1-1) in real-time. The invention Claims a basic switch control strategy (On-Off) of the control-by-wire clutch 111; under high speed vehicle operating condition (vehicle average speed of time higher than 50 kmph; very few active acceleration or braking), preferably select parallel-hybrid mode (clutch closed); under city driving condition or congested expressway driving (the average speed of the vehicle is less than 45 kmph with frequent active acceleration or braking), preferably select series-hybrid series-hybrid (clutch open); further preferably select intelligent mode switching strategy (iMS), as advanced type intelligent dynamic control strategy of wire-controlled clutch; the energy saving and emission reduction actual effects of the iMS strategy are better than that of the on-off switching control strategy, subsequent detailed description later. In the present invention, torque and torque are synonyms, exhaust-gas and exhaust gas are synonyms.

The difficulty of traditional heavy truck engine electric control is that it must cover the full operating condition zone (namely all rotating speed and torque range), dynamically satisfy a plurality of technical targets such as the engine performance, fuel-saving, emission reduction, and cost, which are often contradictive with each other and closely coupled, and meet the increasingly stringent mandatory emission regulations of all countries in the world (including pollutant discharge and carbon emission). Over the past 20 years (2000-2020), the world-wide modern mass production heavy-truck engine's minimum fuel consumption (BSFC; kWh g/kWh), thermal efficiency (BTE; %), or the actual comprehensive fuel consumption (L/100 kM) only achieved cumulative improvement of less than 20%, which has encountered the bottleneck of internal combustion engine research and development technology and production process. If the operation range of the engine can be simplified from the full area working-condition to selected operating condition points or lines in the high efficiency zone of the engine, it is possible through technical innovations, to break through the upper efficiency limit of the current mass production heavy truck engine (BTE of 46%), simultaneously optimizing the fuel consumption and emission performance with high performance to cost ratio, it opens up new territory (namely new technology route); At the same time, it is possible to effectively satisfy continuously more strict new international automobile exhaust (pollutant discharge and carbon discharge) mandatory regulations over the next 20 years, meet the severe challenges on heavy truck engine main body, ECU, and exhaust-gas processing system (ATS) design, calibration, and manufacturing complexity and rising product costs, such as California diesel heavy-truck ultra-low NOx combination regulations (2024 reduction 75%, 2027 reduction 90%), promulgated in August 2020.

Compared with the spark ignition gasoline engine (SI), compression ignition diesel engine (CI) with high fuel economy, low rotating speed & large torque, robust with extra-long service life (B10 life more than 1 million kM), high performance to cost ratio and so on, it becomes the most important choice (more than 95%) of the current global engine. However, in terms of pollutant emission, especially for atmospheric environment and human health harmful nitrogen oxide compound (NOx) and micro-particle (PM) pollutant discharge, diesel engine is less desirable than gasoline engine. The world mainstream post-processing technology route meeting EPA-2010, European-VI, and China GB-6 mandatory emission regulations to reduce the heavy truck diesel engine exhaust pollutant NOx and PM emissions comprises a selective catalytic reduction (SCR) and diesel particulate catcher (DPF); SCR and DPF need the internal working temperature (the exhaust-gas temperature) to reach the light-off temperature of more than 250 degree C. (Light-off temperature), the catalyst in the after-treatment system can work normally and efficiently; when the exhaust-gas temperature is lower than 200 degree C., the catalytic conversion efficiency of the is greatly reduced, the engine pollutant emission is soaring. The low-temperature catalyst at 150 degree C. is still at the early stage of laboratory research in Europe and America, and the future production time is calculated in decades. When the diesel engine is in cold start, low load or idle speed operation (load rate less than 25%), or instantaneous large output power adjustments, its pollutant discharge and fuel consumption (g/kWh) will be greatly increased; and under the expressway condition, the engine can stably work in the high-efficiency area of the universal characteristics curve, the pollutant discharge and fuel consumption of the diesel engine are small. For traditional heavy truck, it is very difficult to cover the full speed/torque range (i.e., working-condition) of the engine universal characteristics and optimize fuel consumption and pollutant discharge, At present, the U.S. heavy-truck industry has not yet found a ready-to-volume-production heavy truck powertrain to satisfy the US Federal GHG-II greenhouse gas emission regulations (CO2 emissions) and California ultra-low NOx emissions in 2027 simultaneously (reduction of 90%; 0.02 g/bhp-hr.).

The ACE heavy truck of the invention is controlled by series-hybrid iSS or parallel-hybrid iPS control technology, it can make the pulse control engine 101 stably work at least one optimal operating-condition point or at least one high-state operating-condition line in the 1st quadrant high high-efficiency zone of the universal characteristics of the engine or in the 4th quadrant at least one low-state operating-condition point or operating-condition line with zero fuel consumption & zero discharge, essentially eliminating the low rotating speed low load or idle speed and other highly challenging less-efficient operating conditions of the engine, reducing the fuel consumption and CO2 emission, but also can effectively improve and maintain the engine exhaust temperature, after the engine 101 of the after-treatment system (ATS) stably working in the high temperature high efficiency zone (more than 250 degree C.), reducing the pollutant (NOx, PM) discharge, realizing the beneficial effects of minimization of both vehicle fuel consumption and pollutant discharges. At the same time, the ACE heavy truck DPC engine 101 under the active model (AOM) is completely operated in the combustion high-efficiency zone, the engine fuel consumption has lower break-specific-fuel consumption (BSFC) and the exhaust-gas temperature is high, the SCR system keeps high efficiency operation, it also can reduce the dosage (g/100 kM) of the urea (DEF) so as to further reduce the operation cost of the ACE heavy truck; Moreover, the diesel engine and diesel particulate filter (DPF) of ACE heavy truck can work stably for a long time in the respective high-efficiency area, substantially eliminating the long-time industry pain-point of mandatory 30~45 minutes active regeneration via burning extra fuel at idling to get rid of the PMs inside the PDF, further reducing the operation cost of the fleet, improving freight efficiency.

The pollutant discharge in initial ten minutes after the cold start of the modern diesel truck is obviously higher than the discharge of the subsequent steady state working-condition; cold start stage high discharge has no material impact on meeting the current emission regulations (EPA-2010, Euro-VI, GB-6), but the diesel heavy truck to satisfy the California low NOx omnibus regulations' 2027 discharge limit, then it must greatly reduce (90%+reduction) diesel heavy truck emissions in highly challenging operating conditions such as cold start, low speed low load; otherwise, it cannot reach the standard. Different from the traditional diesel heavy truck, the engine of an ACE heavy truck can realize the "clean cold start" function (CCS—Clean Cold Start). ACE heavy truck under the outdoor cold (environment temperature minus 10 degree C.) long-term parking (more than 10 hrs.), the driver preset vehicle cold start preheating time, the vehicle VCU command clutch 111 to open, the vehicle enters the series-hybrid mode, can use battery pack 10-kWh-level effective DC electric capacity, the hundred-KW-level ePSD 123 to finish inversion and output ACAC current or to output the hundred-volt high voltage DC current from the junction point (X) 125, an automotive grade electric catalyst heater (EHC) 301 (see FIG. 7) with a peak power range of 20 kW to 60 kW in the ACE truck after-treatment system is processed by installation (OEM or after-market), the exhaust-gas after-treatment system 305 comprises the SCR module 340 in each module for minute-level fast preheating, each module (301, 320. 340) is substantially 200 degree C. (i.e., light-off temperature), and then the generator 110 (MG1) under the electric drive mode, drag the DPC engine 101 non-combustion operation (POM) to appointed high idle point between 1000 r/min to 1200 r/min, then firstly inject fuel and ignite the engine via compression, entering into the high-efficiency working point (AOM), using series-hybrid intelligent start-stop control (iSS) for the engine, the duty ratio of the engine power function PWM sequence is greater than 0.5, The catalyst electric heater (EHC) 301 is a resistive load of a generator set (102 and 110) or a battery pack (130a or 130b); The transition time from the engine cold start ignition to the exhaust-gas post-treatment system to reach its high-efficiency working temperature (about 250 degree C.) can be greatly reduced by more than 90%, it can reduce more than 90% of pollutant discharge amount compared with the traditional diesel engine heavy truck cold starting, if it wants to realize ACE heavy truck ultra-low emission, the diesel NOx emission limit (especially the vehicle RDE emission value) from the current EPA-2010 or national GB-6 discharge rule is reduced by 90%, preferably using the CCS function is the solution of high performance to cost ratio. When the traditional diesel engine is cold-started. It also usually needs to park idle speed pre-heating engine for several minutes (namely the vehicle warm-up lime), then the gear train starts to run; the preheating time of the SCR module of the ACE truck cleaning cold start (CCS) parking heating exhaust-gas after-treatment system (ATS) is less than the vehicle warm-up time of the traditional heavy truck, it does not delay the work of the driver, and it can dynamically set the pre-heating time via software OTA; it needs to emphasize, ACE heavy truck electric preheating engine after-treatment system time, engine 101 and generator 110 does not work, traction motor 140 and 170 also does not work, at this time, the vehicle has no vibration or noise; can be temporarily supplied by the battery pack, using the ACAC end of the motor controller 122a or 122b with rated power of the hundred-kW level in the ePSD 123 or the DC junction point (X) 125 to supply the ten kW-level vehicle-mounted catalyst electric heater (EHC), the temperature of the SCR module 340 is raised to more than 200 degree C. from below zero degree C. within minutes time, VCU 201 can automatically adjust the operation power consumption and time of the catalyst electric heater (EHC) according to the data of the temperature sensor in ATS system 305. The vehicle after-treatment system should add a thermal insulating layer protection, the system has high heat capacity, the heat preservation lime is at the minute level; once the pulse control engine enters into the stable operation, the sub-minute or minute-level low-state operating condition (passive non-combustible) operation of the PWM pulse sequence does not cause the working temperature of the catalyst in the after-treatment system (ATS) to be quickly reduced below 200 degree C.; when the engine is started or switched from the low-state working-condition of the PWM pulse sequence to the high-state working-condition, equivalent to the engine 101 hot start, basically does not need EHC electric heating to turn on, pulse control engine high-state operation, the temperature of the exhaust-gas is obviously higher than 250 degree C., At this time, the after-treatment system (ATS) can keep high temperature and high efficiency operation, ensuring the vehicle RDE exhaust-gas discharge to meet emission standard stably.

In 2021, China began to carry out a comprehensive enforcement of diesel heavy duty GB-6 emission standards. For most of China's domestic engines and key powertrain parts suppliers with insufficient technology accumulation, it is a huge technology and business challenge, it ensures the vehicle reaches and continues satisfy emission standard, especially the seven-hundred-thousand kM RDE discharge system availability (Useful Life), the ACE heavy truck of the invention simplifies the technical performance of the diesel engine 101 from the full-domain surface working-condition to multiple pre-determined working-condition points or lines in the engine high-efficiency zone, which is much simpler than the surface working-condition comprehensive technical requirement of the engine 101 by the traditional internal combustion engine heavy truck (non-hybrid), at the same time, it optimizes the energy saving and emission reduction of the vehicle for the novel technical route with high performance to cost ratio, it creates a new opportunity for realizing volume production quickly, it develops another new world for the survival and development of the Chinese heavy truck powertrain and key component suppliers in the post GB-6 times.

The power of the motor is proportional to the product of its rotational speed and torque, and the volume, weight, and cost of the motor are both positively associated with its peak torque (i.e., maximum torque), the hybrid or pure electric passenger vehicle (the total weight less than 3.5 tons) adopts the medium and small sized automotive grade motor with high rotating speed (peak value greater than 12000 rpm) and low torque (peak value less than 350 NM); and the hybrid heavy truck uses large automotive grade motor with low rotating speed (peak value less than 3000 r/min) and high torque (the peak value greater than 1000 NM). For example, the rated power of the large motor I (with rotating speed 1200 r/min and the peak torque 2000 NM) and the rotating speed 12000 r/min of the and the middle and small type motor II (with rotating speed 12000 r/min and peak torque 200 NM) are both at 251 kW; but the volume of the motor I, weight, and cost are obviously higher than that of the motor II. Compared with passenger vehicle applications, ACE heavy truck has very little restriction on the volume and weight of the subsystems such as motor and battery pack, but is highly sensitive to the cost of them. In terms of the annual sales of new energy vehicles in the world, the volume of passenger vehicles is more than ten times that of heavy truck. The rated power of the high rotating speed low torque motor used by the current new energy passenger vehicle is less than 100 kW (peak load rate of 150%+), the unit cost (US$/kW) is obviously reduced year by year along with the increase of the yield. However, the new energy large commercial vehicle (with a total weight over 15 tons) uses a large electric motor with a low rotating speed, high torque at rated power over 100 kW. In the next 20 years, the unit cost (USD/kW) of such motor will still be high, and it is difficult to significantly reduce the cost year by year. For new energy passenger vehicle or heavy truck, the requirements on core components such as IGBT or SiC and other power electronic devices are substantially the same, the device of the same voltage platform can be shared. If the hybrid heavy truck's large three-electric system (motor, battery, electric controller) requirements (especially voltage platform, peak torque, peak power and so on) can be close to the technical requirements of the new energy passenger vehicle, even partially overlapped, the large three-electric system of ACE heavy truck can fully leverage the scale effect of the new energy passenger vehicle mature supply chain, the cost is reduced year by year, and the quality guarantee is guaranteed.

Preferably, for FIG. 1 embodiment, the essential generator (MG1) 110 is a permanent magnet synchronous motor (PMSM), the rated power is between 100 and 150 kW, can also be selected AC induction motor or magnetic reluctance motor with similar rated power, the traction motor (MG2) 140 is preferably a permanent magnet synchronous motor with rated power of 150 kW to 210 kW; it also can select AC asynchronous motor or magnetic reluctance motor with the same power specification; selecting the secondary traction motor (MG3) 170 preferably rated power of 60 kW to 100 kW of permanent magnet synchronous motor, also can be AC asynchronous motor or magnetic reluctance motor with the same power specification. In various embodiments of FIG. 1, if the rated power respectively the three motors (110, 140, 170) exceeds the preferred parameter range, ACE heavy truck still can work normally; when the rated power is lower than the preferred lower limit value, the motor cost, volume, weight are reduced, but the power of the vehicle, redundancy, or fuel saving rate in low probability extreme road condition or vehicle working-condition (such as mountain operation) may be reduced; when the rated power is higher than the upper limit value, the power and fuel saving rate of the vehicle only can be improved under the low probability extreme road condition of vehicle working-condition, but the motor cost, volume, weight are obviously increased; both are the suboptimal selections. It should be emphasized that the peak power (10 seconds or 15 seconds pulse) of the motor or battery pack is significantly higher than the rated power, the overload rate can reach 150% to 200% (based on the rated power).

The electric power splitter (ePSD) 123 shown in FIG. 2 is a power electronic network (PEN) having three ports of hundred-kW level rated power each, including at least two insulated-gate bipolar transistor (IGBT) or silicon carbide (SiC) power modules. However, it may not include any electric power supply or power storage device. With a plurality of power electronic circuit topology designs, which can realize the function of input and output characteristics the three-terminal PEN and various subsystems. It should be noted that the present disclosure is not intended to limit the specific circuit topology of the three-terminal PEN including IGBT or SiC power modules, but only can realize the key input and output functions of the ePSD 123 described by the present disclosure and various power electronic circuit topology designs having the said characteristics are within the scope of the present disclosure. In view of the flexibility of the power electronic module integrated designs, to improve the system performance and/or reduce the cost, the motor controller (MCU1, MCU2, MCU3) 121, 122a&b, choppers 132a&b, and voltage control switch (VCS) 133 and so on in the ePSD 123 can be packaged in a metal box, also can be packaged in distributed fashion in a plurality of metal boxes. Currently, the IGBT is the global mainstream automotive grade power electronic power module with the highest performance-to-price ratio, the silicon carbide (SiC) power module is the emerging show, its performance is better but its current cost is also higher, but as the SiC yield is increased, its market share will increase year by year. The invention Claims an IGBT module, which can mean all kinds of industrial power electronic power module including IGBT or SiC.

In the embodiment shown in FIG. 2, the AC ends of the port I of the ePSD internal motor controller 121 AC and the 3-phase AC outputs of the external generator (MG1) 110 are bidirectionally connected; the ACAC end of the port II internal motor controller 122a is bidirectionally electrically connected with the three-phase AC output end of the external main traction motor (MG2) 140, the ACAC end of the internal motor controller 122b is bidirectionally electrically connected with the three-phase AC output end of the external auxiliary traction motor (MG3) 170; the low voltage end of the port III internal chopper 132a is DC electrically connected with the external battery pack 130a bidirectionally; The low-voltage end of the chopper 132b is in DC connection with the external battery pack 130b bidirectionally, the DC end of all motor controllers (121, 122a, 122b) is bidirectionally DC connected to the DC bus junction point (X) 125 of the ePSD, all the chopper (132a, 132b) high voltage end is also connected to the DC bus junction point (X) 125 in the ePSD bidirectionally. One end of the voltage control switch (VCS) 133 of hundred-kW level rated power is electrically connected with the junction point (X) 125 unidirectionally, the other end is electrically connected with the bidirectionally, external brake resistor 131 of hundred-KW-level rated power with a radiator unidirectionally.

Preferably using the IGBT power module to realize the voltage control switch (VCS) 133, using the DC voltage trigger mode to control the on or off of the voltage control switch VCS, the specific control mode is defined by software and dynamically adjustable, therefore the so-called intelligent voltage control switch (iVS); The ordinary technical personnel in the industry can adopt multiple power electronic topological structures to realize such VCS function. The iVS control strategy embodiment is as follows: $V_{on}=(1+k_{on})V_{bus0}$; $V_{off}=(1+k_{off})V_{bus0}$; wherein $V_{on}$ is the on-voltage threshold value, $V_{off}$ is the off-voltage threshold value; $V_{bus0}$ is DC bus rated voltage, preferably in the range of 600V to 750V; $k_{on}$ is conductive bias coefficient, preferably in the range of 2% to 10%; $k_{off}$ is off bias coefficient, preferably in the range of −5% to +2%; $k_{on}$ and $k_{off}$ are defined by software, can respectively dynamically adjusted; when the DC voltage of the junction point 125 (X) rises to the on voltage Von, the voltage control switch (VCS) 133 can be in millisecond response time from the off state to the on state and keep the conduction state, the hundred kW brake resistor 131 becomes ePSD 123 junction point 125 of the effective electrical load; when the DC voltage of the junction point X is reduced to the off voltage $V_{off}$, the voltage control switch 133 can be in millisecond response time from the on state to the off state and keep the off state, when the battery pack 130a or 130b of instantaneous state-of-charge state (SoC) function value exceeds the red line URL, for protecting the battery pack, chopper 132a or 132b will quickly cut off the charging path of the battery pack (ten millisecond level); but at this time, if ACE heavy truck still needs to drive the regenerative braking function of the motor 140 or 170 from the active safety angle, and suddenly loses the battery pack of the effective electric load, it will cause the DC voltage at the junction point X instantaneous rise sharply, even may exceed the breakdown voltage (e.g., 1200V) of the IGBT module, instantaneous "limit voltage pulse", may cause the ePSD 123 inner each IGBT module or other electronic component is subjected to permanent damage; the technical solution of the intelligent voltage control switch (iVS) is the effective measure for preventing the junction point X from appearing the limit voltage pulse, intelligent pressure control switch (iVS) control strategy can be substantially full overflow (SoC=URL) when the battery 130a&b, connecting the brake resistor 131, providing ACE heavy truck long slope non-friction steady state slow speed function, further providing another important junction point X instantaneous over-voltage protection function, to avoid the main electronic component of the ePSD 123 containing IGBT module, such as motor controller 121, 122a, 122b and chopper 132a. 132b and so on, when the ePSD 123 some limit working-condition, tripping interrupt work or suffering from permanent damage (especially IGBT over-voltage breakdown damage) and so on serious failure model preferably the rated power range of the voltage control switch (VCS) 133 is 200 kW to 350 kW, the voltage level is more than 1200V, the rated power of the corresponding brake resistor 131 is less than the rated power of the voltage control switch 133; from increasing system redundancy and reducing cost, further preferably two sets of rated power of 150 kW of voltage control switch 133 and matched with the hundred KW level brake resistor 131 in parallel to realize the total rated power of 300 kW intelligent voltage control switch (iVS) function; Obviously, the iVS function is defined by software, and the continuous upgrade iterations can be implemented by over-the-air download technology (OTA).

When the nominal voltage $V_{bp}$ of the battery pack 130a or 130b (i.e., the open circuit voltage at the battery pack room temperature lower charge state SoC=50%) is equal to the DC bus rated voltage $V_{bus0}$ of the ePSD 123, to simplify the system and reduce the cost, the chopper 132a or 132b may be eliminated, and the battery pack 130a&b can have direct DC electric connection to the Junction point (X) 125 bidirectionally; However, the nominal voltage of the battery pack must be fixed and be equal to the DC bus rated voltage, and the battery pack loses the function of actively adjusting the hundred-kW level instantaneous charge and discharge power by software definition; at the same time, the ePSD 123 also loses the ability of flexibly matching battery packs of different rated voltages with high performance-to-price ratio in the new energy automotive supply chain through software definition (field or OTA remote iteration) and the is a suboptimal choice. The battery pack 130a or 130b is one of highest cost subsystems of an ACE heavy truck, also is also the weakest link in terms of vehicle performance, reliability and durability, the charging-discharging high-rate partial SoC (HRPSoC) characteristics curve and cycle-life is closely related to the dynamic working-condition data such as state-of-charge (SoC) and the battery cell temperature, Another benefit of using the hundred-kW level chopper 132a or 132b is the ability to dynamically adjust the charging or discharging rate of the battery pack (103a or 130b) (within ten-millisecond level delay) according to the battery cell HRPSoC digitized curve characteristics provided by battery supplier, battery cell condition data (SoC, temperature and so on). and ACE heavy truck dynamic working-condition data charging-discharging, to allow the battery pack to work stably in its high efficiency zone, to reach the VIPs beneficial effects of battery pack optimal performance and cycle-life optimization. The chopper 132a&b also be defined by software, without increasing any hardware cost, adding new functionalities, such as battery pack intelligent pulse preheating function (iPH).

The DC bus junction point 125 (X) in the ePSD 123 is the nerve center of the power electronic network of an ACE heavy-truck hybrid powertrain, the unique DC voltage time-varying function of the point and the set of the DC current time-varying functions of all in and out branch circuits can completely describe the dynamic working state of ACE heavy-truck electric power loop is mathematically, it is the key node of ACE heavy-truck operation energy saving, emission reduction and safety control. The junction point X is a point on the circuit topology, but can have a plurality of physical implementations, such as a metal bus bar or a multi-joint large power cable distributor and so on.

The ePSD 123 can realize digital control through internal electronic modules (e.g., motor controllers 121, 122a & b; chopper 132a & b; voltage control switch 133 and so on) to, to dynamically adjust the electric power flow's route, amplitude, and direction among the three ports in the ten millisecond response time and rated-power amplitude of hundred-kW level, to fuse the mechanical power flow and the electric power flow according to the series-hybrid power equation (2-4) or the parallel-hybrid power equation (3-3), to dynamically match the vehicle road-load power time-variant function $P_v$ (t), in real time to satisfy the vehicle dynamics equation (1-1). VCU 201, according to the optimized energy-saving and emission-reducing machine learning algorithm (ML), can control clutch 111 and ePSD 123. The vehicle can be in stable operation in one the two different control modes of series-hybrid iSS and parallel-hybrid iPS or be switched dynamically between the two (i.e., the intelligent mode switching iMS); under conditions of satisfying the vehicle propulsion power; safety and freight timeliness, to achieve engine fuel consumption and emission simultaneous optimization (i.e., minimization); ACE truck, under long-haul freight application, the vehicle can enable iMS function, the automated switching between series-hybrid and parallel-hybrid is low, the average switching to be less than 20 times per hundred miles, further reducing the actual fuel consumption.

Alternatively or additionally, the ePSD 123 may be provided with several automotive grade sensors and memory modules, capable of measuring and recording the DC bus junction point X of the dynamic voltage function $V_{bus}$ (t) and current function $I_g$ (t), $I_m$ (t), $I_b$ (t) time sequence at a frequency not less than 5 Hz, as a part of the fuel-saving data set, and through the vehicle-mounted wireless communication gateway 210, timely (hour-level time delay) uploaded to the cloud computing platform 001 storage for subsequent data analysis & processing. The implementation manner of the fuel-saving data set is detailed later.

known ePSD 123 internal DC bus junction point (X) 125 of the electric power balance equation is as follows:

$$P_g + P_{bat} + P_m + P_{br} = 0 \quad (4-1)$$

wherein $P_g$ belongs to $[-P_{igx}, P_{igx}]$, $P_{bat}$ belongs to $[-P_{bx}, P_{bx}]$, $P_m$ belongs to $[-P_{imx}, P_{imx}]$; $P_{igx}$ is the peak power of the motor controller (MCU1) 121, $P_{bx}$ is the total peak charging-discharging power of the primary battery pack 130a and the secondary battery pack 130b, $P_{imx}$ is the total peak power of the motor controller (MCU2) 122a and (MCU3) 122b; The parameter configuration satisfies the following: $P_{bx} > P_{imx} > P_{igx}$. $P_g$ is the instantaneous electric power time-variant function of generator (MG1) 110, controlled by the motor controller (MCU1) 121, $P_{gx}$ is the peak power ($P_{igx} > P_{gx}$), positive value is propulsion power (electric energy change mechanical energy), negative value is generating power (mechanical energy variable electric energy); $P_{bat}$ is battery pack (130a&b) instantaneous electric power time-variant function, controlled by the chopper (132a&b), positive value is charging power (electric energy change chemical energy), negative value is discharge power (chemical energy variable electric energy); Pm is main traction motor (MG2) 140 and secondary traction motor (MG3) 170 of the total instantaneous electric power time-varying function, controlled by the motor controller 122a&b $P_{mx}$ is the peak power ($P_{imx} > P_{mx}$), the positive value is the propulsion power (electric energy change mechanical energy). the negative value is the regenerative braking power (mechanical energy-variable electric energy, recycling energy; equivalent to generating power); $P_{br}$ is instantaneous electric power time-variant function of the brake resistor 131, controlled by the voltage control switch (VCS) 133, is non-negative and the peak power is not less than the traction motor (MG2) 140 peak power. In the present disclosure, unless specifically noted, peak power to the engine, refers to the maximum continuous mechanical power, and for the electric motor, motor controller (i.e., inverter), chopper, or battery pack, the peak electric power of 10 seconds or 15 seconds pulse is obviously greater than the rated power (namely maximum continuous electric power), most peak power can reach more than 150% of the rated power.

The embodiment of the present disclosure describes mainly the case of the primary traction motor (MG2) 140 and the primary battery pack 130a. If the ACE truck system further comprises an optional secondary traction motor (MG3) 170 and/or a secondary battery pack 130b, an ordinary technical person in the industry can easily extended such descriptions to cover without creative invention. ACE heavy truck, under high-speed working-condition, can preferably close the clutch 111, realizing parallel-hybrid operation; operation mode when in the city/suburban working-condition and on congested expressway, can preferably open the clutch 111, realizing the series-hybrid mode; and when ACE heavy truck meets long slope or high mountain (longitudinal slope absolute value is greater than 2.0 degrees, continuous uphill or downhill distance exceeds 5 kM), considering vehicle driving safely and propulsion power performance, no matter the average vehicle speed, preferably select parallel-hybrid mode. ACE heavy truck in long-haul freight applications, nearly 90% mileage is expressway, the clutch 111 does not need to open or close frequently; at the same time, due to the double motors (MG1 and MG2) dynamic cooperation, both can quickly and accurately control the rotating speed or torque, it can realize the non-clutch shifting (CGS) function in parallel-hybrid mode. ACE heavy-truck CGS does not have obvious driving torque interruption and vehicle slow-down feeling. The propulsion power performance and NVH performance of the vehicle are obviously better than that of the internal combustion engine heavy truck of the prior art.

The battery pack i132a&b are the sub-systems with the highest cost of ACE heavy truck, at the same time, it is one of the potential weakest links of vehicle power performance, reliability, and durability (namely long service life), therefore, the high performance-to-price ratio design and production of the battery pack is essential. The technical requirements of ACE heavy truck high-power battery pack are compared with that of the hybrid light vehicle, with obvious difference. The volume and weight of the battery pack of the ACE heavy truck for tens of kW-hours of the total capacity are not restricted, but the battery pack is high and low temperature resistant (environment temperature range: −30 degrees centigrade to +50 degrees centigrade) and impact-resistant vibration requirement is higher, especially the battery pack under the high-rate partial SoC (HRPSoC) condition of equivalent depth cycle-life (i.e., equivalent full full-fill times; 100% DOD) requires a high number of times. For example, the accumulated electric throughput of the battery pack of ACE heavy truck in the full life cycle is greater than 300 thousand kWh, if the effective capacity of the high-power battery pack is 30 kWh, if the double motors (MG1, MG2) supporting the total rated power of 210 kW and the peak power of 450 kW (MG1, MG2) normally operate, the continuous charging-discharging rate of the battery pack is higher than 7 C, the charging-discharging rate of the peak value (10 seconds) is higher than 150, considering the end-of-life (EOL) decay rate 20%, the equivalent deep cycle-life is higher than 12000 times; Obviously, if the effective capacity of the battery pack is doubled, becomes 60 kWh, then equivalent cycle-life can be reduced to 6000 times, and charging-discharging rate is substantially reduced by 50%, but the volume of the battery pack, weight, and the total cost is obviously increased, the comprehensive performance-to-price ratio of the large battery pack is not the best, according to the main working-condition of the ACE heavy truck (Duty Cycle) and the longitudinal slope distribution function of the expressway usually running, the comprehensive consideration is determined.

Through mixing high performance (low temperature high-rate charging-discharging), long service life, primary battery pack 130*a* of the lithium titanate battery cell (LTO) with high cost (capacity is 10-20 kWh) and the LFP or NCM secondary battery pack 130*b* with low cost (capacity is 25-50 kWh), then it can according to the specific applications of the ACE heavy truck 010, optimizing the performance-to-price ratio of the whole system. When in the cold winter (less than negative 10 degree C.) vehicle outdoor parking exceeds 10 hours, after the vehicle cold start, LTO primary battery pack 130*a* is cold resistance, can immediately participate in high rate charging-discharging work; the secondary battery pack 130*b* using LFP or ternary lithium battery cell is controlled by the chopper 132*b*, can temporarily not participate in the work or only low intensity work, after more than ten minutes, the secondary battery pack 130*b* inner battery cell temperature is gradually heated to more than 10 degree C., the secondary battery pack 130*b* starts high rate charging-discharging; it is easy to use hot water of ACE heavy truck engine radiator to gradually heat the battery pack to 10 degree C. in ten minutes, and has no negative influence to the fuel consumption or emissions of the vehicle; The disadvantage of this battery pack heating method is that the heating time is relatively long (ten minutes), and the battery pack of ACE heavy truck in a short time cannot charge with high power. The battery pack 130*a*&*b* are some of the most expensive subsystems in the ACE heavy truck, two or more battery packs of different electrochemical cells are mixed, it is beneficial to improve the comprehensive performance of the battery pack, the total cost of the battery pack is reduced, and it is important to optimize the comprehensive performance-to-price ratio of the ACE heavy truck. The chopper 132*a* or 132*b*, through the pulse-width-modulation (PWM) technology and software definition and remote iterative upgrade (OTA), can according to the charge and discharge characteristics of battery cell at different temperatures and the protective limit condition of each kind of battery cell, dynamically and continuously adjusting the charging-discharging current value of the battery pack 130*a* or 130*b*, under the premise condition of ensuring the complete vehicle power performance of the satisfy ACE truck, optimizing the performance of the battery pack, electric throughput, and equivalent cycle-life.

The LTO single cell nominal voltage (SOC=50% open circuit voltage) is only 2.2V, lower than the LFP single cell nominal voltage of 3.3V and the NCM single cell nominal voltage of 3.7V. For the (battery pack of same capacity (in kWh), higher voltage battery pack solution (battery cells with more series and less parallel connections and rated voltage about 650V) compared with the lower voltage battery pack solution (battery cells with less series and more parallel connections and rated voltage about 400V), the design and control of the former battery management system (BMS) is more complex, the material and manufacturing cost of the former battery pack is higher, and the system redundancy and robustness are worse; At the same time, the latter solution is easier to borrow the battery packs of the main-stream new energy passenger vehicle voltage platform (such as 300V to 450V range), with higher performance-to-price ratio, multiple suppliers, and quality guarantee. ACE heavy truck can preferably adopt at least two battery packs, composed of different electrochemical cells connected in parallel, which is beneficial to improve the performance-to-price ratio of ACE heavy truck system. The rated voltage range of the lithium ion power battery pack adopted by the current global mainstream new energy passenger vehicle is 300V to 500V (the 400V platform battery pack for short) with a global mature supply chain, A dozen of the leading manufacturers of lithium ion power batteries in China, Japan and South Korea account for more than 85% of the global market share; the 400V platform battery pack volume is rapidly rising year by year, the cost (UD$/kWh) is obviously reduced year by year, and higher than 600V rated voltage of the battery pack (800V platform battery pack) per year global production is more than one order of magnitude less than the former, 800V platform battery pack cost is high, qualified suppliers are fewer, annual price reduction amplitude is low. The peak electric power of the ePSD 123 of the present invention can be up to 500 kW, the preferred range of the rated voltage of the DC bus is from 600V to 750V (i.e., 800V platform). The battery pack (130*a*&*b*) of the present disclosure preferably has a rated voltage value between 350V and 450V; overlapping the rated voltage range of mainstream new energy passenger vehicle battery pack as much as possible with large annual production volume, it is convenient for fully using the current new energy passenger vehicle mature 400V platform power battery supply chain, reducing the cost and assuring the supply. These battery packs 130*a* or 130*b* can match and connect with the DC bus of the ePSD 123 through the hundred-kW DC-DC converter 132*a* or 132*b* (also called chopper) as shown in FIG. 2. Except the DC transformation function, the other beneficial function of the hundred-kW chopper (132*a*&*b*) is through pulse-width-modulation control (PWM), in 0% to 100% battery pack charging-discharging peak value current range, it can ensure the cycle-life and safety of the battery cells to the various limiting conditions of the working-condition according to the charging and characteristics curves of various battery cells at different temperatures or different periods of life cycle (SOH) and the battery pack manufacturer, through the software definition and over-the-air upgrading (OTA) the microprocessor in the chopper (132*a*&*b*), automatically, accurately and dynamically adjusting the amplitude and direction of the charging-discharging DC current of the battery packet 130a&b so as to ensure the battery pack in the full life cycle, both performance and cycle-life are optimized (Optimization); at the same time, it also does not increase the hardware cost. Using the chopper 132a&b to realize intelligent pulse preheating (iPH) of the battery pack 130a&b in cold winter, with performance-to-price ratio and high energy efficiency of technical features to solve the lithium-ion battery industry long-term difficult problem of efficient and uniform heating of the mainstream battery cells such as the LPF or NCM (except LTO).

Preferably, the primary battery pack 130a can adopt the lithium titanate battery cells (LTO) with total capacity of 12 kWh to 26 kWh, continuous charging-discharging rate of 5 C~9 C, 10 seconds or 15 seconds pulse peak charging-discharging rate of 15 C~30 C; equivalent depth charging-discharging (100% DoD) cycle-life (namely the battery pack based on the HRPSOC working-condition, total life cycle accumulated total electric quantity turnover times, abbreviated as "equivalent cycle-life") more than 12000, the working environment temperature is −30 to +55 degree C. If the hundred-kW chopper 132a is provided, the nominal voltage of the battery pack 130a is preferably in the range of 300V to 450V (i.e., 400V voltage platform); If the chopper 132a is not provided, the nominal voltage of the battery pack 130a must be equal to the nominal voltage of the bus point X (i.e., the 800V voltage platform). In the automobile specification power battery of various electrochemical formulations of the global modern commercialization, only one set of the lithium titanate battery cell (LTO) can satisfy for all strict requirements of the ACE heavy-truck battery pack, especially the requirement of over-long cycle-life and low-temperature and high-rate partial charge and discharge. LTO battery cell specific energy (Wh/KG) is low, for ACE heavy truck application, LTO battery pack volume or weight is not too high; However, the other disadvantages of LTO battery pack are high cost and lack of global qualified suppliers, the cost per kW (kWh) battery cell cost (yuan/watt) is more than three times the cost of other mainstream automobile grade lithium-ion battery cells (e.g., LFP, NCM, NCA), resulting in long-term high cost of LTO battery pack. If all adopt LTO battery cell, because the battery pack total cost is too high to limit the ACE heavy truck widely applied globally; The high-cost problem of the full life cycle of LTO battery pack must be solved effectively. Primary battery pack 130a can also be suitable for severe working environment charging-discharging high-rate partial SoC (HRPSoC) application of the power-type battery cell: nickel-hydrogen battery (NiMH), lithium iron phosphate (LFP), ternary lithium ion battery (NCM/NCA), or carbon lead battery (PbC); the four kinds of battery cell when the battery pack capacity is equivalent, it may need at least two sets of battery cell, can satisfy 12000 long equivalent cycle-life of the requirement; at the same time, the four kinds of battery cell cost (yuan/watt) are obviously lower than lithium titanate battery cell, although it needs two sets of system can satisfy ultra-long cycle-life requirement, but from the battery pack device investment (Capex) angle test, compared with a set of LTO battery cell has economic advantage; It can also be considered that the battery pack composed of the two different electrochemical components of the battery cell is connected in parallel and mixed (for example, LTO and LFP), as shown in FIG. 2; at the same time, the total capacity of the battery pack (130a and 130b) is lifted to 40 kWh~90 kWh range to obtain the battery pack 130a&b optimal performance-to-price ratio in the ACE heavy truck full life cycle.

Preferably, the secondary battery pack 130b can adopt the capacity 30 kWh~60 kWh power type lithium-ion battery cell (continuous charge discharge 3C+), such as lithium iron phosphate (LFP) or ternary lithium (NCM or NCA) battery cell. Of course, it also can select the secondary battery pack 130b with capacity greater than 60 kWh, so as to enhance the vehicle propulsion power performance vehicle in various operating conditions, reducing battery pack equivalent cycle-life upper limit and charging-discharging rate peak value; However, the weight of the large-capacity battery pack, volume, and cost will be obviously increased, performance-to-price ratio is not necessarily optimal, needing comprehensive consideration. If the chopper 132b is provided, the battery pack 130b is preferably 400V voltage platform, so as to fully utilize the modern new energy automobile battery pack industry supply chain; If the chopper 132b is not provided, the battery pack 130b should be an 800V voltage platform, long-haul heavy truck full load driving, the power consumption of pure electric driving is about 2.0 kWh of electricity per mile, even the ACE heavy truck equipped with large high-power battery 130a&b with total capacity of 90 kWh, the all-electric-range is only 45 miles, only a small fraction of the vehicle daily average mileage of 500 miles, Engine 101 is still a primary energy source for long-haul ACE heavy-truck 010.

In the invention, the function of the battery pack 130a&b is similar to a high-power engine with a small fuel tank; Compared with the diesel engine 101, the battery pack is characterized by strong explosive power, fast instantaneous response, but seriously insufficient in endurance (or range). The battery 130a&b can continuously provide 120 kW medium intensity electric propulsion power for the traction motor (140 or 170) for a long time (10-minute level), It is also possible to continuously provide a high intensity electrical drive power of more than 300 kW for the traction motor (140 or 170) over a short period of time (minute level). Assuming that the total effective capacity of the ACE heavy-truck battery pack 130a&b is 30 kWh, the total rated power of the double motors MG1 and MG2 is 300 kW, when the pulse control engine 101 is in passive mode (PAM), the battery pack 130a&b can continuously discharge from the full (SoC=URL) to empty (SoC=LRL) under the charge depletion mode of the battery pack (CD), and the double motors (110 and 140) can independently supply power for 6 minutes at 300 kW intensity, the full load (total weight of 40 tons) and parallel-hybrid ACE heavy truck 010 at a speed of 90 kmph on the uncongested expressway for close to 10 kM; In other words, considering from the vehicle propulsion power control or energy management perspective, ACE heavy truck 010 is a high inertia electromechanical system with a five-minute or ten kM buffer space-time.

ACE heavy truck adopts the high-power battery pack, need to support traction motor total continuous power 200 kW+ or 10 second pulse peak power 400 kW+high rate charging-discharging requirement; battery pack (130a&b) preferably effective capacity 25 kWh~65 kWh, battery pack average continuous charging-discharging rate range of 4 C to 80, 10 seconds peak charging-discharging rate range is 8 C to 20 C, and the charging rate (continuous or peak) of the battery pack is generally higher than the discharge rate, to work in a non-symmetrical manner with the greatest challenge to the battery cells. If an ACE heavy truck is to achieve 30% fuel saving against a conventional diesel truck in cumulative mileage of 500,000 miles, the battery pack full life cycle (i.e., 500K miles) equivalent accumulated throughput should be more than 300K kWh; for example, selecting battery pack 30 kWh effective capacity at beginof-life (BOL), considering battery pack end-of-life (EOL) capacity decay rate of 20%, then the equivalent cycle-life of battery pack 130a&b should be more than 12K cycles; The requirement of ACE heavy-truck battery pack to the performance and service life of the battery cell is obviously higher than that of the battery pack of the new energy passenger vehicle. Limited by the current world automotive grade lithium ion battery cell technical route and industrial development level, the actual performance and cycle-life of the battery pack is closely related to the instantaneous working-condition (current, voltage, temperature, SoC, SOH, etc.) of the battery cells; ACE heavy truck needs to comminate through chopper 132a&b with battery management system (BMS) of battery pack 130a&b according to the instantaneous state-of-charge (SoC) of battery 130a&b battery cell temperature, battery cell health state (SOH) data, dynamically controlling the actual charging-discharging rate of the battery pack, which can more effectively and reliably realize battery pack performance and cycle-life optimization.

the high-power battery pack needs to ensure both the performance standard and the long cycle-life, must according to the working-condition data of the battery pack 130a&b (SoC, SoH, temperature, voltage and so on), under the charging-discharging HRPSoC condition, dynamically adjusting the current amplitude and direction of high-rate charging-discharging, strictly controlling the battery pack all battery cells of the charge state (SoC) time-varying function. The charging-discharging upper-red-line (URL) of the modern automotive grade high-power battery cell is generally 85% to 95%, the lower red line (LRL) is generally 10% to 20%; The best upper limit (BUL) of the high-efficiency zone of the battery cells is 70% to 85%, and the best lower limit (BLL) is 20% to 35%, when the battery pack is working in the SoC high efficiency zone (BLL<SoC<BUL), the performance and safety of all the battery cells, and the cycle-life is optimal, and the battery pack when the SoC is higher than the URL or lower than the URL of the red line area in HRPSoC operation, the battery pack performance is obviously reduced, it may cause permanent damage to the battery cells, reducing the cycle-life, generating potential safety hazards, it must be avoided. The invention Claims a core of predicative state-of-charge control (PSC) for battery pack 130a&b which is to ensure that the ACE heavy truck 010 can optimize the three metrics of vehicle power, fuel consumption, and emission simultaneously, by series-hybrid iSS of parallel-hybrid iPS control and intelligent cruise control (iCC) technology, dynamically and automatically adjusting the operation mode of the battery pack (CS, CD, CI; one of the three), keeping the battery pack 130a&b working in the high efficiency zone, maximizing the total charge turnover rate and the regeneration charge turnover rate.

ACE heavy truck 010 under the series-hybrid (clutch 111 open) or and parallel-hybrid (clutch 111 closed), VCU 201 according to the energy-saving and emission-reducing machine learning algorithm, vehicle configuration parameter, operation conditions of the vehicle and each related sub-system, road-load instantaneous power, and electronic horizon road three-dimensional information (especially longitudinal slope function) and road-load power prediction, to apply series-hybrid iSS or parallel-hybrid iPS control on instantaneous output power of the engine 101 and battery pack 130a&b parallel-hybrid iPS, it not only can real-timely satisfy the vehicle power equation (1-1) and the series-hybrid power equation (2-4) or parallel-hybrid power equation (3-3), but also can predictively adjust the engine average power function, by controlling the dynamic distribution of the mechanical power of the hundred kW level among the three ports of mPSD 124 and the dynamic distribution of electric power of hundred-kW level among the three ports of the ePSD 123, to realize the ACE heavy-truck battery pack (130a&b) continuous operation in one of the following three charge modes (CS, CD, CI) or smoothly switching among the three: 1) under the charge sustaining mode (CS), instantaneous state-of-charge change function (instantaneous SoC) of the battery pack and average state-of-charge function (average SoC for short; referring to equation (MAW), fluctuate continuously between BUL and BLL (i.e., in the high-high-efficiency zone); at this time, the average power of the engine 101 is approximately equal to the average power of the vehicle road load, vehicle propulsion (series or parallel hybrid) mainly relies on engine 101, with battery pack 130a or 130b as auxiliary power source, satisfying the vehicle dynamics equation (1-1) and series-hybrid equation (2-4) or parallel-hybrid equation (3-3) in real time; 2) under the charge depletion mode (CD), the instantaneous SoC function of the battery pack fluctuates continuously while the average SoC function is continuously reduced between the upper red line (URL) to the lower red line (LRL); the average power of the engine is substantially less than the average power of the vehicle road load, the vehicle propulsion uses the engine 101 as auxiliary power and mainly relies on the battery pack 130a or 130b to provide electric power to the traction motor 140 or 170 satisfying the equations (1-1) and (2-4) of (3-3) in real time; 3) under the charge increasing mode (CI), the instantaneous SoC function of the battery pack continuously fluctuates and the average SoC function rises continuously between the lower red line (LRL) and the upper red line (URL); at this time, the average power of the engine is substantially greater than the vehicle road-load average, power, the mechanical power of the engine is used for driving the vehicle directly in parallel-hybrid mode or indirectly in series-hybrid mode, the surplus mechanical power of the engine is used to charge the battery pack 130a or 130b through the generator 110 continuously, so as to ensure the battery pack average SoC function continuously rise with time, satisfying the equations (1-1) and (2-4) or (3-3) in real time.

The electric energy in the battery pack 130a&b can be divided into two kinds, one is the engine 101 driving the generator 110 to generate electricity (engine charge), is "high cost electric energy", also called "engine electric energy"; another is the "regenerative charge" (Regen charge) generated by the regenerative braking of the motors 110, 140, or 170 to recover the mechanical energy of the vehicle, which is basically "quasi-zero cost electrical energy", and also called "regenerative electricity". To minimize the comprehensive fuel consumption (FC) of ACE truck in the freight event, to minimize the overall fuel consumption (FC in L/100 kM) of the freight event, firstly needing to make the battery pack (130a or 130b) to charge or discharge just-in-time continuously, maximizing the accumulating total electric energy of the battery pack (kWh; the sum of the electric energy of the engine and the regenerated electric energy) or the total charge turnover rate (defined as the ratio of the accumulated total electric energy of the total electric energy to the equivalent capacity of the battery pack); secondly, improving the ratio of the regeneration electric energy in the total electric energy (that is to say, maximizing the regeneration charge turnover rate), catching each opportunity of energy recovery through regenerative braking; at the same time, it should reduce the ratio of the electric energy of the engine (namely minimizing the charge turnover rate of the engine); to avoid the battery pack overflow (SoC=URL), unable to accept new regenerated electric energy, triggering the voltage control switch (VCS) 133 to close and wasted the electric energy on the brake resistor 131. According to the 3D road data in the vehicle map unit 240 memory, vehicle configuration parameters, and dynamic operating data, ACE heavy truck can calculate in real-time (sub-second time delay) to kW level granularity vehicle road load instantaneous power function and the average power function in the electronic horizon (hour level in time or 100 kM level in distance); Unless the vehicle encounters a large downhill slope (e.g., more than 10 kM continuous downhill) resulting the regenerative braking charge (i.e., quasi-zero price) of the battery pack to be full (a predictable but not common scenario), the ACE heavy truck is always capable of preparing for the rainy day, by dynamically adjusting the difference between the average road-load power of the vehicle 010 and the average power of the engine 101, in a just-in-time (JIT) fashion, charging-discharging the battery pack 130a&b as required in real time charging-discharging, furthest making the battery pack stably work in the high efficiency zone, avoiding the two types of bad situations of no regen because the battery pack is full (SoC=URL) or no discharging because the battery pack is empty (SoC=LRL); The invention is capable of maximizing the regenerative braking charge turnover rate and the total charge turnover rate at the same time. Obviously, the ACE heavy truck for long-term operation in the mountainous region should be provided with large capacity high-power battery pack (such as effective capacity 60 kWh) and the ACE heavy truck running nation-wide, most of the time or mileage running in flat of hilly area, configuring high-power battery pack 30 kWh effective capacity, the performance-to-price ratio is higher. The core of ACE heavy-truck fuel-saving strategy of the invention is under the precondition of ensuring the vehicle power and the active safety, fully using the prior road three-dimensional data in the electronic horizon and the is hundred-kW level fluctuation of the longitudinal slope power caused by the longitudinal slope changes along the road, through intelligent cruise control (iCC) (namely one-dimensional longitudinal L1 level autonomous driving function; comprising a predictive cruise control PCC and an adaptive cruise control ACC) and according to the AI fuel-saving algorithm, pulse-width-modulation control (PWM) or pulse amplitude modulation control (PAM) (i.e., series-hybrid iSS or parallel-hybrid iPS) for instantaneous power of engine 101 or instantaneous power of 130a&b respectively, dynamically adjusting the path and amplitude of mechanical power flow and electric power flow of ACE heavy truck 010, or direction, in real time satisfy the vehicle dynamics equation (1-1) and the series-hybrid power equation (2-4) or parallel-hybrid equation (3-3), making the battery pack 130a&b to work stably in one of the three modes of charge sustaining (CS), charge depletion (CD), or charge increasing (CI) or smoothly switching among the three, seeking maximization of battery pack regeneration electric quantity turnover rate and total charge turnover rate, realizing predictive charge state control function (PSC—Predicative SoC Control), so as to reach the beneficial effect of optimizing vehicle energy saving and emission reduction (i.e., $CO_2$ and $NOx$ actual emission is minimized at the same time).

Under the series-hybrid mode (clutch 111 open), battery pack 130a&b provides propulsion power to the ACE heavy truck 010 by discharging to the traction motors 140 and/or 170, when charging the battery by the traction motor 140 and 170 through regenerative braking to recover energy; under parallel-hybrid mode (clutch 111 closed and locked), the engine 101 is directly involved in the vehicle propulsion or braking, generator 110 and traction motor 140 can also combine torque or power, equivalent to motor with larger peak torque or power, to participate in the vehicle driving or regenerative braking recycling energy, further improving the regenerative braking charge throughput, improving the fuel-saving effect. If the ACE is climbing a long uphill and the battery pack 130a&b to be substantially depleted of charge (SoC=URL), the ACE heavy truck at this time should be in parallel-hybrid mode, and its dynamic performance depends entirely on the peak power of the engine 101; if the peak power of the engine 101 is not large enough, then the vehicle has to change into lower gear to continue the climb, temporarily reducing the power performance and cargo timeliness of the vehicle; until the vehicle is on flat ground or downhill, the generator 110 and/or the traction motor 140&170 can be the regenerative braking or engine propulsion power to the battery pack 130a&b charging, recovering the vehicle power.

In the next 20 years, the performance-to-price ratio annual improvement of the power electronic (PE) power module based on silicon IGBT or silicon carbide (SiC) MOSFET is obviously higher than that of the motor or battery pack. Continue with reference to FIG. 2, preferably considering the design electric power divider ePSD 123 comprises six hundred-kW level PE power modules (e.g., port I in the standard MCU1 121, port II is connected with MCU2 122a and MCU3 122b, port III is connected with the voltage control switch 133, primary chopper 132a and secondary chopper 132b and so on), the function and performance of the power electronic hardware (especially the rated power and peak power) should adopt the over-design principle, so as to continuously improve the current performance and function of each sub-system or increase the new function of ACE heavy truck through the software remote updating iteration (OTA). The peak power $P_{gx}$ of the MCU2 122a is more than 15% higher than the peak power $P_{pmx}$ of the primary traction motor 140. The peak power of 122b should be more than 10% higher than the peak power $P_{smx}$ of the secondary traction motor 170, and $P_{pmx} > P_{smx}$; the peak power of the primary chopper 132a&b and the secondary chopper 132b is higher respectively the peak power of the primary battery pack 130a or the secondary battery pack 130b by more than 15%, the rated power of the voltage control switch 133 is higher than the rated power of the traction motor 140 by more than 15%.

Power semiconductor module such as IGBT or SiC performance-to-price ratio average improving speed is obviously higher than the battery pack, motor, and a brake resistor and so on, it can fully utilize the continuous innovation and upgrade of the global power semiconductor industry, using multiple power electronic circuit topology structure to realize the high performance-cost ratio of the electric power splitter ePSD 123; The ePSD 123 with hardware design margin is a software-defined electric power splitter from the beginning, and can continuously improve and evolve the existing functions or increase new functions through software remote upgrade iteration (OTA), using the modularized design strategy, the three ports of ePSD 123 are connected with the external electric machine, battery pack, or brake resistor and electromechanical load can adopt industry standard mechanical and electric interface, it is convenient and flexible for all kinds of motor and battery pack provided by multiple high-quality automotive suppliers meeting the performance requirement and target cost, continuously improving the ACE heavy truck performance-to-price ratio, with long-term quality guarantee.

An inverter (Inverter; namely the bidirectional DC-AC converter) is the core part of the modern motor controller (MCU); In the present disclosure, the motor controller (MCU) should be understood as a complete automotive grade motor controller using the inverter as the core module, a plurality of mature circuit topology structure can realize MCU, motor controller and the inverter can be generalized as synonyms, it will not cause confusion to the common technician in the field, the motor controller (MCU1 121, MCU2 122a, MCU3 122b) can dynamically and precisely control the rotating speed or torque of the three-phase AC motor (MG1 110, MG2 140, MG3 170) in vector control (Vector Control) manner, it can real time precise (ten millisecond time delay, 2% precision) adjusting the amplitude and direction of the hundred-kW electric power flow, realizing the bidirectional conversion between the electric energy and the mechanical energy, the chopper (132a, 132b) is a bidirectional lifting voltage DC-DC converter (Boost-Buck), high voltage side bidirectional electric connection to the DC bus of ePSD 123, preferably DC bus rated voltage range is 620V to 750V; the low-voltage side bidirectional electric connection to battery 130a&b, preferably the battery pack rated voltage range is 320V to 450V, and the mainstream new energy passenger vehicle of 400V voltage platform are overlapped, so as to share; Of course, the rated voltage range can be 450V to 650V, only the option has sub-optimal performance-to-price ratio. The chopper 132a&b can flexibly matched with various battery 130a&b different rated voltages (320V-700V) through software definition, and can ensure the performance and safety in the full life cycle of the battery cell according to the battery supplier, and cycle-life standard, preferably charging-discharging curve provided by the battery cell under different battery cell internal temperature and state-of-charge, through software definition and air downloading iteration (OTA) chopper control program and parameter, automatically customizing and dynamically updating the charging-discharging control scheme for each battery pack. The invention furthest dynamically compensates the battery pack (130a&b) in high and low temperature operation performance, reliability, cycle-life and other short-comings The vehicle controller 201 (VCU) of ACE heavy truck 010, according to the vehicle fuel-saving & emission-control strategy and fuel-saving machine learning (ML) algorithm, can command the ePSD 123 in real-time and continuously adjust the three mutually related hundred-kW level electric power time functions, comprising of independent variable generator power Pg (t), independent variable traction motor power Pm (t), and dependent variable battery pack charging-discharging power Pb (t), the electric power balance equation at the ePSD DC bus junction point X must be satisfied all the time:

$$P_m(t) + P_g(t) - P_b(t) = 0 \qquad (6\text{-}1)$$

The electric power balance equation is equivalent to the previous series-hybrid equation (2-2) and the previous parallel-hybrid equation (3-2).

Preferably, the primary traction motor (MG2) 140 is a large permanent magnet synchronous motor with low rotating speed and high torque, the rated power range is 150 kW to 250 kW, the peak power range is 275 kW~450 kW, the peak torque range 1500 NM~2500 NM, the traction motor 140 can also be an AC induction motor or magnetic reluctance motor of similar power and torque requirements. The peak power of the primary inverter 122a should be higher than the peak power of the primary traction motor by more than 15% with a surplus. The annual sales of the hybrid passenger vehicle are nearly two orders of magnitude higher than that of the hybrid electric commercial vehicle, so as to select and share some core components of the passenger vehicle as much as possible, it can effectively reduce the cost of the hybrid commercial vehicle and assure the production supply. The rated power of the single motor and the inverter used by the electric (including hybrid electric) passenger vehicle is usually much less than 180 kW. The traction motor 140 also can select the permanent magnet synchronous motor used by the large new energy passenger vehicle with rated power of 160 kW to 230 kW and maximum torque of 350 NM to 500 NM, the mechanical torque coupler (mTC2) 104 uses a parallel shaft structure, the heavy gear speed reducer with gear ratio of 4~8 range bidirectionally & mechanically connecting the B end of the clutch 111, the mechanical shaft of the traction motor 140, and the input shaft of the transmission box 150.

For the ACE heavy-trick system block diagram FIG. 1, an electric generator (MG1) 110 is mechanically coupled to the flywheel end of the engine 101 by a mechanical torque coupler (mTC1) 103 mechanically (i.e., the so-called hybrid P1 position), and is also mechanically coupled to the A-end (driven end) of the clutch 111. The structure of mechanical torque coupler (mTC1) 103 is divided into two types. Type I is a single shaft coaxial structure, the three (engine, generator, clutch) are serially connected on the same mechanical rotating transmission shaft; At this time, the rotating speed of the generator 110 is the same as the rotating speed of the engine 101 (the rotating speed ratio is 1.0); the permanent magnet synchronous motor with low rotating speed and high torque which can preferably have a rated power of 100 kW to 150 kW and a peak torque 1200 NM to 1200 NM. Type II is a parallel shaft structure (multi-axis), the three-way mechanical coupling by the heavy gear reducer, the flywheel of the engine 101 and the A end of the clutch 111 are coaxially connected, and the two are then connected with the generator 110 through the heavy gear reducer with fixed rotating speed ratio. The high efficiency zone of the rotating speed range of the main-stream heavy-truck engine (displacement 11-16 L) is generally as follows: 1000 rpm to 1800 rpm, the torque load rate is 40% to 90%. When the diesel engine works stably in the high efficiency zone, its brake specific fuel consumption (BSFC; g/kWh) is the lowest (as low as 182 g/kWh), at the same time, the temperature of the exhaust gas is higher than 250 degree C., which is good for the after-treatment system to operate efficiently, reducing the actual emission. The power of the engine and the motor is directly proportional to the product of the rotating speed and the torque; At the same time, the maximum torque of the engine of the generator is positively correlated with its volume, weight, and price. The mechanical torque coupler (mTC1) 103 adopts type II parallel shaft structure, the rotating speed ratio of the generator 110 and the engine 101 can be lifted to the range of 3.0~8.0 by the fixed speed ratio heavy gear speed reducer, so that it is possible to select high speed and low torque large power permanent magnet synchronous motor in the new energy passenger vehicle mature supply chain system, greatly reducing the volume of the generator 110, weight, and price, realizing high performance-cost ratio and quality assurance. The generator 110 may also select an automotive grade permanent magnet synchronous motor with rated power of between 130 kW and 200 kW and a peak torque of less than 500 NM (the highest rotational speed is less than 12000 revolutions per minute).

Traction motor MG2 140 through mTC2 104 is bidirectionally & mechanically connected with the B end of the clutch 111, at the same time bidirectionally & mechanically coupled with the input shaft of the transmission box 150; The B end of the clutch 111 and the input shaft of the transmission-box 150 are preferably coaxially & mechanically coupled (the rotational speed ratio is 1:1), mTC2 structure is divided into two types. Type I is a single coaxial structure, three (clutch, traction motor, transmission box) are connected in series on the same mechanical transmission shaft, at this time, the rotating speed of the traction motor 140 is completely the same as the rotating speed of the input shaft of the transmission box 150 (the rotating speed ratio is 1:1). Type II is a parallel shaft structure (multi-axis) with the three-way mechanical coupling by the heavy gear reducer, the traction motor 140 and the transmission box 150 input shaft of the rotating speed ratio is fixed, preferably the speed ratio is in the range of 3 to 8. When the clutch 111 is closed, the engine 101 flywheel and the input shaft of the transmission box 150 are coaxially, and bidirectionally, and mechanically connected, the rotating speed ratio of the two is 1:1. The upper limit of the peak torque of the 16-liter engine with the maximum displacement of the traditional heavy truck is 2600 NM, so the maximum input torque of the input shaft of the current mainstream heavy truck transmission-box is 2600 NM; ACE heavy truck 101 under parallel-hybrid mode, the dual-motor 110&140 can add torque to the engine, transmission box 150 input shaft total torque can exceed 4000 NM. An enhanced heavy-truck automatic mechanical transmission (AMT) 150, which is preferably designed specifically with input peak torque as high as 3500 NM, the total forward gear number can be reduced to less than 8, wherein it preferably comprising a direct gear ratio of 1.0 (Direct Drive) and an overdrive having a speed ratio of less than 1.0; also can be selected from the main-stream production heavy truck AMT transmission-box, actively limiting the total effective peak torque is less than 3000 NM, sacrificing partial vehicle power, so as to ensure the reliability and long service life of the drivetrain system. The mechanical design of the transmission box 150 should have margin (e.g., 20%), the hybrid powertrain can dynamically & accurately control the transmission-box 150 input shaft total torque value and the change rate (i.e., the time derivative of the torque function) with the ten-NM level or ten-millisecond level granularity. It can effectively avoid the input peak torque jitter generating violent mechanical impact to the transmission box and other drivetrain system components, the total effective peak torque of the input end of the main-stream transmission box of the ACE heavy truck can be improved to more than 3000 NM, at the same time, it gives attention to the reliability and long service life of the drivetrain system. Using type II parallel shaft structure, through the fixed speed ratio heavy speed reducer, the traction motor 140 rotating speed to the input shaft of the transmission-box 150 ratio is increased to 3.0~8.0, so it is possible to select the current new energy passenger vehicle system in the high power permanent magnet synchronous motor, greatly reducing the volume of the traction motor 140, weight, and price; The traction motor (MG2) 140 may preferably be a permanent magnet synchronous motor or an AC asynchronous motor with a rated power between 150 kW and 210 kW. Under mTC2 type I structure, the traction motor 140 is a permanent magnet synchronous motor or AC asynchronous motor with low rotating speed (highest rotating speed is less than 3000 r/min) and large torque (above peak torque over 1500 NM). Under type II structure; the traction motor 140 is a permanent magnet synchronous motor or AC asynchronous motor with medium-high rotating speed (the highest rotating speed is less than 10000 r/min), and the torque (peak torque is less than 500 NM); Obviously, the latter is smaller than the former in volume and quality, and the price is lower.

The selected secondary traction motor (MG3) 170 can be configured between the output shaft of the transmission-box 150 and the axle 160 (hybrid P3 position), and may also be configured in front of the second axle 180 (hybrid P3 position), and the motor 170 is mechanically coupled to the axle, the peak torque of the input end of the heavy-truck axle can reach more than 20000 NM, between the secondary traction motor (MG3) 170 and the axle (160 or 180) is necessary to add a large speed reducer (not marked in FIG. 1), It can be understood that the speed reducer is integrated with the secondary traction motor (MG3), the speed ratio range is 7.0~15.0; It is preferable that the rated power is 60 kW to 120 kW, the peak torque is less than 500 NM of middle-high speed low torque automotive grade permanent magnet synchronous motor or AC asynchronous motor.

In FIG. 1, the input shaft of the transmission box 150, through the mTC2 104, is bidirectionally & mechanically connected with the B end of the clutch 111 and the output shaft of the main traction motor 140, The output shaft of the transmission and the first axle 160 are bidirectionally & mechanical connected. Preferably, using the current mature volume production automatic mechanical transmission with peak input torque over 2500 NM and 10~12 forward gears (AMT-10 to AMT-12), also can be selected heavy double-clutch (DCT) or automatic transmission with hydraulic torque converter (AT); It also can select 5 or 6 forward gear new heavy automatic mechanical transmission-box (AMT-5 or AMTGB-6) with strengthened design, the maximal input torque can be more than 3500 NM. Different from the low torque at low rotating speed characteristics of the engine 101, traction motor 140 can output the maximum torque at zero speed, and hybrid powertrain system total torque is obviously greater than that of the top-of-the-line 16 L diesel engine and the transmission-box 150 input shaft, therefore reducing the frequency of downward shifting caused by insufficient torque, so the ACE heavy-truck automatic transmission box only needs 5~6 forward gears to cover all applications, there is no need to more gear; Obviously, the AMT with more than 12 shifts can be used, but the cost of the optional transmission box is increased, but the performance of the vehicle is not changed, which is the suboptimal. It should be emphasized that ACE heavy truck in the invention comprises a bidirectional drivetrain system including the transmission-box 150 is different from the conventional heavy truck with a unidirectional drivetrain; regenerative braking the maximum reverse torque and the peak forward torque are substantially the same. Therefore, the main bearing and the gear in the transmission box 150 need special hardening design and manufacture in order to ensure the performance and service life to meet the standards.

In the present disclosure, the secondary traction motor (MG3) 170, motor controller 122*b* (MCU3), and the secondary axle 180 can be integrated into an integrated electric axle (Integrated e-Axle). 6×2 traditional diesel engine heavy truck also can select integrated electric axle and be retrofitted into a 6×4 hybrid heavy truck, but at this time, the pure mechanical powertrain of the engine and the transmission box are independently operated with the integrated electric axle, lack of close cooperation, energy-saving and emission-reducing effect is not the best. Different from the existing technology, the present disclosure ACE heavy truck in FIG. 1, the integrated electric axle and at least one of engine 101, engine control unit 102, generator (MG1) 110, ePSD 123, a traction motor 140, a battery pack 130a&130b, clutch 111, transmission box 150, and transmission box control unit 151 are closely coupled, coordinated, and controlled by the vehicle controller (VCU) 201, according to the specific vehicle condition and road condition, by dynamically adjusting the path of the vehicle powertrain mechanical power flow or electric power flow, amplitude, and direction, commonly driving ACE heavy truck, optimizing the beneficial effect of vehicle energy saving and emission reduction; at the same time, it also can improve the vehicle power and brake performance, and increase the redundancy of the vehicle propulsion and brake systems.

The engine 101 of the ACE heavy truck can select large heavy truck diesel engine or natural gas engine with 13 L to 16 L displacement, peak value power 320 kW to 450 kW, peak torque 2000 NM to 2600 NM; it also can select the medium heavy truck diesel engine or natural gas engine with the displacement of 9 L-12 L, the peak power of 250 kW to 320 kW and peak torque of 1500 NM to 2100 NM, The mixed hybrid ACE heavy truck preferably uses 11 L to 13 L of heavy-truck diesel engine in the world mainstream with best performance-to-price ratio. For example, ACE heavy truck is configured with a current market high-volume 11 L diesel engine 101 (basic or advanced type), peak torque 2200 NM @ 1200 rpm, peak power 300 kW @ 1800 rpm; permanent magnet synchronous generator (MG1) 110 with rated power 175 kW and peak torque 1400 NM, permanent magnet synchronous traction motor (MG2) 140 with rated power 200 kW and peak torque 1600 NM, an extra-long cycle-life high-power battery pack 130a & b with continuous charge and discharge power (i.e., rated power) greater than 250 kW and end-of-life (EOL) effective capacity 30 kWh; under the parallel-hybrid mode and in engine high efficiency zone (such as rotating speed of 1000 rpm to 1600 rpm), the engine and the double motor can cooperatively generate force, the vehicle transmission box 150 input shaft total peak torque can be as high as 4000 NM, the vehicle power (high speed climbing, accelerating overtaking and so on) is obviously better than the traditional best-in-industry heavy truck with a 16 L diesel engine, in order to prevent the transmission box and the drivetrain system durability degradation due to mechanical overload, it needs to dynamically limit maximum input torque to the transmission under the parallel-hybrid architecture. The ACE heavy truck can reduce fuel consumption (L/100 KM) by over 20% against a diesel truck of similar performance and vintage with the same load and route and the optimal fuel consumption of ACE heavy truck can be completely determined by the fuel-saving ML algorithm of the fuel-saving robot, basically independent of the driving level and experience of the driver are irrelevant or the technical level and performance metrics of the engine 101.

Figure 4:
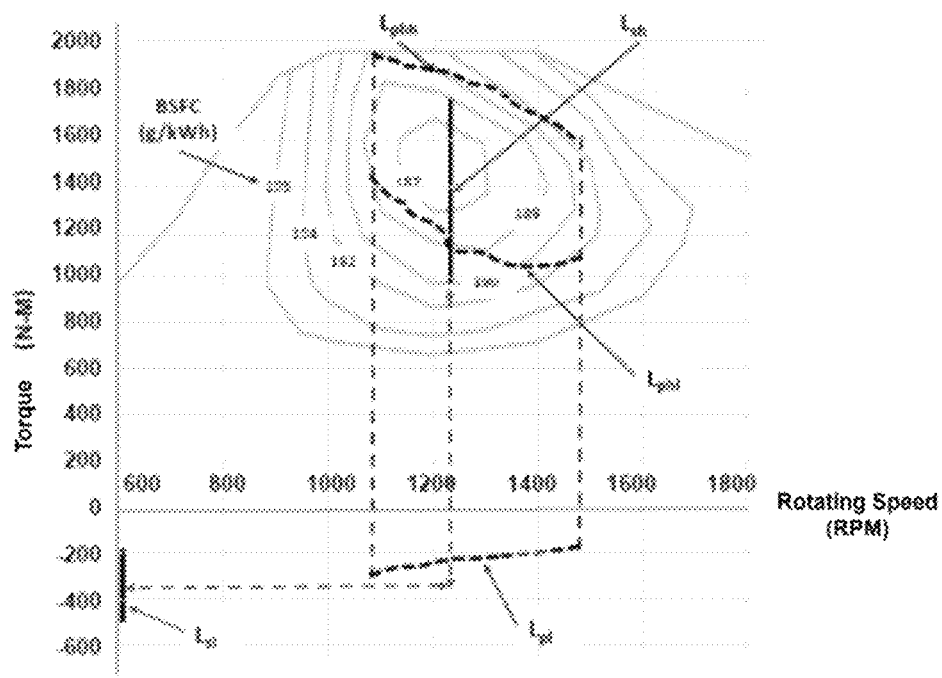
FIG. 4 shows an ACE truck engine's universal characteristics curve (Engine Map) according to one embodiment of the present disclosure

FIG. 4 is a typical universal characteristics curve graph of a modern heavy truck 11-liter diesel engine (Fuel Map), the peak torque of the engine is 2000 NM, peak power is 300 kW, minimum fuel consumption (BSFC) is 187 g/kWh. In the picture is distributed with multiple irregular shape curves of complementary disjoint, each curve is a constant specific fuel consumption (BSFC) contour; The complete detailed characteristics of the engine is a commercial secret of the engine manufacturer, and will only be shared after signing a non-disclosure agreement with the vehicle manufacture or the relevant tier-I suppliers. At present, the minimum fuel consumption of the mainstream heavy-truck diesel engine used by the global truck manufacturers is 182 g/kWh, and the corresponding thermal efficiency (BTE) is 46%; Heat efficiency (BTE) 50%~55% of heavy-truck diesel engine at present Europe and America are still in the prototype research and development stage, there are also three to five years away from volume production in Europe and America. If the high efficiency zone of the engine 101 is defined as the engine working area at 105% of the minimum specific fuel consumption (196 g/kWh) in the fuel consumption curve, referring to FIG. 4, then the high efficiency zone of the engine corresponding to the rotating speed range is 900 r/min to 1700 r/min, the torque range is 670-2000 NM, namely the torque load rate is 33% to 100%. It is easy to digitize the universal characteristics curve of the engine high-efficiency zone of FIG. 4 into a data-list (Look-up Table) convenient for computer processing, preferably to 10 r/min rotating speed step and 10 NM torque step to generate a 140×100 matrix to describe the engine high-efficiency zone characteristics, Each matrix row corresponding to constant torque and each column corresponding to the constant speed; In this table, each element (i.e., at specific line number/column number) corresponds to a specific fuel consumption value (BSFC) of an engine operating condition point (i.e., a specific engine rotational speed/torque; g/kWh), called "original fuel consumption list" ("original FC table for short)" the original FC list reflects the original design metrics of the engine; the engine control unit (ECU) 102 of ACE heavy truck 010 can according to the actual operation data of the engine 101, generating a revised fuel consumption list (revised FC table for short) every two days or every thousand miles. The revised FC list not only reflects the original design performance metrics of the engine, but also reflects the specific engine's wear-and-tear over time, the current actual performance metrics, to be used by the ACE heavy truck energy-saving and emission-reducing AI algorithm.

Referring to FIG. 4, the universal characteristics curve of the engine 101 can be presented by an fuel consumption matrix of 101×51 (Look-up Table); the row number (1 to 101) of the matrix corresponds to the engine torque, the column number (1 to 51) corresponds to the engine rotating speed, each matrix element represents an engine operating-condition point, the element value is the brake-specific fuel consumption value (BSFC) of the operating-condition point; The effective range of engine torque or rotating respectively is: −500 NM 2000 NM or 500 RPM-1800 RPM; dividing uniformly, the torque step is 25 NM, the rotating speed step is 26 RPM; For example, matrix elements (1, 1) corresponding to (~500 NM, 500 RPM) operating point; (1, 51) corresponding to (~500 NM, 1800 RPM); (101, 1) corresponding to (2000 NM, 500 RPM); (101, 51) corresponding to (2000 NM, 1800 RPM); The optimal operating condition point (91, 26) corresponds to (1840 NM, 1150 RPM), and the element value is 187 (g/kWh). Obviously, all the fuel consumption values corresponding to all the 4th quadrant condition points (that is, all the elements with the number of rows less than 21) are set to be 0; the brake-specific fuel consumption values corresponding to the combustion operating-condition points beyond the maximum torque curve of the engine in the 1st quadrant is set to be one thousand times of the minimum BSFC, namely, 187,000 (g/kWh), approximately infinitely large in engineering sense. The brake-specific fuel consumption value of the rest effective combustion operating-condition point is directly read from the factory engine universal characteristics; the engine constant torque horizontal operating-condition lines are composed of matrix elements with the same row number and different column number; the vertical operating-condition line with constant rotating speed is composed of matrix elements with different row number and same column number; and the equal power curve is composed of adjacent matrix elements with different row number and column number. The fuel consumption matrix completely describes the universal characteristics of the engine 101, which is one of the key mathematical models of the ACE Truck 010 Power Management Strategy (PMS) data driven machine learning (ML) algorithm.

Referring to FIG. 4, inside the engine combustion high-efficiency zone, a 5% change in rotating speed or torque will trigger a BCFC change of much less than 5%; but outside the combustion high-efficiency zone (such as the torque load rate less than 30%), the rotating speed or torque change of 5% will cause a BSFC change of much more than 5%. In other words, for all modern heavy truck engine, inside the combustion high-efficiency zone, not only BSFC is low and exhaust gas temperature is high (more than 300 degree C.), but also the BSFC and exhaust-gas temperature are more stable, basically staying constant with the changes of the engine operating-condition points; in the combustion non-high-efficiency zone, not only BSFC is high and exhaust-gas temperature is low (less than 250 degree C.), but also the BSFC and exhaust-gas temperature are not stable with substantial changes in value as the engine operating points shift. The engine universal characteristics curve and features of the above fuel consumption matrix are the foundational physics behind why the DPC engine of the current invention is much better that the AEC engine of the prior art in terms of optimized fuel consumption and emission effects, the computational load of the fuel-saving emission-reducing algorithm of the former (DPC engine) to be an order of magnitude less than that of the later, more robust and faster converging. An engine, a motor, a transmission box, and wheels have many speed sensors, the rotating speed measuring precision can be stabilized within 0.5% for a long time. However, there is no automotive-grade production-ready torque sensor in the world, The indirect measuring precision of the effective torque of the flywheel of an engine is approximately 3%; the engine can directly and dynamically adjust the torque of the engine in real-time by accurately controlling the fuel injection quantity; the torque is an independent variable, but its dynamic measurement relative error is large (~3%); the rotating speed of the engine is determined by the instantaneous torque and the mechanical load, the rotating speed is a dependent variable, but its measuring error is small (less than 0.5%). The DPC engine 101 of the current invention can assure high-efficiency engine stable operation in high-state or low-state to be nearly 99% of the time (on a pre-selected high-state operating-condition line or all low-state operating-conditions to be zero fuel consumption and zero emission); The energy-saving and emission-reduction online global optimization algorithm of an ACE heavy truck 010 equipped with a DPC engine 101 compared with the existing technology (prior art) has the characteristics of "3 high and 1 low": high accuracy, high convergence, high robustness, and low computation load.

Several embodiments of the pulse control engine 101 are discussed below in conjunction with FIG. 4. First, discussions of several series-hybrid intelligent start-stop control (iSS) embodiments. Assuming that the rated power of the generator (MG1) 110 configured by the ACE truck is 175 kW, the rated torque is 1200 NM @1400 RPM with 15 second peak overload rate of more than 50%; the rated power of the primary traction motor (MG2) 140 is 200 kW, the rated torque is 1370 NM @1400 RPM, the 15 second peak overload rate is more than 50%; The universal characteristics of the OEM engine 101 is shown in FIG. 4, the optimal rotating speed can be selected in the range of 1100 RPM to 1300 RPM, preferably selecting the operating-condition point with 1200 RPM and 1400 NM in the original list or the revised list to be the "Best-Operating-Point" (BOP), the engine power corresponding to the BOP is 176 kW, named "high-state operating point". At the same time, it is preferable that the non-combustion engine is run at an idle speed of 600 RPM (the selectable idle speed range of the series-hybrid: 550 RPM~750 RPM), the average resistance torque of a passive engine 101 is about −250 NM, the engine power corresponding to the "non-combustion idle point" (NCI—Non-Combustion Idle) is −16 kW, called "low-state operating point". The best operating-condition point (BOP) in the engine high efficiency zone is preferably on the series-hybrid high-state operating-condition line ($L_{sn}$, is a vertical operating-condition line; for example, the fixed speed is 1200 RPM, the variable torque range is: 1000 NM~1800 NM). NCI is on the preferred series-hybrid low-state operating-condition line in the passive operation zone (POM) (Ls1, is a vertical operating-condition line, fixed speed 600 RPM, variable torque range: −500 NM to −150 NM); the ECU 102 controls the engine 101 to run stably at either BOP or NCI or to switch dynamically and smoothly between the two, converting the traditional analog instantaneous power time-varying function of the engine 101 under the series-hybrid mode into a novel bipolar asymmetrical equal amplitude (i.e., rectangular) pulse-width-modulation (PWM) pulse sequence function; Preferably, the period Ts of the PWM pulse sequence is in the range of 30 seconds to 90 seconds, and the duty ratio $k_s$ (i.e., the ratio of the BOP operation in the same period to the pulse period Ts) can be adjusted dynamically & arbitrarily between 0.0 and 1.0. Obviously, the average power function value (equation (MAW) of the engine 101 under the series-hybrid mode can be adjusted continuously between −16 kW to 176 kW by dynamically changing the duty cycle $k_s$. If the electromechanical conversion efficiency of generator (MG1) 110 is approximately equal to 1.0 (i.e., 100%), the electric, power function of the series hybrid generator set is the same as the mechanical power function in the numerical value, according to the series-hybrid power equation (2-4A), the electric power divider (ePSD) 123 and high-power battery pack 130a or 130b can work in concert to generate an instantaneous power pulse-amplitude-modulation (PAM) pulse sequence function equal to the difference between the ACE heavy truck 010 instantaneous road-load power function and the engine 101 instantaneous power PWM pulse sequence function instantaneous power, satisfying vehicle dynamics equation (1-1) in real-time; in order to ensure the series-hybrid iSS control technology does not negatively affect the vehicle vibration noise (NVH), characteristics period of PAM is less than the period of the PWM by one order of magnitude, preferably period $T_{pk1}$ of the battery pack PAM pulse sequence is less than 10% of the engine PWM pulse sequence period Ts; the amplitude of the PAM pulse, which not only can adopt natural sampling (i.e., curved top sampling), but also can adopt equivalent flat top sampling. According to the equation (MAW), the window period $T_w$ of the rolling time average operation should be significantly greater than the period Ts of the PWM, preferably $T_w > 2T_s$.

The pulse control engine working-condition dual-point embodiment is the simplest series-hybrid iSS control embodiment, the only adjustable parameter to dynamically control average power function value of engine 101 is the duty ratio $k_s$; It is also preferable to use more advanced and flexible working-condition dual-line embodiment. For example, under the active operation mode (AOM), engine 101 can operate at any point along the series-hybrid high-state operating-condition line $L_{sh}$ (equal speed 1200 RPM) inside the 1st quadrant high efficiency zone of the engine universal characteristics map, the torque adjustable range is 1000 NM to 1900 NM, the range of the corresponding high-state power value is 126 kW to 239 kW, the torque loading rate is 50% to 95%; high-state; under the passive operation mode (POM), engine 101 can operate at any point along the series-hybrid low-state operating-condition line $L_{sl}$ (equal rotating speed 600 RPM) inside the 4th quadrant high efficiency zone of the engine universal characteristics map, the torque adjustable range is −500 NM to −150 NM, the range of the corresponding low-state power value is −31 kW to −9 kW, low-state, obviously the engine 101 is dragged by generator 110 resulting in zero fuel consumption & zero emission operation (special-case high-efficiency operation of the engine); The actual torque value of the low-state working-condition of the DPC engine depends on the power requirements of all the auxiliary subsystems (oil pumps, water pumps, air pumps, compressors and the like) of the vehicle, and the absolute value of the majority of the low-state power is less than 10 kW. The ECU 102 controls the engine 101 to work stably on the high-state operating-condition line $L_{sh}$ or the low-state operating-condition line $L_{sl}$ or to switch dynamically and smoothly between the two, transforming the traditional analog instantaneous power time-varying function of the engine 101 under the series-hybrid mode into a novel bipolar asymmetrical non-uniform (i.e., non-rectangular) pulse-width-modulation (PWM) pulse sequence function; a novel at this time, the adjustable parameters to dynamically control the engine 101 average power function value are duty ratio $k_s$ and the power amplitude. The engine 101 instantaneous power pulse sequence function generated by the working-condition dual-line iSS control embodiment in essence is the superposition of the PWM sequence and the PAM sequence; The average power function of the engine 101 is arbitrarily adjustable between −31 kW and +239 kW. It should be emphasized that to ensure that the NVH characteristics of an ACE heavy truck is better than diesel heavy truck, it is preferably to select pulse-width modulation control (PWM) over the pulse amplitude modulation control (PAM) of the instantaneous power function of the engine. However, the battery pack does not have any mechanical movement when charging-discharging, the instantaneous power function of the battery packet 130a&b is not only capable of performing PWM control, but also using PAM control. Obviously, ACE heavy truck 010 when running in the series-hybrid architecture, the maximum continuous torque and power of the vehicle is limited by primary traction motor 140 at respectively 1370 NM and 200 kW, 10 seconds peak torque or power overload rate can be more than 50%. Although it can meet medium-low speed city working-condition of the vehicle road-load power requirement, but in high-speed operating condition ACE heavy truck series-hybrid mode, the power is obviously insufficient, the vehicle should be switched to parallel-hybrid mode.

Next, a number of parallel-hybrid intelligent power switching control (iPS) embodiments are discussed. ACE heavy truck main configuration parameters are the same as the above example; under parallel-hybrid mode clutch 111 is closed, gear shift control strategy of the transmission box 150, under the ACE heavy truck high-speed condition, the engine 101 of the rotating speed is controlled in the high-efficiency zone (e.g., 1000 RPM to 1600 RPM); Referring to FIG. 4, the engine speed range corresponding to the high-efficiency zone is between 1100 RPM and 1500 RPM (referred to as the "efficient rotational speed region"), the base speed of the engine (base speed is the mid-point speed of the peak torque curve) is 1200 RPM. ACE heavy truck 010 on the non-congested expressway intelligent turn on control (iCC) function, the vehicle speed is substantially maintained at a nominal cruising speed (e.g., 60 miles per hour) with up and down 10% fluctuation around the center value, namely the speed function is in a narrow speed band with slow continuous fluctuations. Under the parallel-hybrid iPS control, the rotating speed of the engine 101 is a dependent variable, the speed (1200 r/min) of 10% of the narrow rotating speed-band (1080 r/min to 1320 r/min) slowly and continuously fluctuation; and the torque of the engine is independent variable, which can quickly and continuously change below the peak torque. Referring to FIG. 4, the engine 101 can work at a 1st quadrant in the active operation area (AOM) or the passive operation area (POM) 4th quadrant. Under the parallel-hybrid architecture, corresponding to each engine instantaneous rotation speed dependent variable, from the engine 101 of the original fuel consumption table (see FIG. 4)) or the revised fuel consumption table, selecting different high-state operating-condition points in the engine high-efficiency zone with minimum BSFC value and maximum torque to form a high-state high operating-condition line $L_{phh}$, it also can select different high-state operating-condition points of the engine high efficiency area with minimum BSFC value and minimum torque value to connect into line, forming high-state low-operating-condition line $L_{phl}$. Obviously, the high-state operating-condition lines $L_{phh}$ and $L_{phl}$ are two irregular and non-intersecting lines in the high efficiency zone of the engine 101; $L_{phh}$ operating-condition line corresponding to the engine instantaneous power is between 230 kW to 251 kW, the torque load rate is 80% to 100%; $L_{phl}$ operating-condition line corresponding to the engine instantaneous power is between 173 kW 167 kW, the torque load rate is 53% to 75%, under the passive operation (model), the non-combustion engine 101 is dragged, resulting in zero fuel consumption zero emission engine operation, resistance torque is negative and its absolute value is less than 300 NM, all the low-state operating-condition point connecting lines in all the high-efficiency rotating speed region (1100 RPM to 1500 RPM) to form the low-state operating-condition line $L_{pt}$, which is a quasi-equal torque working-condition 4th quadrant of the engine universal characteristics map with positive rotating speed negative torque. As mentioned above, the absolute value of the low-state operating-condition point power is less than 35 kW, and most likely to be less than 10 kW. Assuming that the absolute value of the low-state power consumption of the DPC engine 101 is 12 kW, the average road-load power of the ACE heavy-truck 010 in high-speed working-condition is 150 kW, the low-state operation of the dragged engine in each minute only consumes 0.2 kWh electricity, and the power consumption of the driving vehicle is as high as 2.5 kWh; In other words, the power consumption of the low-state working-condition of the DPC engine is only a small fraction of ACE heavy-truck propulsion power consumption.

Under the parallel-hybrid iPS mode, ECU 102 controls the engine 101 to operate stably at the high-state operating-condition line ($L_{phh}$ or $L_{phl}$) or low-state operating-condition line ($L_{pl}$) or to switch dynamically smoothly between the two, to realize, under the ACE heavy truck parallel-hybrid architecture, pulse-width-modulation (PWM) control of the engine 101 instantaneous power function, generating a bipolar asymmetrical non-equal (i.e., non-rectangular) pulse-width-modulation (PWM) pulse sequence; in each PWM period, the high-state operation part only selects a stable operation on either $L_{phh}$ or $L_{phl}$ without switching between the two in the same PWM period; but in adjacent PWM periods, the high-state operation part can stably operate on different high-state operating-condition line $L_{phh}$ of $L_{phl}$, essentially adding a new control degree of freedom; the PWM pulse sequence period $T_p$ preferably ranges from 30 seconds to 90 seconds, the duty ratio $k_p$, (the ratio of the high-state operation of the same period to the pulse period $T_p$) is continuously adjustable between 0 and 1, According to the rolling time average power function equation (MAW), by dynamically adjusting the PWM duty cycle $k_p$, the average power function value of the engine 101 is continuously adjustable between −35 kW to 251 kW. According to the parallel-hybrid power equation (3-3A), electric power divider (ePSD) 123 and high-power battery pack 130a or 130b can collaborate to generate synchronized instantaneous power pulse modulation sequence (PAM or PWM) of the battery 130a&b equal to the difference between the ACE heavy truck 010 road-load instantaneous power function and the engine 101 instantaneous power PWM pulse sequence function satisfying the vehicle dynamics equation (1-1) in real time in order to ensure that parallel-hybrid iPS control technology does not degrade the vehicle vibration noise (NVH) characteristics, battery pack PAM period Tpk1 should be one order of magnitude less than the period $T_p$ of the engine PWM, and the period $T_{pk2}$ of the battery pack PWM can be the same with the period $T_p$ of the engine PWM; preferably, the period $T_{pk1}$ of the battery pack PAM pulse sequence is less than 10% of the PWM pulse sequence period $T_p$ of the engine; according to the parallel hybrid power equation (3-3A), the amplitude of the battery pack PAM pulse, which not only can adopt natural sampling (i.e., curved lop sampling), but also can adopt equivalent flat top sampling; and the amplitude of the PWM pulse of the battery pack must be not equal. The window period of the power function rolling time average operation (see equation MAW) should be significantly greater than the period of the PWM, preferably $T_w>3T_p$. At this time, the adjustable parameters to dynamically control the engine 101 average power function value are the duty ratio $k_p$ and additional power amplitude adjusting degree of freedom ($L_{phh}$ of $L_{phl}$). The instantaneous power PWM sequence function of the engine 101 generated by the iPS control embodiment of the parallel-hybrid three-line working-condition ($L_{phh}$, $L_{phl}$, $L_{pl}$) is equivalent to the superposition of the PWM sequence and the PAM sequence, and the double-line working-condition ($L_{phh}/L_{pl}$ of $L_{phl}/L_{pl}$) iPS control is the special case of the former. Obviously, ACE heavy truck 010 in parallel-hybrid mode operation, engine 101, generator 110, and traction motor 140 can jointly drive the vehicle; The theoretical maximum continuous torque and power value of the vehicle can be as high as 4570 NM and 675 kW respectively, but limited by the maximum input torque of 3000 NM of the modern mainstream heavy-truck transmission box 150, the actual maximum continuous torque of power value are capped at 3000 NM or 440 kW respectively. It can also provide a peak power (10 seconds) overload rate of 50%, and therefore the power performance of the parallel-hybrid ACE heavy truck obviously exceeds the current top-of-the-line 16 L diesel heavy truck. Under parallel-hybrid iPS mode, the total peak torque of ACE heavy truck 010 double motor 110&140 is greater than 3500 NM; in each PWM period, regardless whether the pulse control engine 101 operates in high-state of low-state, the total effective maximum torque of the powertrain at the input shaft of the transmission box 150 can be as high as 3000 NM. In other words, the switching of the pulse control engine 101 between the high-state and the low-state in the short-term (minute) has no influence on the actual power performance of the ACE heavy truck. The ACE heavy truck is always better than 16 L diesel heavy truck of the existing technology in terms of vehicle power performance.

It should be emphasized, when the pulse control engine 101 (series-hybrid iSS or parallel-hybrid iPS) is in the active operation (AOM), ECU 102 can directly and dynamically control the torque of the engine by quickly and accurately controlling the spraying quantity and distribution of the fuel injection nozzle, and according to the dynamic power requirement (namely actual load) of the engine, the effect of indirectly controlling the rotating speed of the engine is reached. When the engine is in passive operation (POM), the engine 101 becomes the mechanical load of the generator (MG1) 110, at this time the ECU 102 does not actively control the engine 101, and the generator 110, in charge-depletion mode, drives the engine 101 to operate in a low-state; MCU1 121 can directly, quickly, and accurately control either the rotating speed or the torque of the generator 110 to satisfy the engine POM power dynamically, so as to indirectly control the pulse control engine POM torque or rotating speed effect. In other words, engine electronic control, torque control is the cause, rotating speed control is the effect, the rotating speed value depends on the dynamic load power of the engine; AC motor vector control (Vector Control), not only can have torque control as the cause, rotating speed control as the effect, but also can have rotate speed control as the cause and torque control as the effect. Obviously, the AC motor vector control precision or response speed of the motor rotating speed and torque are an order of magnitude better than that of the engine electronic control, and the road load instantaneous power function of ACE heavy truck, except in emergency braking cases, in the second-level time granularity, is a slow-varying space-time function. In other words, regardless how the DPC engine 101 instantaneous power function (i.e., the PWM pulse sequence) changes, VCU 201 and ePSD 123 can easily and dynamically adjust the instantaneous power function of the battery packet 130a&b in real-time to satisfy series-hybrid power equation (2-4A) or the parallel-hybrid power equation (3-3A). The invention can convert the traditional analogue electric control (AEC) engine in the hybrid powertrain into a novel digital pulse control (DPC) engine by series-hybrid iSS control or parallel-hybrid iPS control, under the precondition of ensuring that the power performance of ACE heavy truck under any operating conditions to exceed the current global top configuration volume production diesel heavy truck, the engine 101 complex surface operating condition is greatly simplified into several pre-determined high-state working-condition point or working-condition line in the high-efficiency zone, at the same time, it adds several low-state working-condition points of working-condition lines with zero fuel consumption and zero emission. In order to fully utilize the existing volume production of automobile technology and product, effectively solving the modern diesel heavy truck at the 2027 years at the same time, at the same time, at the same time, at the same time in performance-to-price ratio, it can effectively solve the difficult technical problem of how the current diesel heavy truck can satisfy the US Federal greenhouse gas emission regulations (GHG-II, that is, RDE fuel consumption standard or CO2 emission standard) and California diesel heavy-truck ultra-low NOx emission combined regulations (RDE pollutant emission standard) by 2027 simultaneously. The current invention provides a novel and production-ready technical path and technical solution to the difficult technical problem above, can optimize the ACE heavy truck actual driving environment (RDE) of energy saving and emission reduction, satisfy the U.S. Federal GHG-II and California new regulations of the CO2 and NOx emission 2027 years limit of ACE heavy truck by 2025 and achieve volume commercial applications.

The control speed and precision of the instantaneous power function of the battery pack 130a&b is higher than the control speed and precision of the instantaneous mechanical power function of the engine 101 by one order of magnitude, and the hundred-kW level battery pack power change without any mechanical vibration noise, only with electromagnetic noise; the road-load power is a second-level slow-varying function, the pulse control engine power is bipolar non-constant amplitude PWM pulse sequence function, the control software of the chopper 132a&b used, the battery pack 130a&b is capable of real-time accurately satisfying the series-hybrid power equation (2-4A) or parallel-hybrid power equation (3-3A). The battery pack instantaneous power pulse sequence function is non-constant amplitude PAM pulse sequence or bipolar non-equal amplitude PWM pulse sequence.

Figure 6:
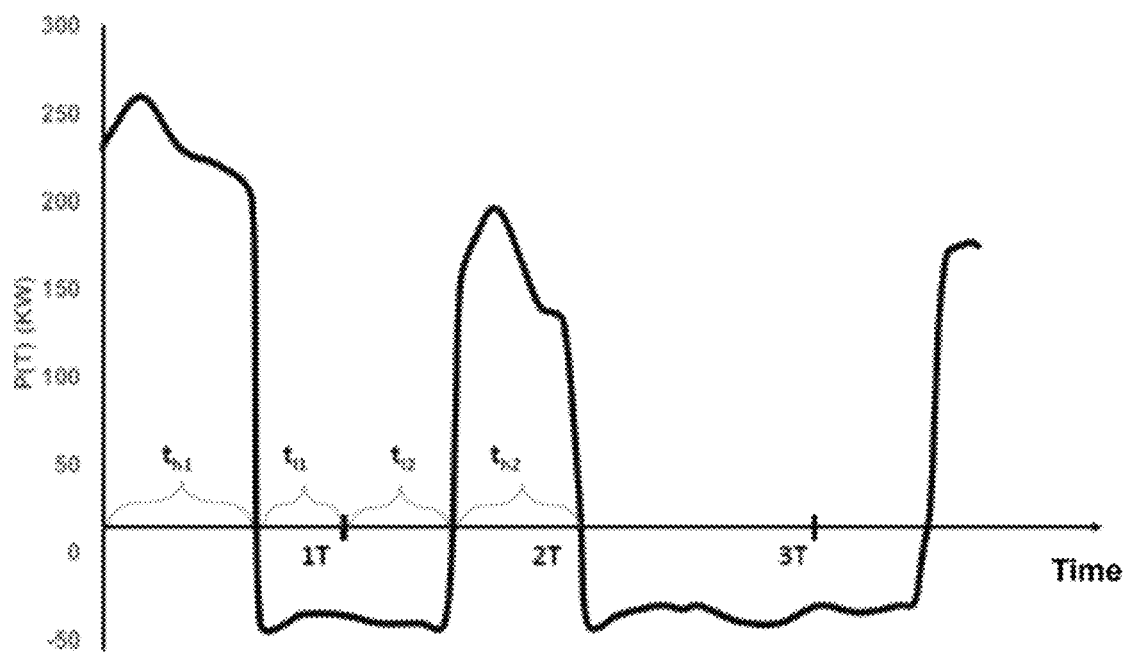
FIG. 6 shows an instantaneous power PWM pulse sequence function of the pulse control engine of an ACE heavy truck according to one embodiment of the present disclosure.

FIG. 6 illustrates an instantaneous power PWM pulse sequence function of a pulse control engine 101. Obviously, the pulse control engine 101 can generate the same bipolar non-equal amplitude PWM pulse sequence instantaneous power function under the control of the series-hybrid iSS or parallel-hybrid iPS. From the single perspective of engine PWM power function, one cannot reversely infer and judge whether the engine is running in the series-hybrid iSS mode or the parallel-hybrid iPS mode. In FIG. 6, in the period 1, duty ratio $k_1=t_{h1}/T$; period 2, duty ratio $k_2=t_{h2}/T$; period 3, duty ratio $k_2=t_{h3}/T=0$. The instantaneous power function of a digital pulse control engine 101 and the instantaneous power function of a conventional analog electric control engine 101 have fundamental difference from a mathematics or physics perspectives. For an ACE heavy truck 010 under any operating conditions, the pulse control engine operating-condition and the ACE heavy truck operating-condition are almost completely decoupled, almost completely running (namely more than 99.0% of the operation time) at combustion high efficiency zone high-state operating-condition point (high-efficiency rotating speed range, torque or power load rate is greater than 40%) or zero fuel consumption zero emission low-state operating-condition point, almost completely avoiding (i.e., less than 1.0% of the operation time) the monumental challenges of vehicle energy-saving and emission-reducing under the plurality of low-speed low-load working point (rotating speed is less than 1200 RPM; the torque or the power load rate is less than 30%) or the idle point (the rotating speed is less than 850 RPM; the torque or the power load rate is less than 2%); ACE heavy truck under the parallel-hybrid architecture, the existing technology (prior art) analog electronic control (AEC) engine working-condition and ACE heavy truck working-conditions are strongly coupled, although an AEC engine can run most of the time in the combustion high-efficiency zone (efficient rotating speed range, torque or power load rate is greater than 40%), it cannot avoid operating at the low rotating speed and low load operating-condition points (rotating speed less than 1200 RPM, which are very challenging for the vehicle energy saving and emission reduction, the torque or the power load rate is less than 30%) or the idle speed points (the rotating speed is less than 850 RPM; torque or power load rate is less than 10%), non-high efficiency combustion zone working point operation time probability can be higher than 5%, still belonging to the complex engine surface working-condition; Compared with the analog electronic control (AEC) engine of the existing technology, the digital pulse control (DPC) engine of the current invention not only greatly simplifies the ACE heavy truck RDE fuel consumption minimization problem, but also eliminates the coupling between the two distinctive technical problems of fuel consumption optimization (i.e., CO2 emission optimization) and NOx emission optimization, can independently adjust the fuel consumption or emission of the pulse control engine, can assure that the actual (RDE) fuel consumption and emission of the pulse control engine are minimized simultaneously.

Although theoretically, the duty ratio ($k_s$ or $k_p$) of the pulse control engine 101 instantaneous power PWM pulse sequence function is continuously adjustable between 0 and 1, but in practice, from the perspective of noise-vibration-harshness performance (NVH) optimization or RDE emission optimization of engine 101 or ACE heavy truck 010 (mainly refers to the dynamic temperature control of the diesel engine after-treatment system), it should avoid the engine 101 high-frequency switching between the high-state and the low-state (such as more than 2 times per minute), and high-state continuous operation time being too short (such as less than 15 seconds) and so on, it is needed to further limit the allowable dynamic value of the duty ratio. In each PWM pulse period, preferably engine 101 high-state operation time is either zero (i.e., duty ratio is zero) or greater than 20 seconds; if the PWM pulse period is selected to be 30 seconds, then preferably the value range of the duty ratio is either 0 or more than 67%; if the pulse period is selected to be 60 seconds, preferably the duty ratio is either 0 or more than 33%. Obviously, within one PWM period, there should be at most one switching from the low-state to the high-state or from the high-state to the low-state, at least zero switching (duty ratio is zero or one). In order to ensure that the NVH performance of ACE heavy truck is better than the traditional internal combustion engine heavy truck, preferably the transition time of PWM pulse sequence from the high-state to the low-state is 1 second, the transition time from low-state to high-state is 2 seconds (that is, the switching strategy of slow jump-up and fast jump-down); If the rotational speed of the pulse-controlled engine 101 is 1200 RPM, it means that each cylinder of the engine can have 10 combustion strokes (crankshaft turns of a complete engine cycle) per second; the pulse control engine can jump down in step of 10% relative power of the PWM high-state and low-state power difference value (about 25 kW), or jump up in step of 5% relative power of the PWM high-state and low-state power difference value (about 12.5 kW), ensuring the smooth switching between high-state and low-state. If the transition time between high-state and low-states is too short (e.g., 0.1 second), it means that a power step with an amplitude exceeding 250 kW is completed within one four-stroke complete cycle of the pulse control engine, and the NVH performance of the entire vehicle will deteriorate significantly (Degrade). Obviously, pulse control engine 101 high-state and low-state switching transition time and power adjustment granularity and setting mainly relates to the vehicle NVH performance optimization, are not directly correlated with simultaneous optimization of the three core metrics of vehicle power, fuel consumption, and emission. The pulse control engine 101 PWM pulse sequence period, high and low transition time, power adjusting granularity and so on are all defined by software and dynamically adjustable, capable of effectively avoiding ACE heavy truck 010 pulse control engine 101 operation (especially high and low-state bidirectional switching) producing additional mechanical vibration and noise, especially system mechanical resonance, dynamically optimizing the actual NVH performance of the pulse control engine and ACE heavy truck. And for the battery 130*a*&*b*, although the battery pack charging-discharging does not have any mechanical movement and the transition time is in ten millisecond level, the battery pack charging-discharging switching transition time synchronous with the high-state and low-state switching of the DPC engine is controlled at one-second level but not ten-millisecond level, it is good for reducing electromagnetic interference (EMI).

Figure 3:
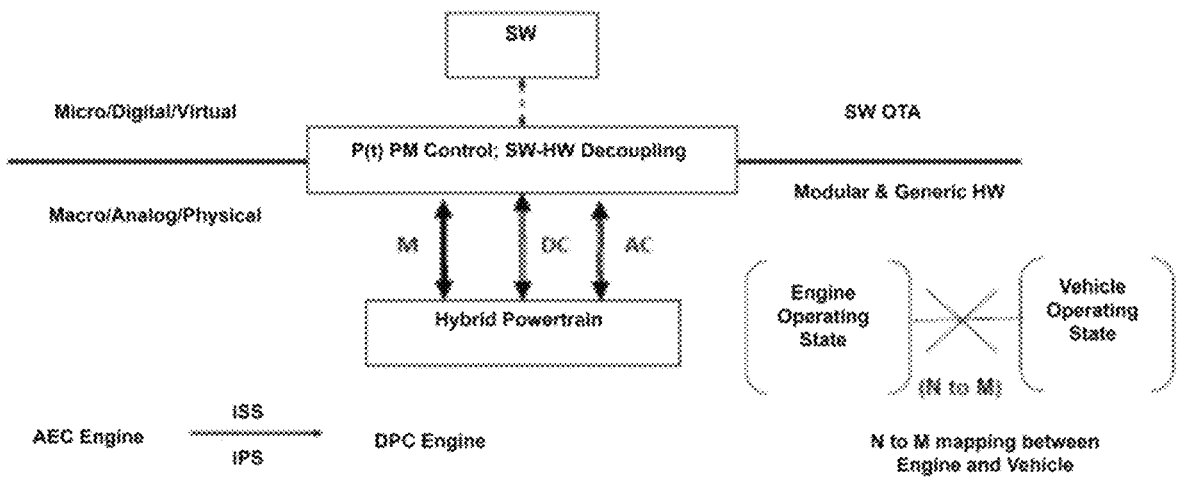
FIG. 3 shows a functional diagram of a software defined mixed hybrid powertrain of an ACE truck according to one embodiment of the present disclosure.

It should be emphasized that the current technology (prior art) volume-production heavy-truck engines of the world are ALL (i.e., 100%) analog-electronic-control (AEC) engines; The digital pulse control (DPC) engine of the current invention and a prior art AEC engine have no intrinsic difference in hardware and calibration software (Calibration Firmware), the two can even be completely the same physically (identical engine universal characteristics map); the intrinsic difference between the two (DPC vs AEC) is concentrated on the power management strategy (i.e., VCU software algorithm) at the powertrain system or the vehicle layer, namely the specific control measures of the instantaneous power time-variant function of the engine 101 are different, the operating-condition point distributions of the two engines are different (AEC engine with complex surface working-condition; while DPC engine with simple predetermined line working-condition), the resulting engine instantaneous power function time-domain distribution characteristics are different, the instantaneous power function of the current technology analog electronic control (AEC) engine is a time-domain second-level slow-changing continuous analogue function, the function value is non-negative (excluding the special working-condition of engine braking), correspondingly the AEC engine is operated in the complex surface working-condition in the 1st quadrant (of the fuel map); while the instantaneous power function of the digital pulse control (DPC) engine of the invention is time-domain bipolar non-constant-amplitude pulse sequence function, the function value can be positive or negative, most of the time in each pulse period is slow-varying continuous function, but may occur one or two hundred-kW-level bidirectional sudden jumps between high-state (positive) and low-state (negative) bidirectionally, corresponding digital pulse control engine operating on the operating-condition simple lines in the 1st quadrant or the of 4th quadrant (of engine map). In other words, any model of the analog electric control (AEC) engine used by the manufacturer can keep its hardware unchanged and be converted into a digital pulse control (DPC) engine by hybrid vehicle layer VCU 201 of supervisory control software only (series-hybrid iSS or parallel-hybrid iPS). Obviously, any conventional internal combustion engine vehicle cannot support the digital pulse control (DPC) engine application. The essential hardware foundation of a digital pulse control engine includes a hybrid powertrain with at least one high-power large electric motor (series-hybrid; parallel-hybrid; mixed-hybrid). In the prior art series-hybrid or parallel-hybrid vehicle technology, analog electronic control (AEC) engine can realize multiple-to-multiple bidirectional mapping between the engine working-condition and the vehicle working-condition, but the interactions between engine working-condition and the vehicle working-condition cannot be ignored, the two cannot be completely decoupled, Therefore, the analog electronic control engine of the hybrid vehicle still works at the complex surface working-condition in the 1st quadrant of the universal characteristics curve, only the working-condition point distribution number (or running time probability) inside the combustion high-efficiency zone is higher than that of an analog electronic control engine of a traditional vehicle. Referring to FIG. 3, the present invention through series-hybrid iSS or parallel-hybrid iPS control strategy, the engine 101 of the ACE heavy truck 010 is transformed from a traditional analog electric control (AEC) engine into a novel digital pulse control (DPC) engine. In the engineering sense, no matter under the series-hybrid or parallel-hybrid architecture, the working-condition of the DPC engine 101 is completely decoupled from the working-condition of the vehicle 010, and such powertrain system also realizes hardware generalization & abstraction, as well as software and hardware decoupling, so as to realize the software defined hybrid powertrain. Both the hardware function and the vehicle performance of the mixed-hybrid powertrain have redundancies, hardware (engine 101, dual-motor 110&140, etc.) can be generalized or abstracted (Generic or Abstract HW). In the real driving environment (RDE), the three core metrices of power performance, fuel consumption, and emission of the hybrid powertrain are completely and dynamically defined and controlled by VCU 201 software and are basically independent from the specific hardware configuration of ACE heavy truck (especially the performance and price of the engine 101 and dual-motor 110&140). It can achieve "thousand-vehicle thousand-face", ensuring any ACE heavy truck (original equipment new vehicle or retrofit used vehicle) under any working-condition is better than any top-of-the-line 16 L diesel truck of similar vintage in vehicle power, fuel consumption, and vehicle emission.

Every volume-production modern engine (engine meeting US EPA-2010, Europe-VI, GB-6 emission regulations) is an integration of hardware-software including hardware of the engine 101 (engine body and after-treatment system) and ECU 102 hardware and calibration software (Firmware), corresponding to the unique engine universal characteristics curve. Obviously, the hardware of the engine with the same type can be provided with different calibration software to generate engines with different models (or types); the mass-production modern engine must meet the emission regulations steadily and reliably throughout its effective life cycle (Useful Life) of the 700K kM (about 435K mile). Once an engine model passes the governmental emission compliance certification and enters volume production, the hardware and calibration software cannot be changed without authorization. Even if the engine hardware is not changed, only the calibration software is modified, then such engine must go through the government's emission re-certification, otherwise, it is illegal. The existing vehicle technology (internal combustion engine vehicle or hybrid vehicle) uses the unique and fixed universal characteristics curve of a mass production analog electronic control engine (i.e., complex surface working-condition characteristics) to adapt to many different actual working-conditions of the vehicle, it is extremely difficult to achieve thousand-vehicle thousand-face via agile customization of the powertrain control strategy to optimize the three core metrices of vehicle power, fuel consumption and emission.

The government mandatory emission certification of global passenger vehicles (road vehicles with a total weight of less than 3.5 tons) is commonly used in the mode of "vehicle-engine combination" (i.e., the engine plus vehicle chassis to be certified together), and the large commercial vehicle (total weight over 6 tons of on-road or non-road vehicle) of the emission certification generally adopts the "vehicle-engine separation" mode (only the engine is certified on a dyno, vehicle chassis not included); In other words, the engine after the same emission certification can be adapted to various types of large commercial vehicles, and each vehicle does not need to redo the emission certification. Referring to FIG. 6, each volume-production engine has a specific hardware and firmware (Firmware, that is, calibration software), corresponding to a fixed engine universal characteristics curve; obviously changing the engine hardware will change the universal characteristics curve; only changing the engine calibration software can also change the universal characteristics curve of the engine. From the perspective of VCU 201 to control the powertrain, engine 101 and dual-motor 110&140 can be abstracted to be actuators of to provide the vehicle driving torque. The invention through series-hybrid iSS or parallel-hybrid iPS control method can convert the analogue electric control engine into a novel digital pulse control engine, the actual operating condition of the engine 101 can be greatly simplified from the complex surface working-condition of the former (AEC) into the latter (DPC) with at least two pre-determined working-condition simple lines (high-state or low-state) in the generalized high-efficiency zones, its functions are analogous to driver programs of each hardware subsystem in a computer system (Driver); and the intelligent cruise control method iCC of the invention, the VCU 201 according to the configuration parameters and dynamic operation data of ACE heavy truck 010 (including vehicle speed, location, posture and so on), vehicle MU 240 memory of hundreds-mile level electronic horizon 3D road data, combining the vehicle dynamics equation (1-1), quasi real-time (sub-second time delay) dynamic calculation of the ACE heavy truck future hour-level road-load power time-variant function distribution (relative error 5%), then dynamically adjusting the working-condition of the engine 101 according to the series-hybrid power equation (2-4) or the parallel-hybrid power equation (3-3) and the instantaneous power distribution between the engine 101 and the battery pack 130$a\&b$; the average power (see equation MAW) between the engine and the battery pack to dynamically adjust the average charge state function (SoC) of the battery pack, finally the expressway operation design domain (ODD) of ACE heavy truck 010 operation of energy saving and emission reduction optimization problem can be converted into the equivalent AI problem of computer playing Go. The energy-saving and emission-reducing algorithm of VCU 201 can keep ACE heavy-truck power performance superior to all volume-production diesel truck, at the same time to realize the simultaneous minimization of vehicle actual (RDE) fuel consumption (CO2) and pollutant emissions (NOx, PM), like an application program (App) In a computer system.

The main chip of the VCU 201 is preferably 32-bit automotive-grade multi-core embedded processor, the main frequency is higher than 100 MHz, the security level is at least ASIL-C, megabyte level flash memory, supporting multiple or multi-path data bus (at least two CAN buses); It also can select the mature low-cost 16-bit automotive grade processor, but at this time limited by the chip performance upper limit, the system has poor performance upgradability, the performance-to-price ratio is good; The 64-bit automotive grade processor can be selected for future production, the hardware is obviously overequipped, the future upgradability is strong, but such chip is expensive, the performance-to-price ratio is good (not the best). VCU 201 running the iSS, iPS, iCC control programs in its memory, through the CAN bus to command engine 101, motor 110&140, battery 130$a\&b$ transmission box 150, 111 clutch so on to collaborate dynamically, realizing the series-hybrid iSS, and parallel-hybrid iPS, and intelligent cruise iCC functions.

The pulse control engine 101 (series-hybrid iSS or parallel-hybrid iPS) several embodiments discussed above, describing how to effectively decouple ACE heavy truck working-condition from engine working-condition, so as to realize software defined hybrid powertrain; Next will be further described how to utilize vehicle-mounted 3D electronic map (MU) 240, a vehicle-mounted satellite navigator (GNSS) 220, and cloud computing platform 001 (see FIG. 5) (e.g., cloud computer servers) stored ACE heavy-truck operation structured data (Data Set), combining the fuel-saving machine learning (ML) algorithm and cloud computing, training cloud-end of vehicle-end fuel-saving AI brains, implementing the intelligent cruise control technology (iCC) on the ACE heavy truck along the same traffic lane of the expressway, realizing the beneficial effects of the optimization of the ACE heavy truck energy saving and emission reduction simultaneously.

In some embodiments of FIG. 1, the ACE truck is provided with a map unit (MU) 240 and a satellite navigator (GNSS) 220. The map unit 240 is pre-stored with a prior three-dimensional electronic map (so called the 3 D map) covering the national expressway and other main closed (controlled access) roads; The 3 D map information includes but is not limited to: describing the longitude and latitude of the absolute position of the ego-vehicle, and especially displaying the road longitudinal grade (such as the uphill angle $\alpha$ and the downhill angle $\alpha$ d shown in FIG. 5) information. For example, as shown in FIG. 1 in the vehicle-mounted map unit 240 memory may include road meter level or ten-meter-level precision absolute geographical positioning (latitude and longitude) and road longitudinal slope 0.1 degree precision of the 3 D map, many kinds of advanced-driving-assistance-system (ADAS) map containing the road three-dimensional information are already in volume production and commercial use in global major automotive markets; the high definition map (HD Map) capable of supporting the autonomous driving system of L3 or L4 has also entered the preliminary commercial stage; In the description of the present invention, the ADAS map should be broadly understood as including an HD map.

Satellite navigator (GNSS) 220 is used to measure in real time the current absolute geographical position of longitude, latitude, altitude, longitudinal road slope, longitudinal speed, longitudinal acceleration, system absolute time of vehicle positioning and operating condition data of the ACE heavy truck 010. In some embodiments, it can be a GNSS 220 with real-time kinematic (RTK) technology of double-antenna input of satellite navigator (RTK receiver for short). The ACE heavy truck can be accurately located and measured in real time at a measurement speed of more than five times per second (i.e., the measurement refresh frequency is higher than 5 Hz). The International Satellite Navigation System (GNSS) currently has four independent systems, US GPS, Russian Glonass, European Union Galileo, and China's Bei Dou (BD). At present, the BD No. 3 can provide the latest satellite navigation service for the Asia-Pacific region with China as the core and the "one path" along the line, and the global networking coverage is just completed by 2020; At the same time, China's BD system has signed a compatible agreement with other three satellite navigation systems. Preferably, the satellite navigator (GNSS) 220 containing the latest BD-3 RTK chip is matched and installed on two satellite antennas positioned at least one meter apart on top of the heavy truck cab, real-time dynamically measuring the time-reference service of the vehicle, speed, position (longitude/latitude), and the longitudinal attitude (i.e., road longitudinal slope angle). The RTK chip can receive the independent signal of the four navigation satellites according to any combination of the GNSS four large system, finishing the satellite navigation positioning and measuring the measuring posture, the time-reference service precision is 50 nanoseconds, the speed measuring precision is 0.2 meter/second, the horizontal latitude and longitude locating precision is less than 2.5 meters, the road longitudinal slope precision is less than 0.15 degrees, the measuring frequency is 10 Hz; The RTK navigator has difficulty to accurately calculate the vertical altitude of the road surface under the vehicle wheel in real time; at the same time, many countries in the world, have strict controls on the mapping and distribution of the precise altitude information; The invention has low requirement for measurement precision of absolute altitude of vehicle road surface, 10 meters precision is acceptable; but the measuring precision of the road longitudinal slope must be very high, the vehicle road longitudinal slope measuring precision should be better than 0.2 degree. In some embodiments, it also can adopt single-antenna satellite navigation receiver adding inertial navigation unit (IMU) to finish the vehicle three-dimensional positioning and navigation; Based on a plurality of micro-electromechanical systems (MEMS) acceleration sensors and a gyroscope (Gyro) special processing chip, the automotive grade output IMU can measure the longitudinal slope function of the front road of the ACE heavy truck in real time with the measuring frequency higher than 10 Hz and the measuring precision better than 0.2 degrees. The GNSS 220 in the present invention should be understood to be either a dual-antenna RTK receiver, or a single-antenna satellite navigator plus inertial navigation IMU. In ACE heavy truck high-speed driving, road longitudinal slope function 0.1 degree level small change will trigger ten KW-level longitudinal slope power function change, this is the secret source of ACE heavy truck fuel-saving and emission-reducing; so using GNSS 220 real-time accurately measuring expressway slope distribution function along the way, then adding map unit (MU) 240 stored electronic horizon firstly checking the 3 D information, it is important to realize the invention; It should be emphasized that the road longitudinal slope measuring precision of GNSS 220 and its measuring and refreshing speed are significantly higher than the traditional longitudinal slope sensor provided by the heavy truck automatic transmission box in the prior art.

Each ACE heavy truck's actual fuel consumption of one freight event (the freight from start point to the end point) are highly correlated with the configuration parametric constants of each important subsystem of the heavy truck (including each parameter of the hybrid powertrain, vehicle drag coefficient, coefficient of friction and so on), the discrete variable of the vehicle total weight (traction head, payload, truck trailer), the two continuous variables of longitudinal speed and acceleration, the three continuous variables of the longitude and latitude of the travel path, and the longitudinal slope distribution function, and other parameters or variable; and is substantially independent of macroscopic average fuel consumption including all the ACE trucks on all roads. ACE heavy truck driver, before starting can input the starting point and end point of the freight event, then ACE heavy truck can automatically plan the travel path of the freight event, and request the cloud 001 artificial intelligence (AI) fuel-saving brain, reference cloud storage of all historical data stored regarding the section running of ACE heavy truck operation of the fuel-saving data set, real time calculating and downloading the vehicle and specific path customized by default (Default) the best fuel-saving control strategy, then combined with the vehicle-side AI inference chip (contained in the VCU 201) for local calculation, real-time modifying and optimizing vehicle fuel-saving strategy, the ACE heavy truck intelligent cruise control (iCC), realizing expressway with predictive power control and self-adaptive cruise control function of the same lane L1 level autonomous driving function; each ACE heavy truck, no matter whether the driver has the driving experience of the specific freight line, can rely on collective experience and wisdom of all ACE heavy truck, each time consistency can realize the best fuel consumption of the industry, compared with the actual fuel consumption of modern internal combustion engine heavy truck can be reduced by 30%, and the energy-saving and emission-reducing effect is decoupled with the skill level of the driver and the performance of the engine 101, and it is better than all human drivers.

ACE heavy truck 010 can automatically collect, marking, storing at the vehicle end, uploading the fuel-saving data set of the entire freight event to the cloud platform, the fuel-saving data set comprises the overall dynamic operation data of an ACE vehicle 010, an engine 101, a transmission box 150, a generator 110, a traction motor 140 or 170, a battery pack 130a or 130b, a clutch 111, a satellite navigator (GNSS) 220, the configuration parameters of the key subsystems, such as the electric power divider (ePSD) 123 in the whole freight event. The special structured big data about ACE heavy truck energy management, is the "petroleum of data" of the machine learning (ML) algorithm for training and continuously evolving ACE heavy truck; The structured big data is called fuel-saving data set for short.

One of the core content of ACE heavy truck 010 fuel-saving data set is the electric power divider (ePSD 123) of the operational big-data, including the following contents: sampling and recording frequency of at least 5.0 Hz, using the precise time of satellite navigator 220 (10 nanosecond absolute precision) to calibrate and synchronize all the clocks of other vehicle-mounted subsystem microprocessors, as the unique system clock reference of the whole vehicle system; At each sampling time point $t_i$, each microprocessor of the ACE truck directs the relevant sensor to locally collect and store at least one or more of the following variable values: ACE heavy truck 010 the current longitude $L_{lg}(t_i)$, latitude $L_{lat}(t_i)$, slope $G_d(t_i)$, longitudinal vehicle speed $v(t_i)$, longitudinal vehicle acceleration $a(t_i)$, generator 110 of DC current $I_g(t_i)$, the total DC current $I_m(t_i)$ of the traction motor 140&170, the total DC current $I_{bat}(t_i)$ of the battery 130a&b, DC bus junction point X DC voltage Vbus $(t_i)$, the respective state-of-charge (SoC) $C_{bat}(t_i)$ of the battery 130a&b, the DC current $I_{bx}(t_i)$ of the brake resistance 131, the external environment temperature $T(t_i)$, the environment wind speed and the wind direction $v_{xyz}(t_i)$; it can also locally sample and store, at the sampling point $(t_i)$, the dynamic operational data of main time-variant variables of each motor (generator 110, primary traction motor 140, secondary traction motor 170), engine 101, automatic transmission 150, such as rotating speed, torque, gear, fuel injection rate (g/second), specific fuel consumption (g/kWh) and so on; it can also collect and store the instantaneous amplitude value, pulse period, duty ratio and so on of the DPC engine 101 (series-hybrid iSS or parallel-hybrid iPS) instantaneous t mechanical power PWM pulse sequence function at sampling point $t_i$, and battery 130$a$&$b$ (series-hybrid iSS or parallel-hybrid iPS) instantaneous electric power PAM or PWM pulse sequence function, at sampling point $t_i$, the instantaneous amplitude value, pulse period, duty ratio and so on data. It needs to emphasize, fuel-saving data set of the ACE heavy truck must use the hybrid ACE heavy truck system device and a pulse control engine technical solution (series-hybrid iSS or parallel-hybrid iPS) disclosed in FIG. 1 to collect and store simultaneously and holistically; it cannot be created by synchronizing and combining distributed data afterwards (time-division, place-division, sub-system, or sub-vehicle).

For the initial training and subsequent continuous improvement of cloud or vehicle end fuel-saving artificial intelligence (AI) model, it can adopt multiple open source or proprietary machine learning (ML) algorithms and buy-as-needed network cloud computing services, combined with the fuel-saving data set to complete the model set-up, training, and optimization of fuel-saving algorithm deep neural network (DNN). The fuel-saving data set of ACE heavy truck operation is non-public and proprietary, the more the data accumulation is, the more its value will become, analogous to petroleum of data; The invention can continuously reduce cost and increase the efficiency of the long-haul freight enterprises using the invention of ACE heavy truck, continuously improve and keep the competitive advantages for a long time. In some embodiments, the ACE heavy truck 010 vehicle controller (VCU) 201 may be configured to: based on the pre-stored in the map unit 240 the prior 3 D map on the freight event along the electronic horizon (meter level interval, meter-level or ten-meter-level earth geographical absolute positioning precision), longitudinal road grade ("longitudinal slope", 0.1 degree precision) and other road information, and/or based on the longitude, latitude and altitude of the position of the vehicle estimated by the satellite navigator (GNSS) 220, longitudinal slope and other dynamic data, or based on the configuration parameters of ACE heavy truck 010 and key subsystem dynamic operating data, according to the vehicle dynamics equation (1-1) to predict in real-time (sub second level) the vehicle road-load power function time sequence value (kW precision) and fuel-saving AI algorithm, to implement predictive dynamic power control independently to at least one of the following subsystems, comprising an ePSD 123, an engine 101, a generator 110, a traction motor 140 or 170, a clutch 111, a transmission-box 150, and the battery pack 130$a$ or 130$b$, under the premise of ensuring the vehicle propulsion power and safety, pursuing simultaneous minimization of the ACE heavy truck actual fuel consumption and pollutant emissions.

Alternatively or additionally, VCU 201 can perform second-level time average operation or other noise reduction filtering measures to the measured longitudinal slope time-varying function to improve the precision and robustness of such longitudinal slope function measurement; when the absolute value of the deviation between the prior road information pre-stored in the 3 D map in the map unit 240 and the road information measured by the satellite navigator (GNSS) 220 exceeds the allowable tolerance range, especially as one of key information of the fuel-saving ML algorithm, when the absolute value of the deviation of the current longitudinal slope data of the vehicle exceeds the allowable tolerance range, then the VCU 201 can firstly use the longitudinal slope data measured by the GNSS 220 to control the instantaneous power distribution among the ePSD 123 three ports, in real-time satisfying vehicle dynamics equation (1-1). If the speed of acceleration of the vehicle is obviously deviated from the control expected value, then the real situation is actually measured data of the GNSS 220 is wrong and the prior data of the 3 D map is correct. VCU 201 can, according to the instantaneous power distribution parameters of the ACE heavy truck ePSD 123 three ports, vehicle 010 longitudinal line speed and acceleration, combining the vehicle dynamics equation, make judgement call based on vehicle-in-the-loop (VIL) simulation that the vehicle three-dimensional electronic map is correct, realizing the functions of ACE heavy truck positioning attitude measuring automatic error detection or error correction.

GNSS adopts double-antenna RTK receiver scheme, a rather complex system with excellent performance but high cost. Of course, to reduce the system cost, one can also select single-antenna of the common satellite navigator 220, at the same time selecting a single-axis or multi-axis dynamic inclination sensor (measuring precision is better than 0.15 degrees; the measuring range is over positive and negative 15 degrees. An inertia measurement unit (IMU) with a refresh frequency higher than 5 Hz is used to measure the absolute positioning (longitude/latitude) and the road longitudinal slope of the running vehicle in real time, the dynamic slope sensor is provided with multiple realizing methods; One of the high performance-to-price ratio embodiments is an acceleration sensor (Accelerometer) of an automotive grade micro-electromechanical system (MEMS) and a gyroscope (Gyroscope) is integrated with a dedicated chip. In several embodiments of the following, the exemplary explanation of VCU 201 is how to use vehicle dynamic three-dimensional positioning and orientation measurement navigation information (especially road longitudinal slope distribution function) to realize automatic predictive fuel-saving control. It is again pointed out that the following specific examples are not to be understood to limit the scope of the protection of the present disclosure, but are entirely for the purpose of better understanding of the present invention for those skilled in the art.

In some embodiments, the expressway in the range of hundred kM ahead of the vehicle has only short slope, the slope is less than the predefined second slope threshold (e.g., less than 3.0 degrees) and the length of the slope section is less than a predefined second length threshold (e.g., less than 10 kM, or even less than 2 kM), VCU 201 can adjust the instantaneous power PWM function and/or average power function of the engine 101 by series-hybrid iSS control mode or parallel-hybrid iPS control mode, realizing the battery pack predictive state-of-charge control function (PSC-Predicative SoC Control), enabling stable operation of the battery pack (130$a$&$b$) in CD, CS, or CI mode or dynamic switching among the three. This is especially suitable for the front road section with "short slope" (also referred to as "small slope") Scenes. Because the slope length is short (such as less than 2 kM), so before the battery pack 130$a$&$b$ discharged all the stored electric energy, the vehicle can climb to the slope top, in the subsequent downhill stage, it can quickly through traction motor 140 hundred-kW level regenerative braking power to recharge the battery pack 130$a$&$b$ again, recycling the kWh-level energy, just-in-time charging and discharging. Through this way, it can increase the electric energy turnover rate of high-power battery pack 130$a$&$b$ of limited capacity (10 kWh level), especially seeking to maximize the quasi-zero cost regeneration charge turnover rate and to minimize the high-cost engine charge turnover rate. Compared with the energy type battery pack (high volume/weight, high price), the performance-to-price ratio of the high-power battery pack is higher than the use of the energy type battery pack with large capacity of the hundred kWh. In the flat area or hill area of expressway, there is no long slope or high mountain (longitudinal slope absolute value is greater than 2.0 degrees; the slope length is more than 10 kM), it also can adopt intelligent mode switching (iMS), dynamic switching between series-hybrid iSS and parallel-hybrid iPS, the fuel saving machine learning algorithm to automatically explore and find the best fuel-saving control strategy for the specified path.

Returning to the reference FIG. 1, for considering the driving safety, in some embodiments. ACE heavy truck further comprises a millimeter wave radar module (mWR) 230 at front end of the vehicle to measure in real-time absolute distance and relative speed between the ego heavy truck and its leading-vehicle in front in the same-lane of the expressway; the frontal maximum detection distance of the long-distance millimeter wave radar (LRR) should exceed 250 meters, the horizontal viewing angle (FOV) range is: +/−10 degrees; The millimeter wave radar 230 may also include automotive grade short-distance large viewing angle radar (SRR), the maximum detection distance is 70 meters, the viewing angle range is +/−65 degrees. It can also adopt automotive grade front view monocular or binocular camera with processing chip, the maximum detection distance exceeds 250 meters, fusion with the front millimeter wave radar (LRR&SRR), enhancing the performance and system robustness of vehicle front end speed and distance measuring. If it is necessary to ensure the redundancy and robustness of the vehicle front vision speed and distance sensor system, it also can be added with a low-cost laser radar (LIDAR) with small horizontal view (FOV+/−10 degrees) more than 16 lines, the farthest detection distance should be more than 200 meters. The present disclosure in FIG. 1 of the millimeter wave radar R230, it should be understood as any combination of a plurality of multiple sensors (millimeter wave radar, laser radar, camera) to performance the three kinds of measurement, tracking, or identifying the vehicle around, especially the front object detection, relative speed, or absolute distance.

In some embodiments, the heavy truck further comprises a vehicle wireless communication gateway (T-Box) 210, through the third generation/fourth generation/fifth generation (3 G/4 G/5 G) cellular mobile communication network 002 (see FIG. 5), the heavy truck 010 and cloud computing wide area wireless or wired network platforms 001, it also can support C-V2X (vehicle-road, vehicle-vehicle, vehicle-network, vehicle-human and so on) real-time communication.

VCU 201 can, through vehicle data bus (such as CAN bus), communicate unidirectionally or bidirectionally in real-time a plurality of vehicle-mounted sub-systems including a satellite receiver 220, millimeter wave radar 230 and dynamically control any combination of vehicle mounted modules or sub-systems including an engine 101 and its control module (ECU) 102, generator 110, clutch 111, electric power divider ePSD 123 (containing MCU1 121, MCU2 122a, MCU3 122b, voltage control switch (VCS) 133, choppers 132a&b), battery 130a&b, traction motor 140 and 170, automatic transmission box 150 and transmission box controller (TCU) 151, map unit 240, through multi-module real-time dynamic cooperation of the "symphony style", realizing the ACE heavy truck in the same lane of the expressway intelligent cruise control function (iCC), namely SAE L1 or L2 level autonomous driving function, freeing both feet of the driver, reducing the driving work intensity, at the same time, optimizing the power performance, energy saving and emission reduction of the vehicle, and ensuring the vehicle actual exhaust-gas pollutant emissions to meet the regulations stably (GB-6, Euro-VI, EPA-2010) in the period of validity of the after-treatment system for 70 million kM. VCU 201 can effectively utilize the hundred-kilometer level electronic horizon three-dimensional road information, through the accumulation of kilometer granularity road section of ACE heavy intelligent cruise control (iCC), under the premise of ensuring the vehicle power, to achieve the minimum comprehensive fuel consumption of the whole journey of the vehicle.

In addition, ACE heavy truck on the closed expressway driving, can also turn on or close intelligent cruise control (iCC) function by the driver, combined with the volume-production advanced auxiliary driving system (ADAS), realizing SAE L1 or L2 level autonomous driving function, basically freeing up both feet of the driver and reducing the driving work intensity; The iCC function can be enabled in both expressway ODD and non-extreme weather (no heavy rain, heavy snow, hail, flood and so on).

In some embodiments, the intelligent cruise control (iCC) can include the following three sub-modes: 1) normal model N; 2) fuel-saving Eco mode; and 3) high-performance model P (Power Mode).

For example, the total weight of a passenger vehicle is less than 3.0 tons, the maximum propulsion power can be 125 kW; however, a fully loaded heavy truck has a total weight of 40 tons, but the maximum propulsion power of the European and American mainstream heavy truck is less than 400 kW. Obviously, the heavy truck unit-weight propulsion-power (kW/ton) is far less than that of a passenger vehicle; in other words, the acceleration performance of the heavy truck is much lower than the passenger vehicle; at the same time, the emergency brake distance of the heavy truck is far longer than that of the passenger vehicle. The dynamic driving characteristics the two vehicle types are very different. When the heavy truck is running on the non-congested expressway, it is challenging to keep a constant speed up of down the longitudinal slope of more than 2.0 degrees, and it is difficult to keep a constant distance following the leading passenger vehicle (in the same lane); if the constant speed were to be maintained, the heavy truck is going through equivalent active acceleration or braking each time of the uphill fueling or downhill braking, resulting in increased fuel consumption and emissions of the engine. ACE heavy truck when entering the intelligent cruise control (iCC) in the expressway operation design domain (ODD), according to the vehicle cruising speed $V_c$ set and sub-mode selected by the driver, reasonably setting the upper limit and lower limit of the cruising speed-band, and controlling the vehicle speed inside the cruising speed-band; the emphasis of the three iCC sub-mode are different, common mode (N) covers both fuel-saving and freight time; The fuel-saving model (Eco) elevates fuel-saving over freight time (that is, it can drive slowly but must save fuel); High performance model (P) emphasizes freight time over fuel-saving (i.e., it can consume more fuel but must be fast). Preferably, the upper and lower limit values of the cruising speed band of each of the following iCCs model can be selected:

Common model (N), cruise vehicle speed $(1.0-0.05)$ $V_c<V<(1.0+0.05)$ $V_c$ and not higher than 103% of the legal highest speed of the road section; under the fuel-saving model (Eco), cruise vehicle speed $(1.0-0.10)$ $V_c<V<(1.0+$ 0.05) $V_c$ and not higher than 103% of the legal highest speed of the road section; high performance model P), cruise vehicle speed (1.0−0.03) $V_c$<V<(1.0+0.03) $V_c$ and not higher than 105% of the legal maximum speed of the road section. For example, if the speed of the heavy truck cruise control is set too narrowly (such as the upper and lower floating rate is less than 2%), it is not good for heavy truck energy saving and emission reduction optimization.

The VCU 201 can be combined with the current road 3 D information (latitude and longitude, longitudinal slope) and the electronic horizon 3D information such as the longitudinal slope distribution function and curvature and three-dimensional information stored in the map unit 240 (especially the front kM level road section), in real-time (hundred milliseconds time delay) calculating and adjusting the adaptive cruising safe vehicle-following-distance time-variant function $L_s$ (t) (safe distance function in short). Different from the passenger vehicle adaptive cruise control; the front kM-level road longitudinal slope function distribution has great influence on the real-world acceleration (i.e., power & gradability) or deceleration (i.e., brake effectiveness) of a high-speed ACE heavy truck. Passenger vehicle, because the unit-weight propulsion-power (kW/ton) and brake power is multiple times higher than that of a heavy truck, it is not necessary to dynamically adjust the safe vehicle tracking distance Ls according to the vehicle front road longitudinal slope distribution; but the dynamic adjustment of Ls is very important to the ACE heavy truck driving safety under any iCC sub-mode. The safe vehicle-following distance Ls can be subdivided into three specific distances: L1 is a preliminary warning distance (Alert Distance), L2 is a warning distance (Warning Distance), L3 is an emergency braking distance (Emergency Braking Distance), wherein L1>L2>L3. VCU 201 can according to the vehicle configuration parameters and driving condition data (such as vehicle total weight, vehicle speed and so on), real-time weather condition (wind, rain, snow, ice, temperature and so on), and vehicle electronic horizon road data (longitude, latitude, longitudinal slope and so on), combining the vehicle dynamics equation (1-1), dynamically calculating the three following distance functions L1, L2, or L3 at a refresh frequency higher than 10 Hz with meter-level precision. Obviously, the safety distance function and the instantaneous speed of the ACE heavy truck; the longitudinal slope function of the front public-level road section, the vehicle weight and other known data are highly and positively correlated; on flat road section without long slope or mountain, fully-loaded truck running at 60 miles/hour speed, alert distance L1 is about 250 meters, warning distance L2 is about 150 meters, emergency braking distance L3 is about 60 meters; Obviously, the higher the total weight of ACE heavy truck or the higher the vehicle speed, then the longer the three distances (L1, L2, L3) should be.

Under expressway condition, ACE heavy truck mainly adopts parallel-hybrid iPS control; when the safety distance function of the ACE heavy truck 010 $L_s$=L1 and the relative speed v is more than 0 (representing continuously shortening the following distance between the ego-vehicle and leading vehicle), VCU 201 provides alert prompt through at least one of the sound, vision, tactile and other physical signals, immediately (0.1 second time delay) the instantaneous power PWM pulse sequence duty ratio of the DPC engine 101 is reduced to less than 50%, reducing the average power function value of the engine, the vehicle propulsion is mainly by the battery pack, the engine is auxiliary, making the battery 130a&b to work at the charge sustaining mode (CS) or the charge depletion mode (CD) and preparing for the fast (ten millisecond level time delay) regenerative braking; when the safety distance function $L_s$=L2 and the relative speed v is more than 0, VCU 201 gives higher intensity waring prompts through at least two of the sound, vision, tactile and other physical signals simultaneously, immediately (ten millisecond time delay) the instantaneous power PWM pulse sequence duty ratio of the DPC engine 101 is reduced to 0% (zero), the engine enters the passive model (POM), the average power function value of the engine is a negative number; turning the DPC engine 101 into the mechanical load of generator 110, the battery pack 130a&b working in charge sustaining mode (CS) or charge depletion mode (CD) and providing all vehicle driving electric power, can use the ability of fast switching between the hundred-kW level propulsion power or regenerative braking power in the ten-millisecond level response time of the motor 140 and battery 130a&b in maximum effort to keep the vehicle distance $L_s$ between the warning distance L2 and the emergency braking distance L3, and immediately implementing emergency brake preparation; when the safety distance function $L_s$=L3 and the relative speed v is more than 0, VCU 201 gives the highest intensity emergency brake prompts to the driver through active acoustic, vision, visual, tactile and other physical signals simultaneously at the, maintaining DPC engine 101 in the passive mode (the PWM duty ratio is zero), and the self-braking function of the engine is immediately turn on; the engine average power function value is a negative number, after second-level time delay, the engine braking power can reach hundred-kW level; and immediately implementing (ten millisecond time delay) emergency brake assistance of the dual-motor 110&140 with total peak regenerative braking power near 500 kW; at the same time, it also can be started (sub-second time delay) a megawatt mechanical brake emergency brake; the motor regenerative braking and engine braking are emergency brake auxiliary functions, both are non-friction braking and their combined brake power is not enough to stop a heavy truck driving at high speed, however it (non-friction brake) will not cause the driving wheel to lock or to trigger the vehicle to be out of control; it is the fast redundancy supplement to the ACE heavy-truck mechanical braking system, it obviously improves the brake effectiveness of ACE heavy truck significantly. Double motors (110, 140 or 170) have total 500 kW maximum regenerative braking power, for high-speed full-load truck, only enough to satisfy auxillary braking deceleration requirement of less than 0.1 G (G=9.8 M/S$^2$). In case of emergency, the friction-type mechanical braking system (megawatt level) of the heavy truck must be started by stepping on the brake plate by means of the driver or by ADAS system, so as to realize the emergency braking of the deceleration exceeding the 0.2 G; the response time of the driver plus the response time of the heavy-truck mechanical brake (pneumatic brake) system is more than 500 milliseconds; while the system response time of the ACE heavy truck from the hundred-KW propulsion power to the hundred-kW regenerative braking power can be within 25.0 milliseconds, its reaction speed is at least one order of magnitude faster than the reaction speed of the traditional heavy truck mechanical braking system, it can make the vehicle decelerate faster and more safely (without locking wheel), the power regenerative braking system and the mechanical braking system are independent from each other; ACE heavy truck motor regenerative braking function, which not only improves the comprehensive brake performance of the vehicle, but also provides the safety redundancy. The above-described dynamic control of vehicle cruising speed-band or multi-technical measure set of the safe vehicle-following distance is referred to as intelligent cruise control (iCC) technology or function; Obviously, the intelligent cruise control (iCC) of the invention is fundamentally different from the prior art adaptive cruise control (ACC) of passenger vehicles or traditional diesel heavy trucks in terms of the specific technical features or the technical effect. The ACE heavy truck of the invention is much better than with a modern European and American top-of-line 16 L diesel engine heavy truck in vehicle power performance, energy saving and emission reduction, brake effectiveness, and system safety & redundancy and so on.

The intelligent cruise control function (iCC) of the ACE heavy truck can be divided into two types. The first type is that there is no other vehicle 250 meters in front of the same lane of ego-vehicle, according to the fuel saving AI algorithm, the ACE heavy truck is controlled to travel within the set vehicle speed band without considering the three kinds of safe vehicle distances discussed above $L_s$; the second type is that when there are other vehicles within 250 meters in the same lane in front of the ego-vehicle; firstly, the ACE heavy truck is dynamically controlled according to the three kinds of safe vehicle-following distance $L_s$, secondly considering the fuel-saving AI algorithm. In other words; the priority or weight of the control algorithm or wire control signal related to the vehicle running safety is obviously higher than the control algorithm or wire control signal related to energy saving and emission reduction. The ACE heavy-truck intelligent cruise control technology (iCC) of the invention is compared with the traditional diesel heavy truck predictive adaptive cruise control technology (namely the existing technology), the most obvious difference point is through the DPC engine 101 (series-hybrid iSS or parallel-hybrid iPS), according to the vehicle positioning and posture measurement and electronic horizon 3D road information and fuel-saving AI algorithm, dynamically adjusting the safe vehicle distance L1/L2/L3 and implementing predicative SoC control (PSC) of battery pack 130*a*&*b*, ensuring the vehicle power performance, freight safety and timeliness, at the same time, optimizing the fuel consumption and pollutant emissions of the vehicle, achieving the beneficial effects of actual CO2 and NOx emission value simultaneous minimization.

The long-haul heavy truck will occasionally encounter the traffic jam, road repair, extreme weather, or traffic accident and other factors causing road congestion and city working-condition (average speed is less than 40 kmph, frequent active acceleration and deceleration), increasing the driver driving work intensity, vehicle fuel consumption and emissions. The congested expressway is one of the long-term "pain points" of the global on-road logistics industry, and the average traffic jam in China is more severe than that of the US, the average vehicle speed is lower (the China long-haul truck average speed is 60 kmph while the average speed of the US long-haul truck is 90 kmph). ACE heavy truck at this time can turn on of "intelligent following" function, such function can only be used on the closed road (such as expressway or elevated city road) at low speed (average speed is less than 40 kmph), not suitable for open city or suburban road. Using the front view radar (SRR) and camera 230, the closed congested road section, with the same lane front leading vehicle keeping set safe vehicle following distance L0, by VCU 201 directing ACE heavy truck to open clutch 111, the engine 101 adopting series-hybrid intelligent start-stop control (iSS), the battery pack is mainly controlled to operate at the charge sustaining mode (CS) or charge depletion mode (CD), relying completely on the primary traction motor 140 to realize vehicle frequent active acceleration or regenerative braking. The traction motors 140 or 170 can produce maximum torque output from the zero speed to the rated speed range, acceleration and brake performance of the ACE heavy truck is obviously better than the that of traditional heavy truck, can even be compared with that of a traditional light vehicle. At this time, the heavy truck brakes frequently and actively, it is very good for the hundred-kW regenerative braking to recover vehicle energy. Under the "intelligent vehicle following" mode, the ACE heavy truck can achieve over 30% real-world fuel saving against a conventional heavy truck, with much lower NOx emission and significant reduction of driver work intensity.

Loaded heavy truck running high-speed down a long slope (more than 10 kM), its mechanical brake system can suffer brake performance degradation (brake fade) or event complete brake failure. In March 2018, a toll station on Lanhai expressway in Lanzhou China, a loaded heavy truck lost its braking function because of overheating after going down-hill for almost 17 kM, smashed many passenger vehicles waiting in line, killed 17 people and injured 34. At present, the European regulations require the long-haul heavy trucks to have non-friction retarder. Although the heavy trucks in the United States and China are currently not under the mandatory requirements of the heavy-truck retarder, more and more heavy-truck owners choose to load the heavy-truck retarder. The volume production retarders, such as electric eddy current retarder, hydraulic retarder, and engine braking retarder, etc., all have their advantages and disadvantages. The electric eddy current retarder and the hydraulic retarder only have the retarder function, not participating in the vehicle driving, increasing the weight of the vehicle and costing more than ten thousand RMB, and the retarder effect is reduced significantly under low vehicle speed. The in-cylinder or out-of-cylinder engine brake retarder can have multiple functions in one machine, but the in-cylinder brake retarder makes large noise when working, the brake power is significantly lower than the peak power of the engine, and retarder effect is obviously reduced when the vehicle is at low speed. The invention Claims an ACE heavy truck powertrain, using parallel-hybrid iPS control, besides optimizing the beneficial effect of saving fuel and reducing emissions, it also can achieve 500 kW level retarder function through multiple motors (110, 140, 170) regenerative braking and engine 101 in-cylinder or out-of-cylinder brake for an ACE heavy truck running down a long slope, without the need to add any hardware, can completely replace the eddy current retarder or hydraulic retarder, with higher performance-to-cost ratio than all the prior art retarders.

When the ACE heavy truck 010 encounters long slope road section (slope absolute value greater than 2 degrees, slope length greater than 5 kM), downhill longitudinal slope power is sufficient to overcome the power of tire resistance and air drag to propel the vehicle constant speed downhill, the surplus longitudinal slope power can charge the battery via regenerative braking power of the electric motors (110, 140. 170) to recover vehicle energy, avoiding the vehicle continuously accelerating downhill or activating the mechanical brake to turn part of the remaining mechanical energy into heat energy waste, VCU 201 can direct the clutch 111 to close and lock, the vehicle is working under parallel-hybrid mode this time, now the engine 101 works at a special case of the intelligent power switching (iPS), namely the duty ratio of the DPC engine instantaneous power PWM pulse sequence is reduced to zero, entering the low load passive operation (engine braking function off) or high load passive operation (engine braking function on) of zero fuel consumption and zero emission low-state line working-condition, generator 110 and traction motor 140 or 170 can assist the regenerative braking power generation to recover the mechanical energy of the vehicle running downhill, charging the battery pack 130a&b through the ePSD 123; when the battery 130a&b is full (i.e., SoC=URL), the chopper 132a&b cut off the battery 130a&b, and the voltage control switch (VCS) 133 is switched from the off-state to the on-state, one-way electrically connected with the hundred-kW level brake resistor 131 as the effective electric load of regenerative braking electricity generation, converting the surplus electric energy into heat energy consumption. Under parallel-hybrid mode, the engine braking power and motor regenerative braking power can be combined, which can not only greatly improve the total power of frictionless retarder function, but also can provide two sets of mutually independent and redundant retarding systems, improving the active safety of ACE heavy-truck downhill driving. Regenerative braking can not only save fuel through near zero cost energy recovery, but also can greatly prolong the service life of the mechanical brakes, significantly reduces the full vehicle life-cycle mechanical brake system maintenance total cost of the ACE heavy truck 010. From safety considerations, when the ACE heavy truck is rolling down a long slope, no matter what the vehicle speed is, it should select parallel-hybrid mode and avoid series-hybrid mode.

The invention Claims an ACE heavy truck 010 hybrid powertrain system, through series-hybrid iSS or parallel-hybrid iPS control technology, capable of converting any modern volume-production AEC engine into a DPC engine, resulting in a full digital software defined powertrain system (SDPt); the necessary technical characteristics of the SDPt includes the decoupling of engine 101 working-condition from the working-condition of the vehicle 010 as well as the software and hardware decoupling of the powertrain system; In other words, so long as each hardware subsystem of the assembly system (e.g., engine 101, generator 110, clutch 111, traction motor 140, transmission box 150, electric power divider 123, battery 130a&b, etc.) meet threshold technical requirements, the three core technical metrices of RDE power, fuel-consumption, and emissions of the powertrain can be defined entirely by software and capable of dynamic-agile-customization to achieve thousand-vehicle thousand-face; the three core metrices are basically independent of the specific technical performance and price of engine 101, motor 110&140 and other hardware sub-systems. The various hardware sub-systems of the software defined mixed hybrid powertrain (SDPt) only need to meet some, minimum standards (that is, the hardware can be generalized and abstracted); hardware over-provisioning is neither beneficial nor harmful to the optimization of ACE heavy truck 010 powertrain, but it can improve the redundancy and future upgradability of the system. In particular, the potential limit of the three metrices can be increased substantially by provisioning the future volume-production enhanced transmission-box (maximum input torque over 3500 NM) and the matched drive-axle. ACE heavy-truck focuses on expressway ODD intelligent cruise control (iCC) function to optimize energy-saving and emission-reducing, which actually is 1D longitudinal SAE L1 level autonomous driving function, and has the upgrade potential to L2 level, L3 level, or L4 level autonomous driving function. ACE heavy truck equipped with the SDPt of the invention has system redundancy in vehicle propulsion, power supply, and brake; it is relatively to upgrade the environmental sensors, automatic steering-by-wire, autonomous driving AI chips and software to transform the L1 level ACE heavy truck into a SAE L3 or L4 level autonomous driving heavy truck; it is the preferred vehicle platform of future volume-production commercial L4 level long-haul heavy truck. L4 level ACE heavy truck future volume production and commercialization will have significant and lasting influence on the global long-haul heavy-truck industry, similar to the global mobile communication transition from feature phone in 2 G to smart phone in 3 G.

Industry experts agree that L5-level unmanned heavy trucks are very difficult to enter the global major market for commercial use before 2030. The autonomous driving heavy truck of SAE L1 to L4 must comply with the road vehicle functional safety standard ISO26262, reaches the specified automobile safety integrity level (ASIL safety level), the higher the level, the higher the system reliability and redundancy, ACE heavy truck 010 includes the system integration of traction motor 140 and 170, battery 130a&b, and ePSD 123, can achieve high-performance pure electric driving, regenerative braking to recover energy, automatic emergency brake auxiliary function (AEBA), and long downhill retarder function, adding a set of completely independent redundant power regenerative braking brake active safety system outside the traditional engine and mechanical brake system of the vehicle, at the same time, it further adds a redundant vehicle electrical propulsion system (engine and multiple electric motors) and redundant electric power supply. In other words, the ACE heavy truck 010 of the invention naturally has redundancy in propulsion system, brake system, steering system, and a multi-voltage power supply system, which is a preferred base vehicle platform for future development and mass production of the L4-level autonomous driving heavy truck in ODD of expressway. The invention Claims an ACE truck, under the premise of best-in-industry vehicle propulsion performance against any modern volume-production ICE heavy truck, can simultaneously optimize the three ultimate goals of the industry—safety, energy saving, and environmental protection at high performance-to-price ratio.

The ACE heavy truck of the invention, through the DPC engine (series-hybrid iSS or parallel-hybrid iPS), intelligent cruise control (iCC) and other technical features, can realize expressway ODD in-lane one-dimensional (1D) longitudinal SAE L1 autonomous driving function and achieve the beneficial effect of nearly 30% reduction in comprehensive fuel-consumption (L/100 kM) against a traditional diesel heavy truck, mainly by the hybrid powertrain technology, especially the electric power divider ePSD, full utilization of the electronic horizon 3D map prior data, vehicle dynamic working-condition data, then adding vehicle-cloud fuel-saving data-set and fuel-saving machine learning (ML) algorithm; Even if the human driver were to drive manually the ACE heavy truck (i.e., L0 level), it can still realize the fuel-saving rate near 25%, namely realizing about 80% of the energy saving and emission reduction optimization full potential; through the iCC function of ACE heavy truck to realize the high speed road ODD longitudinal L1 level autonomous driving, one can ensure that the comprehensive fuel consumption (up/100 kM) of each ACE heavy truck are highly decoupled from the technical grade and performance of the engine and the personal driving skill of the driver (meaning capability, road experience, and working attitude and so on), achieve actual fuel saving result and consistency to be much better than that of the human driver. The ACE heavy truck of the invention uses mature and volume-production key components and system integration technology, fuel-saving effect is substantial with high performance-to-price ratio, the trucking fleet does not depend on government subsidies, can achieve return on investment within 2.5 years only by actual fuel cost saving (i.e., the difference between the ACE heavy truck and the traditional diesel heavy truck), and double cumulative profit per truck in 5 years; The ACE Heavy Truck can achieve volume production and commercialization in North America within three years to retrofit the used heavy trucks. Other commercialized long-haul truck non-powertrain fuel-saving technologies, such as low rolling resistance tires, vehicle light weight, reducing the drag coefficient (tractor & trailer) and so on, can all be applied to the ACE heavy truck. It needs to be emphasized, different from the modern diesel heavy truck, the various non-powertrain fuel-saving technology can generate 1+1>2 of energy-saving and emission-reducing synergistic effects on the ACE heavy truck, and the better the low rolling resistance, light weight, low wind drag, the stronger the synergistic effects of ACE heavy truck; at the same time, because ACE heavy truck has the super capability of regenerative braking to recover energy, ACE heavy truck, in high performance model (P) or average cruising speed over 65 miles per hour (maximum legal speed in most US states), not only can improve the freight timeliness and ensure the actual fuel consumption is not increased, but also can further reduce the actual fuel consumption with high probability, effectively breaking the modern diesel truck freight timeliness (namely the highest cruising speed) vs fuel consumption zero-sum trade-off. It is estimated that around 2023, US volume-production retrofit ACE trucks can achieve fuel-saving rate over 20% against the 2019 vintage modern diesel heavy truck, the actual NOx emission value (g/bhp-hr.) is reduced by more than 50%, the vehicle propulsion performance and the brake performance are substantially improved.

Different from the prior art, the present disclosure FIG. 1 to FIG. 7 embodiments of ACE heavy truck 010, by a full digital software defined mixed-hybrid powertrain, by VCU 201 command, according to the configuration parameters and dynamic vehicle operating data (such as vehicle total weight, longitudinal vehicle speed and acceleration, the vehicle dynamic positioning and so on), combined with the map unit (MU) 240 electronic horizon prior 3D road data and machine learning (ML) fuel-saving algorithm (namely AI fuel-saving algorithm), by pulse modulation control (PM) of the instantaneous power function of DPC engine 101, including series-hybrid intelligent start-stop (iSS) or parallel-hybrid intelligent power switching (iPS), intelligent mode switching (iMS), and a non-clutch shift (CGS), dynamically and continuously adjusts the average power function value (equation MAW) of the engine; further by controlling the electric power distributor (ePSD 123) to dynamically adjust the flow route, direction, and amplitude of the hundred-kW level electric power among a plurality of power supplies or loads externally connected with the three-port power electronic network (such as generator 110, traction motor 140 or 170, battery pack 130a or 130b, brake resistance 131 and so on); according to the series-hybrid power equation (2-4) or parallel-hybrid power equation (3-3), performing pulse modulation control (PAM or PWM) to the instantaneous power function of the battery packet 130a&b, making the battery pack 130a&b to operate stably in one of the three modes of the charge sustaining (CS), charge depleting (CD), or charge increasing (CI) or switching smoothly among them, realizing the predictive control of the average SoC function of the battery pack (PSC—predicative SoC control), making the battery pack 130a&b to operate stably in the high-efficiency zone (BLL<SoC<BUL) for a long time, pursuing simultaneous maximization of total charge turnover rate and regeneration brake charge turnover rate, satisfying vehicle dynamics equation (1-1) in real-time; then combined with intelligent cruise control (iCC) function, achieving fuel-saving rate over 25% against a modern diesel heavy truck in terms of RDE fuel consumption (L/100 kM), substantially improving the power performance and brake effectiveness of the vehicle, ensuring the RDE emissions to meet emission standard stably, reducing the work intensity of the driver, improving the driver resting experience during no-idle vehicle parking (Anti-Idling) and multiple other beneficial effects. The invention of an ACE heavy truck equipped with a software defined mixed hybrid powertrain, through intelligent cruise control (iCC) technical features, can convert the power management problem of an ACE heavy truck in the expressway design operation design domain (ODD) into the equivalent narrow AI problem of computer playing Go, which is very suitable for using machine learning (ML) fuel-saving algorithm and the computer readable medium of the invention to store and upload the fuel-saving data set to the cloud, through the cloud and vehicle-mounted fuel-saving AI chip collaboration (training or inferring), automatically learn the optimal fuel-saving strategy and continuously evolving and improving. The AI fuel-saving algorithm of ACE heavy truck is much better than the human driver at actual energy-saving and emission-reducing optimization with strong consistency, and can become a valuable assistant to the human driver.

As discussed above, a loaded ACE heavy truck 010 on expressway driving, by skillfully leveraging the ten-kW to hundred-kW level vehicle downhill longitudinal slope power caused by frequently occurring road longitudinal slope fine change of 0.1 degree granularity, through the traction motor 140&170 regenerative braking to recover energy and generate AC electricity, after being rectified by the electric power divider ePSD 123 to charge the battery 130a&b, from each hundred-meter or KM level downhill road section along the way, it is possible to harvest the zero cost electric energy (regenerative braking charge) in the hundred-watt hour or kWh level, like the small stream to flow long time to achieve high volume via accumulation of many small parts. In addition, the comprehensive energy conversion efficiency of ACE heavy truck from the battery to the driving wheel is nearly two times higher than the comprehensive energy conversion efficiency from the fuel tank to the driving wheel; In other words, the electric energy in the ACE heavy-truck battery pack compares the chemical energy of the fuel in the fuel tank, when applying work to drive the vehicle, one unit of energy in the former can be equal to 3 units of energy in the later. The fuel-saving secret of a ACE heavy truck in high-speed road working-condition lies in the maximum utilization of the accumulated zero-cost regenerative-braking-charge in the battery pack 130a&b to provide partial propulsion power of the vehicle, through the fast turnover mode of just-in-time charging-discharging, improving the battery pack 130a&b electric energy turnover rate throughout the entire freight event, especially increasing the regenerative braking charge turnover rate and reducing the engine charge turnover rate simultaneously, achieving the best vehicle fuel-saving effect.

VCU 201 in real-time according to the vehicle map unit (MU) 240 electronic horizon prior 3D road data to conduct predicative and dynamic planning, making sure that before the vehicle encounters long slope of more than ten kilometers and the longitudinal slope greater than 2.0%, there is sufficient time to command the clutch 111 to close and lock, to switch to parallel-hybrid mode, to implement parallel-hybrid intelligent power switching control (iPS) on the engine 101 and generator (MG1) 110, before the vehicle reaches the long slope, charge the battery 130a&b full (SoC=URL) in just-in-time fashion, and increase the vehicle speed to the maximum legal speed limit, to the fullest extend to delay the time and reduce the probability that the battery pack electric energy is exhausted while the ACE heavy truck 010 is still climbing uphill, the vehicle could not maintain constant speed uphill and have to switch into lower gear and to run uphill at lower speed because of the lack of enough engine peak power, degrade the vehicle power performance and freight timeliness. According to the 3D map data stored in the vehicle MU 240, especially the electronic horizon in high precision longitudinal slope space-time distribution function, and the configuration parameters and the dynamic working-condition and positioning data of the vehicle, VCU 201 can, through the vehicle dynamics equation (1-1), dynamically predict the longitudinal slope power time-variant function and the road load instantaneous power time-variant function of the vehicle in the electronic horizon (hour level or hundred kM level) with KW level granularity and the refresh frequency over 1 Hz; so as to perform pulse modulation (PM) control (series-hybrid iSS or parallel-hybrid iPS) to the instantaneous power function of the engine 101, and pulse modulation control (PAM or PWM) of the instantaneous power function of the battery packet 130a&b, realizing the predictive control of the average SoC function of the battery pack 130a&b; according to the driver selected vehicle intelligent cruise control (iCC) different sub-mode and under the condition of ensuring driving safety and actual (RDE) emissions always meeting the standard, seek positive-sum balance (i.e., simultaneous optimization) between the ACE heavy-truck fuel-saving performance and propulsion power performance, satisfy the vehicle dynamics equation (1-1) and the series-hybrid power equation (2-4) or the parallel-hybrid power equation (3-3) in real-time, achieve the beneficial effect of simultaneous optimization of ACE heavy truck energy saving and emission reduction. It should be emphasized that the comprehensive fuel consumption (L/100 kM) minimum value (i.e. optimal value) of a ACE truck on a specific freight event is highly correlated with the configuration parameters (especially total weight) of the vehicle, the longitudinal slope space-time function of the specific trip (or route) along the road, the weather condition on the same day, and the vehicle dynamic working-condition data (especially longitudinal speed or acceleration) and so on, and is basically independent of macroscopic big data national average fuel consumption value of the heavy trucks of similar configuration and load, is substantially ACE heavy truck in each minute running or each kilometer running, realizing average fuel consumption minimization, linear superposition, it can ensure the ACE heavy truck each day, each month, each year, and full life cycle accumulated comprehensive fuel consumption is optimal. All different configuration and different load of ACE heavy truck cluster in the national or continental expressway network operation, daily accumulation of the long-haul freight fuel-saving data set to become precious "data petroleum" used to train the fuel saving ML algorithm on cloud platform, the default fuel-saving control strategy recommended by the cloud-side fuel-saving algorithm is a useful guidance for every ACE truck on any specific freight route.

Figure 5:
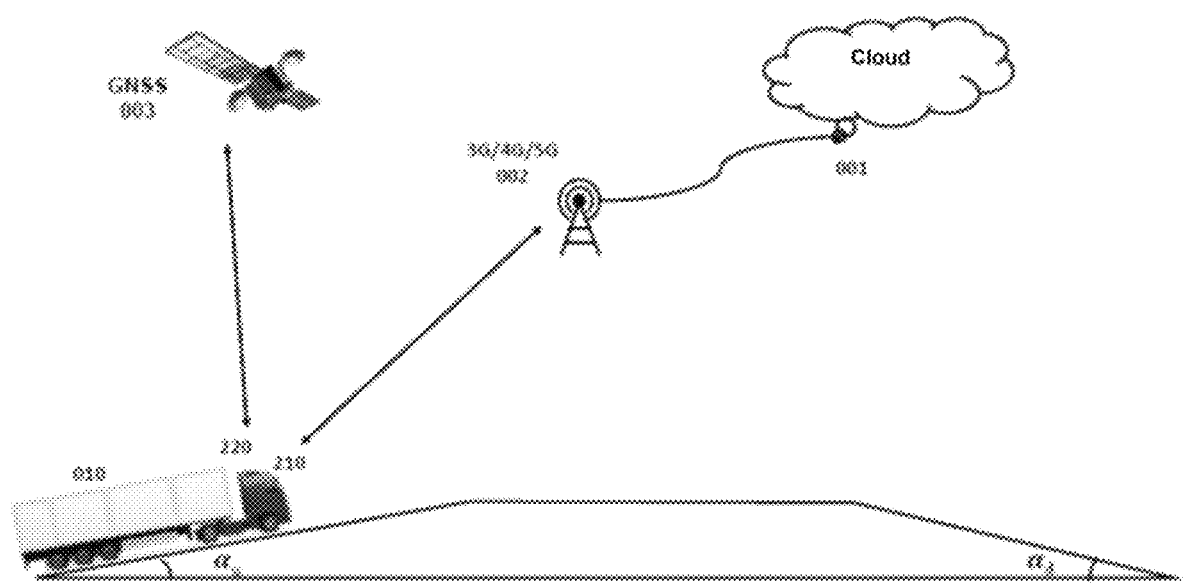
FIG. 5 shows an ACE heavy truck communicating through the mobile-Internet with the cloud-computing platform vehicle-cloud system block diagram according to one embodiment of the present disclosure.

Referring to FIG. 5, the following describes how to use the ACE heavy truck 010 during the running period collected and locally stored fuel-saving data set, after desensitization and encryption, through the vehicle-mounted wireless gateway 210 through mobile internet 002 timely (minutes or hour-level time delay) uploaded to the cloud computing platform 001 to store, for subsequent analysis and processing. Cloud platform 001 through a plurality of preferred machine learning (ML) fuel-saving algorithms (deep learning algorithm), leveraging the public cloud or private cloud of sufficient computational power, using the increasingly accumulated ACE heavy truck fuel-saving data-set stored On the cloud platform, training the cloud-end fuel-saving AI algorithm, automatically establishing and continuously improving the deep neural network (DNN) model, seeking the best fuel-saving control strategy; through the wireless mobile communication network to download to each ACE heavy truck the fuel consumption benchmark value and default fuel-saving control strategy for a certain freight event and a specific route, enabling each ACE heavy truck to fully utilize the collective wisdom of all ACE heavy trucks to realize simultaneous optimization of vehicle energy saving and emission reduction; each ACE heavy truck can use the VCU 201 to perform the vehicle-end AI inference operation, according to the rea-time local environment of the ACE heavy truck, the real-time road traffic condition and the vehicle operation dynamic data, dynamically modifying the vehicle default fuel-saving control strategy, assuring the actual vehicle fuel consumption of the specific freight event is minimized.

In some embodiments, during the ACE heavy truck 010 driving process, from the generating set (comprising an engine 101, ECU 102, generator 110, MCU1 121), ePSD 123, 111 clutch traction motor 140 or 170, automatic transmission box 150, TCU 151, brake resistor 131, and various configuration parameters or dynamic operation data of each key powertrain subsystem such as battery pack 130a or 130b, all can be measured and recorded locally and in real-time by the "Internet-of-Things" formed by various sensors on the ACE heavy truck 010 (preferably measuring and recording the refresh frequency is more than 5 Hz); centrally stored in the memory of VCU 201 or other memory chips on the vehicle in the format of the structured big data commonly used in industry; of course, the measurement data can also be dispersedly stored in the memories of the microprocessors corresponding to several sub-systems. The so-called "fuel-saving structured big data" (abbreviated as "fuel-saving data set") is a multi-dimensional time sequence set of each sub-system running dynamic data in the ACE truck running process on the computer readable storage medium in association with a certain "mapping relationship".

For example, one can utilize the ten-nanosecond level ultra-high precision reference time of the vehicle-mounted satellite navigation instrument (GNSS) 220 to be the sole unique system reference clock of ACE heavy truck, repeatedly calibrating (e.g., every ten-minute interval) each vehicle-mounted microprocessor clock including VCU 201 clock, using ordered unique vehicle system running time sequence, to automatically label and synchronize ACE heavy truck dynamic operation data of each subsystem, for future splicing and combining multi-dimensional time sequence, generating a fuel-saving data set for a particular ACE heavy truck and a specific freight event. As shown in FIG. 1~5, the vehicle 010 mounted key sub-systems such as VCU 201, engine 101, engine control module 102, generator 110, electric power divider (ePSD 123; comprising a motor controller 121, 122a&b, voltage control switch 133, chopper 132a&b and others), clutch 111, traction motors 140& 170, battery 130a&b, brake resistor 131, transmission box 150, transmission box controller 151, millimeter wave radar 230, mobile communication gateway 210, map unit 240, the satellite navigator 220, and other important sub-systems all have corresponding microprocessor, memory, or sensor; These subsystems can, in the range of 1.0 Hz<$f_m$<50.0 Hz measurement frequency ($f_m$), measure, calculate, record, or store locally on-vehicle in real-time the key vehicle operational dynamic data time sequence with vehicle operation absolute time as the unique marker. For example: The engine control module 102 can calculate and record the longitudinal vehicle speed, longitudinal vehicle acceleration, engine 101 rotating speed, torque, brake-specific fuel consumption (BSFC) and other dynamic operating data with measurement frequency over 5 Hz, generator controller (MCU1) 121 can measure and record the rotating speed and torque of the generator 110, motor internal temperature, or generator controller 121 of the DC voltage or current, and internal temperature and other dynamic data at measuring frequency over 10 Hz; the ePSD 123 can measure and record the only DC voltage function of the DC bus junction point X and the DC current functions of all branch circuits and other dynamic data at the measurement frequency over 10 Hz; The battery management module (BMS) provided by the battery 130a&b is capable of recording the DC voltage at the output end of the battery management module (BMS), current, and the current of the inner battery cell and the battery module level, voltage, temperature, charge state and other dynamic data at a measuring frequency of 10.0 Hz; the motor controller 122a&b capable of measuring and recording the rotating speed and torque of the mechanical shaft of the traction motor 140, 170, the motor internal temperature, MCU2 or MCU3 DC end current and voltage and other dynamic data at a frequency of more than 10 Hz; the chopper 132a&b can record the DC voltage and the current dynamic data of the high voltage end or the low voltage end by the measuring frequency of more than 10 Hz; transmission box controller (TCU) 151 can record transmission box 150, input end rotating speed, output end rotating speed and other dynamic data at frequency over 2.0 Hz; satellite navigator 220 can record the longitudinal vehicle speed; and acceleration of the vehicle, latitude and longitude, longitudinal slope, time-reference service and other dynamic data at frequency of 5 Hz; millimeter wave radar 230 data such as the absolute distance and the relative speed between the vehicle and the front vehicle can be measured and recorded at frequency of 10 Hz; the voltage control switch 133 can record the dynamic data such as its DC voltage and current at a frequency of 10 Hertz. The sensor measurement data of each subsystem may be partially overlapped with each other, and the data overlap redundancy helps to improve the fault tolerance and error correction of the full system measurement.

Next, as shown in FIG. 1~5, VCU 201, based on vehicle running reference time sequence unique unidirectional label as the time reference of all sub-system measurement data time sequence, generate the "fuel-saving data-set", which is created during the operation of the ACE heavy truck 010 and is highly correlated with the energy-saving emission control strategy of the ACE heavy truck, after automatic assembly, integration, desensitization, and encryption; such fuel-saving data-set can be uploaded to the centralized or distributed storage of the Internet cloud computing platform 001 through mobile internet 002 or wired internet in "real-time" (sub-second time delay) or "timely" (hour time delay) for subsequent data analysis and processing.

For example, as shown in FIG. 1 and FIG. 5, can upload, through the wireless communication gateway 210 and cellular mobile communication network 002, the ACE truck fuel-saving data set in time (minute or hour-level time delay) to the distributed or centralized storage of the cloud computing platform on the Internet 001 for subsequent data processing. Optionally, the data packet before uploading can be desensitized and encrypted to ensure the data security and to protect client (driver or fleet) of privacy and business secret. The cloud platform 001 will collect the fuel-saving data-set generated by multiple ACE heavy trucks using the present invention. Using the ACE heavy truck cluster increasingly accumulated operational structured big data (fuel-saving dataset), focusing on machine learning (ML) algorithm, using corresponding cloud end computational power to train the AI chip on cloud, automatically establishing and continuously improving the depth neural network (DNN) model of the fuel-saving ML algorithm, searching for the best fuel-saving control strategy of each ACE heavy truck and each freight event, the actual fuel consumption of the a long-haul ACE heavy truck can be reduced by more than 25% compared with that of the modern diesel truck, and is basically decoupled with the driving skill of the driver and the engine performance. Cloud 001 preferably uses commercial AI training chips with characteristics of high general usability, high performance, high power-consumption, and high cost; and the vehicle end preferably adopts AI inference chip with high specificity, moderate performance, low power-consumption, and low cost. Vehicle end fuel-saving AI inference chip (such as contained in the VCU 201) and cloud end fuel-saving AI training chip can collaborate in real-time or timely, according to the continuously changing driving condition of the ACE heavy-truck, searching for each second or each minute period (corresponding to the driving distance is 20 to 2,000 meters) of dynamic optimal fuel-saving control strategy; the DPC engine 101 in active operation (AOM) has no lagging effect or memory effect, by obtaining the microscopic minimum fuel consumption (L/100 kM) in each time period, continuously accumulating, linear superposition, can finally realize macroscopic minimum fuel consumption of the ACE heavy truck 010 for the whole freight event. VCU 201 directs ACE heavy truck 010 on expressway ODD driving, through intelligent cruise control technology (iCC) to realize the 1D longitudinal L1 autonomous driving function, the ACE heavy truck energy-saving and emission-reducing optimization problem is converted into the equivalent narrow meaning AI problem of computer playing Go. The software defined hybrid powertrain of the invention, adding VCU 201, iCC function and fuel-saving AI algorithm, is equivalent to an unmanned industrial robot without human form, the so called ACE heavy truck fuel-saving robot. Like the AlphaGo to beat all human players in Go easily, the ACE heavy truck "fuel-saving robot" of the invention also can out-perform the human driver in the long-haul truck actual fuel consumption and emission. At the same time, it also needs to emphasize that the fuel-saving robot of the invention will not completely replace the human driver, but is the reliable secondary driver and assistant of the long-haul heavy truck driver.

The starting point and end point of each freight event (Freight Event) of the long-haul heavy truck are known, the freight weight is also known and basically fixed throughout the trip, with very few temporary random changes. The mileage of each freight event is from several hundred kilometers to thousands of kilometers, and the time is from several hours to several days. The fuel-saving robot (VCU 201) of ACE heavy truck 010 or the driver can, before each shipment event starts and through the wireless mobile gateway 210 or mobile phone, automatically request to download the cloud platform 001 of AI "fuel-saving brain" the default optimal fuel-saving control scheme for the freight event travel and the current industry best fuel consumption benchmark (L/100 kM), as initial value of reference when the vehicle VCU 201 fuel-saving machine learning algorithm performs local real-time operation and dynamic adjustment. In this way, each ACE heavy truck can leverage the collective wisdom of all the ACE heavy trucks of the industry running on the same road section to achieve the best fuel saving effect. When the driver directs the ACE heavy truck to run on closed type expressway, he can select the iCC function sub-mode (normal mode N/fuel-saving model Eco/high-performance mode P), starts the intelligent cruise control function (iCC), then the VCU 201 will replace the driver to perform the driving function, realizing longitudinal the heavy truck one-dimensional movement (acceleration/cruise/coasting/deceleration) durative automatic control (namely SAE L1 level autonomous driving), releasing both feet of the driver long-time, reducing the work intensity of the driver during long-distance driving; it also can realize the beneficial effects of RDE fuel consumption and emission (CO2 and NOx) simultaneous optimization (minimizing) and decoupling from the driving skill of the driver; It should be emphasized that the driver's hand, eye, ear, brain still need to work, responsible for vehicle surrounding target and event detection and response (OEDR), continuously controlling the steering or emergency braking of the vehicle in real-time; bearing full responsibility of the heavy truck driving safety. Another beneficial effect of the invention is that the fuel-saving robot can achieve the ACE heavy-truck energy-saving and emission-reducing simultaneous optimization by iCC function, effectively solving the long-haul trucking industry long-term difficult problem of high RDE fuel consumption spread of over 20% caused by the various driver human factors (freight route familiarity, driving skill, working attitude, fatigue and so on), ensuring that each ACE heavy truck and any driver can reach the lowest fuel consumption in high consistency when running on the same road section, such highlighted benefit is very important for the freight company to reduce the cost.

In summary, the fundamental difference between the invention with intelligent cruise control (iCC) function of the ACE heavy truck 010 and any prior art hybrid vehicle or traditional diesel heavy truck, is that the former focuses on long-haul freight heavy truck simultaneous optimization of energy saving and emission reduction, effectively solves the global difficult problem recognized by automotive and transportation industries world-wide, that is, under the expressway condition, the fuel-saving effect of a hybrid heavy truck compared with the traditional diesel heavy truck is not large, the actual fuel saving rate is less than 12%, can achieve the actual comprehensive fuel consumption reduction of over 25% in the long-haul application scene; at the same time, it can substantially improve the vehicle power performance and brake effectiveness, and ensure the ACE heavy truck in the three major heavy truck markets of China/America/European Union actual driving environment (RDE), long service life stable (700 kM emission standard quality guarantee period) pollutant satisfy and carbon emission rule index and multiple beneficial effects. In other words, ACE heavy truck 010 on the uncongested closed expressway driving, the driver can only be responsible for dynamic driving task (DDT) vehicle surrounding object and event sensing and decision (OEDR) and vehicle transverse control, the heavy truck fuel-saving robot through intelligent cruise control (iCC) technical features to realize vehicle 1D longitudinal SAE L1 level autonomous driving function, realizing vehicle energy saving and emission reduction simultaneous optimization.

Under the intelligent cruise control (iCC) driver preset sub-mode (referring to one of the following three, normal mode N/fuel-saving mode Eco/high performance mode P), the heavy-truck fuel-saving robot, according to the performance characteristic and configuration parameters of the vehicle key subsystems, vehicle driving condition dynamic data, electronic horizon prior 3D road data, using vehicle energy management control strategy based on machine learning (ML) fuel-saving algorithm and vehicle real-time computation for AI inference, can implement series-hybrid intelligent start-stop control (iSS), or parallel-hybrid intelligent power switching control (iPS), or intelligent mode switch control (iMS) on the instantaneous output power of the engine 101, perform pulse modulation control (PAM or PWM) on the instantaneous power function of the battery packet 130$a$&$b$ to dynamically adjust the battery pack average power function (equal to the difference between vehicle road load average power and engine average power), to enable the battery pack 130$a$&$b$ to work stably in one of the following three modes of charge sustaining (CS), charge depletion (CD), or charge increasing (CI) or to switch smoothly among them, satisfy the constrains of vehicle power performance, active safety, RDE emission meeting standards long-term, in real time meet the vehicle dynamics equation (1-1) and the series-hybrid power equation (2-4) or parallel-hybrid power equation (3-3), minimize the whole freight event actual fuel consumption, achieve the actual comprehensive fuel saving rate of 30% against a traditional diesel heavy truck, and ensure that the pollutant emissions can meet the standard (EPA-2010, Euro-VI, GB-6) under any RDE environments steadily and in long-term. In the prior art, passenger vehicle or commercial vehicle "adaptive cruise control (ACC)" function is used mainly to provide driving convenience and to improve the active driving safety, the vehicle actual comprehensive fuel saving rate is rather small (less than 2%); while the "predictive cruise control" (PCC) of the traditional internal combustion engine truck, although focused on vehicle energy management control strategy, cannot effectively recover vehicle energy by regenerative braking, Its actual fuel saving effect is less than 3%; at the same time, a modern diesel vehicle cannot ensure under any RDE, especially under certain low speed and low load working-condition and idle working-condition, its actual pollutant emissions can meet the standard stably and in long-term; In US and Europe, the industry has not yet found a viable technical solution (i.e., high performance-to-price ratio, volume-production ready) to satisfy the current pollutant emission regulations (EPA-2010, Europe-VI, GB-6) all the time in any RDE, much less a high performance-to-price ratio and production-ready technical solution of to meet the future California low NOx emission Omnibus regulation of 2027 (NOx down 90% from that of EPA-2010). The technical problem to be solved by the invention is how to ensure the simultaneous optimization of the fuel consumption and emission of ACE vehicle (especially ACE diesel heavy truck), namely the actual emission of vehicle CO2 and NOx must be minimized simultaneously. Obviously, the power performance of the vehicle refers to the performance of the entire vehicle powertrain (e.g., hybrid powertrain of ACE heavy truck comprising an engine 101, double motor 110 &140, mPSD 124, ePSD 123, battery 130$a$&$b$, transmission box 150, axles 160 & 180 and others) (i.e, the total electric-mechanical torque or power), not merely the power performance of engine 101; the vehicle fuel consumption and emission is the RDE total fuel consumption or pollutant emissions of the powertrain (NOx, PM), however since the battery pack has zero fuel consumption and zero emission, it is essentially means the fuel consumption and missions of engine 101.

The distinguishing technical characteristics of the intelligent cruise control (iCC) against the predicted-cruise-control (PCC) or the adaptive-cruise-control (ACC) in the prior art include: 1) the effective planning range of the iCC electronic horizon can exceed 100 miles or one hour, the vehicle-level power-management-strategy (PMS) comprises a second-level fast-control-loop and an hour-level slow-control-loop; while the effective planning range of the prior art POC is only mile level or minute level, the vehicle PMS only has a second-level fast-control-loop without an hour-level slow-control-loop; 2) iCC can, according to vehicle configuration parameters (especially total weight), vehicle speed, weather and road condition, the vehicle front mile-level road section longitudinal slope function distribution, autonomously and dynamically adjust the safe vehicle-following distance (L1>L2>L3), while the safe vehicle-following distance of the ACC is a preset static parameter and cannot be dynamically adjusted; The iCC technology of the invention are substantially better than prior art PCC or ACC in terms of RDE fuel consumption and pollutant emissions simultaneous minimization, freight timeliness, and brake effectiveness, and other beneficial technical effects.

Different from the existing technology, the software definition hybrid powertrain technology in the invention focuses on the simultaneous optimization of the three core technical metrices of power performance, fuel consumption, and pollutant emissions of an ACE truck and is a combination of many technical features, including at least two of the following technical features: series-hybrid intelligent start-stop control (iSS), parallel-hybrid intelligent power switching control (iPS), intelligent mode switching control (iMS), intelligent cruise control (iCC), engine clean cold-start (CCS), clutch-less gear shifting control (CGS), predictive state-of-charge control (PSC), vehicle Predictive Power Management Strategy (PPMS) based on the machine learning (ML) fuel-saving algorithm, after-treatment system intelligent temperature management (iTM), engine binary cylinder-deactivation (bCDA) and so on. Although multiple embodiments of the present invention focus on long-haul ACE diesel heavy trucks, the software defined hybrid powertrain technology is also suitable for various types and tonnage of on-road or non-road vehicles (passenger vehicle, light/medium/heavy commercial vehicle) and various internal combustion engine (ignition type gasoline engine, a compression ignition type diesel engine, and ignition type or compression ignition type natural gas engine, . . . ); The combined technical features above can be used to achieve the beneficial effects of simultaneous optimization of vehicle fuel consumption and emission in the actual driving environment (RDE).

The retrofit ACE truck embodiment is as follows: 1) selecting a suitable used heavy truck in the United States (Used Truck); preferably satisfying the US Federal EPA-2010 emission regulations with the total mileage less than 600K miles and in good vehicle conditions (diesel or natural gas), engine 101 with displacement 11 to 16 L needs to be in good working condition, transmission-box 150 should be an automatic mechanical transmission-box (AMT) in good working condition; If both the engine 101 and the transmission box 150 were to go through out-of-frame overall of the powertrain, then only the vehicle chassis and the cab need to be in good working condition; 2) preparing the hybrid conversion kit (HCK—Hybrid Conversion Kit), comprising of dual-motor 110&140 (low speed high torque permanent magnet synchronous motor of AC asynchronous motor, the rated power is 100 to 200 kW), battery 130a&b (power type liquid-cooled battery pack, the total capacity 20-90 kWh, can be composed of two groups of different battery cell combination in parallel), a clutch 111 (heavy-duty clutch controlled by wire), electric power divider (ePSD) 123, a hundred-kW level brake resistor 131; further including vehicle controller (VCU) 201 with the new function of a hybrid powertrain domain controller, a satellite navigator (GNSS) 220, wireless gateway 210, millimeter wave radar 230, a map unit 240 (including a national road ADAS three-dimensional electronic map), and various electromechanical accessories combined with the key subsystem modification; 3) the conversion of the retrofit ACE heavy truck 010 must be completed by the technician trained and certified. Regardless the displacement size of the engine 101, each retrofit ACE heavy truck, under the parallel-hybrid mode, has vehicle total continuous propulsion power greater than 500 kW, its vehicle power and brake performance is obviously better than that of any top-of-the-line volume production heavy diesel truck, and the actual (RDE) fuel consumption ($CO_2$ emission) can be reduced by 20% to 30% than the truck before such retrofitting, RDE emission (NOx) is reduced by more than 50%, meeting the mandatory requirement of the US GHG-II regulation for 2027 model year new heavy truck ahead of schedule. The ACE heavy truck technology of the invention is not only suitable for the new heavy trucks, but also can be used to convert, at high performance-to-cost ratio by 2027, more than 25% of the existing over 2.0 million US used heavy trucks (500K in aggregate) into retrofit ACE trucks with high power performance, ultra-low RDE fuel consumption and pollutant emissions, with significant economic and social benefits. ACE heavy truck further can be provided with binary cylinder deactivation function (bCDA) of the diesel engine and the new intelligent temperature control function (iTM) of the existing technology of single-box integrated after-treatment system (ATS), simultaneously meeting the 2027 model-year US GHG-II regulatory $CO_2$ limit and the California ultra-low emission combination regulations (NOx ratio EPA-2010 limit reduction 90%) of ACE heavy truck ahead of schedule.

Referring to FIG. 6, the engine 101 in its passive operation model (POM) in the $4^{th}$ quadrant (positive speed, negative torque) of the universal characteristics curve) can be further divided into two types according to the specific working mode of a complete engine four-stroke cycle period of a specific cylinder; the first type is. "fuel cut-off mode" (CCO—Cylinder Cut-Off), while the second type is "Cylinder Deactivation Mode" (Cylinder Deactivation—CDA); the so-called CCO refers to a specific cylinder completely cutting off fuel injection in the combustion stroke, but the air in-take valve and the exhaust valve of the cylinder are normally opened and closed; obviously CCO is suitable for all the volume production commercial engines, actually is a specific engine fuel injection control strategy, completely realized by software, it does not need engine to configure complex variable valve actuation mechanism (VVA); while the so-called CDA refers to some but not all the cylinders of the engine in addition to fuel cut-off in the combustion stroke, the air in-take valve and the exhaust valve corresponding to the fuel cut-off cylinder are closed constantly in the entire engine cycle (Four-Strock Engine Cycles); It is clear that the CDA control strategy is only applicable to advanced engines equipped with complex variable valve actuation mechanisms (VVA), and a normal engine without VVA mechanism cannot realize CDA function.

The "Combustion Factor" (CF—Combustion Factor) of an engine is defined as the ratio of the number of cylinders in the full engine cycle (Engine Cycle) to complete the combustion work to the total number of cylinders of the engine. For example, for the modern heavy-truck in-line six-cylinder (I6) diesel engine, CF=1 corresponds to all six cylinders of the engine have normal combustion to do work; CF=½ corresponds to the engine with only three cylinders have normal combustion to do work, and the other three cylinders are in non-combustion passive operation (CCO or CDA); CF=⅓ corresponds to the engine with only two cylinders have normal combustion to do work, while the other four cylinders, run passively (CCO or CDA); The CF=0 corresponds to all six cylinders of the engine to operate passively (CCO or CDA). In the existing engine CDA technology (prior art), the combustion factor CF is a positive number not greater than 1; in other words, the existing analog electronic control engine technology (In-cluding CDA technology), during engine 101 normal operation, except the special case of zero engine speed and torque (i.e., engine static point), the CF of the engine is not allowed to be zero, namely the engine does not allow all cylinders to operate passively in the 4th quadrant of its universal characteristics (except for the brake model the engine).

Taking I6 engine as an example, to realize CDA function, the engine must be equipped with VVA mechanism; The simplest embodiment of the existing CDA technology requires the VVA mechanisms (called VVA-2) with two independent control-by-wire channels, and can respectively control two groups of the intake and exhaust valves, each group comprises of three cylinders; multiple embodiments have six independent control-by-wire channels (VVA-6), which can respectively control the intake and exhaust valves of the six cylinders; while the most complicated embodiment requires twelve control-by-wire channels (VVA-12), which can control the air in-take valves or air exhaust valves of six cylinders individually; Obviously, the higher the control-by-wire channel number is, the more complex the VVA mechanism of the engine is, the engine cost is higher, and the engine control dimension is higher, and the engine performance is better. At the same time, the VVA mechanism function is compatible downwards and not upwards. For example, VVA-12 is compatible with all functions of VVA-6, VVA-6 is compatible with all functions of VVA-2; the reverse is not true. The modern gasoline engine adopts CDA technology focusing to reduce RDE fuel consumption; the modern heavy truck diesel uses CDA technology on the other hand is mainly used as an effective method of thermal management of diesel after-treatment system, while keeping the RDE fuel consumption substantially unchanged and reducing the diesel engine RDE emissions (NOx and PM) significantly The engine cylinder deactivation technology (CDA) is commercially available on a light vehicle gasoline engine or a diesel engine; but by the end of 2020, the CDA technology of heavy-truck diesel engine in the world is still in the research and development stage, and is no yet in commercial production. The challenges of commercialization of the CDA technology for the heavy-truck diesel engine include to redesign the engine, add complex VVA mechanism and increase cost, complete the long-term cycle-life (one million miles) validation of the VVA mechanism, and mitigate the noise-vibration-harshness problem (NVH) at the vehicle level caused by CDA engine mode switching (i.e., the dynamic switching between the engine normal operation (CF=1) and various CDA model (0<CF<1); and such NVH problem of the vehicle with a CDA engine cannot be effectively solved by testing on an engine dyno, must be addressed at the vehicle level in a customized manner, which consumes a lot of time and resources. The present invention focuses on a novel CDA engine technical solution—"binary cylinder deactivation technology" (bCDA—binary Cylinder DeActivation), and the specific technical measures are as follows: preferably by designing and changing the engine intake and exhaust mechanism, configuring a set of VVA-1 mechanism, including a valve-train clutch (VtC—Valve-train Clutch), the VtC is controlled by one channel of digital signal (e.g., high-state is 1, low-state is 0), there are two stable VtC working-conditions, open (cut-off) or close. When the control signal is 1, the clutch (VtC) is closed, all the air in-take and exhaust valves of the engine are driven by the cam shaft of the engine to work normally and CF=1 or 0; when the wire control signal is 0, the clutch (VtC) is open, all the air in-take and exhaust valves of the engine are mechanically decoupled from the camshaft of the engine, all the air in-take and exhaust valves are closed constantly during the entire four-stroke engine cycle (two turns of the engine crankshaft), CF=0. Obviously, for six-cylinder heavy truck CDA engine 101, single channel VVA-1 mechanism is simpler and more durable than the multi-channel embodiments such as VVA-2. VVA-6, VVA-12 and others, the control strategy is simple and practical, the cost increment (Cost Delta) is lower, it is the optimal embodiment of bCDA; Of course, various multi-channel VVA mechanisms (e.g., VVA-2, VVA-6, VVA-12, etc.) all can be downward compatible with all the functions of the VVA-1 mechanism, but the performance-to-price ratio is not as good as that of the VVA-1, are suboptimal embodiments. The technical personnels in the engine industry can use various production-ready VVA technical solutions to realize the VtC device, and the single channel VVA-1 mechanism provided is the simplest and the VVA device with the highest performance-to-price ratio to realize the engine binary cylinder deactivation functionality (bCDA) among multiple feasible technical solutions; The invention uses the abstraction VtC as a system component and focuses on software defined powertrain and ACE heavy truck. It must to emphasized that the binary cylinder deactivation technology (bCDA) should be combined with digital-pulse-control engine technology (iSS or iPS) to achieve the full benefits of simultaneous optimization of engine fuel-saving and emission reduction. The prior art CDA technology does not include the bCDA of the present invention. In other words, the binary cylinder deactivation technology (bCDA) is a significant improvement over the existing cylinder deactivation technology (CDA); under the premise of keeping the engine performance, the bCDA structure is simpler, the cost is lower, the durability is longer, the NVH characteristics is much better.

The pulse control engine (series-hybrid iSS or parallel-hybrid iPS) of the invention can substantially solve the noise-vibration-harshness (NVH) characteristics deterioration problem of the engine or vehicle caused by the mode dynamic switching of CDA (including bCDA) technology; the specific technical measures are as follows: the pulse control engine CDA mode switching instantaneous time is controlled to be in the passive operation mode (POM) period of the engine; for example, as the engine switches between the high-state (CF=1) and low (CF=0) bidirectionally, firstly performing fuel cut-off (CCO), after at least 0.5 second in the low-state operation of the engine, opening the VtC to start the binary cylinder deactivation mode (bCDA), the air in-take and exhaust valves of all the cylinders of the engine are constantly closed; and then closing the VtC at least 0.5 seconds before the engine low-state operation is ended, exiting the bCDA mode so that all the air in-take and exhaust valves of all the cylinders of the engine are recovered to the normal switching work state; the air in-take and exhaust valves of each cylinder, will go through at least one full engine cycle (4 strokes) of POM before any CDA mode dynamic switching. In other words, under the control of VCU 201 and/or ECU 102, the CDA mode switching of a digital pulse control engine 101 can only occur in the 4th quadrant low-state working condition time of the engine, and are not allowed to happen in the 1st quadrant high-state working-condition time of the engine; therefore, it greatly avoids the mechanical vibration noise problem (NVH) of the engine or the vehicle caused by the direct coupling of the engine CDA mode switching and the various combustion strokes of all the cylinders of the engine. Another advantage of the digital pulse control (DPC) engine of the current invention over the prior art analogue electric control (AEC) engine is that the former can completely avoid the engine or vehicle level NVH problem caused by CDA mode switching and the associated problem of lengthy engine and the vehicle level system calibration.

Figure 7:
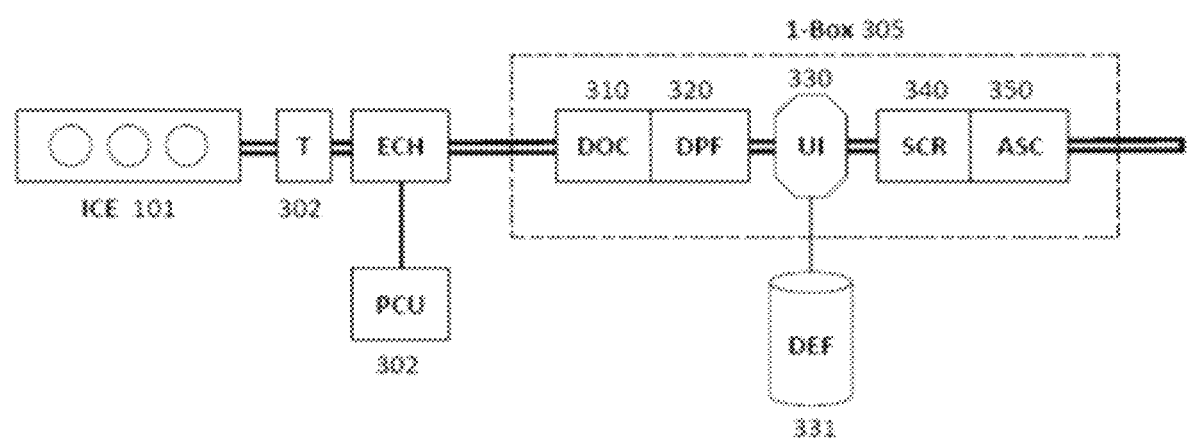
FIG. 7 shows an engine exhaust after-treatment system of an ACE heavy truck according to one embodiment of the present block diagram.

Referring to FIG. 7, the after-treatment system of the modern diesel engine 101 of the ACE heavy truck 010 may include the following modules, the exhaust gas outlet of the turbocharger (T) 108 can be regarded as the mechanical interface between the engine main body and the after-treatment system, the external structure of the catalyst electric heater (ECH—"Catalytic electric heater") 301 can be viewed as a section of stainless steel tube covered by heat resistant thermal insulation layer to connect the exhaust port of the turbo 108 and the input port of the integrated aftertreatment system 305 ("single box system"), the ECH contains an automotive grade electric heater with small exhaust flow pressure drop, controlled by the power controller (PCU) 302 to heat up the exhaust gas through ECH quickly (second level) to more than 250 degrees centigrade; the ECH can also quickly heat up each catalyst module in the single box system 305, such as DOC 310, DPF 320, SCR 340 and so on. Preferably select the power controller 302 based on the IGBT power electronic technology, obtain high voltage DC from the junction point (X) 125 of the ePSD 123, using pulse-width-modulation (PWM) control strategy and configuring the communication capability of the CAN bus, the rated power of ECH and PCU should be at least 30 kW. Unless specified otherwise, the various high power electric controller based on IGBT power electronic technology and low power microprocessor or microcontroller of the invention all have bidirectional CAN bus communication capabilities. The mainstream diesel integrated after-treatment system 305 meeting current emission regulations (EPA-2010, Euro VI; China GB-6) contains the following modules: a diesel oxidation catalyst (DOC) 310, a series diesel particulate catcher (DPF) 320, a tandem selective catalytic reductor (SCR) 340, a series urea leakage catalyst (ASC), a series exhaust pipe 360, the urea nozzle (UIU) 330 is located between the DPF 320 outlet and the in-take of the SCR 340, which can dynamically and accurately control from the diesel oil discharging liquid tank (DEF; namely urea tank) 331 of urea spraying time and dosage.

The rated electric power range of the catalytic electric heater (ECH) 301 is preferably from 30 kW to 70 kW, and the rated electric power range of the power controller (PCU) 302 is 25 kW to 65 kW. If the rated power is less than the lower limit of the ECH and PCU, cost is lower, but fast heating capacity is limited, is a suboptimal alternative; if the rated power is greater than the upper limit of the ECH and PCU, the fast-heating capability is high, but the cost is substantially increased, it is a suboptimal scheme. Because the cost of PCU 302 is much higher than that of ECH 301, the rated power of ECH should be more than PCU, and properly over-matching. Other embodiments further include moving the position of ECH 301 in FIG. 7 to the interior of the single-box system 305, and placing the position after the DPF 320 and prior to SCR 340. The urea nozzle (UIU) 330 may include a kW electrical heating function. The invention Claims an engine after-treatment system (ATS) intelligent temperature control technology (iTM), using the ECH 301 shown in FIG. 7, PCU 302. UIU 330 module, through power electronic control and electric heating to dynamically adjust the single box system 305 in each catalyst (especially SCR 340) of the working temperature range (250 degrees centigrade to 550 degrees centigrade), ensuring regardless of the vehicle working condition, the engine after-treatment system always works in the high efficiency zone of each kind of catalyst, which minimizes the vehicle pollutant emissions.

The current US heavy-truck industry has not yet found a commercially viable technical solution capable of simultaneously meeting both the GHG-II regulatory CO2 emission limit (equivalent fuel consumption) and the California ultra-low NOx emission limit (reduction of 90% than the EPA-2010 limit) for diesel heavy trucks by 2027; industry experts generally believe that feasible technical solution should include modern diesel engine main body and after-treatment system comprehensive (holistic) design changes (hardware and software), such as engine cylinder deactivation technology (CDA), a close-coupled "light-off selective catalytic reduction" (LO-SCR, including another urea nozzle), etc., added between the exhaust outlet of the turbocharger 108 and the in-take port of the integrated aftertreatment system 305. The main function of the LO-SCR is that when the exhaust gas temperature (ToT—Turbo Out Temperature) of the outlet of the turbocharger of the diesel engine is lower than 250 degrees centigrade (the light-out state of the after-treatment system; LO—Light-Out), it heats up at a faster speed, bearing the main task of NOx emission reduction in diesel engine low load (power or torque load rate is less than 30%) or idle operating conditions; the configuration of LO-SCR will increase the volume, weight, complexity, and cost of the after-treatment system, additionally because the LO-SCR is arranged before the DOC and DPF, It suffers more of the adverse effect of the exhaust gas, such as particulate matter or Sulphur and so on, significantly reducing the performance and cycle-life of the LO-SCR; however the approach of changing the engine working-condition for intermittent high temperature (more than 500 degrees centigrade) desulfurization regeneration (De-sulfation) of the LO-SCR will consume more fuel and increase CO2 emission.

The invention Claims an ACE heavy-truck software defined hybrid powertrain technical solution based on global production-ready diesel engine and other automotive grade electromechanical parts that are capable of commercial production by 2027 to meet the US GHG-II CO2 regulatory limits and California diesel engine ultra-low emission omnibus NOx limit value (90% reduction over EPA-2010 NOx limit) simultaneously; the specific technical means and/or features are the following: selecting commercial production engine 101 (diesel or natural gas) with VVA mechanism, constructing ACE heavy truck 010 dual-motor hybrid powertrain system in reference to FIG. 1 and FIG. 2 and the embodiments discussed before; using the series-hybrid iSS technology or parallel-hybrid iPS technology to convert the analogue electric control (AEC) engine into a digital pulse control engine, performing binary cylinder deactivation control (bCDA) to the VVA DPC engine in reference to FIG. 7 and the above mentioned embodiments; building an engine after-treatment system with intelligent temperature control function (iTM); letting the VCU 201 in collaboration with ECU 102, ePSD 123, the BMS (battery management system) of battery pack 130a&b. TCU 151, PCU 302, UIU 330 and other control modules, according to the energy saving and emission reduction AI algorithm of ACE heavy truck 010, dynamically controlling engine 101, double motor 110&140, clutch 111, transmission 150, battery pack 130a&b, catalytic electric heater (ECH) 301, urea injector (UIU) 330, and other subsystems, to optimize energy saving and emission reduction simultaneously, realizing ACE heavy truck RDE fuel consumption and emission simultaneous minimization, satisfying year 2027 US regulations (GHG-II; California) diesel heavy truck CO2 and NOx limits; such technical solution of the invention is called diesel near-zero-emission (NZE) technical solution for short.

If the ACE heavy truck 010 is to simultaneously satisfy current US Federal GHG-II (CO2) and EPA-2010 regulations (NOx), one performance-to-price ratio optimal embodiment can be the mixed hybrid powertrain (see FIGS. 1 & 2) with a normal engine 101 without the VVA mechanism, matched with the series-hybrid iSS technology or parallel-hybrid iPS technology and energy-saving and emission-reducing AI algorithms. Although such an engine (without VVA mechanism) cannot implement the binary cylinder deactivation control (bCDA), the binary cylinder fuel cut-off control strategy (bCCO—binary cylinder Cut-Off) can still be implemented, and the common single-box system 305 without the intelligent temperature control function (iTM) is used as the after-treatment system. In North America, the modern used diesel heavy truck (post EPA-2010 vehicle) can be legally converted into a retrofit ACE heavy truck with the above embodiment as the preferred technical solution. Obviously, comparing the binary cylinder deactivation technology (bCDA) with the binary cylinder cut-off technology (bCCO), the advantages of the bCDA are as follows: firstly it completely avoids the problem of cool exhaust of the DPC engine in passive operation mode (POM) to reduce the working temperatures of various catalyst modules of the single-box system 305 to 250 degrees centigrade or less, therefore ensuring the after-treatment system to run in the catalyst high-efficiency zones all the time in order to minimize pollutant emissions; secondly it reduces the loss of the pumping loss under the passive operation mode of the PDC engine to save fuel. The disadvantage of bCDA is that it requires the volume production normal engine hardware to be upgraded into an advanced engine with a VVA mechanism, and the system cost is increased.

In the present invention, near-zero emission (NZE) diesel truck is especially a commercially viable production-ready diesel truck which satisfies the US Federal GHG-II regulation (CO2) and California ultra-low NOx emission omnibus regulation (NOx reduced by 90% over EPA-2010 limit value) simultaneously. At present, the automotive industry is actively searching for the NZE diesel heavy truck technology solution with high performance-to-price ratio and ready for volume production. Among the diesel NZE technical embodiments, preferably using large six-cylinder diesel engine with single channel variable valve actuation mechanism (VVA-1); alternatively using a large six-cylinder diesel engine with multi-channel variable valve actuation mechanism such as VVA-2, VVA-3, VVA-6, VVA-12 and so on.

It needs to emphasize, to implement parallel-hybrid vehicle iPS control technology only requires one large electric motor with peak torque and power comparable to the engine, (hybrid P1 or P2 position) to be connected in parallel with the engine 101, the torques of the engine and electric motor can be combined to drive the vehicle, the AEC engine of the vehicle can then be converted into a DPC engine by the software inside the VCU 201 to realize a software defined parallel hybrid powertrain; the dual motors (110 and 140) plus the clutch 111 are not required; Therefore the single motor embodiment of parallel-hybrid ACE heavy truck can be considered as a special case of the dual-motor mixed-hybrid powertrain shown in FIG. 1. Referring to FIG. 1 and FIG. 2, a single motor parallel-hybrid powertrain embodiment is as follows: eliminating generator (MG1) 110 and motor controller (MCU1) 121, but retaining torque coupler (mTC1) 103, clutch 111, torque coupler (mTC2) 104, traction motor (MG2) 140; At this time, the electric power divider (ePSD) 123 is simplified from a three-port power electronic network into a dual-port network (closing port); a retaining port II & III). Preferably, the maximum continuous power (i.e., the nominal power) range of the permanent magnet synchronization (PMSM) or the AC asynchronous (ACIM) motor (MG2) 140 is: 150 kW to 220 kW, the maximum pulse power (10 second level) range: 250 kW to 410 kW; the maximum continuous power and the maximum pulse power of the motor controller (MCU2) 122a should be slightly higher than the corresponding limit values of the motor (MG2) (at least 110%); The remaining mandatory or optional sub-systems of FIGS. 1 and 2 remain the same as the case of dual-motor mixed-hybrid embodiment described above. Obviously, the maximum power (continuous or pulse) of the motor (MG2) 140 can be outside the preferred range discussed above and the system will still function; but if the motor is too small (less than 150 kW), the vehicle weight and cost can be reduced, but the vehicle power and energy saving and emission reduction optimizing effects are reduced; if the motor is too large (greater than 250 kW continuous power), the vehicle power and energy-saving and emission-reducing optimization effects are improved but the vehicle weight and, cost are obviously increased; both are the secondary preference items; other single motor parallel-hybrid embodiment further comprises the traction motor (MG2) to be arranged on the hybrid P1, P3, P4 positions, but at the P3 or P4 position because the motor (GM2) cannot amplify the torque through the transmission box 150, it has a negative impact on the ACE heavy truck 010 vehicle performance and the normal operations of the DPC engine 101, it is therefore a sub-optimal embodiment. Unless explicitly specified in the present invention, the dual-motor mixed-hybrid powertrain includes the two special cases of dual-motor series-hybrid or parallel-hybrid, as well as the special case of a single motor parallel-hybrid powertrain.

Referring to FIGS. 1 & 2, the advantages and disadvantages of the following two embodiments are compared; one embodiment is a dual-motor mixed-hybrid powertrain, the peak power of the engine 101 is 300 kW, the rated power of the double motors (MG1/MG2) 110 and 140 are 125 kW and 175 kW respectively; the other embodiment is a single motor parallel-hybrid powertrain, the peak power of the engine 101 is 300 kW and the rated power of the motor (MG2) is 300 kW; the other sub-systems of the two systems are the same (the standard or optional) is the same; According to the current global low-speed high-torque vehicle electric motor industry development situation, the cost of double motor approach (175 kW+125 kW; including motor controllers) is most likely to be lower than that of the single motor approach (300 kW; including motor controller); the former has a diversified and established supply base with significant advantages in low cost and high quality supply over the latter; the vehicle system comprehensive power performance of the two approaches are essentially the same; both approach can convert the AEC engine 101 of the existing technology (prior art) into a DPC engine by pulse modulation control (series-hybrid iSS of parallel-hybrid iPS) technical features; but the former has more system functions than the latter (such as intelligent mode switching (iMS), series-hybrid mode, dual-motor redundancy and so on); in terms of vehicle level simultaneous optimization of energy saving and pollution reduction, the former (dual-motor mixed-hybrid powertrain) has more levers to turn than the latter (single motor parallel-hybrid powertrain) with better system performance and higher performance-to-cost ratio; therefore, the former is the preferred embodiment.

It is the common knowledge of the global heavy truck industry, with the same vehicle configuration parameters (engine displacement, total vehicle weight and so on) and similar freight route traffic conditions, the actual fuel consumption of long-haul heavy truck is closely related to the driving style and skill of the driver, RDE fuel consumption value relative spread can be as high as 20%; the fuel-saving driver fully uses the large inertia of the high-speed heavy truck and the observations and memories of the longitudinal slope function distributions of the front mile-level road section; tries to avoid sudden acceleration or braking as much as possible, and controls the vehicle speed within a speed band stably; and the driver of high fuel consumption cannot fully utilize the great inertia of the high speed heavy truck, also is not good at observing and remembering the longitudinal slope function distribution of the front mile-level road section, frequently steps on the throttle or brake to maintain the vehicle speed or to over-take, each application of throttle or brake means additional fuel consumption or emissions. If human wants to fly in the sky, we cannot simply design a flying device with flapping wings by simulating the birds, must instead design the flying device according to the First Principle of Aerodynamics and Control Theory; Similarly, if human wants to automate the task of simultaneous optimization of long-haul heavy truck energy-saving and emission-reduction, we cannot simply imitate the experienced driver, and must find the First Principle of solving the problem of long-haul heavy truck simultaneous energy-saving and emission-reduction.

The First Principle of the long-haul heavy truck energy saving and emission reduction simultaneous optimization is the vehicle dynamic equation (1-1); The human driver cannot use the mental steps or pencil & paper to solve the vehicle dynamic equation in real-time (second-level delay), cannot quantitatively (relative error less than 10%) and dynamically predict the vehicle road-load power space-time function distribution in the electronic horizon (minute level or mile level); even the best fuel-saving driver can only roughly remember the longitudinal slope distribution of the road sections in some of the nation-wide expressway roads; however the vehicle-mounted computer (such as VCU 201) can, according to the static parameters (engine displacement and power, motor power, battery pack capacity, vehicle total weight, 3D map, drag coefficient, rolling-resistance coefficient and so on) and dynamic data (vehicle speed, acceleration, road longitudinal slope, time, the vehicle geographical positioning and so on) of the ACE truck 010, easily solve the vehicle dynamic equation (1-1) with at least 0.2 Hz refreshing frequency and relative error less than 10%, accurately and timely predict the vehicle road-load power space-time function distribution ("the predicted road-load power" for short) in the electronic horizon in (hour level or hundred-mile level); at the same time, the various sensors and controllers of ACE heavy truck 010 (such as ECU 102, GNSS 220, VCU 201, MCU1 121, MCU2 122*a*, BP1 130*a*, BP2 130*b* and so on) can measure, compute, store locally, or upload to the cloud "fuel-saving data set" at refreshing frequency over 2.0 Hz. Obviously, the fuel-saving data set contains the actual road-load power; projecting the actual road-load power space-time function and the predicted road-load power space-time function to the vehicle road longitudinal one-dimensional space and calculating the difference between the two; the precision of the VCU 201 prediction of the road-load power function can be improved automatically and continuously by means of the machine learning (ML) algorithm and the vehicle-end and the cloud coordination (see FIG. 5); accurately and timely predicting the road-load power function distribution in the hundred-mile level electronic horizon is the technical foundation of the long-haul ACE heavy truck 010 through intelligent cruise control (iCC) technical means to optimize the energy saving and emission reduction of the vehicle simultaneously; the VCU 201 needs the planning space of the vehicle Power Management Strategy (PMS) in the electronic horizon (hour level or hundred-mile level), by dynamically controlling the duty ratio of the instantaneous power function of DPC engine 101 and then calculating the vehicle road-load average power function the engine average power function (equation MAW) in the electronic horizon to dynamically plan and control the average charge state function (SoC) of the battery pack 130*a*&*b*, ensuring the battery pack 130*a*&*b* working in the high-efficiency area (BLL<SoC<BUL) most of time (90%+), all time (100%) running in the safety area (LRL<SoC<URL); the DPC engine 101 of the ACE truck to achieve simultaneous minimization of actual fuel consumption and emissions of the whole freight event, and the actual energy saving and emission reduction effect of ACE heavy truck is basically independent of the skill level of the driver and the technical performance of the engine.

The essence of the ACE heavy truck 010 energy-saving and emission-reduction simultaneous optimization problem is the problem of vehicle-level power-management-strategy (PMS); the invention, through ACE heavy truck 010 intelligent cruise control (iCC) technical measure, realizes the vehicle online real-time & global power management strategy (PMS); the iCC leverages two mutually decoupled control loops (namely fast loop or slow loop), achieves real-time & global energy-saving & emission-reduction optimization control strategy of the ACE Truck 010 customized for a specific freight event under the premise of ensuring the vehicle power and active safety; iCC inner layer is a second-level fast control loop; at any time, regardless whether the DPC engine 101 working-point is high-state or low-state, VCU 201 can dynamically command ePSD 123, double motor 110&140, battery packs 130*a*&*b*, clutch 111 and so on, to satisfy vehicle power equation (1-1) and the series-hybrid power equation (2-4) or parallel-hybrid power equation (3-3); II is obvious that the quick loop only focuses on how to dynamically distribute power between the engine and the battery pack, so as to ensure the instantaneous power performance and the active safety of the ACE heavy truck 010, and the instantaneous local optimization of the engine energy saving and emission reduction; it does not directly relate to the real-time & global optimization of the engine energy saving and emission reduction; the iCC outer layer is an hour-level slow control loop; VCU 201 firstly predicts, at refresh frequency over 0.2 Hz within the electronic horizon (hour-level or hundred mile level), the road-load instantaneous power function and the average power function (see equation MAW), secondarily dynamically control the distribution of the difference between the predicted average road-load power function and the average power function of the DPC engine 101 within the electronic horizon (hour-level or hundred-mile level) according to the special energy-saving and emission-reduction algorithm (via changing the duty ratio of the DPC engine to meet series-hybrid power equation (2-4A) or parallel-hybrid power equation (3-3A)), so as to ensure that the battery pack 130*a*&*b* work stably and for a long time in its high-efficiency zone and seek global maximization of battery pack regenerative electric energy throughput or total electric energy throughput, achieving DPC engine 101 real-time & global energy-saving and emission-reduction optimization (Real-time and Global Optimization) for the specific freight event; Obviously the slow-speed loop only focuses on real-time global optimization energy-saving and emission-reduction of the vehicle, doesn't pay attention to instantaneous power distribution between the engine and the battery pack (i.e., between the engine and the motor); the slow loop and the fast loop are decoupled and both of them can be controlled independently.

In the preferred embodiment, the PWM period $T_{PWM}$ of the DPC engine 101 is one minute, the rolling average window $T_{MAW}$ is five minutes (i.e., five PWM periods), the electronic horizon time period $T_{ehz}$ is one hour or the arrival end time $T_{ltd}$; ACE heavy truck 010, when under normal expressway running, has average vehicle speed higher than 40 miles per hour; due to suddenly deceleration of the front vehicle in the same lane or other traffic conditions, ACE heavy truck 010 may need sudden deceleration to keep the driving safety distance; However, such a sudden drop of the instantaneous vehicle speed is a temporary disturbance (Transient Disturbance), and the speed of the ACE heavy truck will be restored to the speed of the expressway traffic flow (higher than 40 miles per hour) within one minute; Because ACE heavy truck 010 has superior regenerative braking capability (and parallel-hybrid mode 10 seconds pulse regenerative braking power up to 500 kW), this kind of temporary disturbance only has significant influence to the instantaneous vehicle speed but negligible impact on the vehicle level energy-saving and emission-reduction. The fast loop of the power management strategy (PMS) is responsible for dynamically adjusting the instantaneous vehicle speed and acceleration, ensuring the power performance and active driving safety of the vehicle (braking/steering), the response time of vehicle total torque thousand NM level jump or total power hundred kW level jump is in the hundred millisecond level. Obviously, the relative error when VCU 201 predicts the average road-load power function distribution within the future one-hour in the electronic horizon is significantly lower than that (i.e., the variance of the predicted value and the actual value) of the instantaneous road-load power function, and the robustness of the predicted average road-load power function is obviously better than that of the predicted instantaneous road-load power function; the slow-speed loop has enough time (hour level) to dynamically control the battery pack 130*a*&*b* to operate in one of the three modes (CS, CD, CI) steadily or to switch among them by dynamically adjusting the DPC engine 101 instantaneous power PWM duty ratio, to perform predictive charge control (PSC) of the battery pack, to seek regeneration charge turnover rate or total charge turnover rate maximization, so as to realize ACE heavy truck 010 RDE energy-saving and emission-reduction real-time global optimization. It needs to be emphasized, based on the iCC technology of the invention, the energy-saving and emission-reducing optimization algorithm is an online real-time global (On-line Real-time Global) optimization algorithm, and has substantial difference with the existing technology (prior art) power management strategy (PMS) of modern internal combustion engine vehicle or hybrid vehicle; the former (iCC) has multiple advantages over the latter (existing technology) such as lower computation power requirement at the vehicle end, more robust and less computational error, simultaneous optimization of engine 101 fuel-consumption and pollutant-emissions ($CO_2$ & NOx), agile customization to achieve "thousand-vehicle thousand-face".

In the present invention, the working-condition of the engine 101 refers to the instantaneous rotating speed and torque of the engine flywheel, a powertrain (containing engine 101, motor 110&140, transmission box 150, axle 160&180, etc.) working-condition or ACE heavy truck 010 working-condition refers to the instantaneous rotating speed and the total torque of all driving wheels of the vehicle; for the ACE heavy truck 010, vehicle working-condition is equivalent to the hybrid powertrain working-condition, but is not equivalent to the working-condition of the engine 101; ACE heavy-truck working-condition and engine working-condition are independent from each other, and can be controlled separately. The so-called point working-condition, line working-condition, of surface working-condition of the engine refers to the projections of all the instantaneous working-condition points of the operating engine on the plane of the engine universal characteristics (rotation speed on the horizontal axis; torque on vertical axis) to be fixed point, line, or surface respectively; Obviously, the operating condition of the vehicle is always a surface working-condition (changing speed & torque). Referring to FIG. 4, one of the distinguishing features of the present invention and the prior art is that the digital pulse control (DPC) engine 101 of the ACE heavy truck 010 can run (in series-hybrid or parallel-hybrid) forever in line operating conditions, wherein at least one line operating condition is in the active operating (AOM) high-efficiency zone of the engine, the other line working-condition is the passive operation (POM) high-efficiency zone of zero emission & zero fuel consumption of the engine, with second-level smooth switching between the two line working-conditions; The traditional analogue electric control (AEC) engine of ICE heavy truck or hybrid heavy truck (especially parallel-hybrid or mixed-hybrid heavy truck) in the existing technology is surface working-condition, it cannot stably run (containing fast switching) at one of the three line working-conditions for a long time.

In the prior art, the instantaneous power function of the analog electronic control (AEC) engine 101 of an ICE heavy truck or a hybrid heavy truck is similar to the vehicle road-load instantaneous power function, both are analogue slow-varying time function, when the vehicle runs normally (except emergency brake), the instantaneous power function of the engine will not have the sudden jump of the hundred-KW-level in magnitude and second-level in time (especially the jump from the low-state to the high-state). Referring to FIG. 4 and FIG. 6, the instantaneous power function of the DPC engine 101 provided by ACE truck of the present invention is a bipolar non-equal amplitude pulse-width-modulation (PWM) function; in each PWM period (minute-level time duration), the second-level sudden jump of twohundred-kW-level can appear at most twice (at most one low-state to the high-state jump up and/or at most high-state to the low-state jump down). One of the essential technical features of the DPC engine of the present invention is regardless of what the actual cycle working-condition (Duty Cycle of the vehicle) of the ACE heavy truck 010 is, the engine instantaneous power function will often (within minute-level intervals) have hundred-kW-level sudden jumps (second-level). Obviously, the instantaneous power function of the DPC engine and the instantaneous power function of the AEC engine in the prior art have fundamental difference in the function presentation form in the time domain; the physical explanation corresponding to the presentation forms of the instantaneous power functions of the two different engines is the following: for the AEC engine 101 of the existing technology, all operating-condition points in the 1st quadrant of the engine universal characteristics curve are presented as point-cloud complex surface distribution, wherein a non-negligible part of the operating-condition points (10%+probability in time) is located outside the combustion high-efficiency zone of the engine; whereas for the DPC engine 101, all operating-condition points in the 1st quadrant or in the 4th quadrant of the engine universal characteristics curve are presented along at least two simple pre-defined working-condition lines (see FIG. 4); wherein the high-state operating-condition points in the 1st quadrant almost always (99%+probability in time) falls on the pre-defined operating-condition line in the combustion high-efficiency zone of the engine, the DPC engine can optimize the actual fuel consumption and pollutant emissions simultaneously, the low-state operating-condition points in the 4th quadrant are all fallen on the pre-defined zero-fuel-consumption and zero-emission operating-condition line (namely another type of high-efficiency operating-condition point); the time probability of the low-efficiency operating-condition points occurred during bidirectional switching between the engine high-state and the low-state is less than 1%, with negligible influence on the actual cumulative fuel consumption and emissions of the DPC engine.

The intelligent mode switching (iMS) technology is a member of the intelligent cruise control (iCC) combination technology set, one of its preferably embodiment is as follows: VCU 201 with at least 0.5 Hz refresh frequency dynamic calculates the predicated instantaneous road-load-power and average road-load-power functional distribution in the hour-level electronic horizon; on the road section where the absolute value of the predicted average road-load-power space-time function is less than 50 kW and the length is greater than 0.5 mile, preferably switch from parallel-hybrid mode (clutch 111 closed) to series-hybrid mode (clutch 111 open), when the absolute value of the predicated or actual average road-load-power is greater than 50 kW, preferably switch to parallel-hybrid mode. Obviously, for the DPC engine 101, the mechanical power consumption or electrical power consumption in series-hybrid iSS low-state working-condition is obviously lower than that of parallel-hybrid iPS low-state working-condition, therefore iMS can further reduce the vehicle fuel consumption 1.0%. Since the traction motor P2 140 is mechanically connected with the transmission-box 150, the transmission-box will never be in neutral operation, and the iMS has a significant difference in technical features with the existing technology of neutral coasting (Commercial names such as eCoast or Smart-Coast), and the former is better than the latter in vehicle braking performance.

The software defined hybrid powertrain and ACE heavy truck of the invention, compared with the existing technology, focus on vehicle RDE fuel-saving and emission-reduction, greatly reduce the technology difficulty of using information (fuel-saving data set) to save energy (fuel-consumption reduction), significantly improve the conversion efficiency of the actual fuel-consumption & emission reduction of ACE heavy truck by consuming information.

Although the present disclosure describes the subject matter using a language specific to structural features and/or method logic actions, it should be understood that the subject matter defined in the appended Claims is not necessarily limited to the specific features or actions described above. On the contrary, the specific features and actions described above are merely illustrative of the Claims.

The invention claimed is:
1. A hybrid heavy truck, comprising:
a drive motor mechanically connected to a driving shaft of the hybrid heavy truck;
a generator set and at least one power battery pack, each of which can independently provide power to the drive motor, wherein the generator set comprises an engine and a generator which are mechanically connected with each other in bidirectional; and
a vehicle controller configured to: control the engine, so that the engine only can work in a specified combustion state or another specified non-combustion state, and can be switched between the combustion state and the non-combustion state, so as to adjust the power provided by the engine by a first modulation mode, wherein,
in the combustion state, the engine has a rotating speed in a specified first positive value range, and a torque in a specified second positive value range; and
in the non-combustion state, the engine has a rotating speed in a specified second positive value range, and a torque in a specified negative value range, the absolute value of the torque in the negative value range being lower than the value of the torque in the positive value range, and
the vehicle controller is further configured to: adjust the power provided by the power battery pack by a second modulation mode, the second modulation mode being determined based on the required road-load power and the first modulation mode.
2. The hybrid heavy truck of claim 1, further comprising:
a controllable clutch disposed between the generator set and the drive motor, and operable to:
establish a direct mechanical connection between the generator set and the drive motor, when the clutch is closed; and
cause the generator set and the drive motor lose the direct mechanical connection, when the clutch is open.
3. The hybrid heavy truck of claim 1, wherein adjusting the power provided by the engine by the first modulation mode comprises:
in each control period, determining a duty ratio between the time during which the engine is working in the combustion state and the control period.
4. The hybrid heavy truck of claim 3, wherein adjusting the power provided by the engine by the first modulation mode further comprises:
in each control period, further adjusting the determined duty ratio in accordance with the state of charge of the battery pack required at a certain time point in the future, to obtain an updated duty ratio.

5. The hybrid heavy truck of claim 3, wherein adjusting the power provided by the engine by the first modulation mode further comprises:
in each control period, controlling the power amplitude of the engine working in the combustion state and/or the power amplitude of the engine working in the non-combustion state.

6. The hybrid heavy truck of claim 5, wherein controlling the power amplitude of the engine working in the combustion state comprises:
when the clutch is closed, the power amplitude provided by the engine is selected from: the power amplitude corresponding to a working point on a predefined specific fuel consumption curve in an area jointly defined by the first positive value range of the rotating speed and the positive value range of the torque, and
when the clutch is open, the first positive value range of the rotating speed is set as a fixed value, and the power amplitude provided by the engine is selected from: the amplitude of power corresponding to a working point on a straight-line segment in a region defined by the fixed value of the rotating speed and the positive value range of the torque.

7. The hybrid heavy truck of claim 1, further comprising:
an electric power divider including a first port, a second port and a third port, wherein,
the first port is bidirectionally AC connected with the generator set;
the second port is bidirectionally and electrically connected to the input end of the drive motor; and
the third port is in bidirectionally DC connected with the at least one power battery pack, and
the electric power divider is controlled by the vehicle controller to adjust the flow path, amplitude, and direction of electric power among the generator set, the battery pack, and the drive motor.

8. The hybrid heavy truck of claim 1, wherein the vehicle controller is further configured to:
determine an average value of the road-load power in a plurality of control periods and an average value of the power provided by the internal combustion engine; and
determine, based on the difference between the determined average value of the road-load power and the average value of the power provided by the internal combustion engine, the working mode of the power battery pack in the plurality of control periods, so that the battery pack can enter one of the following three modes:
when the difference between the average value of the road-load power and the average value of the power provided by the internal combustion engine is substantially zero, entering a charge sustaining (CS) mode, in which the state of charge is maintained between a predefined first upper limit and a first lower limit;
when the difference between the average value of the road-load power and the average value of the power supplied by the internal combustion engine is substantially greater than zero, entering a charge depletion (CD) mode, in which the average value of the state of charge monotonically decreases between a predefined second upper limit and a second lower limit; and
when the difference between the average value of the road-load power and the average value of the power provided by the internal combustion engine is substantially less than zero, entering a charge increasing (CI) mode, in which the average value of the state of charge monotonically increases between a predefined second upper limit and a second lower limit, wherein the second upper limit is higher than the first upper limit, and the second lower limit is lower than the first lower limit.

9. The hybrid heavy truck of claim 1, further comprising:
a power control unit,
a catalytic electric heater, and
an after-treatment system, wherein the after-treatment system is arranged downstream of the catalytic electric heater along an exhaust emission flow direction,
wherein the power control unit controls the catalytic electric heater to heat up the after-treatment system when the internal combustion engine works in the non-combustion state or transitions from the non-combustion state to the combustion state.

10. The hybrid heavy truck of claim 9, wherein the vehicle controller is further configured to:
when the internal combustion engine is in the non-combustion state, cause the air in-take value and exhaust valve of all cylinders of the internal combustion engine to enter a closed state, so as to reduce the negative impact of the exhaust air on the temperature of the downstream catalytic system.

11. A hybrid heavy truck, comprising:
a drive motor mechanically connected to the driving shaft of the hybrid heavy truck;
an engine and at least one power battery pack, each of which can independently provide power to the drive motor; and
a vehicle controller configured to: control the engine, so that the engine only can work in a specified combustion state or another specified non-combustion state, and can be switched between the combustion state and the non-combustion state, so as to adjust the power provided by the engine by a first modulation mode, wherein,
in the combustion state, the engine has a rotating speed in a specified first positive value range, and a torque in a specified positive value range; and
in the non-combustion state, the engine has a rotating speed in a specified second positive value range and a torque in a specified negative value range, the absolute value of the torque in the negative value range being lower than the value of the torque in the positive value range, and,
the vehicle controller is further configured to: adjust the power provided by the power battery pack by the second modulation mode, the second modulation mode being determined based on the required road-load power and the first modulation mode.

12. A method for retrofitting a traditional heavy truck, comprising:
providing an existing traditional heavy truck, the existing traditional heavy truck comprising an engine;
providing a drive motor, the drive motor being mechanically connected to the driving shaft of the traditional heavy truck;
providing a generator, the generator being bidirectionally and mechanically connected to the engine;
providing at least one power battery pack, the generator and the power battery pack being configured to independently provide power to the drive motor; and
providing a vehicle controller, the vehicle controller being configured to: control the engine, so that the engine only can work in a specified combustion state or another specified non-combustion state, and can be switched between the combustion state and the non-combustion state, so as to adjust the power provided by the engine by a first modulation mode, wherein, in the combustion state, the engine has a rotating speed in a specified first positive value range, and a torque in a specified positive value range; and in the non-combustion state, the engine has a rotating speed in a specified second positive value range and a torque in a specified negative value range, the absolute value of the torque in the negative value range being lower than the value of the torque in the positive value range, and the vehicle controller is further configured to: adjust the power provided by the power battery pack by the second modulation mode, the second modulation mode being determined based on the required road-load power and the first modulation mode.

13. A device for controlling a vehicle, comprising:

a processing unit; and a memory coupled to the processing unit and containing computer program code, wherein when the computer program code is executed by the processing unit, the computer program code causes the device to perform the actions of:

controlling an engine of the vehicle, so that the engine only can work in a specified combustion state or another specified non-combustion state, and can be switched between the combustion state and the non-combustion state, so as to adjust the power provided by the engine by a first modulation mode, wherein, in the combustion state, the engine has a rotating speed in a specified first positive value range, and a torque in a specified positive value range; and in the non-combustion state, the engine has a rotating speed in a specified second positive value range and a torque in a specified negative value range, the absolute value of the torque in the negative value range being lower than the value of the torque in the positive value range, and the device is further configured to: adjust power provided by a power battery pack of the vehicle by a second modulation mode, the second modulation mode being determined based on the required road-load power and the first modulation mode.

14. A method for controlling a vehicle, comprising:

controlling an engine of the vehicle, so that the engine only can work in a specified combustion state or another specified non-combustion state, and can be switched between the combustion state and the non-combustion state, so as to adjust the power provided by the engine by a first modulation mode, wherein, in the combustion state, the engine has a rotating speed in a specified first positive value range, and a torque in a specified positive value range; and in the non-combustion state, the engine has a rotating speed in a specified second positive value range and a torque in a specified negative value range, the absolute value of the torque in the negative value range being lower than the value of the torque in the positive value range, and adjusting the power provided by a power battery pack of the vehicle by a second modulation mode, the second modulation mode being determined based on the required road-load power and the first modulation mode.

15. A computer program product stored on a non-volatile computer readable medium and comprising machine executable instructions, wherein the machine executable instructions, when executed, cause the machine to perform the steps of the method of claim 14.

\* \* \* \* \*